US010164984B2

(12) United States Patent
Kim et al.

(10) Patent No.: US 10,164,984 B2
(45) Date of Patent: Dec. 25, 2018

(54) METHOD AND APPARATUS FOR SHARING DATA

(71) Applicant: SAMSUNG ELECTRONICS CO., LTD., Suwon-si (KR)

(72) Inventors: Yong-jin Kim, Seoul (KR); Kyung-ah Chang, Seoul (KR); Jong-deok Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 320 days.

(21) Appl. No.: 14/812,435

(22) Filed: Jul. 29, 2015

(65) Prior Publication Data

US 2016/0036822 A1 Feb. 4, 2016

(30) Foreign Application Priority Data

Jul. 29, 2014 (KR) ........................ 10-2014-0096763
Jun. 3, 2015 (KR) ........................ 10-2015-0078663

(51) Int. Cl.
*H04L 29/06* (2006.01)
*H04L 29/08* (2006.01)
(Continued)

(52) U.S. Cl.
CPC ...... *H04L 63/102* (2013.01); *G06F 17/30067* (2013.01); *G06F 21/6218* (2013.01);
(Continued)

(58) Field of Classification Search
CPC ............... H04L 63/102; H04L 67/1095; H04L 67/1097; H04L 67/306; G06F 17/30067;
(Continued)

(56) References Cited

U.S. PATENT DOCUMENTS 7,734,708 B1 * 6/2010 Fletcher ............... G06Q 10/107 709/204
2008/0313700 A1 12/2008 Chalasani et al.
(Continued)

FOREIGN PATENT DOCUMENTS

JP 2009-31828 A 2/2009
KR 10-2014-0013251 A 2/2014

OTHER PUBLICATIONS

Communication dated Nov. 11, 2015 by the International Searching Authority in International Application No. PCT/KR2015/007935, (PCT/ISA/220, PCT/ISA/210, & PCT/ISA/237).
(Continued)

*Primary Examiner* — Linglan E Edwards
*Assistant Examiner* — Forrest L Carey
(74) *Attorney, Agent, or Firm* — Sughrue Mion, PLLC

(57) ABSTRACT

A relay server includes a storage configured to store first access right information of a first cloud storage service to which a first user is subscribed and second access right information of a second cloud storage service to which a second user is subscribed. The relay server further includes a communication interface configured to request, from the first cloud storage service, first data that is stored in the first cloud storage service, based on the first access right information, and receive the requested first data from the first cloud storage. The relay server further includes a controller configured to control the communication interface to store the received first data in the second cloud storage service, based on the second access right information.

28 Claims, 114 Drawing Sheets

(51) Int. Cl.
*G06F 21/62* (2013.01)
*G06F 17/30* (2006.01)

(52) U.S. Cl.
CPC ...... *G06F 21/6236* (2013.01); *G06F 21/6272* (2013.01); *H04L 67/1095* (2013.01); *H04L 67/1097* (2013.01); *H04L 67/306* (2013.01); *G06F 2221/2141* (2013.01)

(58) Field of Classification Search
CPC ............. G06F 21/6218; G06F 21/6236; G06F 21/6272; G06F 2221/2141
See application file for complete search history.

(56) References Cited

U.S. PATENT DOCUMENTS

| | | | |
|---|---|---|---|
| 2009/0164637 A1 | 6/2009 | Tanimoto | |
| 2009/0282462 A1 | 11/2009 | Skaria et al. | |
| 2011/0035811 A1 | 2/2011 | Rees et al. | |
| 2012/0324544 A1 | 12/2012 | Kanetomo | |
| 2013/0007389 A1 | 1/2013 | Patterson et al. | |
| 2013/0054634 A1* | 2/2013 | Chakraborty ....... | H04L 67/1091 707/769 |
| 2013/0226876 A1* | 8/2013 | Gati .................. | G06F 17/30079 707/652 |
| 2013/0282830 A1 | 10/2013 | Besen et al. | |
| 2013/0290256 A1 | 10/2013 | Barrall et al. | |
| 2013/0311598 A1 | 11/2013 | Arrouye et al. | |
| 2014/0026061 A1 | 1/2014 | Kim et al. | |
| 2014/0082154 A1 | 3/2014 | Lin | |
| 2016/0004718 A1* | 1/2016 | Lin .................. | G06F 17/30171 707/690 |
| 2017/0155639 A1* | 6/2017 | Hu ...................... | H04L 63/0815 |

OTHER PUBLICATIONS

Communication dated Dec. 4, 2015 by the European Patent Office in European Application No. 15178602.7.
Tang et al., "A Multi-Tenant RBAC Model for Collaborative Cloud Services", 2013 Eleventh Annual Conference on Privacy, Security and Trust (PST), Jul. 10, 2013, 10 total pages.

* cited by examiner

| User | First Cloud Storage ID | Data Provided to Another Person (1530) |
|---|---|---|
| | | File or Folder Identification Information (1532) |
| First User ID | Cloud1_User1 | https://www.Dropbox.com/ Dropbox_user1_FOLDER2 |

| File or Folder Identification Information | Original File Information | | | | Information about Sharing |
|---|---|---|---|---|---|
| | File or Folder Name | Owner | Storage Storing Original | Original File or Folder Access URL Information | Receiver |
| https://www.Dropbox.com/Dropbox_user1_FOLDER2 | Dropbox_user1_FOLDER2 | First User ID | Dropbox | https://www.Dropbox.com/Dropbox_user1_FOLDER2 | Second User ID |

| File or Folder Identification Information | Original File Information | | | | Information about Sharing |
|---|---|---|---|---|---|
| | File or Folder Name | Owner | Storage Storing Original | Original File or Folder Access URL Information | Receiver |
| https://www.Dropbox.com/Dropbox_user1_FOLDER2 | Dropbox_user1_FOLDER2 | First User ID | Dropbox | https://www.Dropbox.com/Dropbox_user1_FOLDER2 | Second User ID |
| https://www.Dropbox.com/Dropbox_user1_FOLDER2/Dropbox_user1_SUB_FOLDER_1 | Dropbox_user1_SUB_FOLDER_1 | First User ID | Dropbox | https://www.Dropbox.com/Dropbox_user1_FOLDER2/Dropbox_user1_SUB_FOLDER_1 | Second User ID |
| https://www.Dropbox.com/Dropbox_user1_FOLDER2/Dropbox_user1_SUB_FOLDER_2 | Dropbox_user1_SUB_FOLDER_2 | First User ID | Dropbox | https://www.Dropbox.com/Dropbox_user1_FOLDER2/Dropbox_user1_SUB_FOLDER_2 | Second User ID |
| https://www.Dropbox.com/Dropbox_user1_FOLDER2/Dropbox_user1_FILE1 | Dropbox_user1_FILE1 | First User ID | Dropbox | https://www.Dropbox.com/Dropbox_user1_FOLDER2/Dropbox_user1_FILE1 | Second User ID |

| User | Second Cloud Storage ID | Storage Position of Data received from Another Person / Storage Resource Access URL |
|---|---|---|
| Second User ID | Cloud2_User2 | https://wwwGoogle_ Drive.com/User2 |

FIG. 22
200
'S Cloud_user1_FOLDER2' Folder was shared from First User
2210
P.M.
12:12
Tue
10/19
Mon
31
Calendar
Watch
Pictures
Camera
3
Phone
Contacts
Messages
Home

| User | Second Cloud Storage ID | Storage Position of Data received from Another Person / Storage Resource Access URL | Provider selected by User |
|---|---|---|---|
| Second User ID | Cloud2_User2 | https://wwwGoogle_Drive.com/User2 | First User ID |

| File or Folder Identification Information | Original File Information | | | | Information about Sharing | | |
|---|---|---|---|---|---|---|---|
| | File or Folder Name | Owner | Storage Storing Original | Folder Access URL Information | Receiver | Copied Storage | Copied File Access URL Information |
| https://www.Dropbox.com/Dropbox_user1_FOLDER2 | Dropbox_user1_FOLDER2 | First User ID | Dropbox | https://www.Dropbox.com/Dropbox_user1_FOLDER2 | Second User ID | Google Dive | https://www.google.com/user1_FILE3.av |

| File or Folder Identification Information | Original File Information | | | | Information about Sharing | | | Synchronization Direction |
|---|---|---|---|---|---|---|---|---|
| | File or Folder Name | Owner | Storage Storing Original | Folder Access URL Information | Receiver | Copied Storage | Copied File Access URL Information | |
| https://www.Dropbox.com/Dropbox_user1_FOLDER2 | Dropbox_user1_FOLDER2 | First User ID | Dropbox | https://www.Dropbox.com/Dropbox_user1_FOLDER2 | Second User ID | Google Dive | https://www.google.com/user1_FILE3.av | Synchronize only Owner |

4305

4320

| User | First Cloud Storage ID | Data Provided to Another Person | Set Synchronization |
|---|---|---|---|
| | | File or Folder Identification Information | |
| First User ID | Cloud1_User1 | https://www.Dropbox.com/Dropbox_user1_FOLDER2 | Disable Synchronization |

| User ID (6710) | Messenger Service Identification Information (6720) | User ID registered in Messenger Server (6730) | Unique Information (6740) | |
|---|---|---|---|---|
| | | | Phone Number | E-mail Address |
| Relay Server ID of First User | First Messenger | First Messenger ID of First User | 010-1111 -2222 | Alice@ gmail.com |
| Relay Server ID of Second User | Second Messenger | Second Messenger ID of Second User | 010-2222 -1111 | Cute_Linda@ hanmail.net |

| User ID (6710) | Messenger Service Identification Information (6720) | User ID registered in Messenger Server (6730) | Unique Information (6740) | | Messenge Friend Addition Right Information (6750) |
|---|---|---|---|---|---|
| | | | Phone Number | E-mail Address | |
| Relay Server ID of First User | First Messenger | First Messenger ID of First User | 010-1111-2222 | Alice@gmail.com | First Right Information |
| Relay Server ID of Second User | Second Messenger | Second Messenger ID of Second User | 010-2222-1111 | Cute_Linda@hanmail.net | Second Right Information |

| User ID (6710) | Messenger Service Identification Information (6720) | Messenger Server (6730) | Unique Information (6740) | | Messenge Friend Addition Right Information (6750) | Relay Server Friend ID (6950) |
|---|---|---|---|---|---|---|
| | | | Phone Number | E-mail Address | | |
| Relay Server ID of First User | First Messenger | First Messenger ID of First User | 010-1111-2222 | Alice@gmail.com | First Right Information | Relay Server ID of Second User |
| Relay Server ID of Second User | Second Messenger | Second Messenger ID of Second User | 010-2222-1111 | Cute_Linda@hanmail.net | Second Right Information | Relay Server ID of First User |

| User ID | Virtual Account Information | | | | | |
|---|---|---|---|---|---|---|
| | First Messenger Server | | Second Messenger Server | | Third Messenger Server | |
| | Virtual ID | Virtual Password | Virtual ID | Virtual Password | Virtual ID | Virtual Password |
| Relay Server ID of First User | User | User | 111-1000-2000 | Password1 | Not generated | Not generated |
| Relay Server ID of Second User | Cute_Linda@hanmail.net | Password2 | User | User | Not generated | Not generated |

| User ID (7610) | Messenger Service Identification Information (7620) | Messenger Server (7630) | Unique Information (7640) | | Messenger Friend Addition Right Information (7650) | Friend ID (7660) |
|---|---|---|---|---|---|---|
| | | | Phone Number | E-mail Address | | |
| Relay Server ID of First User | First Messenger | First Messenger ID of First User | 010-1111 -2222 | Alice@ gmail.com | Relay Server Account Information of First User | Relay Server ID of Second User |
| Relay Server ID of Second User | Second Messenger | Second Messenger ID of Second User | 010-2222 -1111 | Cute_Linda@ hanmail.net | Second Right Information | Relay Server ID of First User |

| User ID (7710) | Virtual Account Information (7720) | | | |
| --- | --- | --- | --- | --- |
| | Second Messenger Server | | Third Messenger Server | |
| | Virtual ID | Virtual Password | Virtual ID | Virtual Password |
| Relay Server ID of First User | 111-1000-2000 | Password1 | Alice_wonderland @naver.com | Password 3 |
| Relay Server ID of Second User | User | User | 010-3333-2222 | Password 4 |

| Messenger Service Identification Information of User (8512) | User Account Information in Messenger Service (8514) | Messenger Friend Addition Right Information (8516) |
|---|---|---|
| First Messenger | First Messenger Account Information of First User | First Right Information |

8520

| Friend ID (8521) | Virtual ID (8522) | Virtual Password (8523) | Messenger Service Identification Information of Friend (8524) | User ID of Friend in Friend Messenger Service (8525) | Contact Address (8526) | |
|---|---|---|---|---|---|---|
| | | | | | Phone Number | E-mail Address |
| Identification Information of Second User | Cute_Linda@hanmail.net | Password2 | Second Messenger | Second Messenger ID of Second User | 010-2222-1111 | Cute_Linda@hanmail.net |

| Messenger Service Identification Information of User (8532) | User Account Information in Messenger Service (8534) | Messenger Friend Addition Right Information (8536) |
|---|---|---|
| Second Messenger | Second Messenger Account Information of Second User | Second Right Information |

8540

| Friend ID (8541) | Virtual ID (8542) | Virtual Password (8543) | Messenger Service Identification Information of Friend (8544) | User ID of Friend in Friend Messenger Service (8545) | Contact Address (8546) | |
|---|---|---|---|---|---|---|
| | | | | | Phone Number | E-mail Address |
| Identification Information of First User | 111-1000-2000 | Password2 | First Messenger | First Messenger ID of First User | 010-1111-2222 | Alice@gmail.com |

METHOD AND APPARATUS FOR SHARING DATA

CROSS-REFERENCE TO RELATED APPLICATIONS

This application claims priority from Korean Patent Application No. 10-2014-0096763, filed on Jul. 29, 2014, and Korean Patent Application No. 10-2015-0078663, filed on Jun. 3, 2015, in the Korean Intellectual Property Office, the disclosures of which are incorporated herein by reference in their entireties.

BACKGROUND

1. Field

Methods and apparatuses consistent with exemplary embodiments related to a method and an apparatus for sharing data.

2. Description of the Related Art

Due to the development of network technology, data stored in desktop computers, notebook computers, or portable devices may also be stored in servers on the Internet, and users may use their own accounts to download the data from the servers anytime and from anywhere, whenever necessary. Also, the users may share their own data stored in the servers with other users. Also, the users may use messenger services to communicate messages with others anytime and from anywhere.

However, to share data with others, the users should have accounts of the same storage service provider as the others. Also, the users may utilize the data only in the service provided by the storage service provider of the storage in which their own data is stored. Also, to chat with others, the users should have accounts of the same messenger service provider as the others.

Thus, when the service provider of the service used by users is different from the service provider of the service used by others, the users may not use the service.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide methods and apparatuses for sharing data or transmitting messages between users, which use different cloud servers, by using relay servers.

According to an aspect of an exemplary embodiment, there is provided a relay server including a storage configured to store first access right information of a first cloud storage service to which a first user is subscribed and second access right information of a second cloud storage service to which a second user is subscribed. The relay server further includes a communication interface configured to request, from the first cloud storage service, first data that is stored in the first cloud storage service, based on the first access right information, and receive the requested first data from the first cloud storage service. The relay server further includes a controller configured to control the communication interface to store the received first data in the second cloud storage service, based on the second access right information.

The first access right information may include an account of the relay server that is registered in the first cloud storage, and an access right representing a right of the relay server to receive the first data from the first cloud storage service may be set in the first cloud storage service to correspond to the account.

The access right may be set by the first cloud storage service in response to the first cloud storage service receiving, from a device of the first user, a request for sharing the first data with the relay server.

The second access right information of the second cloud storage service may include an account of the relay server that is registered in the second cloud storage service, and an access right representing a right of the relay server to store data in a storage space of the second cloud storage service may be set in the second cloud storage service to correspond to the account.

The access right may be set by the second cloud storage service in response to the second cloud storage service receiving, from a device of the second user, a request for sharing the storage space of the second cloud storage service with the relay server.

The communication interface may be further configured to receive, from the first cloud storage service, a synchronization request indicating that the first data is modified, and the controller may be further configured to update a copy of the first data that is stored in the second cloud storage service into the modified first data in response to the communication interface receiving the synchronization request.

The first data may include a file, the synchronization request may include position information representing a position of modified data in the file, the controller may be further configured to determine whether the modified data is of a write-protected region, based on the position information, in response to the communication interface receiving the synchronization request, and update the copy of the first data that is stored in the second cloud storage service into the modified first data in response to the controller determining that the modified data is not of the write-protected region, and the write-protected region may be in the copy of the first data that is set not to be modified by the relay server.

The communication interface may be further configured to receive, from the second cloud storage service, a synchronization request indicating that a copy of the first data that is stored in the second cloud storage service is modified, and the controller may be further configured to update the first data that is stored in the first cloud storage service into the modified copy of the first data in response to the communication interface receiving the synchronization request.

The first data may include a file, the synchronization request may include position information representing a position of modified data in a copy of the file, the controller may be further configured to determine whether the modified data is of a write-protected region, based on the position information, in response to the communication interface receiving the synchronization request, and update the first data that is stored in the first cloud storage service into the modified copy of the first data in response to the controller determining that the modified data is not of the write-protected region, and the write-protected region is in the first data that is set not to be modified by the relay server.

The communication interface may be further configured to receive, from a device of the first user, a read protection request for a portion of a file among the first data, and the controller may be further configured to acquire the file from the first cloud storage service in response to the communication interface receiving the read protection request, apply read-protection to the portion of the file, and store the read-protected file in the second cloud storage service.

According to an aspect of another exemplary embodiment, there is provided a data relay method in a method of sharing, by a relay server, data between devices, the data relay method including storing first access right information of a first cloud storage service to which a first user is subscribed and second access right information of a second cloud storage service to which a second user is subscribed, and requesting, from the first cloud storage service, first data that is stored in the first cloud storage service, based on the first access right information. The data relay method further includes receiving the requested first data from the first cloud storage service, and storing the received first data in the second cloud storage service, based on the second access right information.

The data relay method may further include receiving, from the first cloud storage service, a synchronization request indicating that the first data is modified, and updating a copy of the first data that is stored in the second cloud storage service into the modified first data in response to the receiving the synchronization request.

The first data may include a file, the synchronization request may include position information representing a position of modified data in the file, the updating may include determining whether the modified data is of a write-protected region, based on the position information, in response to the receiving the synchronization request, and updating the copy of the first data that is stored in the second cloud storage service into the modified first data in response to the determining that the modified data is not of the write-protected region, and the write-protected region is in the copy of the first data that is set not to be modified by the relay server.

The data relay method may further include receiving, from the second cloud storage service, a synchronization request indicating that a copy of the first data that is stored in the second cloud storage service is modified, and updating the first data that is stored in the first cloud storage service into the modified copy of the first data in response to the receiving the synchronization request.

The first data may include a file, the synchronization request may include position information representing a position of modified data in a copy of the file, the updating may include determining whether the modified data is of a write-protected region, based on the position information, in response to the receiving the synchronization request, and updating the first data that is stored in the first cloud storage service into the modified copy of the first data in response to the determining that the modified data is not of the write-protected region, and the write-protected region may be in the first data that is set not to be modified by the relay server.

The data relay method may further include receiving, from a device of the first user, a read protection request for a portion of a file among the first data, acquiring the file from the first cloud storage service in response to the receiving the read protection request, applying read-protection to the portion of the file, and storing the read-protected file in the second cloud storage service.

According to an aspect of another exemplary embodiment, there is provided a relay server including a storage configured to store first right information of a first user for a first messenger server and second right information of a second user for a second messenger server, a communication interface configured to receive a message of the first user from the first messenger server based on the first right information, and a controller configured to control the communication interface to transmit the message of the first user to the second messenger server based on the second right information.

The first right information may be of a right to register, in the first messenger server, a third user that is subscribed in the first messenger server as a messenger friend of the first user, and the second right information may be of a right to register, in the second messenger server, a fourth user that is subscribed in the second messenger server as a messenger friend of the second user.

The communication interface may be further configured to receive, from a device of the first user, a registration request for registering the second user as a messenger friend of the first user, the controller may be further configured to generate a messenger virtual identifier (ID) of the second user in response to the communication interface receiving the registration request, register the messenger virtual ID of the second user in the first messenger server, and register, in the first messenger server, the messenger virtual ID of the second user as a messenger friend ID of the first user based on the first right information, and the communication interface may be further configured to transmit, to the device of the first user, the messenger virtual ID of the second user as an ID of the second user in the first messenger server in response to the communication interface receiving the registration request.

The communication interface may be further configured to receive, from a device of the second user, a registration request for registering the first user as a messenger friend of the second user, the controller may be further configured to generate a messenger virtual identifier (ID) of the first user in response to the communication interface receiving the registration request, register the messenger virtual ID of the first user in the second messenger server, and register, in the second messenger server, the messenger virtual ID of the first user as a messenger friend ID of the second user based on the second right information, and the communication interface may be further configured to transmit, to the device of the second user, the messenger virtual ID of the first user as an ID of the first user in the second messenger server in response to the communication interface receiving the registration request.

The communication interface may be further configured to register a first messenger virtual ID of the second user in the first messenger server based on the first right information, and receive, from the first messenger server, the message of the first user about the second user based on the registered first messenger virtual ID of the second user, and the controller may be further configured to register a second messenger virtual ID of the first user in the second messenger server based on the second right information, and control the communication interface to transmit the message of the first user to the second messenger server based on the registered second messenger virtual ID of the first user.

The communication interface may be further configured to receive, from a device of the first user, a message transmission request for transmitting, to a device of the second user, a message representing the first messenger virtual ID of the second user as a receiver ID, and request the second messenger server to transmit, to the device of the second user, a message representing the second messenger virtual ID of the first user as a transmitter ID in response to the communication interface receiving the message transmission request.

BRIEF DESCRIPTION OF THE DRAWINGS

The above and/or other aspects will be more apparent by describing exemplary embodiments with reference to the accompanying drawings in which:

FIG. 15 is a diagram illustrating a database (DB) about a data provider stored in the relay server in response to a share setting request between the first user and the second user with respect to the data of the first user, according to an exemplary embodiment;

FIG. 16 is a diagram illustrating a DB about data stored in the relay server in response to a share setting request between the first user and the second user with respect to the data of the first user, according to an exemplary embodiment;

FIG. 18 is a diagram illustrating a DB about a list of folders or files of the first user received from the first cloud storage, according to an exemplary embodiment;

FIG. 21 is a diagram illustrating a DB stored in the relay server when the relay server receives position information representing the position of a storage space of the second user in the second cloud storage, according to an exemplary embodiment;

FIG. 36 is a diagram illustrating a DB about the second user stored in the relay server when the first user is set as a provider of the second user, according to an exemplary embodiment;

FIG. 40 is a diagram illustrating a DB about the data of the first user stored in the relay server when the data of the first user is stored in the storage space of the second user in the second cloud storage at the share request of the first user, according to an exemplary embodiment;

FIG. 43 is a diagram illustrating DBs about the data of the first user stored in the relay server when information about a synchronization method is set, according to another exemplary embodiment;

FIG. 67B is a diagram illustrating a DB storing information about the users subscribed in the relay server, according to an exemplary embodiment;

FIG. 68C is a diagram illustrating a DB that the relay sever stores when receiving right information from the device, according to an exemplary embodiment;

FIG. 69D is a diagram illustrating a DB stored in the relay server when a relay server friendship is set between the users, according to an exemplary embodiment;

FIG. 70C is a diagram illustrating a DB generated in the relay server when the relay server registers virtual account information for the users in the messenger servers, according to an exemplary embodiment;

FIG. 76B is a diagram illustrating a DB stored in the relay server, according to an exemplary embodiment;

FIG. 77B is a diagram illustrating a DB in which the relay server stores the virtual account information of the users, according to an exemplary embodiment;

FIG. 85A is a diagram illustrating a DB stored in the first relay server, according to an exemplary embodiment;

FIG. 85B is a diagram illustrating a DB stored in the second relay server, according to an exemplary embodiment;

DETAILED DESCRIPTION

Figure 1:
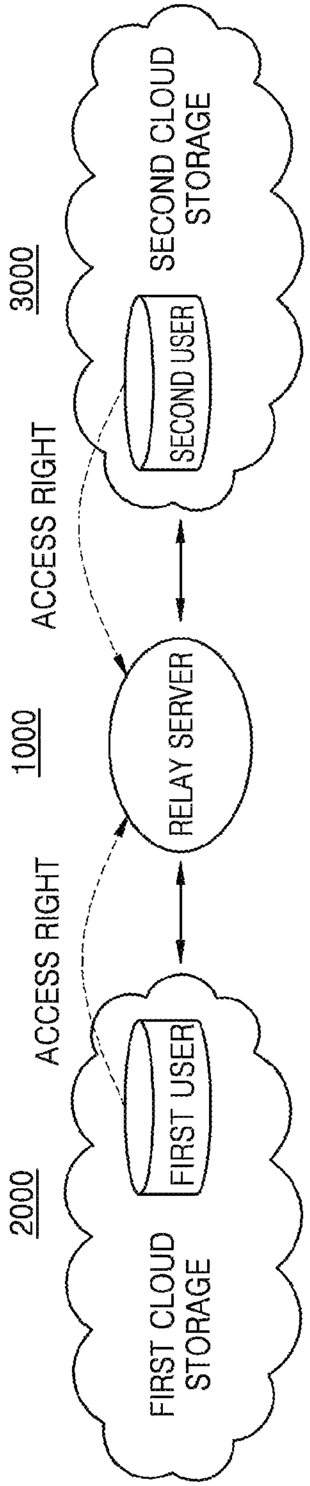
FIG. 1 is a diagram illustrating a method for a relay server to share data of different users stored in different cloud storages, according to an exemplary embodiment.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

It will be understood that the terms such as "unit," "-er (-or)," and "module" described in the specification refer to an element for performing at least one function or operation, and may be implemented in hardware, software, or the combination of hardware and software.

Throughout the specification, a cloud storage may refer to a data storage device that may store digital data. Also, the cloud storage may include one or more storage devices.

Also, the cloud storage may be operated by a service provider that provides a data storage service to users. For example, the service provider may provide the subscribed users with storage spaces in the cloud storage with or without charge. Also, through networks, the cloud storage may transmit user data to user devices or receive user data from user devices. Also, the cloud storage may include a file system to provide each user with a file-level data access.

As the user subscribes to the service provided by the service provider, the user may register his own user account in the cloud storage. The cloud storage may store user data based on the user account registered in the cloud storage. Also, the cloud storage may delete or modify the stored user data based on the user account.

Also, the cloud storage may restrict the access of other users to the user data according to the access policy to the user data that has been set by the user. For example, the cloud storage may grant the access to the user data only to users that have been access-allowed by the user. Also, the cloud storage may grant the access to the user data to all users according to the user's settings.

Also, the cloud storage may be referred to as a public cloud storage according to some exemplary embodiments.

Throughout the specification, a storage space may refer a logical storage space in the cloud storage. For example, the storage space may include folders that are file system structures in which files are stored.

Throughout the specification, position information representing the position of the data may refer to the logical position of the data. For example, the position information representing the position of the data may include a file path and a uniform resource identifier (URI).

Throughout the specification, position information representing the position of the storage space may refer to the logical position of the storage space. For example, the position information representing the position of the storage space may include a folder path or a URI.

The position information may be referred to as link information according to some exemplary embodiments.

Throughout the specification, a messenger server may refer to a transmitter that transmits messages.

Also, the messenger server may be operated by a service provider that provides a message transmission service to users. For example, the service provider may provide the subscribed users with a message transmission service with or without charge.

As the user subscribes the service provided by the service provider, the user may register his own user account in the messenger server. The messenger server may transmit user messages based on the user account registered in the messenger server.

Throughout the specification, a messenger friend may refer to a user that may be chatted through a messenger service. For example, a first messenger friend of a first user may refer to a user that the first user may chat through a first messenger service.

Throughout the specification, unique information of the user may refer to the user's own unique information that may distinguish the user from other users. For example, the unique information of the user may include, but is not limited to, a phone number, an e-mail address, and a resident registration number of the user.

Throughout the specification, a first device may refer to a device that is used by the first user. The first device may include one or more devices. Also, a first cloud storage may be a cloud storage that is subscribed by the first user. Accordingly, the first device may store data in the first cloud storage based on the account of the first user. Also, a second device may refer to a device that is used by the second user. The second device may include one or more devices. Also, a second cloud storage may be a cloud storage that is subscribed by the second user. Accordingly, the second device may store data in the second cloud storage based on the account of the second user.

The cloud storage or the messenger server may be referred to as a cloud server according to some exemplary embodiments.

Also, a relay server may relay data of the users registered respectively in a plurality of cloud storages or may relay data of the users registered respectively in a plurality of messenger servers. However, for convenience of description, described is an exemplary embodiment in which the relay server relays data of the users registered respectively in two cloud storages or relays data of the users registered respectively in two messenger servers.

Also, the relay server may relay messages or data of a plurality of users. However, for convenience of description, described is an exemplary embodiment in which the relay server relays messages or data of the first user and the second user.

FIG. 1 is a diagram illustrating a method for a relay server 1000 to share data of different users stored in different cloud storages, according to an exemplary embodiment.

Referring to FIG. 1, the relay server 1000 may share first user data stored in a first cloud storage 2000 or second user data stored in a second cloud storage 2000 between the first user and the second user.

For example, access right information about the first cloud storage 2000 may be stored in the relay server 1000. The relay server 1000 may request the first user data from the first cloud storage 2000 by using the stored access right information about the first cloud storage 2000.

The access right information about the first cloud storage 2000 may refer to information about the right to acquire the first user data from the first cloud storage 2000.

A set value representing the right to acquire the first user data from the first cloud storage 2000 may be set in the first cloud storage 2000 corresponding to the account of the relay server 1000 registered in the first cloud storage 2000.

When the set value representing the right to acquire the first user data is set in the first cloud storage 2000 corresponding to the account of the relay server 1000 registered in the first cloud storage 2000, the first cloud storage 2000 may transmit the first user data requested by the relay server 1000 to the relay server 1000.

When receiving the first user data from the first cloud storage 2000, the relay server 1000 may transmit the first user data to the second cloud storage 3000 by using the access right information about the second cloud storage 3000. The access right information about the second cloud storage 3000 may be stored in the relay server 1000.

The access right information about the second cloud storage 3000 may refer to information about the right to store data in the second user storage space in the second cloud storage 3000.

A set value representing the right to store data in the second user storage space in the second cloud storage 3000 may be set in the second cloud storage 3000 corresponding to the account of the relay server 1000 registered in the second cloud storage 3000.

When the set value representing the right to store data in the second user storage space is set in the second cloud storage 3000 corresponding to the account of the relay server 1000 registered in the second cloud storage 3000, the second cloud storage 3000 may store the first user data received from the relay server 1000 in the second user storage space.

Figure 2:
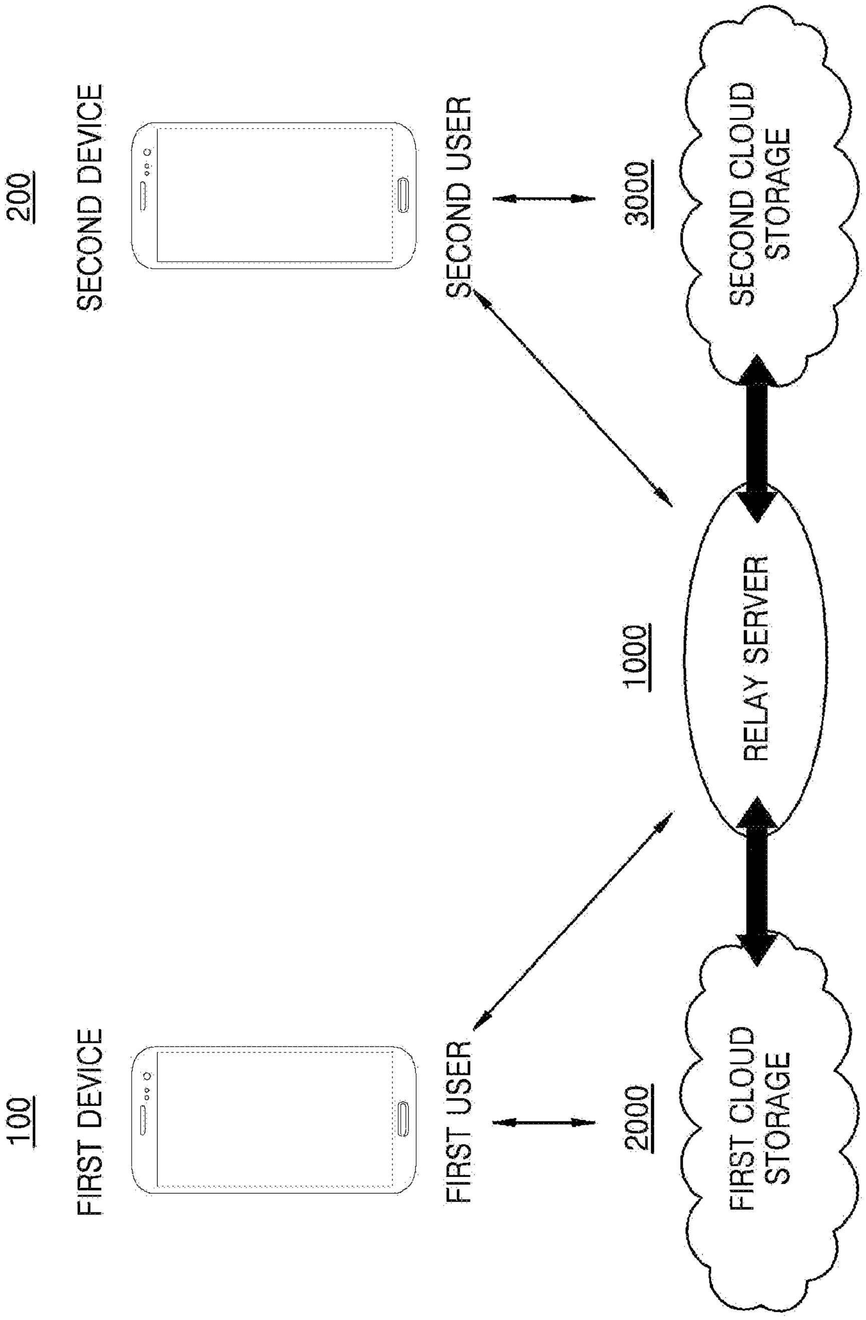
FIG. 2 is a diagram illustrating a first device, a second device, a relay server, a first cloud storage, and a second cloud storage according to an exemplary embodiment.

FIG. 2 is a diagram illustrating a first device 100, a second device 200, the relay server 1000, the first cloud storage 2000, and the second cloud storage 3000 according to an exemplary embodiment.

Referring to FIG. 2, the first cloud storage 2000 and the second cloud storage 3000 may be cloud storages that are operated by different service providers.

The first user may assign the relay server 1000 the access right to the first user data stored in the first cloud storage 2000. For example, the first device 100 may transmit a first user request for sharing the first user data stored in the first cloud storage 2000 with the relay server 1000 to the first cloud storage 2000. When the share relationship between the relay server 1000 and the first user with respect to the first user data is set in the first cloud storage 2000, the relay server 1000 may acquire the access right to the first user data stored in the first cloud storage 2000. The access right to the first user data may include the right to acquire the first user data.

Also, the second user may assign the relay server 1000 the access right to the second user storage space in the second cloud storage 3000. For example, the second device 200 may transmit a second user request for sharing the second user storage space in the second cloud storage 3000 with the relay server 1000 to the second cloud storage 3000. When the share relationship between the relay server 1000 and the second user with respect to the second user storage space is set in the second cloud storage 3000, the relay server 1000 may acquire the access right to the second user storage space in the second cloud storage 3000. The access right to the second user storage space may include the right to store data in the second user storage space in the second cloud storage 3000.

The first device 100 may request the relay server 1000 to set the share between the first user and the second user with respect to the first user data stored in the first cloud storage 2000.

When receiving the share request between the first user and the second user with respect to the first user data stored in the first cloud storage 2000, the relay server 1000 may receive the first user data from the first cloud storage 2000 based on the access right to the first user data stored in the first cloud storage 2000. Also, the relay server 1000 may store the first user data received from the first cloud storage 2000 in the second user storage space in the second cloud storage 3000 based on the access right to the second user storage space in the second cloud storage 3000.

Also, the relay server 1000 may receive a second user request for sharing the second user data in the second cloud storage 3000 with the first user from the second device 200. When receiving the share request, the relay server 1000 may receive the second user data from the second cloud storage 3000 based on the access right to the second user data stored in the second cloud storage 3000 and store the received second user data in the first user storage space in the first cloud storage 2000 based on the access right to the first user storage space in the first cloud storage 2000.

Also, the relay server 1000 may synchronize the first user data stored in the first cloud storage 2000 and a copy of the first user data stored in the second user storage space in the second cloud storage 3000.

Also, the relay server 1000 may set a write protection for the data shared between the first user and the second user. Also, the relay server 1000 may set a read protection for the data shared between the first user and the second user.

Also, the relay server 1000 may be implemented as various types. For example, as illustrated in FIG. 2, the relay server 1000 may be a separate device that is separated from the first cloud storage 2000, the second cloud storage 3000, the first device 100, and the second device 200.

Also, the relay server 1000 may be implemented in the first cloud storage 2000 or the second cloud storage 3000. For example, the relay server 1000 may be a cloud storage that may provide a storage function to the users based on the accounts of the users registered in the relay server 1000.

Also, the relay server 1000 may be implemented in the first device 100 or the second device 200. For example, the relay server 1000 may be a device that may receive data from the first cloud storage 2000 or upload the data in the device to the first cloud storage 2000 according to the user input.

Figure 3:
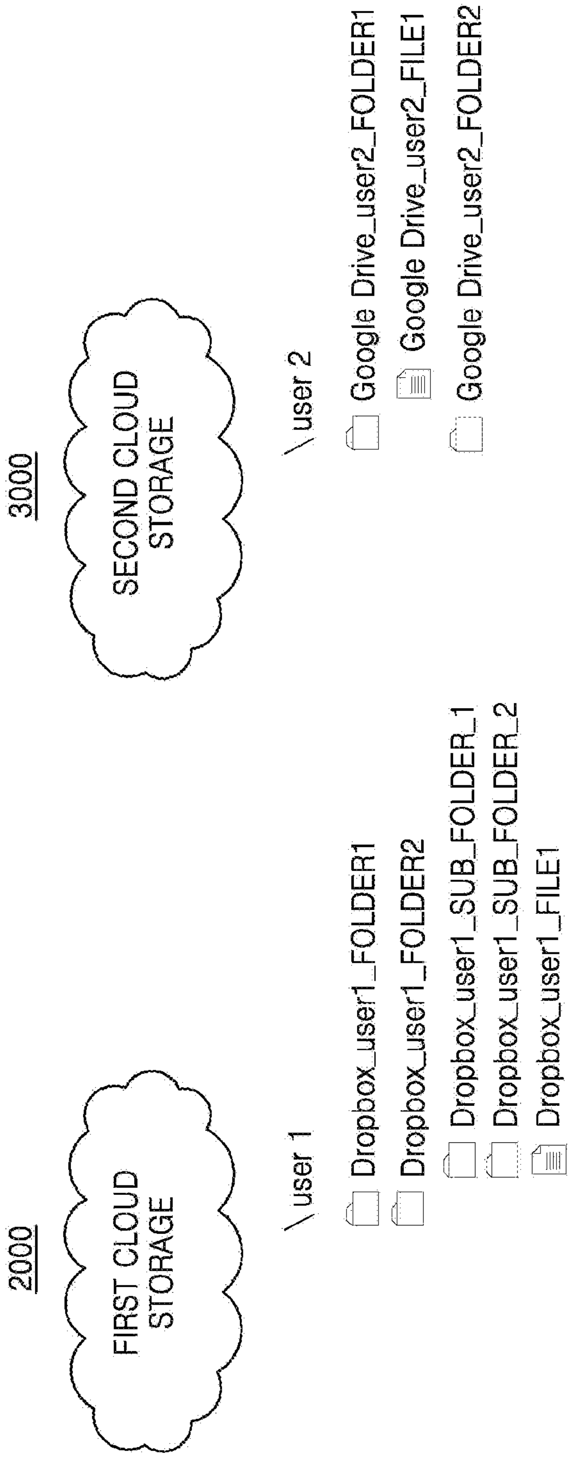
FIGS. 3 and 4 are diagrams illustrating a method in which data of a first user stored in the first cloud storage is stored as data of a second user in the second cloud storage through the relay server, according to an exemplary embodiment.
Figure 4:
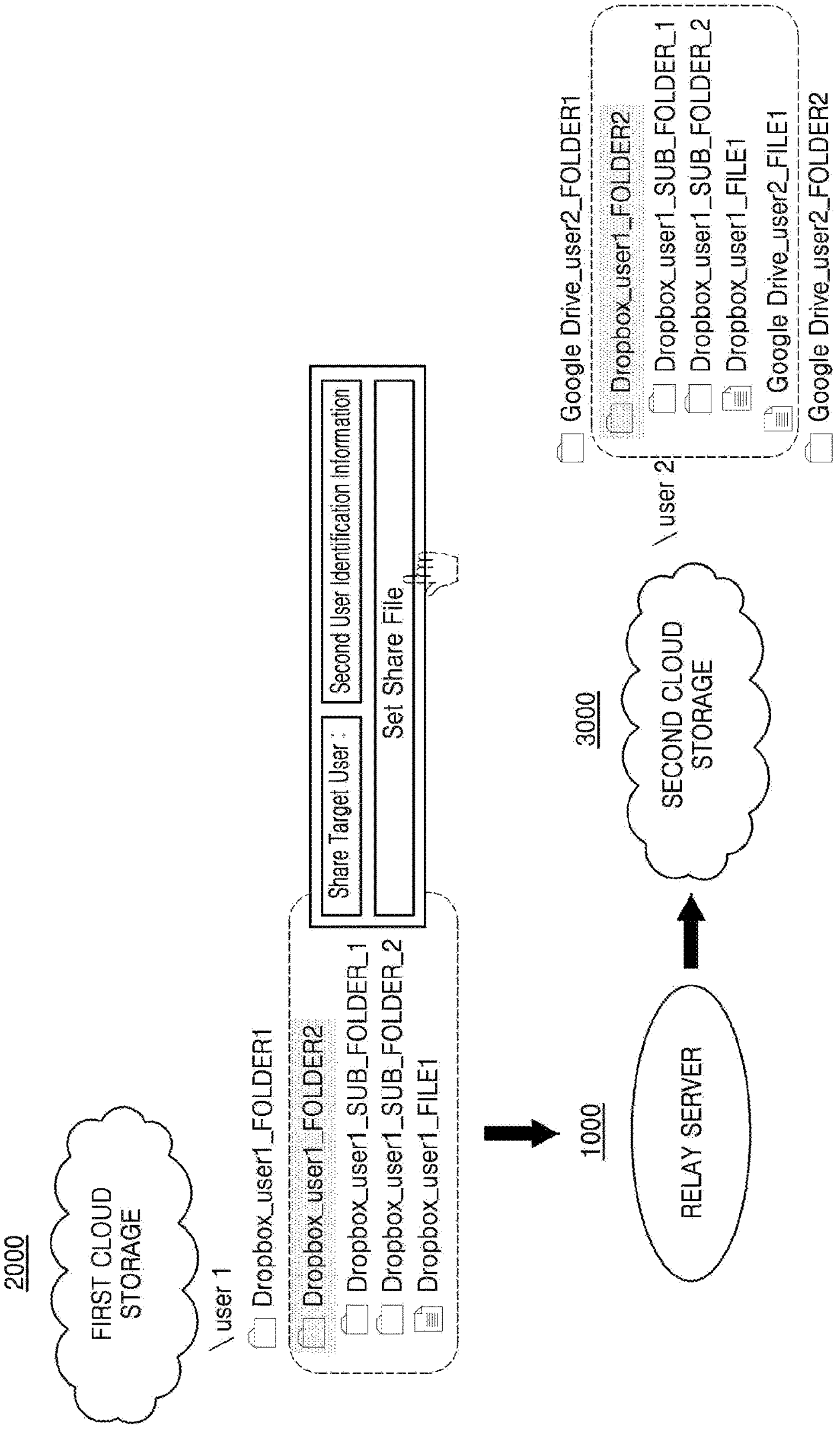

FIGS. 3 and 4 are diagrams illustrating a method in which the data of the first user stored in the first cloud storage 2000 is stored as the data of the second user in the second cloud storage 3000 through the relay server 1000, according to an exemplary embodiment.

Referring to FIG. 3, the first cloud storage 2000 may store first user files.

The first cloud storage 2000 may manage first user files or folders by using a file system.

Data constituting the file may include file contents and file attribute information. The file attribute information may include information about a file name, a file type, a file position, an original file size, a stored data size among a total file size, a file generation time, a file modification time, a file access time, a file access right, a file access range, and a thumbnail image. Also, the file attribute information may be recorded in the file in the form of metadata.

The folder may be a logical storage space including other folders or files. Data constituting the folder may include attribute information of files or sub-folders located in the folder and position information of the files or sub-folders. Also, the folder may be referred to as a directory or a file folder according to some exemplary embodiments.

According to an exemplary embodiment, the structure of first user folders stored in the first cloud storage 2000 may have a structure in which two highest folders having folder names of Dropbox_user1_FOLDER1 and Dropbox_user1_FOLDER2 are located under the root corresponding to the first user. Also, the Dropbox_user1_FOLDER2 folder may include two folders having folder names of Dropbox_user1_SUB_FOLDER_1 and Dropbox_user1_SUB_FOLDER_2 and one file having a file name of Dropbox_user1_FILE1.

Also, according to an exemplary embodiment, the structure of second user data folders stored in the second cloud storage 3000 may have a structure in which two highest folders having folder names of Google Drive_user2_FOLDER1 and Google Drive_user2_FOLDER2 are located under the root corresponding to the second user. Also, the Google Drive_user2_FOLDER1 folder may include one file having a file name of Google Drive_user2_FILE1.

Referring to FIG. 4, the first user may set, in the relay server 1000, the share between the first user and the second user with respect to Dropbox_user1_FOLDER2 among the first user data stored in the first cloud storage 2000. When the share between the first user and the second user is set with respect to Dropbox_user1_FOLDER2, the relay server 1000 may receive the Dropbox_user1_FOLDER2 folder from the first cloud storage 2000 and store the received Dropbox_user1_FOLDER2 folder in the second user storage space in the second cloud storage 3000.

When the Dropbox_user1_FOLDER2 folder of the first user stored in the first cloud storage 2000 is copied into the second user storage space, the second cloud storage 3000 may store the Dropbox_user1_FOLDER2 folder as the second user data.

The storage position of the Dropbox_user1_FOLDER2 folder of the second user in the second user storage space may be determined according to the second user's settings. For example, when the second user sets the mount position of the data copied from the first cloud storage 2000 as Google Drive_user2_FOLDER1, the Dropbox_user1_FOLDER2 folder of the second user may be mounted in the Google Drive_user2_FOLDER1 folder. Also, when the second user does not set the mount position of the data copied from the first cloud storage 2000, the Dropbox_user1_FOLDER2 folder of the second user may be mounted under the root corresponding to the second user.

When the share relationship between the first user and the second user is set with respect to the Dropbox_user1_FOLDER2 folder of the first user stored in the first cloud storage 2000, all data located in the Dropbox_user1_FOLDER2 folder may be copied into the second cloud storage 3000. Also, only the metadata of files and sub-folders in the Dropbox_user1_FOLDER2 folder may be copied into the second cloud storage 3000. For example, only the hierarchical structure of files and sub-folders in the Dropbox_user1_FOLDER2 folder and the attribute information of files in the Dropbox_user1_FOLDER2 folder may be copied into the second cloud storage 3000.

A method, in which the first user data stored in the first cloud storage 2000 is stored as the second user data in the second cloud storage 3000 when the share relationship between the first user and the second user is set with respect to the first user data stored in the first cloud storage 2000, will be described below in detail with reference to FIGS. 5 to 40.

Figure 5:
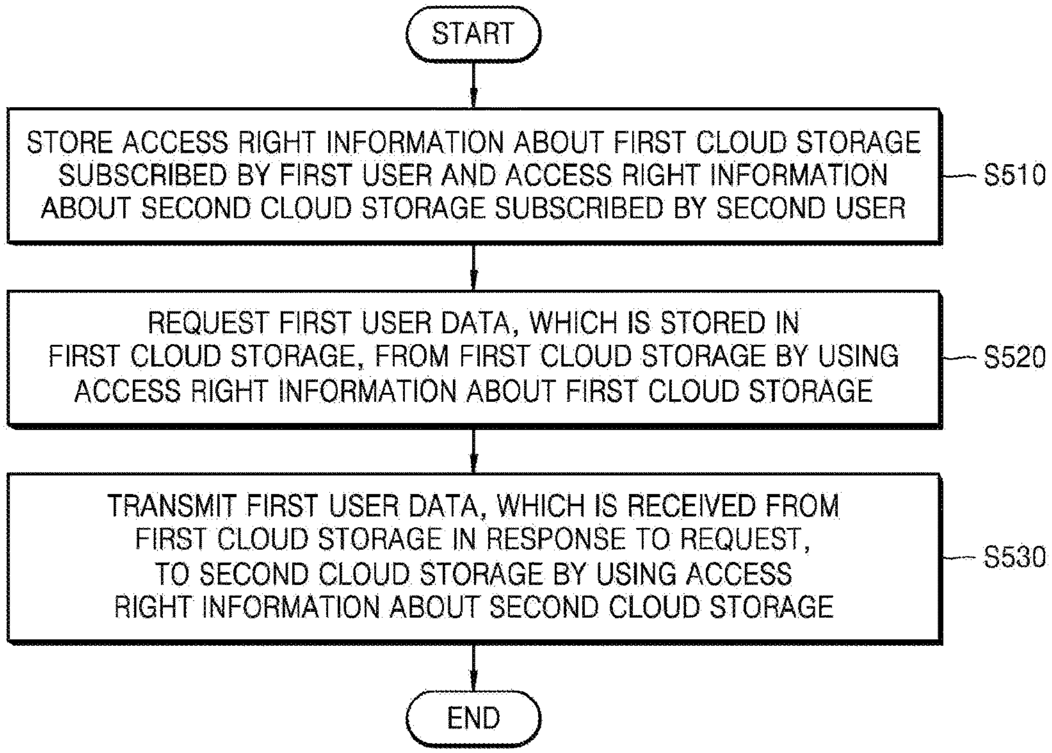
FIG. 5 is a flowchart illustrating a method for the relay server to share data of the first user stored in the first cloud storage between the first user and the second user registered in different cloud storages, according to an exemplary embodiment.

FIG. 5 is a flowchart illustrating a method for the relay server 1000 to share the data of the first user stored in the first cloud storage 2000 between the first user and the second user registered in different cloud storages, according to an exemplary embodiment.

Referring to FIG. 5, in operation S510, the relay server 1000 stores access right information about the first cloud storage 2000 subscribed by the first user and access right information about the second cloud storage 3000 subscribed by the second user.

The relay server 1000 may store the access right information about the first cloud storage 2000 subscribed by the first user.

For example, when receiving a first user input for sharing the first user data stored in the first cloud storage 2000 with the second user, the first device 100 may request the first cloud storage 2000 to assign the relay server 1000 the right to acquire the first user data from the first cloud storage 2000. For example, the first device 100 may request the first cloud storage 2000 to share the first user data stored in the first cloud storage 2000 with the relay server 1000.

When receiving the request for assigning the relay server 1000 the right to acquire the first user data, the first cloud storage 2000 may set a set value representing the right to acquire the first user data corresponding to the account of the relay server 1000 registered in the first cloud storage 2000. When the set value representing the right to acquire the first user data is set in the first cloud storage 2000 corresponding to the account of the relay server 1000, the account of the relay server 1000 registered in the first cloud storage 2000 may represent the access right information about the first cloud storage 2000.

Also, the first device 100 may request position information representing the position of the first user data from the first cloud storage 2000. When receiving the request for the position information representing the position of the first user data from the first device 100, the first cloud storage 2000 may transmit the position information representing the position of the first user data to the first device 100. The position information representing the position of the first user data may include the URL of the first user data. The first device 100 may request the relay server 1000 to store the position information representing the position of the first user data corresponding to the account of the first user registered in the relay server 1000.

Also, the relay server 1000 may store the access right information about the second cloud storage 3000 subscribed by the second user.

For example, when receiving a second user input for setting the second user storage space in the second cloud storage 3000 as the storage space for the data received from the relay server 1000, the second device 200 may request the second cloud storage 3000 to assign the relay server 1000 the right to store data in the second user storage space. When receiving the request for setting the second user storage space in the second cloud storage 3000 for the relay server 1000, the second cloud storage 3000 may set a set value representing the right to store data in the second user storage space corresponding to the account of the relay server 1000 registered in the second cloud storage 3000. When the set value representing the right to store data in the second user storage space is set in the second cloud storage 3000 corresponding to the account of the relay server 1000, the account of the relay server 1000 registered in the second cloud storage 3000 may represent the access right information about the second cloud storage 3000.

Also, the second device 200 may request position information representing the position of the second user storage space from the second cloud storage 3000. When receiving the request for the position information representing the position of the second user storage space from the second device 200, the second cloud storage 3000 may transmit the position information representing the position of the second user storage space to the second device 200. The position information representing the position of the second user storage space may include the URL of the second user storage space. The second device 200 may request the relay server 1000 to store the position information representing the position of the second user storage space corresponding to the account of the second user registered in the relay server 1000.

The relay server 1000 may receive a share request for sharing the first user data stored in the first cloud storage 2000 with the second user from the first device 100.

In operation S520, when receiving the share request from the first device 100, the relay server 1000 requests the first user data, which is stored in the first cloud storage 2000, from the first cloud storage 2000 by using the access right information about the first cloud storage 2000.

For example, the relay server 1000 may request the first user data from the first cloud storage 2000 based on the account of the relay server 1000 registered in the first cloud storage 2000. In this case, the request for the first user data may include the position information representing the position of the first user data.

When the access right to the first user data is set in the first cloud storage 2000 corresponding to the account of the relay server 1000, the first cloud storage 2000 may transmit the first user data requested by the relay server 1000 to the relay server 1000.

In operation S530, the relay server 1000 transmits the first user data, which is received from the first cloud storage 2000 in response to the request, to the second cloud storage 3000 by using the access right information about the second cloud storage 3000.

For example, the relay server 1000 may request to store the first user data in the second user storage space in the second cloud storage 3000 based on the account of the relay server 1000 registered in the second cloud storage 3000. In this case, the request for storing the data in the second user storage space may include the position information representing the position of the second user storage space.

When the access right to the second user storage space is set in the second cloud storage 3000 corresponding to the account of the relay server 1000, the second cloud storage 3000 may store the first user data received from the relay server 1000 in the second user storage space.

The relay server 1000 may receive a read protection request for a portion of the file among the first user data together with the share request for the first user data from the first device 100. Also, the relay server 1000 may receive a use restriction request for the first user data together with the share request for the first user data from the first device 100.

The use restriction on the data may include the restrictions on the copy, print, and modification of the data.

Also, the relay server 1000 may store the first user data in the second user storage space only when receiving the request for the first user data from the second cloud storage 3000.

Also, when the first user data is a file, the relay server 1000 may store only the attribute information of the file except the contents of the file in the second user storage space.

Also, when receiving the read protection request for a portion of the file among the first user data together with the share request for the first user data from the first device 100, the relay server 1000 may delete a read-protected portion among the first user data received from the first cloud storage 2000 and store a file with the portion deleted in the second user storage space.

Also, when receiving the user restriction request for the first user data together with the share request for the first user data from the first device 100, the relay server 1000 may restrict a function requested for the first user data received from the first cloud storage 2000 and store the use-restricted first user data in the second user storage space.

Also, the relay server 1000 may synchronize the first user data stored in the first cloud storage 2000 and a copy of the first user data stored in the second user storage space in the second cloud storage 3000. The copy of the first user data may refer to the data obtained when the first user data stored in the first cloud storage 2000 is copied into the second user storage space in response to the share request.

For example, the relay server 1000 may receive a synchronization request indicating that the first user data has been modified from the first cloud storage 2000. In response to the synchronization request, the relay server 1000 may update the copy of the first user data stored in the second cloud storage 3000 into the modified first user data. In this case, in response to the synchronization request, based on the position information representing the position of the modified data, the relay server 1000 may determine whether the modified data is write-protected data. The relay server 1000 may update the copy of the first user data stored in the second cloud storage 3000 into the modified first user data only when the modified data is not write-protected data. The write protection may represent that the copy of the first user data stored in the second user storage space is set not to be modified by the relay server 1000. Also, when the modified data is a portion of the file, the position information representing the position of the modified data may include position information about a modified portion in the file.

Figure 6:
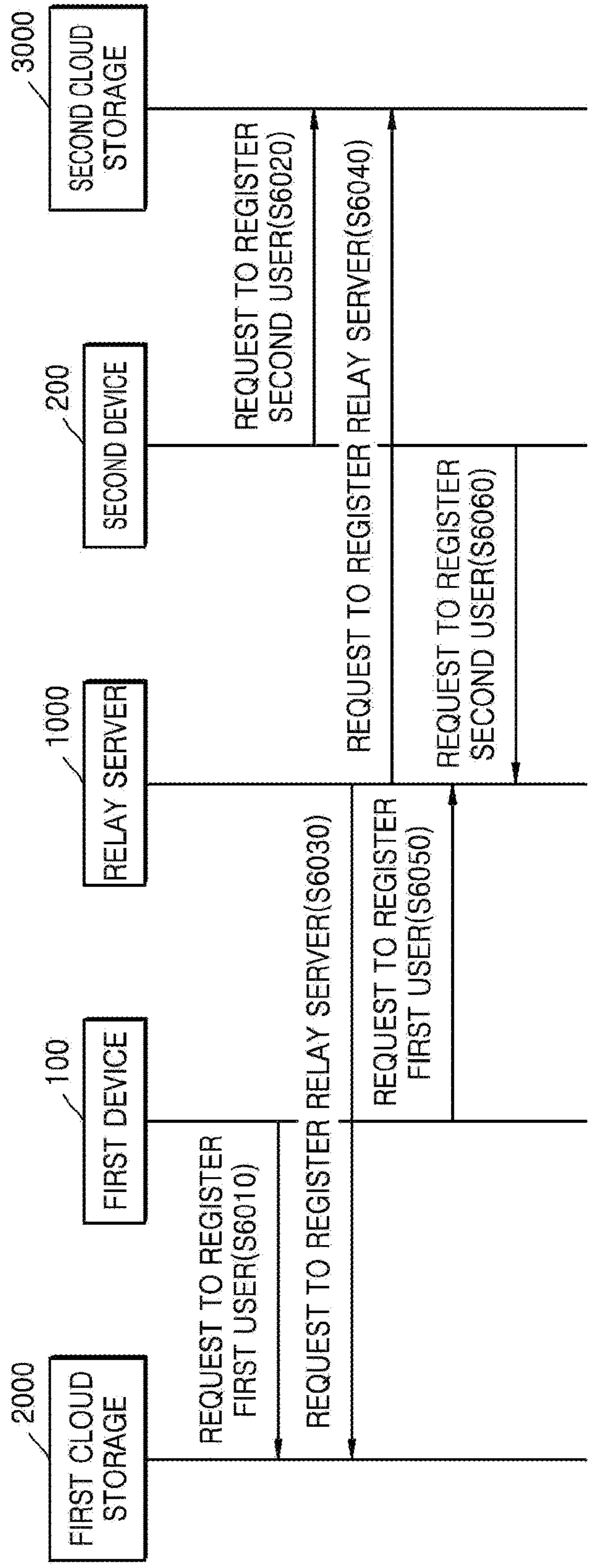
FIG. 6 is a flow diagram illustrating a method for the first cloud storage, the second cloud storage, and the relay server to register the first user and the second user, according to an exemplary embodiment.

FIG. 6 is a flow diagram illustrating a method for the first cloud storage 2000, the second cloud storage 3000, and the relay server 1000 to register the first user and the second user, according to an exemplary embodiment.

Referring to FIG. 6, in operation S6010, the first cloud storage 2000 receives a request to register the first user from the first device 100. The first user registration request may include a first user account to be registered in the first cloud storage 2000. The first user account may include an identifier (ID) and a password of the first user. When the first user is registered in the first cloud based on the first user account, the first user may acquire the right to use the resource of the first cloud storage 2000.

In operation S6020, the second cloud storage 3000 receives a request to register the second user from the second device 200. When the second user is registered in the second cloud based on the second user account, the second user may acquire the right to use the resource of the second cloud storage 3000.

In operation S6030, the first cloud storage 2000 receives a request to register the relay server 1000 from the relay server 1000. When the relay server 1000 is registered in the first cloud storage 2000 based on the account of the relay server 1000, the relay server 1000 may acquire the right to use the resource of the first cloud storage 2000.

In operation S6040, the second cloud storage 3000 receives the request to register the relay server 1000 from the relay server 1000. When the relay server 1000 is registered in the second cloud storage 3000 based on the account of the relay server 1000, the relay server 1000 may acquire the right to use the resource of the second cloud storage 3000.

Accordingly, the relay server 1000 may be registered as a user in the first cloud storage 2000 and the second cloud storage 3000.

Also, the relay server 1000 may be registered in the first cloud storage 2000 or the second cloud storage 3000 as a third party that may use the resource of the first cloud storage 2000 or the second cloud storage 3000.

For example, an authentication and authorization program (e.g., a program based on the OAuth standard), which is based on an open application programming interface (API) provided by the service provider of the first cloud storage 2000 or the service provider of the second cloud storage 3000, may be installed in the relay server 1000. Then, based on the authentication and authorization of the first user or the second user, the relay server 1000 may acquire the right to use the first user resource or the second user resource in the first cloud storage 2000 or the second cloud storage 3000.

When the relay server 1000 is pre-registered in the first cloud storage 2000 and the second cloud storage 3000, an operation of registering the relay server 1000 in the first cloud storage 2000 and the second cloud storage 3000 may be omitted.

In operation S6050, the relay server 1000 receives a request to register the first user from the first device 100. The first user registration request may include a first user account to be registered in the relay server 1000.

In operation S6060, the relay server 1000 receives a request to register the second user from the second device 200. The second user registration request may include a second user account to be registered in the relay server 1000.

Figure 7:
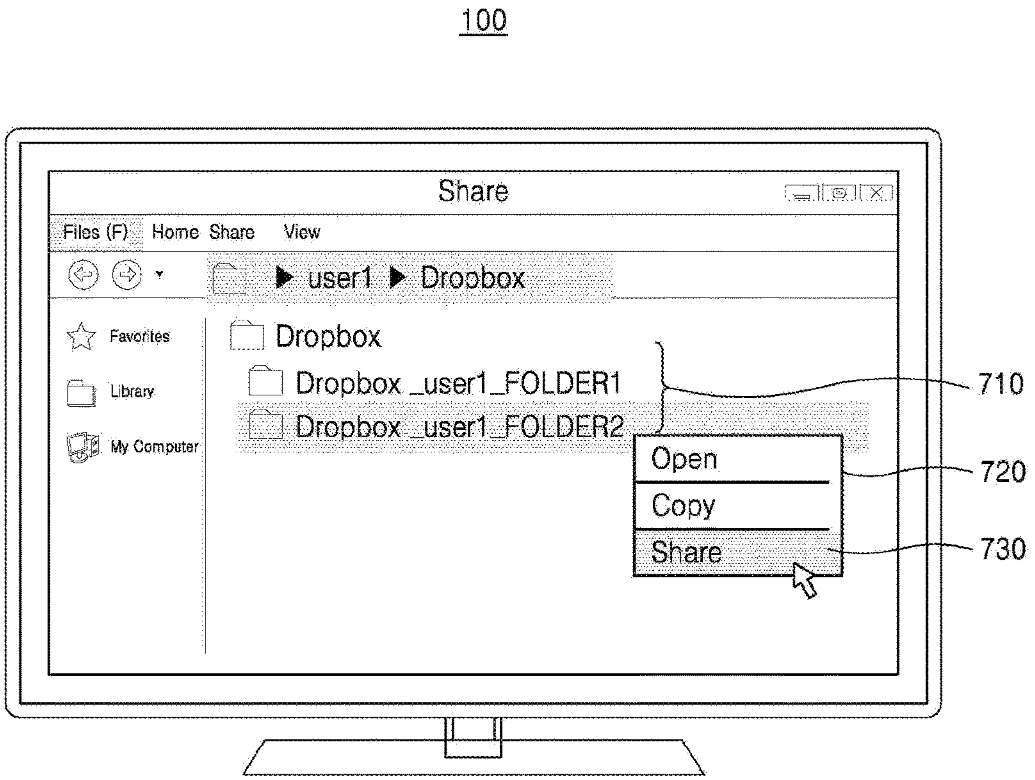
FIG. 7 is a diagram illustrating a method for the first device to receive an input of the first user for selecting data to be shared with the second user, according to an exemplary embodiment.

FIG. 7 is a diagram illustrating a method for the first device 100 to receive an input of the first user for selecting data to be shared with the second user, according to an exemplary embodiment.

Referring to FIG. 7, the first device 100 may receive a first user input for setting the share with the second user with respect to at least one of the first user files and folders stored in the first cloud storage 2000.

The first device 100 may receive the first user files or folders stored in the first cloud storage 2000 from the first cloud storage 2000 and store the received first user files or folders in the first device 100. Also, the first device 100 may synchronize the first user files or folders stored in the first device 100 with the first user files or folders stored in the first cloud storage 2000.

Also, when receiving the first user files or folders stored in the first cloud storage 2000 from the first cloud storage 2000, the first device 100 may display a list 710 of the received first user files or folders on the screen. For example, the first device 100 may mount the first user files or folders received from the first cloud storage 2000 in the file system of the first device 100 and display the list 710 of the received first user files or folders on the screen.

When the first user clicks a mouse right button while selecting the displayed file or folder, the first device 100 may display a menu 720 representing a function related to the selected file or folder.

In this case, the first device 100 may determine whether the selected file or folder is the first user file or folder stored in the first cloud storage 2000. The first device 100 may store information about whether the file or folder is the file or folder stored in the first cloud storage 2000, corresponding to the file or folder. For example, the information about whether the file or folder is the file or folder stored in the first cloud storage 2000 may be recorded in the file or folder in the form of metadata.

When the file or folder selected by the first user is the first user file or folder in the first cloud storage 2000, the first device 100 may display an interface 730 for sharing the selected file or folder.

When receiving a user input for selecting the interface 730 for sharing the selected file or folder, the first device 100 may determine the file or folder selected by the first user as the file or folder that the first user will share with the second user.

Figure 8:
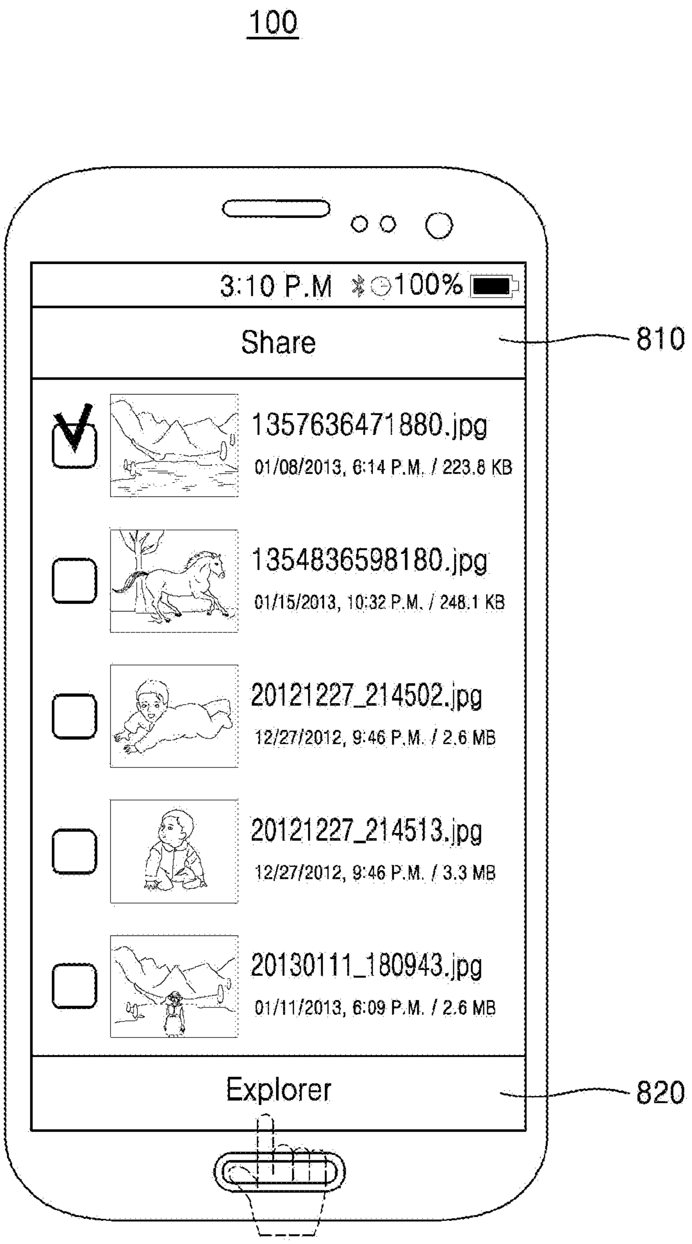
FIG. 8 is a diagram illustrating a method for the first user to select data to be shared with the second user in the first device, according to another exemplary embodiment.

FIG. 8 is a diagram illustrating a method for the first user to select data to be shared with the second user in the first device 100, according to another exemplary embodiment.

Referring to FIG. 8, the first device 100 may receive a user input for selecting at least one of the first user files or folders stored in the first cloud storage 2000, which are displayed on the first device 100.

The first device 100 may receive a list of first user files or folders from the first cloud storage 2000. In this case, the first device 100 may receive only the hierarchical structure of folders and the attribute information of files in the first user folder among the data of the first user files or folders from the first cloud storage 2000.

When receiving the list of first user files or folders from the first cloud storage 2000, the first device 1000 may display the list of first user files or folders on the screen.

Also, the first device 100 may display a user interface (UI) 810 for selecting at least one of the first user files or folders on the screen. The UI 810 for selecting at least one of the first user files or folders may include file or folder names, a check box for selecting each file or folder, and a button 820 for executing a share function.

Also, the first device 100 may display the file attribute information together with the file name.

When receiving the user input for selecting at least one of the first user files or folders and the user input for selecting the button 820 for executing a share function, the first device 100 may determine the file or folder selected by the first user as the file or folder that the first user will share with the second user.

Figure 9:
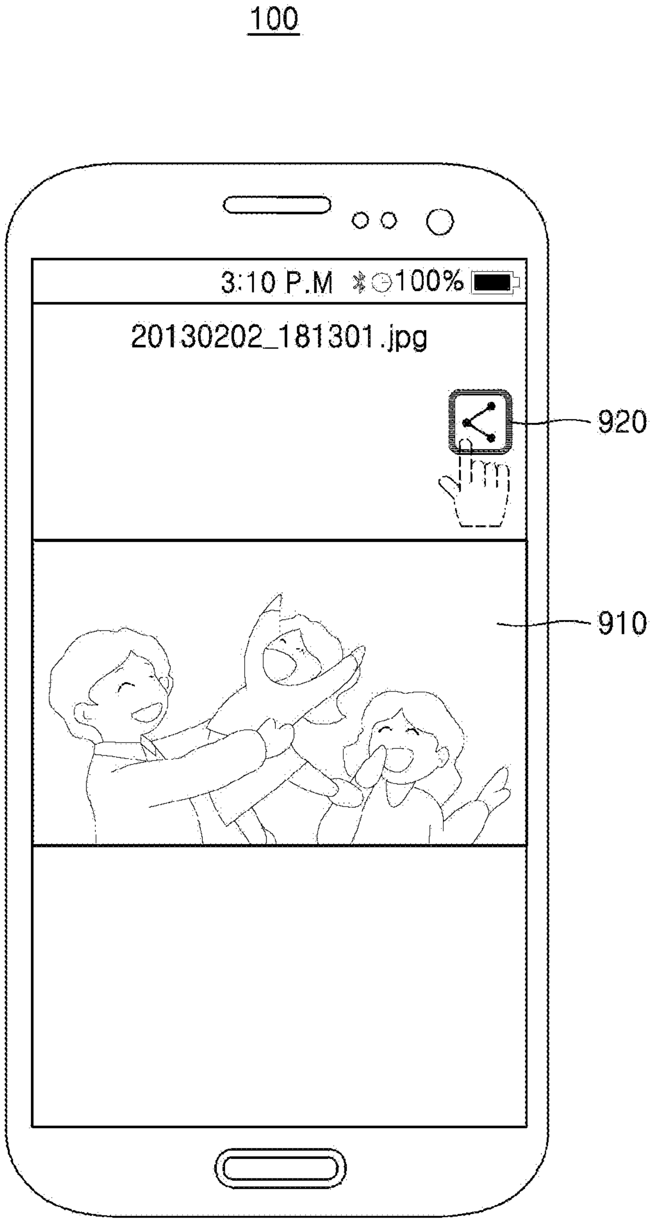
FIG. 9 is a diagram illustrating a method for the first user to select data to be shared with the second user in the first device, according to another exemplary embodiment.

FIG. 9 is a diagram illustrating a method for the first user to select data to be shared with the second user in the first device 100, according to another exemplary embodiment.

Referring to FIG. 9, the first device 100 may receive a user input for selecting the first user file stored in the first cloud storage 2000, which is displayed on the first device 100.

When receiving the user input for selecting the first user file, the first device 100 may display file contents 910. Also, when the displayed file is the file stored in the cloud storage of the first user, the first device 100 may display a UI 920 for sharing the file, together with the file contents 910.

When receiving the user input for selecting the UI 920 for sharing the file, the first device 100 may determine the displayed file as the file to be shared with the second user.

Figure 10:
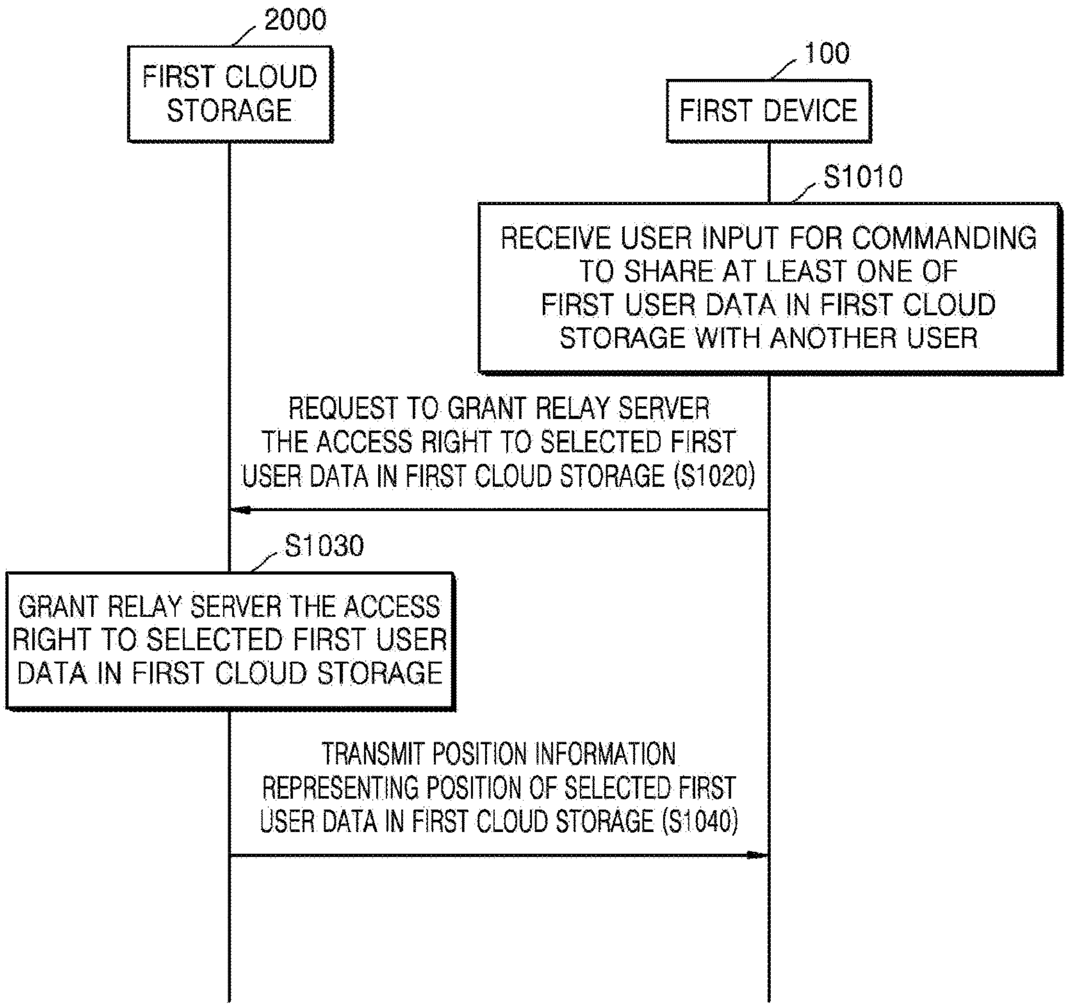
FIG. 10 is a flow diagram illustrating a method for the first device to set an access right to the relay server with respect to the data selected by the first user among the data stored in the first cloud storage, according to an exemplary embodiment.

FIG. 10 is a flow diagram illustrating a method for the first device 100 to set an access right to the relay server 1000 with respect to the data selected by the first user among the data stored in the first cloud storage 2000, according to an exemplary embodiment.

Referring to FIG. 10, in operation S1010, the first device 100 receives a user input for commanding to share at least one of the first user data stored in the first cloud storage 2000 with another user.

In operation S1020, the first device 100 requests the first cloud storage 2000 to grant the relay server 1000 the access right to the selected first user data stored in the first cloud storage 2000.

When receiving the user input for commanding the share, the first device 100 may request the first cloud storage 200 to set the share between the first user and the relay server 1000 with respect to the first user data stored in the first cloud storage 2000.

The share setting request between the first user and the relay server 1000 with respect to the first user data stored in the first cloud storage 2000 may include a first user ID registered in the first cloud storage 2000, an ID of the relay server 1000 registered in the first cloud storage 2000, and identification information of the first user data stored in the first cloud storage 2000.

Also, together with the access right grant request, the first device 100 may request position information representing the position of the first user data stored in the first cloud storage 2000.

In operation S1030, the first cloud storage 2000 grants the relay server 100 the access right to the data selected by the first user among the first user data stored in the first cloud storage 2000.

For example, the first cloud storage 2000 may set the share between the first user and the relay server 1000 with respect to the first user data selected by the first user. When the share between the first user and the relay server 1000 is set, the first cloud storage 2000 may store the access right information about the first user data stored in the first cloud storage 2000 corresponding to the ID of the relay server 1000 registered in the first cloud storage 2000. Also, the first cloud storage 2000 may store the ID of the relay server 1000 corresponding to the identification information of the first user data stored in the first cloud storage 2000.

In operation S1040, the first cloud storage 2000 transmits the position information representing the position of the data selected by the first user among the first user data stored in the first cloud storage 2000 to the first device 100.

As illustrated in FIG. 10, when the share between the first user and the relay server 1000 with respect to the first user data is set in the first cloud storage 2000, the relay server 1000 acquires the access right to the first user data stored in the first cloud storage 2000. However, according to another exemplary embodiment, the relay server 1000 may directly receive the first user account registered in the first cloud storage 2000 from the first device 100.

Figure 11:
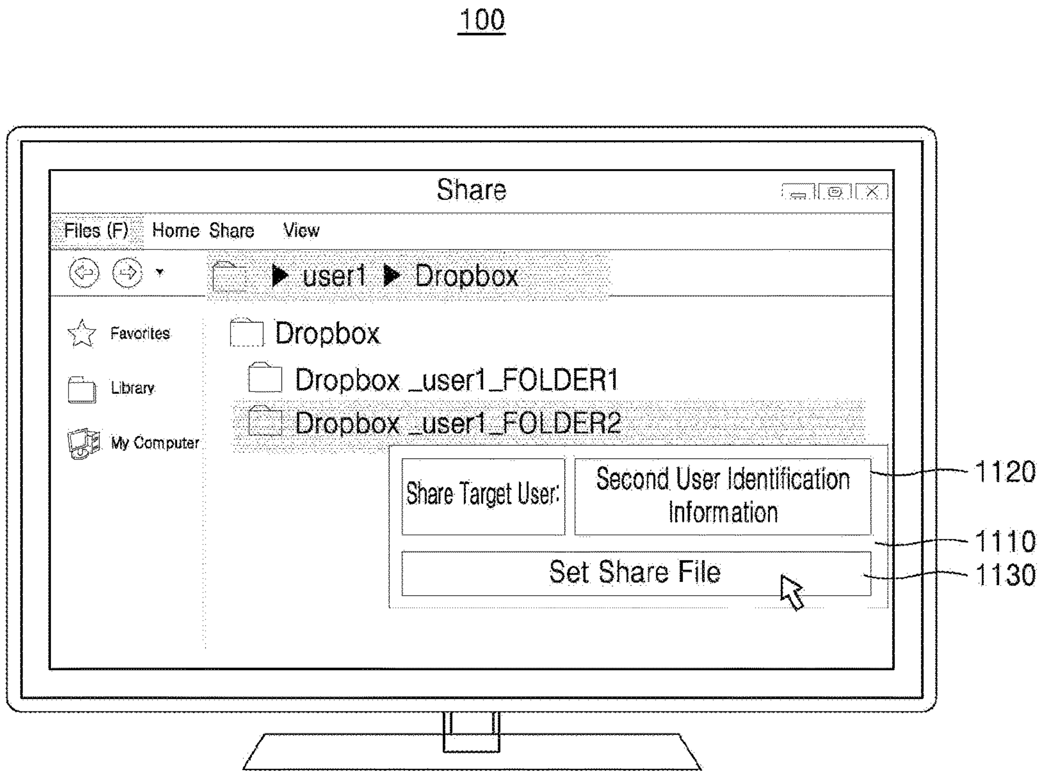
FIG. 11 is a diagram illustrating a method for the first device to receive a first user input for setting the second user to share data of the first user, according to an exemplary embodiment.

FIG. 11 is a diagram illustrating a method for the first device 100 to receive a first user input for setting the second user to share the data of the first user, according to an exemplary embodiment.

Referring to FIG. 11, the first device 100 may receive a user input for setting the second user.

The first device 100 may receive a user input for setting the second user that will share the data selected by the first user among the first user data stored in the first cloud storage 2000.

For example, when the file or folder selected by the first user is determined as the data to be shared, the first device 100 may display a UI 1110 for setting the second user.

The UI 1110 for setting the second user may include a UI 1120 for inputting the identification information of the second user. The identification information of the second user may include the ID, name, phone number, and e-mail address of the second user registered in the relay server 1000.

Also, the first device 100 may display a UI 1130 for requesting the relay server 1000 to share the first user data with the second user. When receiving the first user input for requesting the relay server 1000 to share the first user data with the second user, the first device 100 may request the relay server 1000 to share the first user data selected by the first user with the second user input by the first user.

Figure 12:
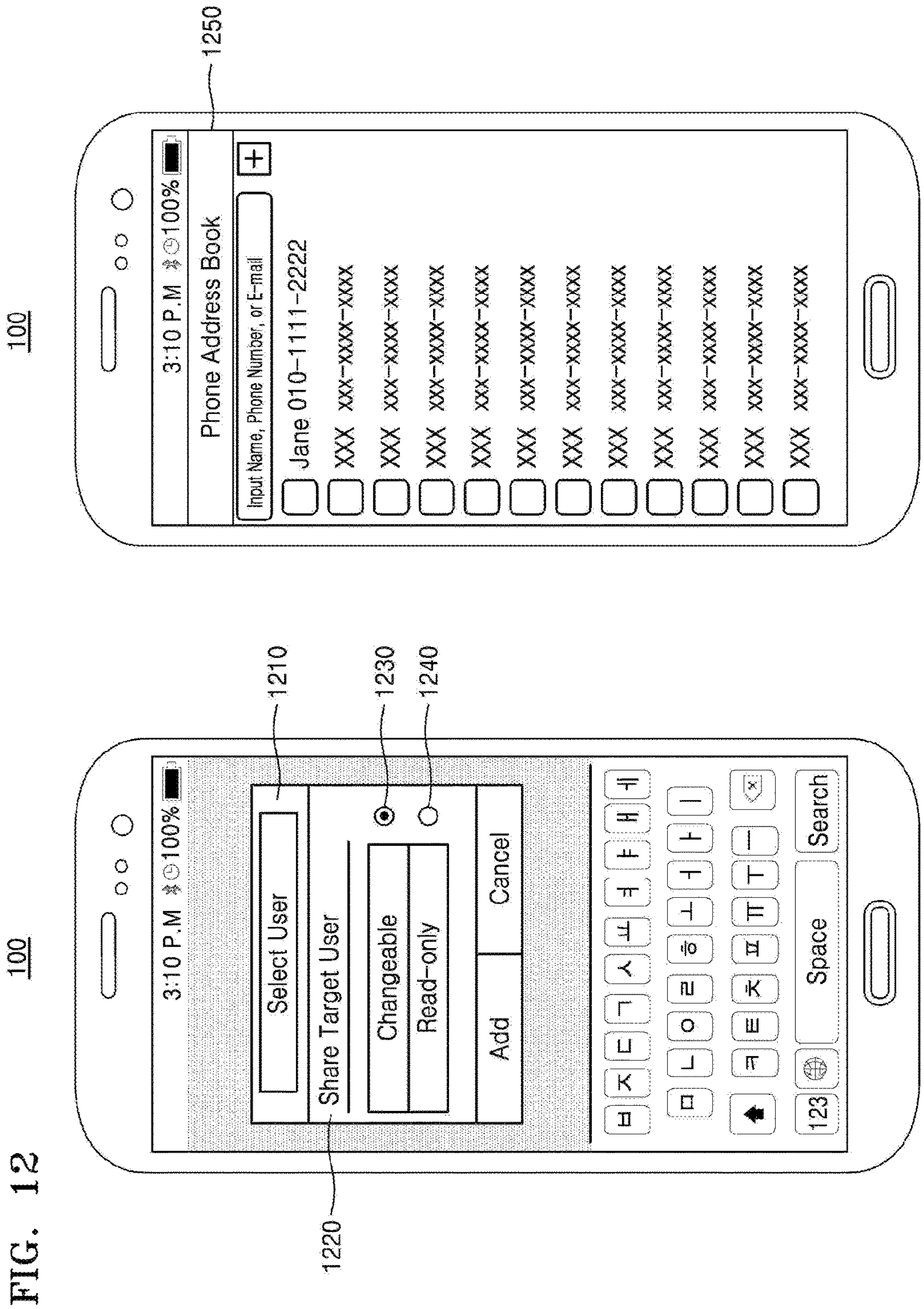
FIG. 12 is a diagram illustrating a method for the first device to receive a first user input for setting the second user to share data of the first user, according to another exemplary embodiment.

FIG. 12 is a diagram illustrating a method for the first device 100 to receive a first user input for setting the second user to share the data of the first user, according to another exemplary embodiment.

Referring to FIG. 12, the first device 100 may receive a user input for setting the second user that will share the first user data stored in the first cloud storage 2000.

The first device 100 may display a UI 1210 for setting the second user with respect to the file or folder selected by the first user.

The UI 1210 for setting the second user may include a UI 1220 for inputting the identification information of the second user. The UI 1220 for inputting the identification information of the second user may be linked with the user list stored in the first device 100.

For example, when receiving a user input for touching the UI 1220 for inputting the identification information of the second user, the first device 100 may display the user list stored in the first device 100. The user list stored in the first device 100 may include an address book 1250.

The first device 100 may receive a user input for selecting at least one of the displayed user list. When receiving the user input for selecting at least one of the displayed user list, the first device 100 may determine the selected user name, phone number, or e-mail address as the identification information of the second user.

Also, the first device 100 may display UIs 1230 and 1240 for setting a use restriction on the first user data to be given to the second user. The use restriction on the data may include the restrictions on the copy, print, and modification of the data.

For example, when the first user selects a “changeable” button 1230, the second user may not only view the first user data but also modify the first user data. On the other hand, when the first user selects a “read-only” button 1240, the second user may only view the first user data but may not modify the first user data.

Figure 13:
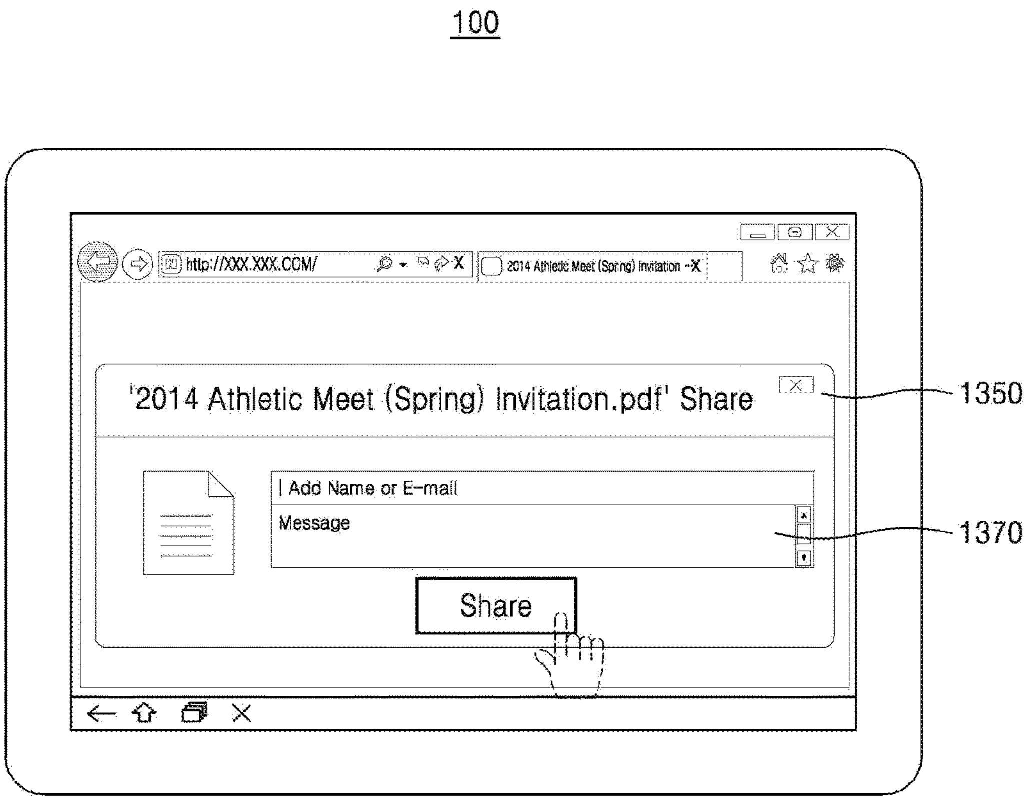
FIG. 13 is a diagram illustrating a method for the first device to receive a first user input for setting the second user to share data of the first user, according to another exemplary embodiment.

FIG. 13 is a diagram illustrating a method for the first device 100 to receive a first user input for setting the second user to share the data of the first user, according to another exemplary embodiment.

Referring to FIG. 13, the first device 100 may receive a user input for setting the second user that will share the first user data stored in the first cloud storage 2000.

The first device 100 may display a UI 1350 for setting the second user. The first device 100 may receive the UI 1350 for setting the second user from the relay server 1000. For example, the first device 100 may receive a web page including the UI 1350 for setting the second user from the relay server 1000.

The UI 1350 for inputting the identification information of the second user may be linked with the user database (DB) stored in the relay server 1000. The user’s name, phone number, and e-mail address may be stored in the user DB stored in the relay server 1000 corresponding to the user ID registered in the relay server 1000.

When the first user inputs the identification information of the second user through the UI 1350, the first device 100 may transmit the input identification information to the relay server 1000. The relay server 1000 may determine the second user ID corresponding to the received identification information of the second user based on the user DB.

Also, the first device 100 may display a UI 1370 for inputting a message to be sent to the second user.

Figure 14:
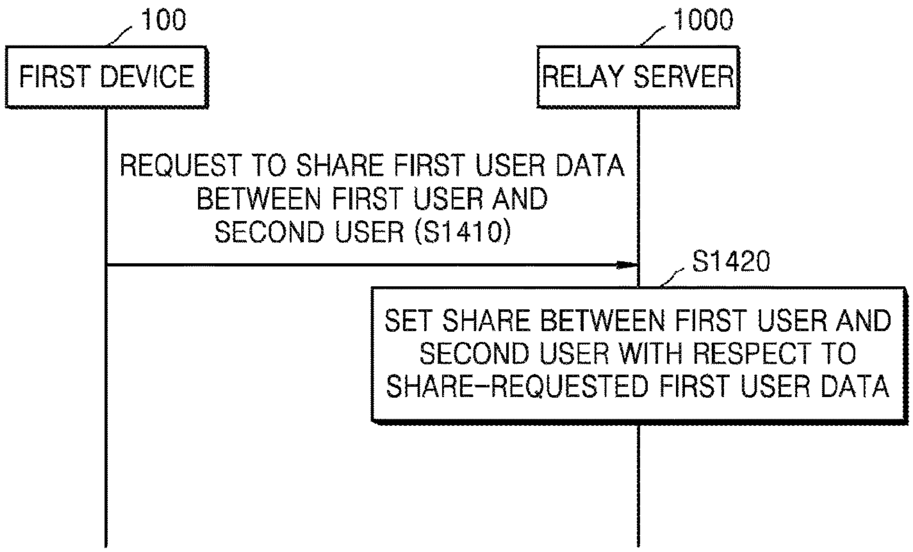
FIG. 14 is a flow diagram illustrating a method for the first device to request the relay server to share the selected data of the first user with the second user when receiving an input of the first user for selecting the second user and the data of the first user to be shared, according to an exemplary embodiment.

FIG. 14 is a flow diagram illustrating a method for the first device 100 to request the relay server 1000 to share the selected data of the first user with the second user when receiving an input of the first user for selecting the second user and the data of the first user to be shared, according to an exemplary embodiment.

Referring to FIG. 14, in operation S1410, the first device 100 requests the relay server 1000 to share the first user data between the first user and the second user.

When receiving the first user input for selecting the second user and the first user data to be shared, the first device 100 may request the relay server 1000 to share the selected first user data with the second user.

The share setting request between the first user and the second user with respect to at least one of the first user data stored in the first cloud storage 2000 may include the first user ID registered in the relay server 1000, the second user ID registered in the relay server 1000, and the identification information of the first user data to be shared. The identification information of the first user data may include position information representing the storage position of the first user data.

In operation S1420, the relay server 1000 sets the share between the first user and the second user with respect to the first user data that is share-requested by the first device 100.

For example, the relay server 1000 may store the second user ID registered in the relay server 1000 as a sharer corresponding to the share-requested first user data. Also, the relay server 1000 may store the first user ID registered in the relay server 1000 as an owner corresponding to the share-requested first user data. Also, the relay server 1000 may store the position information representing the position of the second user storage space in the second cloud storage 3000 corresponding to the share-requested first user data.

FIG. 15 is a diagram illustrating a DB 1500 about a data provider stored in the relay server 1000 in response to a share setting request between the first user and the second user with respect to the data of the first user, according to an exemplary embodiment.

Referring to FIG. 15, the relay server 1000 may store information about data corresponding to the user providing the data.

For example, corresponding to a first user ID 1510 registered in the relay server 1000, the relay server 1000 may store a first user ID 1520 registered in the first cloud storage 2000 and information 1530 about the data that the first user provides to the second user. The information 1530 about the data that the first user provides to the second user may include identification information 1532 of the data that the first user provides to the second user. The identification information 1532 of the data may include position information representing the position of the data.

FIG. 16 is a diagram illustrating a DB 1600 about the data stored in the relay server 1000 in response to a share setting request between the first user and the second user with respect to the data of the first user, according to an exemplary embodiment.

Referring to FIG. 16, the relay server 1000 may store information 1610 about the original data and information 1620 about the sharing corresponding to identification information 1611 of the data requested to be shared between the first user and the second user.

The information 1610 about the original data requested to be shared may include a data name 1612, an owner ID 1614, identification information 1616 of the cloud storage in which the data is stored, and position information 1618 representing the position of the data. Also, the information 1620 about the sharing may include a receiver ID 1622 registered in the relay server 1000.

Figure 17:
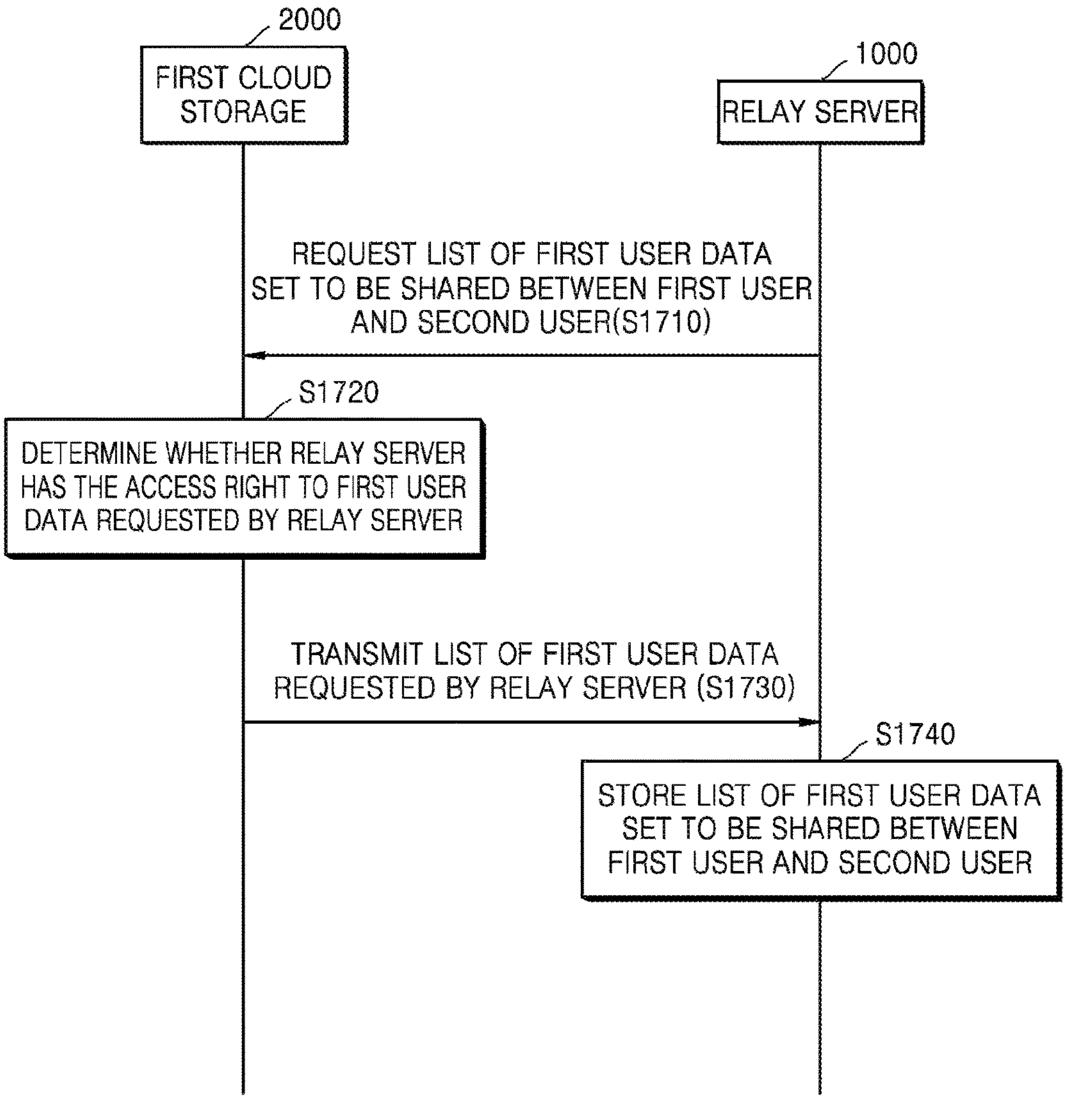
FIG. 17 is a flow diagram illustrating a method for the relay server to receive the share-set data of the first user from the first cloud storage when the share between the first user and the second user is set with respect to the data of the first user, according to an exemplary embodiment.

FIG. 17 is a flow diagram illustrating a method for the relay server 1000 to receive the share-set data of the first user from the first cloud storage 2000 when the share between the first user and the second user is set with respect to the data of the first user, according to an exemplary embodiment.

Referring to FIG. 17, in operation S1710, the relay server 1000 requests the list of the first user data set to be shared between the first user and the second user from the first cloud storage 2000.

When the share between the first user and the second user is set with respect to the first user data, the relay server 1000 may request the list of the first user data set to be shared between the first user and the second user from the first cloud storage 2000.

For example, the relay server 1000 may request the list of the first user data from the first cloud storage 2000 by using the position information representing the position of the first user data and the ID of the relay server 1000 registered in the first cloud storage 2000.

When the data is a file, the data list may include attribute information of the file. Also, when the data is a folder, the data list may include a hierarchical structure of the folder and attribute information of each file located in the folder. Also, when the data is a folder, the data list may further include position information representing the position of each folder or file located in the folder.

In operation S1720, the first cloud storage 2000 determines whether the relay server 1000 has the access right to the first user data requested by the relay server 1000.

The first cloud storage 2000 may determine whether the relay server 1000 has the access right to the requested first user data, based on the ID of the relay server 1000.

For example, when the first user data requested by the relay server 1000 has been set to be shared between the first user and the relay server 1000, the first cloud storage 2000 may determine that the relay server 1000 has the access right to the requested first user data.

In operation S1730, the first cloud storage 2000 transmits the list of the first user data requested by the relay server 1000 to the relay server 1000.

When determining that the relay server 1000 has the access right to the first user data requested by the relay server 1000, the first cloud storage 2000 may transmit the list of the requested first user data to the relay server 1000.

In operation S1740, the relay server 1000 stores the list of the first user data set to be shared between the first user and the second user.

The relay server 1000 may store the list of the first user data received from the first cloud storage 2000. For example, the relay server 1000 may store the attribute information of each file corresponding to the identification information of each file. Also, the relay server 1000 may store the file owner ID, the receiver ID, the time of sharing between the first user and the second user, the access range set by the first user, and the name of the first cloud storage 2000 corresponding to the identification information of each file.

FIG. 18 is a diagram illustrating a DB 1800 about a list of folders or files of the first user received from the first cloud storage 2000, according to an exemplary embodiment.

Referring to FIG. 18, the relay server 1000 may store the list of the first user files or folders received from the first cloud storage 2000.

The relay server 1000 may store attribute information of each file or folder 1810 received from the first cloud storage 2000 corresponding to identification information of each file or folder. The identification information of each file or folder may include position information representing the position of each file or folder.

For example, the relay server 1000 may store the file name, the file owner ID, the name of the cloud storage in which the file is stored, the file type, the file size, the file generation time, the file modification time, the file access time, the file access right information, the file access range information, the file receiver ID, and the position information representing the position of the file corresponding to the file identification information. That is, each file or folder 1810 may correspond to the DB 1600 of FIG. 16.

Also, the relay server 1000 may store the folder name, the folder owner ID, the folder type, the information about the storage in which the folder is stored, the folder receiver ID, and the position information representing the position of the folder corresponding to the folder identification information.

For example, the folder shared between the first user and the second user may be Dropbox_user1_FOLDER2, and the Dropbox_user1_FOLDER2 folder may include a Dropbox_user1_SUB_FOLDER_1 folder, a Dropbox_user1_SUB_FOLDER_2 folder, and a Dropbox_user1_FILE1 file.

Accordingly, the list for the Dropbox_user1_FOLDER2 folder may include the hierarchical structure of the Dropbox_user1_FOLDER2 folder, the attribute information of each file in the Dropbox_user1_FOLDER2 folder, and the attribute information of the Dropbox_user1_FILE1 file.

Figure 19:
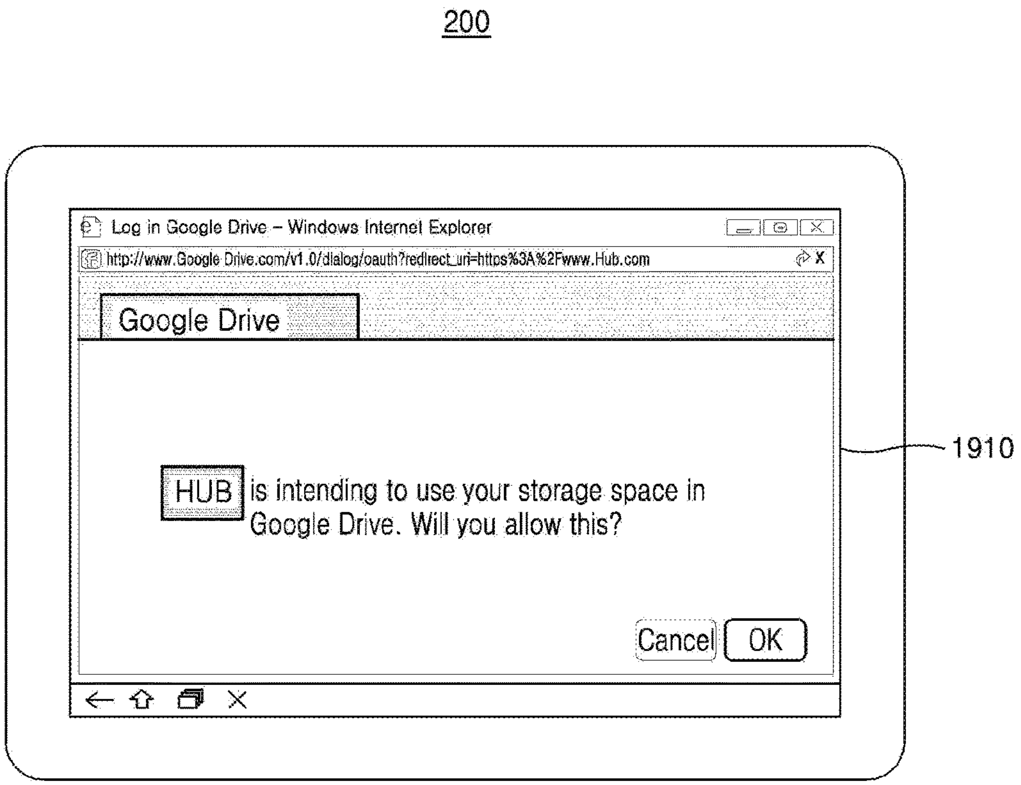
FIG. 19 is a diagram illustrating a method for the second device to grant the relay server the right to store data in a storage space of the second user in the second cloud storage, according to an exemplary embodiment.

FIG. 19 is a diagram illustrating a method for the second device 200 to grant the relay server 1000 the right to store data in a storage space of the second user in the second cloud storage 3000, according to an exemplary embodiment.

The right to store data in the second user storage space in the second cloud storage 3000 may refer to the right to store data as the second user data in the second cloud storage 3000.

Referring to FIG. 19, the second device 200 may request the second cloud storage 3000 to grant the relay server 1000 the right to store data in the second user storage space in the second cloud storage 3000.

For example, the second device 200 or the relay server 1000 may be provided with the software logic for granting other users the right to store data in the second user storage space, by using the open API provided by the service provider of the second cloud storage 3000.

When receiving the request for granting the relay server 1000 the right to store data in the second user storage space from the second device 200 or the relay server 1000, the second cloud storage 3000 may request to authenticate the second user. For example, the second cloud storage 3000 may transmit a user authentication page to the second device 200.

Based on the user authentication page, the second device 200 may receive the second user account registered in the second cloud storage 3000 from the second user. When receiving the second user account registered in the second cloud storage 3000 from the second user, the second device 200 may transmit the received second user account to the second cloud storage 3000 to authenticate the second user.

When the second user is authenticated, the second cloud storage 3000 may request the second user's permission for granting the relay server 1000 the right to store data in the second user storage space from the second device 200. For example, the second cloud storage 3000 may transmit a resource permission page 1910 for determining whether to grant the relay server 1000 the right to store data in the second user storage space to the second device 200.

Based on the resource permission page 1910, the second device 200 may receive information about whether to grant the relay server 1000 the right to store data in the second user storage space from the second user. Then, the second device 200 may transmit the information about whether to grant the relay server 1000 the right to store data in the second user storage space to the second cloud storage 3000.

Based on the user input received from the second device 200, the second cloud storage 3000 may grant the relay server 1000 the right to store data in the second user storage space. For example, the second cloud storage 3000 may set the ID of the relay server 1000 registered in the second cloud storage 3000 as the third party that may use the second user storage space.

Also, when the relay server 1000 is granted the right to store data in the second user storage space, the second cloud storage 3000 may transmit position information representing the position of the second user storage space to the second device 200. When receiving the position information representing the position of the second user storage space from the second cloud storage 3000, the second device 200 may transmit the position information representing the position of the second user storage space to the relay server 1000.

The position information representing the position of the second user storage space may include position information representing the position of the second user folder in the second cloud storage 3000. Also, the position information representing the position of the second user storage space may vary according to the second user's settings.

Figure 20:
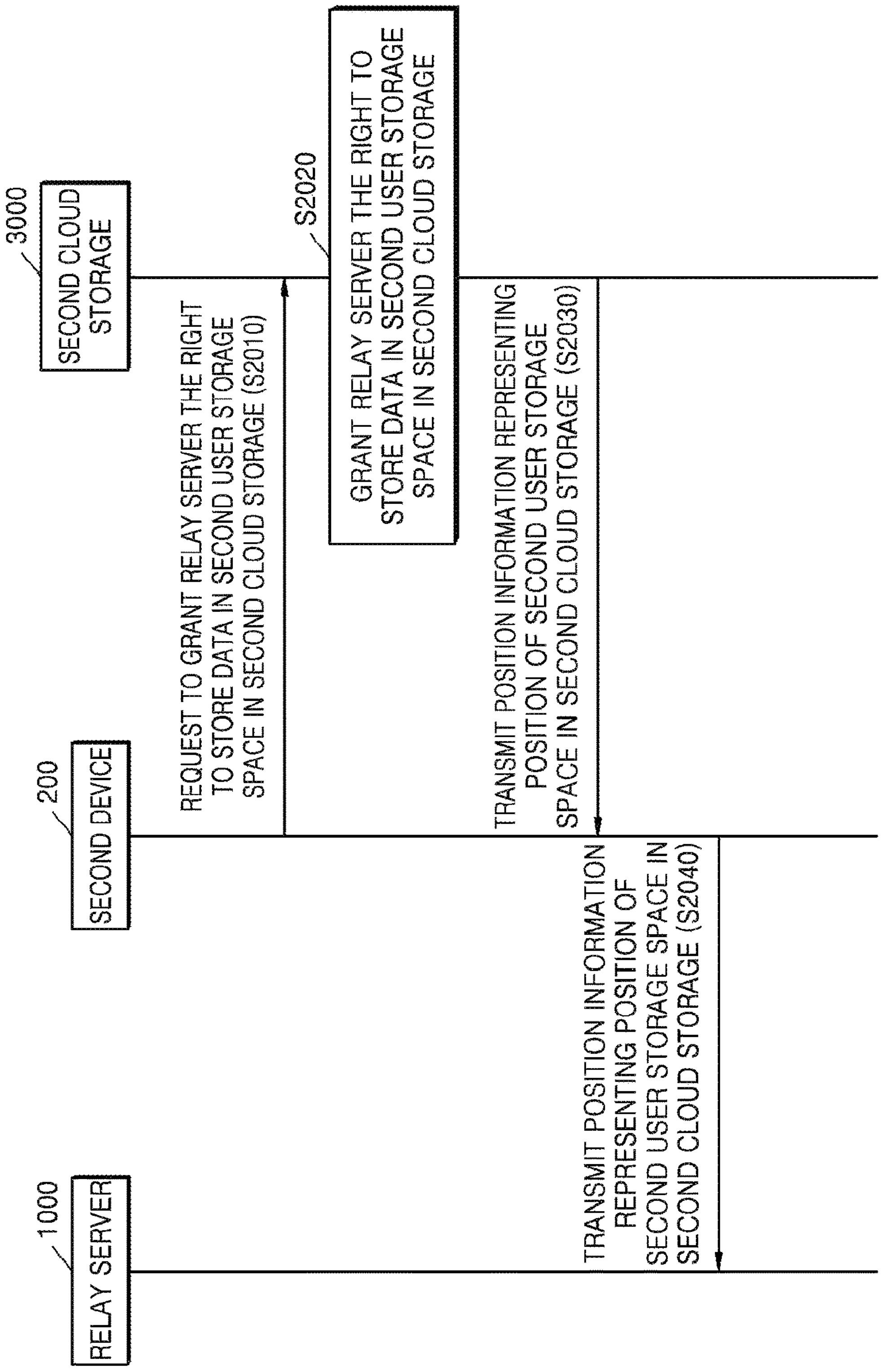
FIG. 20 is a flow diagram illustrating a method for the second device to grant the relay server the right to store data in a storage space of the second user in the second cloud storage, according to an exemplary embodiment.

FIG. 20 is a flow diagram illustrating a method for the second device 200 to grant the relay server 1000 the right to store data in a storage space of the second user in the second cloud storage 3000, according to an exemplary embodiment.

Referring to FIG. 20, in operation S2010, the second device 200 requests the second cloud storage 3000 to grant the relay server 1000 the right to store data in the second user storage space in the second cloud storage 3000.

In this case, the request for granting the relay server 1000 the right to store data in the second user storage space may include the ID of the relay server 1000 registered in the second cloud storage 3000 and the ID of the second user registered in the second cloud storage 3000.

Also, the second device 200 may request position information representing the position of the second user storage space in the second cloud storage 3000 from the second cloud storage 3000.

In operation S2020, the second cloud storage 3000 grants the relay server 1000 the right to store data in the second user storage space in the second cloud storage 3000.

For example, when receiving the request for granting the relay server 1000 the right to store data in the second user storage space, the second cloud storage 3000 may authenticate the second user. Then, the second cloud storage 3000 may receive a second user input for granting the relay server 1000 the right to store data in the second user storage space from the second device 200.

When receiving the second user input for granting the relay server 1000 the right to store data in the second user storage space, the second cloud storage 3000 may grant the relay server 1000 the right to store data in the second user storage space in the second cloud storage 3000. For example, the second cloud storage 3000 may set the ID of the relay server 1000 registered in the second cloud storage 3000 as the third party that may use the second user storage space.

In operation S2030, the second cloud storage 3000 transmits position information representing the position of the second user storage space in the second cloud storage 3000 to the second device 200.

The position information representing the position of the second user storage space in the second cloud storage 3000 may include the URI of the second user drive or folder in the second cloud storage 3000.

Also, according to an exemplary embodiment, the second cloud storage 3000 may transmit information about the right to store data in the second user storage space to the second device 200. The information about the right to store data in the second user storage space may include password information for authenticating the right to store data in the second user storage space.

In operation S2040, the second device 200 transmits the position information representing the position of the second user storage space in the second cloud storage 3000 to the relay server 1000.

When receiving the position information representing the position of the second user storage space in the second cloud storage 3000, the relay server 1000 may store the position information representing the position of the second user storage space corresponding to the second user ID registered in the relay server 1000.

Also, when receiving the information about the right to store data in the second user storage space from the second cloud storage 3000, the second device 200 may transmit the received information to the relay server 1000.

FIGS. 19 and 20 illustrate the method for the second device 200 to grant the relay server 1000 the right to store data in the second user storage space in the second cloud storage 3000; however, in the same way, the first device 100 may grant the relay server 1000 the access right to the first user data in the first cloud storage 2000.

FIG. 21 is a diagram illustrating a DB stored in the relay server 1000 when the relay server 1000 receives position information representing the position of a storage space of the second user in the second cloud storage 3000, according to an exemplary embodiment.

Referring to FIG. 21, the relay server 1000 may store the position information representing the position of the second user storage space corresponding to the second user.

For example, corresponding to a second user ID 2160 registered in the relay server 1000, the relay server 1000 may store a second user ID 2170 registered in the second cloud storage 3000 and position information 2180 representing the position of the second user storage space for storing data provided to the second user from others. The position information 2180 representing the position of the second user storage space may include a URL 2184 of the second user storage space.

Figure 22:
FIG. 22 is a diagram illustrating a method for the relay server to notify the second device that the first user has requested the data of the first user to be shared with the second user when receiving a share request for sharing the data of the first user with the second user from the first device, according to an exemplary embodiment.

FIG. 22 is a diagram illustrating a method for the relay server 1000 to notify the second device 200 that the first user has requested the data of the first user to be shared with the second user when receiving a share request for sharing the data of the first user with the second user from the first device 100, according to an exemplary embodiment.

Referring to FIG. 22, the second device 200 may receive information indicating that the share between the first user and the second user has been set with respect to the first user data from the relay server 1000. The information indicating that the share between the first user and the second user has been set with respect to the first user data may include the first user ID registered in the relay server 1000, the list of the first user data set to be shared between the first user and the second user, and the first user message for the second user.

Accordingly, the second device 200 may display the information indicating that the share between the first user and the second user has been set with respect to the first user data, which has been received from the relay server 1000.

For example, the second device 200 may display an event message 2210 indicating that the share between the first user and the second user has been set with respect to the first user data in an indicator bar on the screen of the second device 200.

Figure 23:
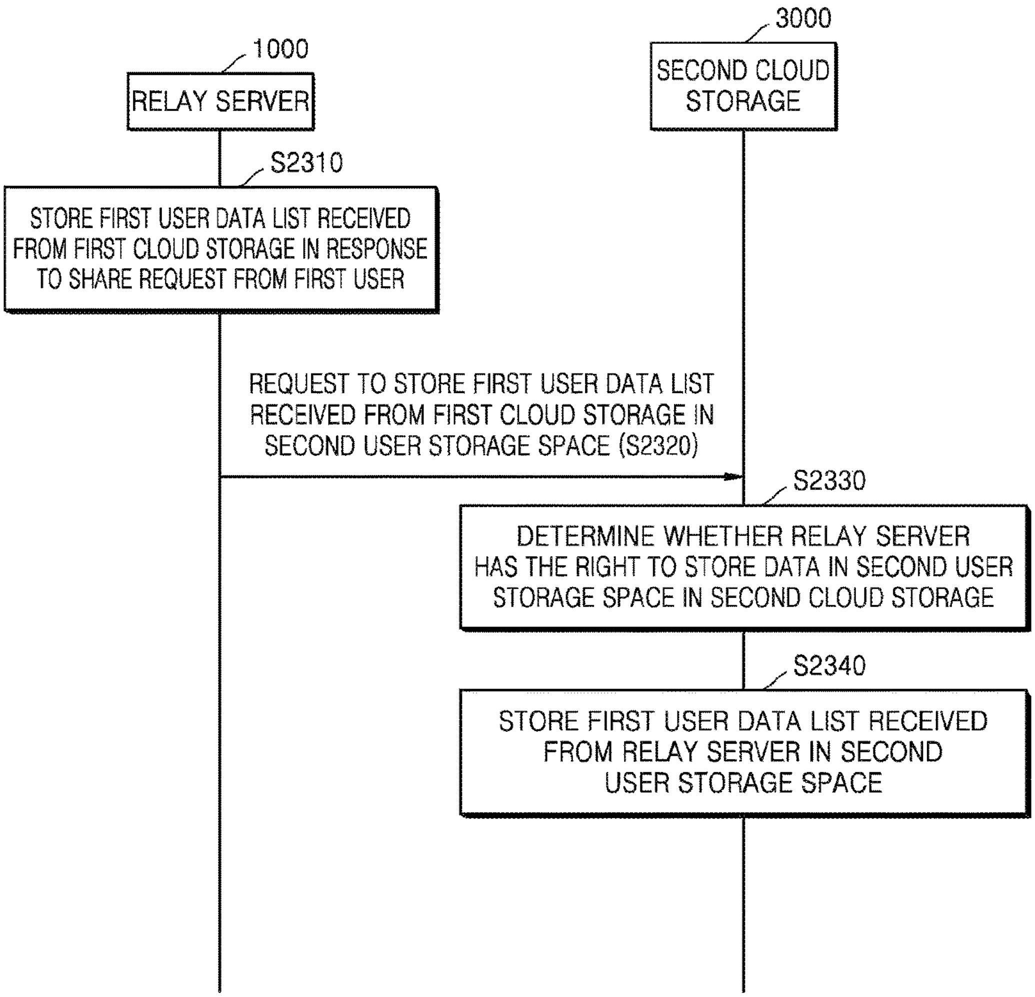
FIG. 23 is a flow diagram illustrating a method for the relay server to store a list of data of the first user received from the first cloud storage in the storage space of the second user in the second cloud storage, according to an exemplary embodiment.

FIG. 23 is a flow diagram illustrating a method for the relay server 1000 to store a list of data of the first user received from the first cloud storage 2000 in the storage space of the second user in the second cloud storage 3000, according to an exemplary embodiment.

Referring to FIG. 23, in operation S2310, in response to the share request from the first user, the relay server 1000 stores the list of the first user data received from the first cloud storage 2000.

The list of the first user data received from the first cloud storage 2000 may be the list of the first user data that the relay server 1000 receives from the first cloud storage 2000 because the first user requests the relay server 1000 to share the first user data stored in the first cloud storage 2000 with the second user.

In operation S2320, the relay server 1000 requests the second cloud storage 3000 to store the list of the first user data received from the first cloud storage 2000 in the second user storage space.

The request for storing the list of the first user data may include the list of the first user data, the ID of the relay server 1000 registered in the second cloud storage 3000, and the ID of the second user registered in the second cloud storage 3000.

In operation S2330, the second cloud storage 3000 determines whether the relay server 1000 has the right to store data in the second user storage space in the second cloud storage 3000.

For example, based on the ID of the second user registered in the second cloud storage 3000 and the ID of the relay server 1000 registered in the second cloud storage 3000, the second cloud storage 3000 may determine whether the relay server 1000 has the right to store data in the second user storage space in the second cloud storage 3000.

In operation S2340, when the relay server 1000 has the right to store data in the second user storage space in the second cloud storage 3000, the second cloud storage 3000 stores the list of the first user data received from the relay server 1000 in the second user storage space.

Figure 24A:
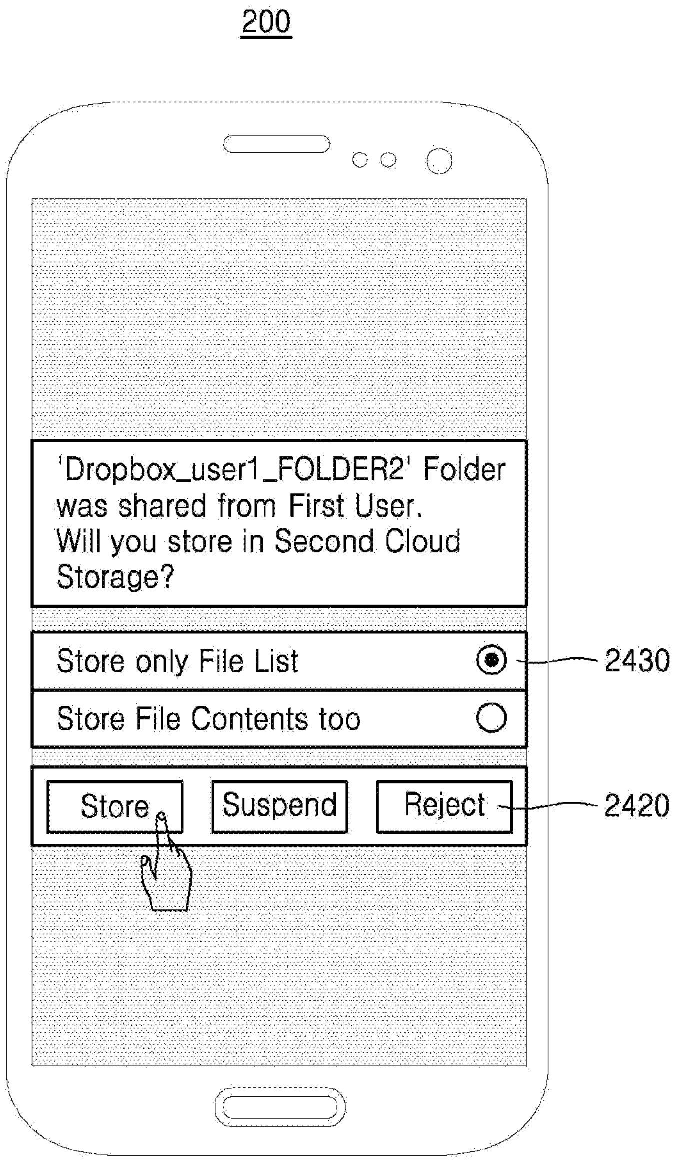
FIG. 24A is a diagram illustrating a method for the second device to display a user interface (UI) for receiving a selection of the second user for selecting whether to store the data of the first user in the second cloud storage when receiving information indicating that the data of the first user has been set to be shared between the first user and the second user from the relay server, according to an exemplary embodiment.

FIG. 24A is a diagram illustrating a method for the second device 200 to display a UI for receiving a selection of the second user for selecting whether to store the data of the first user in the second cloud storage 3000 when receiving information indicating that the data of the first user has been set to be shared between the first user and the second user from the relay server 1000, according to an exemplary embodiment.

Referring to FIG. 24A, the second device 200 may display a UI 2420 for selecting whether to store the first user data se to be shared between the first user and the second user in the second cloud storage 3000.

Also, the second device 200 may display a UI 2430 for selecting the range of the first user data to be stored in the second cloud storage 3000.

The UI 2430 for selecting the first user data storage range may include a UI for selecting whether to store only the list of the data or whether to store the data too.

The second device 200 may transmit information about whether to store the first user data received from the second device 200 in the second cloud storage 2000 and information about the first user data storage range to the relay server 1000.

Based on the information about whether to store the first user data received from the second device 200 in the second cloud storage 2000 and the information about the first user data storage range, the relay server 1000 may store some or all of the first user data in the second cloud storage 3000.

For example, when the second user input value is "store", the relay server 1000 may store the first user data or the list of the first user data received from the first cloud storage 2000 in the second cloud storage 3000.

Also, when the second user input value is "suspend", the relay server 1000 may not store the list of the first user data received from the first cloud storage 2000 in the second cloud storage 3000.

Also, when the second user input value is "reject", the relay server 1000 may not store the list of the first user data received from the first cloud storage 2000 in the second cloud storage 3000. Also, the relay server 1000 may also delete the stored list of the first user data received from the first cloud storage 2000.

Also, when the second user selects to also store the contents of the first user file in the second cloud storage 3000, the relay server 1000 may store not only the list of the first user data set to be shared between the first use and the second user but also the contents of the first user file in the second cloud storage 3000.

Figure 24B:
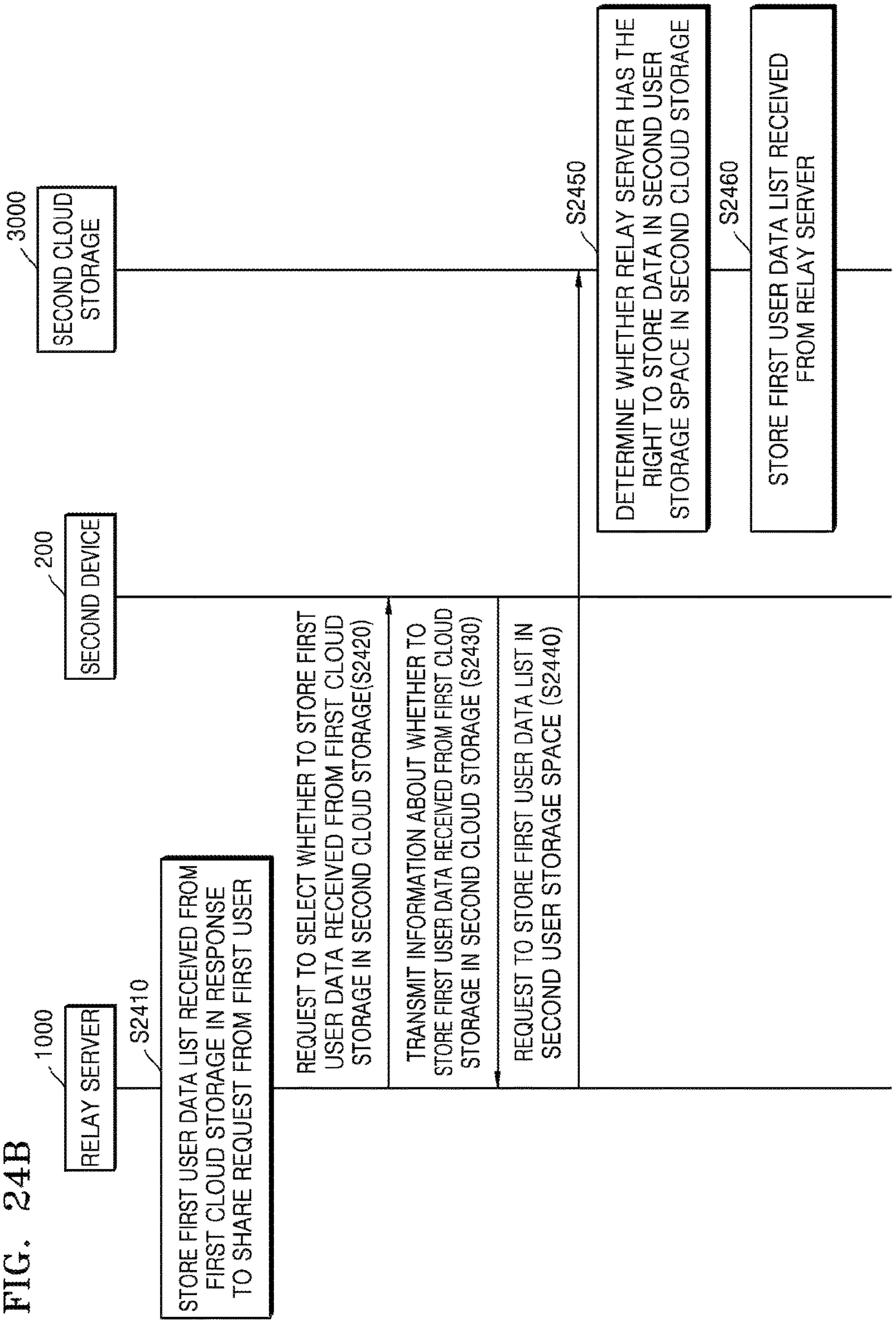
FIG. 24B is a flow diagram illustrating a method for the relay server to store the data of the first user in the second cloud storage based on the selection of the second user received from the second device, according to an exemplary embodiment.

FIG. 24B is a flow diagram illustrating a method for the relay server 1000 to store the data of the first user in the second cloud storage 3000 based on the selection of the second user received from the second device 200, according to an exemplary embodiment.

Referring to FIG. 24B, in operation S2410, in response to the share request from the first user, the relay server 1000 stores the list of the first user data received from the first cloud storage 2000.

In operation S2420, the relay server 1000 requests the second device 200 to select whether to store the first user data received from the first cloud storage 2000 in the second cloud storage 3000.

In operation S2430, the second device 200 transmits information about whether to store the first user data received from the first cloud storage 2000 in the second cloud storage 3000 and information about the first user data storage range to the relay server 100.

In operation S2440, the relay server 1000 requests the second cloud storage 3000 to store the list of the first user data received from the first cloud storage 2000 in the second user storage space.

Based on the second user input received from the second device 200, the relay server 1000 may determine whether to store the first user data received from the first cloud storage 2000 in the second cloud storage 3000 and the storage range of the first user data.

When the second user selects to store only the list of the first user data in the second cloud storage 3000, the relay server 1000 may request the second cloud storage 3000 to store the list of the first user data received from the first cloud storage 2000 in the second user storage space.

Also, the data storage request transmitted to the second cloud storage 3000 may include the list of the first user data, the ID of the second user registered in the second cloud storage 3000, and the ID of the relay server 1000 registered in the second cloud storage 3000.

In operation S2450, the second cloud storage 3000 determines whether the relay server 1000 has the right to store data in the second user storage space in the second cloud storage 3000.

For example, based on the ID of the second user registered in the second cloud storage 3000 and the ID of the relay server 1000 registered in the second cloud storage 3000, the second cloud storage 3000 may determine whether the relay server 1000 has the right to store data in the second user storage space in the second cloud storage 3000.

In operation S2460, when the relay server 1000 has the right to store data in the second user storage space in the second cloud storage 3000, the second cloud storage 3000 stores the list of the first user data received from the relay server 1000 in the second user storage space.

Figure 25:
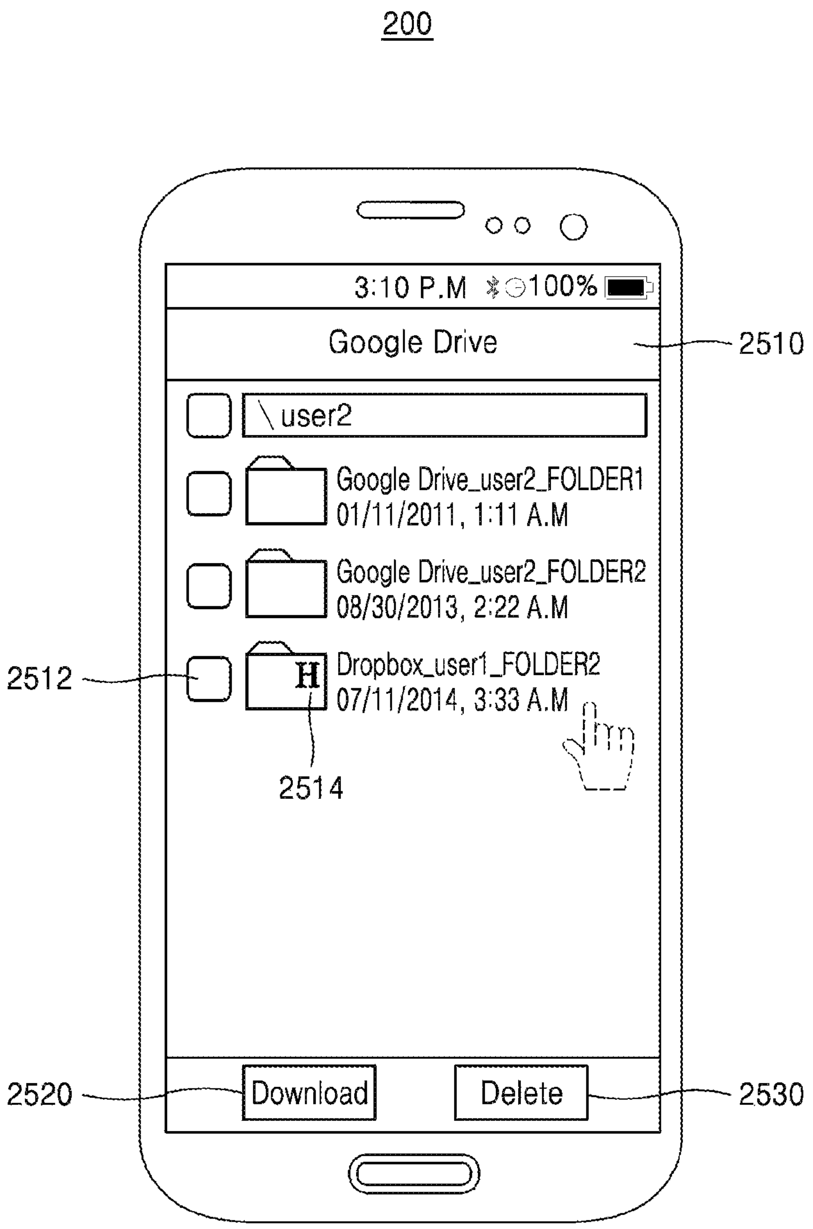
FIG. 25 is a diagram illustrating a method for the second device to receive the data of the first user, which is stored in the second cloud storage when a share is set between the first user and the second user, from the second cloud storage and display the received data of the first user, according to an exemplary embodiment.

FIG. 25 is a diagram illustrating a method for the second device 200 to receive the data of the first user, which is stored in the second cloud storage 3000 when a share is set between the first user and the second user, from the second cloud storage 3000 and display the received data of the first user, according to an exemplary embodiment.

When the second cloud storage 3000 receives the first user data from the relay server 1000 and stores the received first user data as the second user data, the second cloud storage 3000 may transmit the copy of the first user data stored as the second user data to the second device 200.

When the copy of the first user data is a file or a folder, the second device 200 may receive only a list of files or folders from the second cloud storage 3000. The list of files or folder may include attribute information of the files and a hierarchical structure of the folders.

Referring to FIG. 25, the second device 200 may display a list 2510 of the copy of the first user data received from the second cloud storage 3000. In this case, the second device 200 may display the list of the copy of the first user data together with the list of previous files or folders stored in the second cloud storage 3000. Also, the second device 200 may display an image 2514 indicating the copy of the first user data separately from the list of previous files or folders stored in the second cloud storage 3000.

Also, the second device 200 may display a UI 2512 for selecting a file or folder. Also, the second device 200 may display a UI 2520 for receiving the selected file or folder from the second cloud storage 3000.

When receiving a user input for selecting a check box 2512 and touching a download button 2520, the second device 200 may request the file or folder with the selected check box 2512 from the second cloud storage 3000.

Also, when receiving a user input for selecting a check box 2512 and touching a "delete" button 2530, the second device 200 may request the second cloud storage 3000 to delete the selected file or folder from the second cloud storage 3000.

Figure 26:
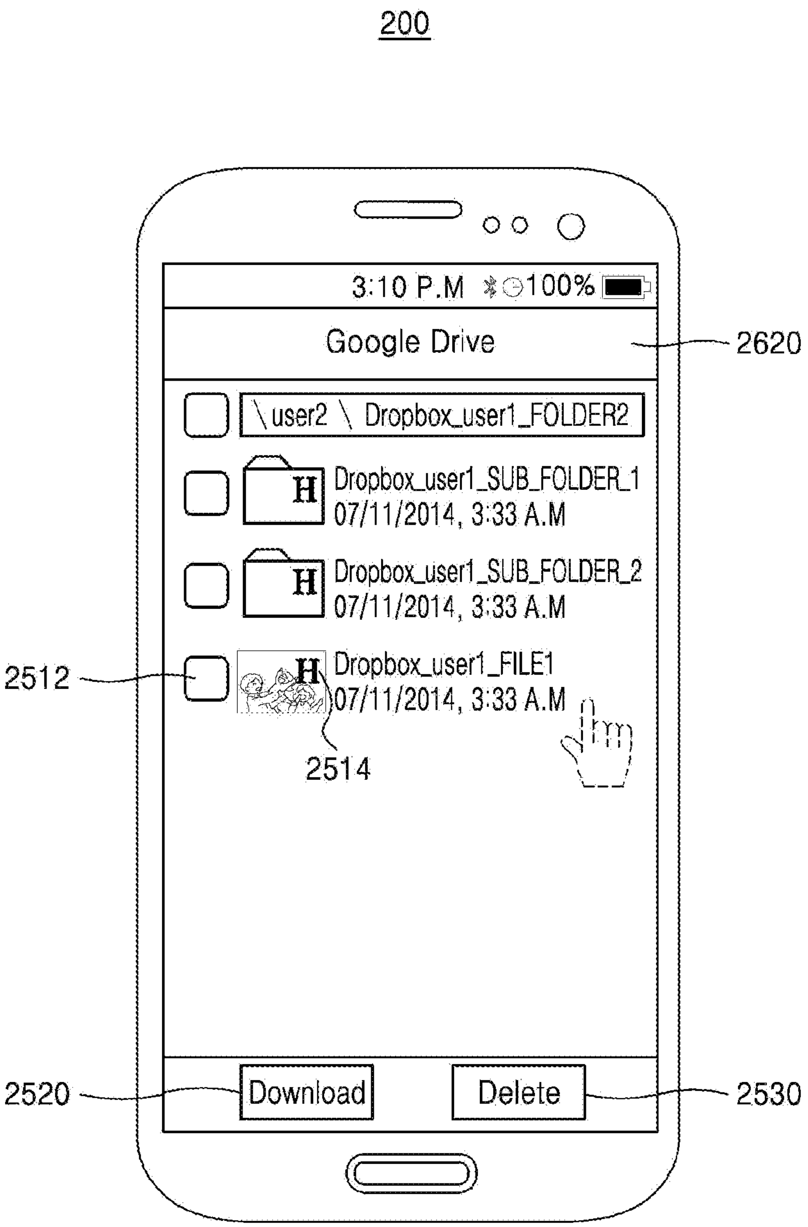
FIG. 26 is a diagram illustrating a method for the second device to receive the data of the first user, which is stored in the second cloud storage when a share is set between the first user and the second user, from the second cloud storage and display the received data of the first user, according to an exemplary embodiment.

FIG. 26 is a diagram illustrating a method for the second device 200 to receive the data of the first user, which is stored in the second cloud storage 3000 when a share is set between the first user and the second user, from the second cloud storage 3000 and display the received data of the first user, according to an exemplary embodiment.

Referring to FIG. 26, when receiving a user input for selecting the Dropbox_user1_FOLDER2 folder, the second device 200 may display a list 2620 of files or folders in the Dropbox_user1_FOLDER2 folder.

The second device 200 may display the list of files or folders in the Dropbox_user1_FOLDER2 folder based on the hierarchical structure of the Dropbox_user1_FOLDER2 folder received from the second cloud storage 3000.

Figure 27:
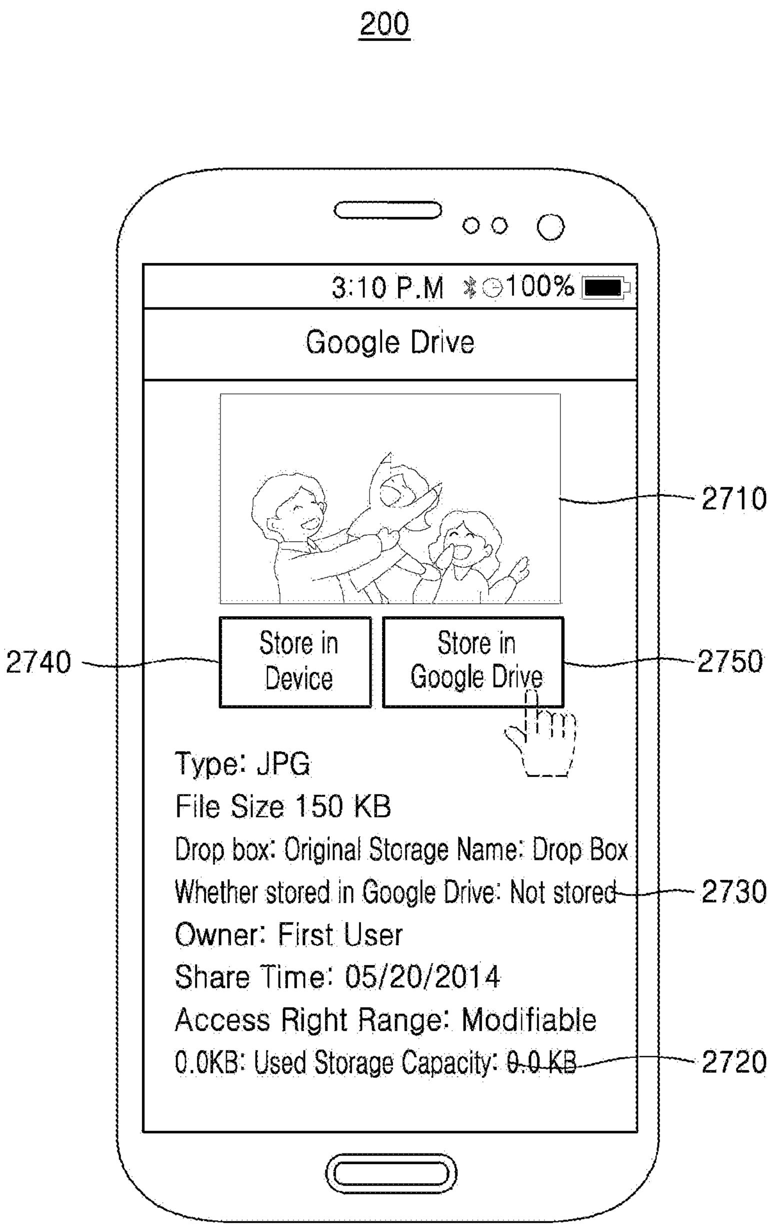
FIG. 27 is a diagram illustrating a method for the second device to receive the data of the first user, which is stored in the second cloud storage when a share is set between the first user and the second user, from the second cloud storage and display the received data of the first user, according to another exemplary embodiment.

FIG. 27 is a diagram illustrating a method for the second device 200 to receive the data of the first user, which is stored in the second cloud storage 3000 when a share is set between the first user and the second user, from the second cloud storage 3000 and display the received data of the first user, according to another exemplary embodiment.

Referring to FIG. 27, when receiving a user input for selecting the Dropbox_user1_FILE1 file, the second device 200 may determine whether the contents of the Dropbox_user1_FILE1 file are stored in the second device 200. When the contents of the Dropbox_user1_FILE1 file are not stored in the second device 200, the second device 200 may display only attribute information of the Dropbox_user1_FILE1 file.

The attribute information of the file may include a thumbnail image. Accordingly, when the selected file is an image file, the second device 200 may display a thumbnail image 2710.

Also, the second device 200 may display a storage capacity 2720 occupied by the displayed file in the second device 200.

Also, the second device 200 may display information 2730 indicating whether the contents of the displayed file are stored in the second cloud storage 3000.

Also, when the selected file is not stored in the second device 200, the second device 200 may display a UI 2740 for storing the displayed file in the second device 200. Also, when the selected file is not stored in the second cloud storage 3000, the second device 3000 may display a UI 2750 for storing the displayed file in the second cloud storage 3000.

Figure 28:
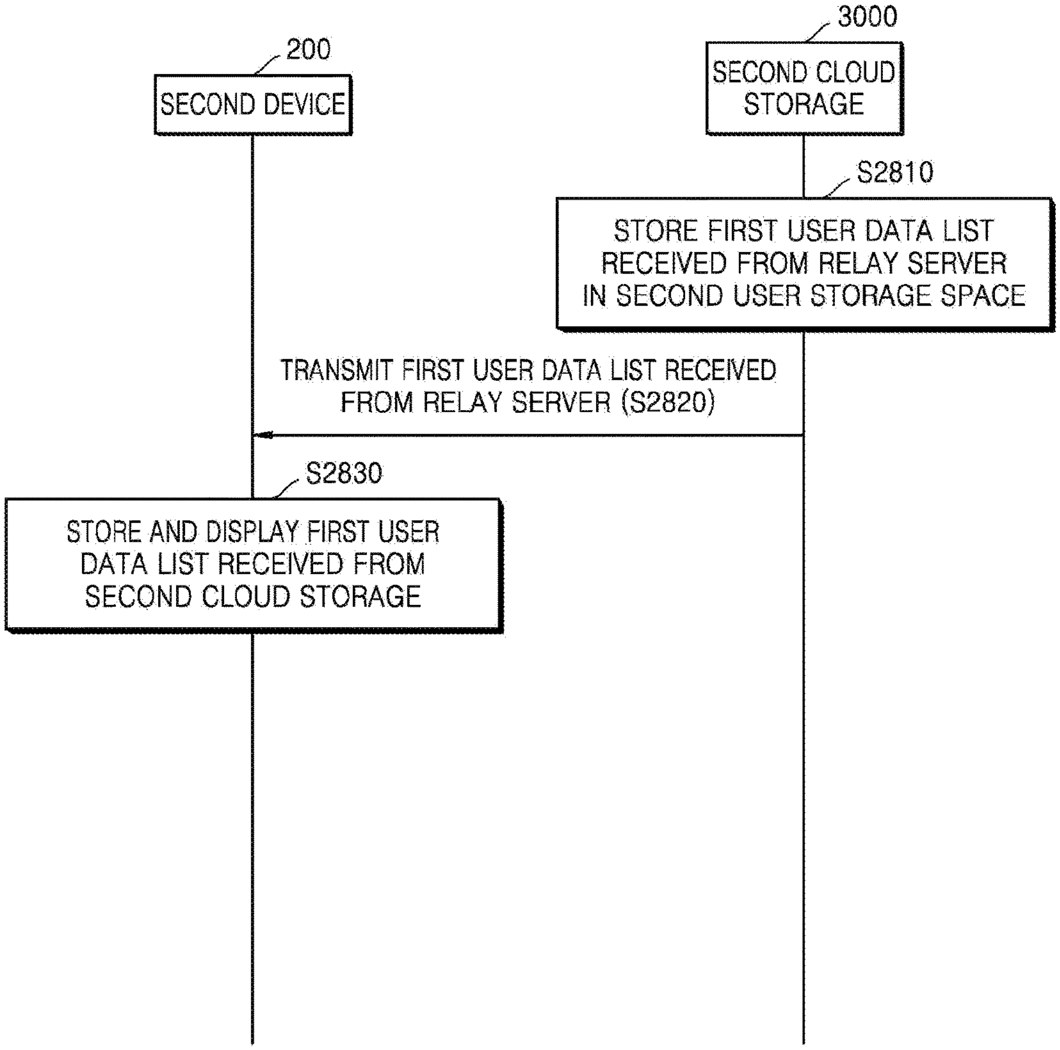
FIG. 28 is a flow diagram illustrating a method for the second device to receive a list of data of the first user from the second cloud storage, according to an exemplary embodiment.

FIG. 28 is a flow diagram illustrating a method for the second device 200 to receive a list of data of the first user from the second cloud storage 3000, according to an exemplary embodiment.

Referring to FIG. 28, in operation S2810, the second cloud storage 3000 stores the list of the first user data received from the relay server 1000, which has been set to be shared between the first user and the second user, in the second user storage space.

For example, when the share between the first user and the second user is set with respect to the first user data stored in the first cloud storage 2000, the first user data may be copied from the first cloud storage 2000 into the second cloud storage 3000 by the relay server 1000.

In operation S2820, the second cloud storage 3000 transmits the list of the first user data received from the relay server 1000 to the second device 200.

The second cloud storage 3000 may transmit the list of the first user data to the second device 200 based on the request of the second device 200. Also, when synchronization is set between the second user data in the second cloud storage 3000 and the second user data in the second device, because the list of the first user data is stored in the second cloud storage 3000, the second cloud storage 3000 may transmit the list of the first user data to the second device 300.

The list of the data transmitted to the second device 200 may include attribute information of the data. In this case, the attribute information of the data may include information about whether the data is stored in the second cloud storage 3000.

In operation S2830, the second device 200 stores and displays the list of the first user data received from the second cloud storage 3000.

Through the second device 200, the second user may access the first user data provided by the first user. That is, the first user data stored in the first cloud storage 2000 may be shared between the first user and the second user.

Figure 29:
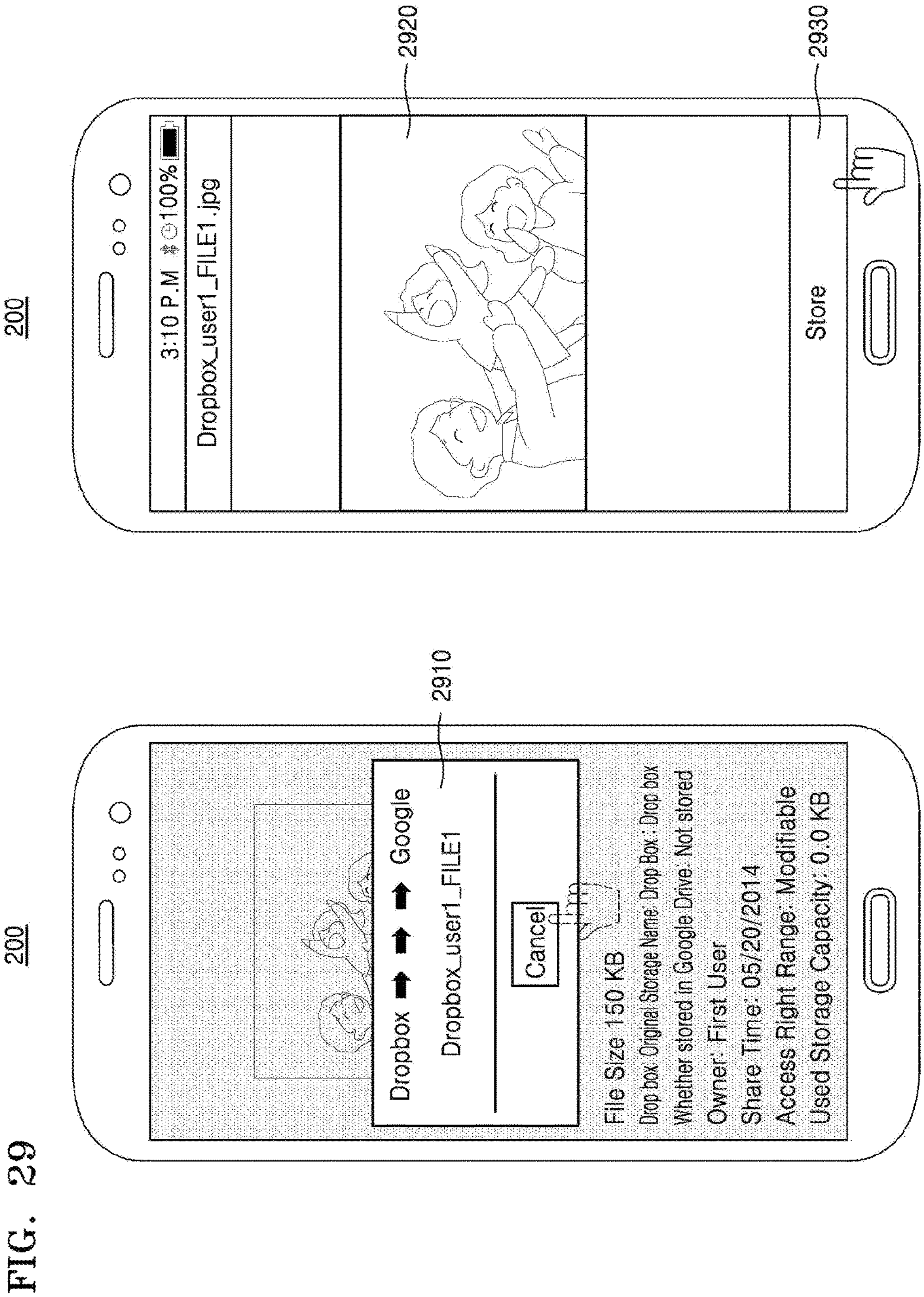
FIG. 29 is a diagram illustrating a method for the second device to acquire the contents of a file of the first user when receiving an input of the second user for selecting one of a list of files of the first user shared between the first user and the second user, according to an exemplary embodiment.

FIG. 29 is a diagram illustrating a method for the second device 200 to acquire the contents of a file of the first user when receiving an input of the second user for selecting one of a list of files of the first user shared between the first user and the second user, according to an exemplary embodiment.

Referring to FIG. 29, when receiving a user input for selecting the first user file shared between the first user and the second user, the second device 200 may determine whether the selected file is stored in the second device 200. When the selected file is not stored in the second device 200, the second device 200 may request the selected file from the second cloud storage 3000.

After requesting the selected file from the second cloud storage 3000, until receiving the requested file from the second cloud storage 3000, the second device 200 may display a UI 2910 indicating that the file is being downloaded. The UI 2910 indicating that the file is being downloaded may include identification information of the cloud storage transmitting/receiving the file. For example, when the file requested from the second cloud storage 3000 is not stored in the second cloud storage 3000, the first user data in the first cloud storage 2000 may be transmitted by the relay server 1000 from the first cloud storage 2000 to the second cloud storage 3000. Accordingly, the UI 2910 may include identification information of the first cloud storage 2000 and identification information of the second cloud storage 3000.

When the file selected by the second user is received from the second cloud storage 3000 through the relay server 1000, the second device 200 may display contents 2920 of the received file. Also, the second device 200 may display a UI 2930 for storing the displayed file in the second device 200.

Figure 30:
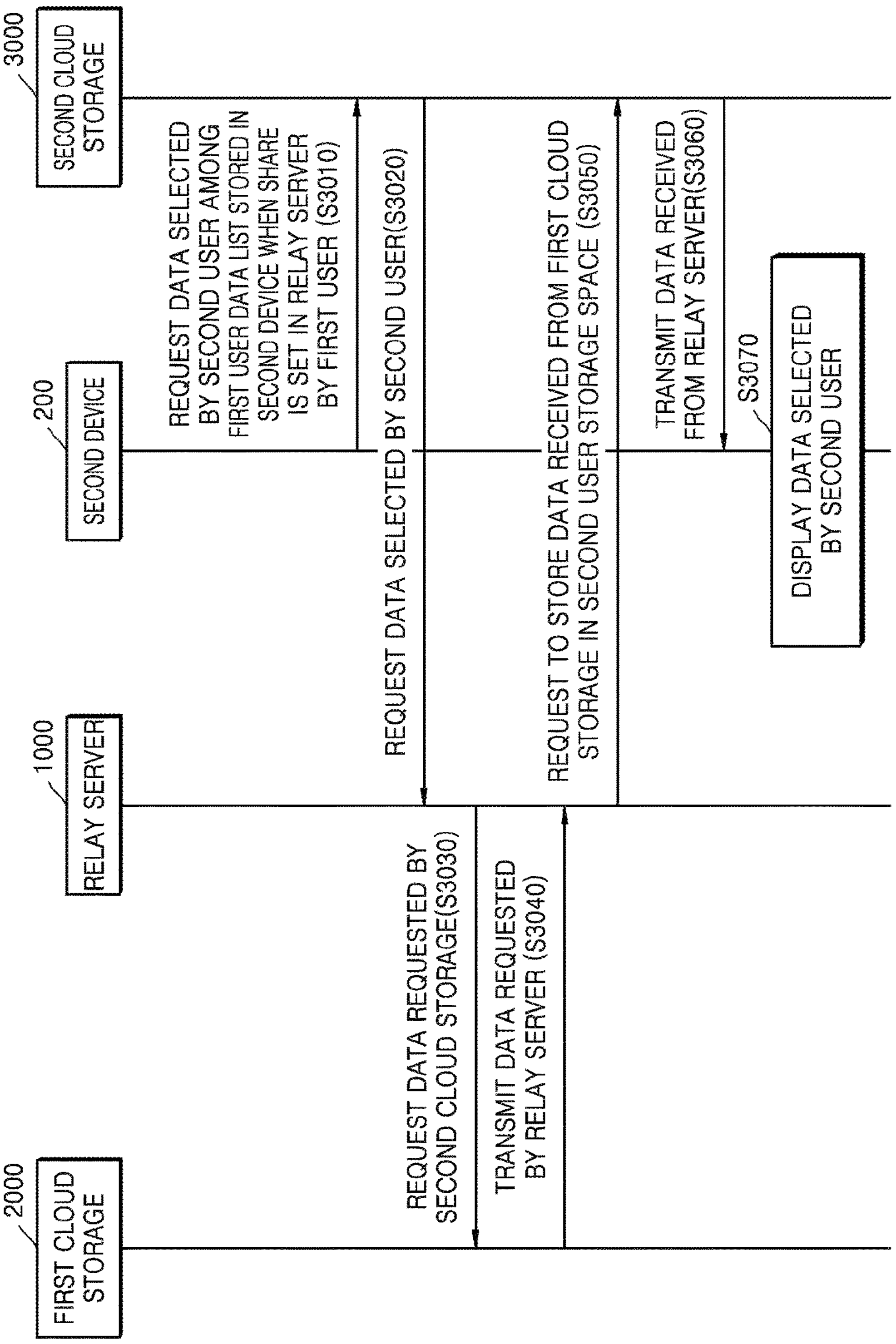
FIG. 30 is a flow diagram illustrating a method for the second device to acquire the data of the first user when only a list of data of the first user shared between the first user and the second user is stored in the second device, according to an exemplary embodiment.

FIG. 30 is a flow diagram illustrating a method for the second device 200 to acquire the data of the first user when only a list of data of the first user shared between the first user and the second user is stored in the second device 200, according to an exemplary embodiment.

Referring to FIG. 30, in operation S3010, when a share is set in the relay server 1000 by the first user, the second device 200 requests the data selected by the second user among the list of the first user data stored in the second device 200 from the second cloud storage 3000.

The second device 200 may display the list of the first user data received from the second cloud storage 3000. Then, the second device 200 may receive a user input for selecting at least one of the list of the first user data.

When receiving a user input for selecting at least one of the displayed list of the first user data, the second device 200 may determine whether the selected data is stored in the second device 200. When the selected data is not stored in the second device 200, the second device 200 may request the selected data from the second cloud storage 3000. The data request for the second cloud storage 3000 may include the identification information of the data and the ID of the second user registered in the second cloud storage 3000.

In operation S3020, the second cloud storage 3000 requests the data selected by the second user from the relay server 1000.

When receiving the data request from the second device 200, the second cloud storage 3000 may determine whether the data requested by the second device 200 is stored in the second cloud storage 3000.

When the data requested by the second device 200 is not stored in the second cloud storage 3000, the second cloud storage 3000 may request the data requested by the second device 200 from the relay server 1000.

The data request for the relay server 1000 may include the identification information of the data in the relay server 1000, the ID of the second user registered in the relay server 1000, and the ID of the second cloud storage 3000 registered in the relay server 1000.

In operation S3030, the relay server 1000 requests the data requested by the second cloud storage 3000 from the first cloud storage 2000.

Based on the identification information of the data received from the second cloud storage 3000, the relay server 1000 may acquire the position information representing the position of the data requested by the second cloud storage 3000. Based on the acquired position information, the relay server 1000 may request the data requested by the second cloud storage 3000 from the first cloud storage 2000.

In operation S3040, the first cloud storage 2000 transmits the data requested by the relay server 1000 to the relay server 1000.

When the data is requested by the relay server 1000, the first cloud storage 2000 may determine whether the relay server 1000 has the access right to the requested data. When the relay server 1000 has the access right to the requested data, the first cloud storage 2000 may transmit the data requested by the relay server 1000 to the relay server 1000.

In operation S3050, the relay server 1000 requests to store the data received from the first cloud storage 2000 in the second user storage space in the second cloud storage 3000.

The relay server 1000 may acquire the position information representing the position of the second user storage space based on the ID of the second user registered in the relay server 1000. Then, based on the acquired position information, the relay server 1000 may store the data received from the first cloud storage 2000 in the second user storage space.

In this case, the second cloud storage 3000 may determine whether the relay server 1000 has the right to store data in the second user storage space.

In operation S3060, the second cloud storage 3000 transmits the data received from the relay server 1000 to the second device 200.

When receiving the data requested by the second device 200 from the relay server 1000, the second cloud storage 3000 may transmit the data requested by the second device 200 to the second device 200.

In operation S3070, the second device 200 displays the data selected by the second user.

When receiving the data selected by the second user from the second cloud storage 3000, the second device 200 may display the data selected by the second user. For example, when the selected data is a file, the second device 200 may display the contents of the selected file.

Figure 31:
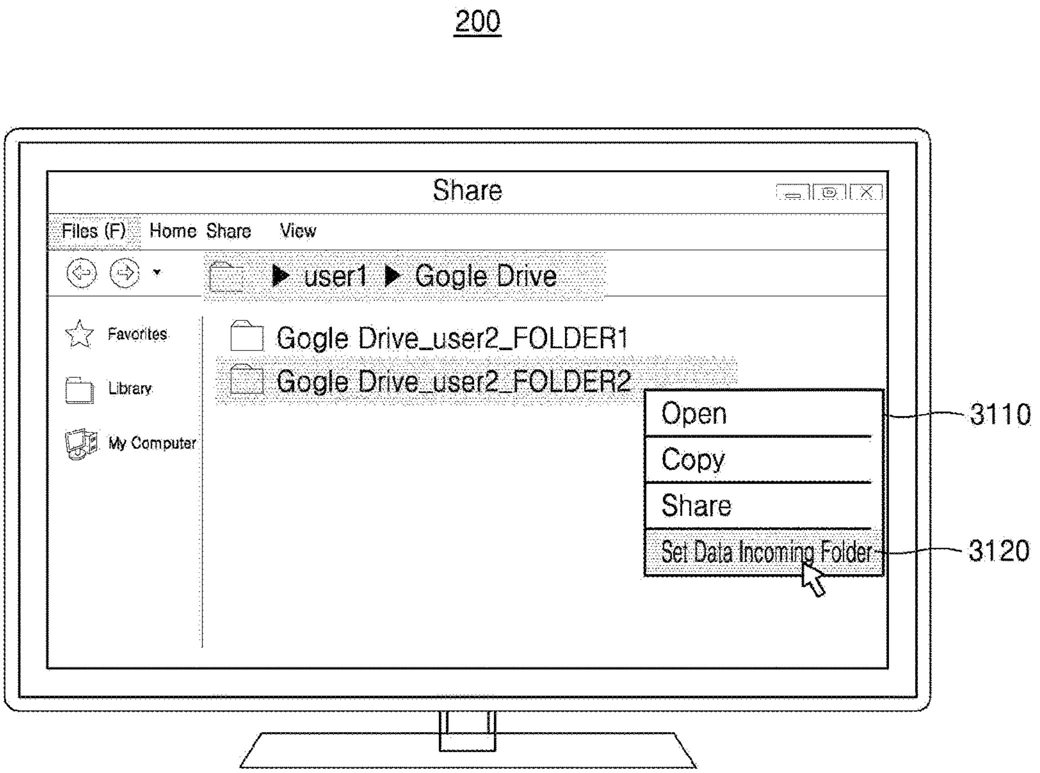
FIG. 31 is a diagram illustrating a method for the second device to set a folder of the second user in the second cloud storage as an incoming folder in the relay server, according to another exemplary embodiment.

FIG. 31 is a diagram illustrating a method for the second device 200 to set a folder of the second user in the second cloud storage 3000 as an incoming folder in the relay server 1000, according to another exemplary embodiment.

The incoming folder may refer to a folder for storing the data to be received from the relay server 1000.

Referring to FIG. 31, the second device 200 may display a UI for setting a folder for storing the data to be received from the relay server 1000.

For example, when the second user clicks a mouse right button while selecting the folder, the second device 200 may display a menu 3110 representing a function related to the selected folder. When the folder selected by the first user is the second user folder in the second cloud storage 3000, the second device 200 may display a selection item 3120 for sharing the selected folder between the second user and the relay server 1000 on the menu 3110.

When receiving a user input for selecting the selection item 3120, the second device 200 may request the second cloud storage 3000 to grant the relay server 1000 the right to store data in the selected folder.

Also, the second device 200 may request position information representing the position of the selected folder from the second cloud storage 3000. Accordingly, the second device 200 may receive the position information representing the position of the selected folder from the second cloud storage 3000.

When receiving the position information representing the position of the selected folder, the second device 200 may request the relay server 1000 to set the selected folder as the incoming folder of the second user.

The incoming folder setting request may include the position information representing the position of the folder and the ID of the second user registered in the relay server 1000.

When receiving the incoming folder setting request, the relay server 1000 may set the folder selected by the second user as the incoming folder of the second user. For example, the relay server 1000 may store the position information representing the position of the folder corresponding to the ID of the second user registered in the relay server 1000.

Figure 32:
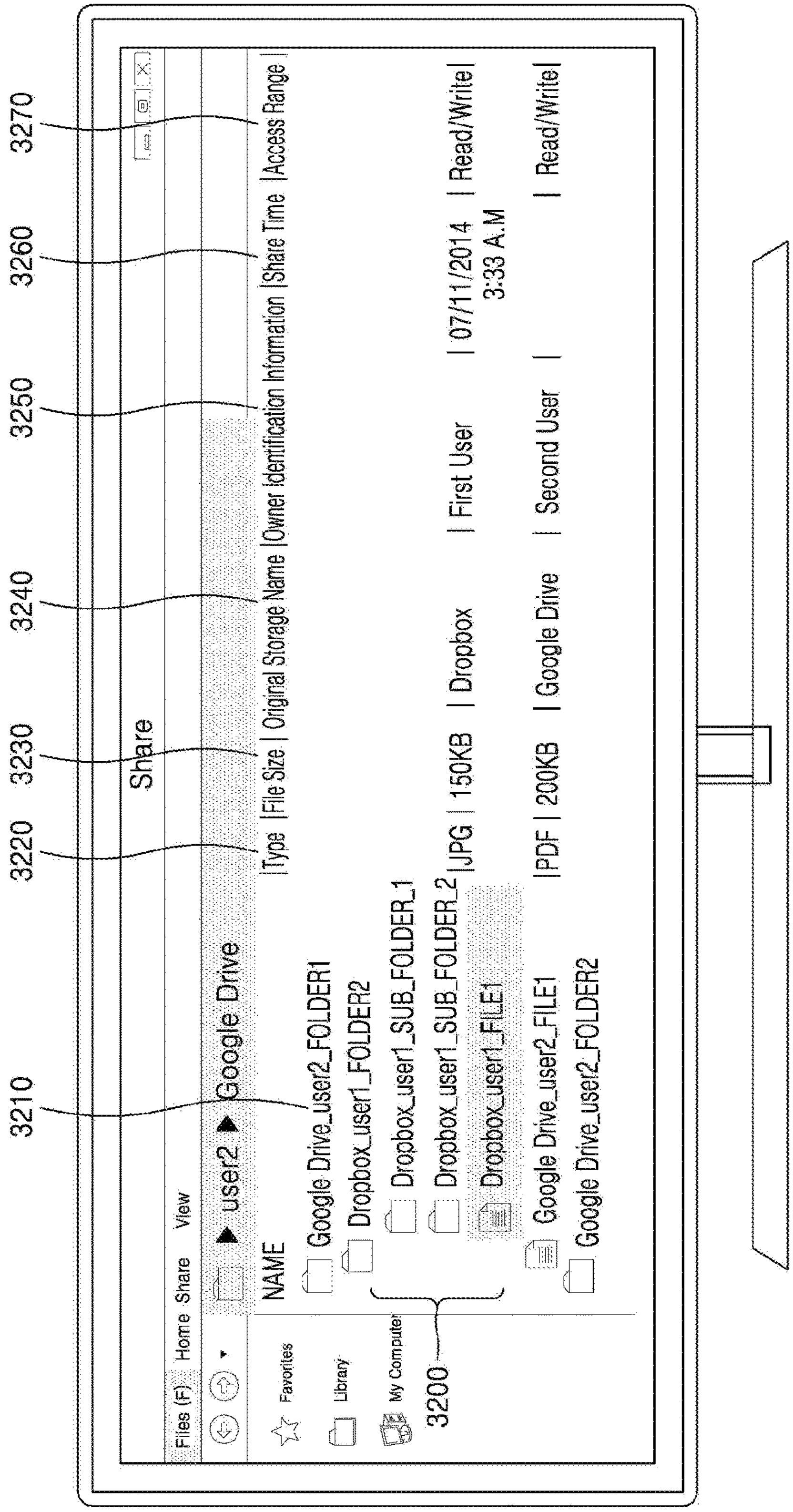
FIG. 32 is a diagram illustrating a method in which the folders or files of the first user shared between the first user and the second user are displayed by the second device when the incoming folder of the second user is set in the relay server, according to an exemplary embodiment.

FIG. 32 is a diagram illustrating a method in which the folders or files of the first user shared between the first user and the second user are displayed by the second device 200 when the incoming folder of the second user is set in the relay server 1000, according to an exemplary embodiment.

Referring to FIG. 32, the second device 200 and the second cloud storage 3000 may synchronize the data stored in the second device 200 and the data in the second cloud storage 3000.

Also, the second device 200 may mount the second user file or folder received from the second cloud storage 3000 in the file system of the second device 200.

For example, when a share is set between the first user and the second user, the Dropbox_user1_FOLDER2 folder of the first user stored in the first cloud storage 2000 may be copied from the first cloud storage 2000 into the second cloud storage 3000 by the relay server 1000.

In this case, when the Google Drive_user2_FOLDER1 folder is set as the incoming folder of the second user in the relay server 1000, the relay server 1000 may store the Dropbox_user1_FOLDER2 folder in the Google Drive_user2_FOLDER1 folder.

When the Dropbox_user1_FOLDER2 folder is stored in the Google Drive_user2_FOLDER1 folder, the second device 200 may receive a Dropbox_user1_FOLDER2 folder 3200 from the second cloud storage 3000 and mount the Dropbox_user1_FOLDER2 folder 3200 in a Google Drive_user2_FOLDER1 folder 3210.

Also, the second device 200 may display attribute information of each file in the Dropbox_user1_FOLDER2 folder. The attribute information of the file may include a file type 3220, a file size 3230, an original copy storage name 3240, owner identification information 3250, a share time 3260, and an access range 3270.

Figure 33:
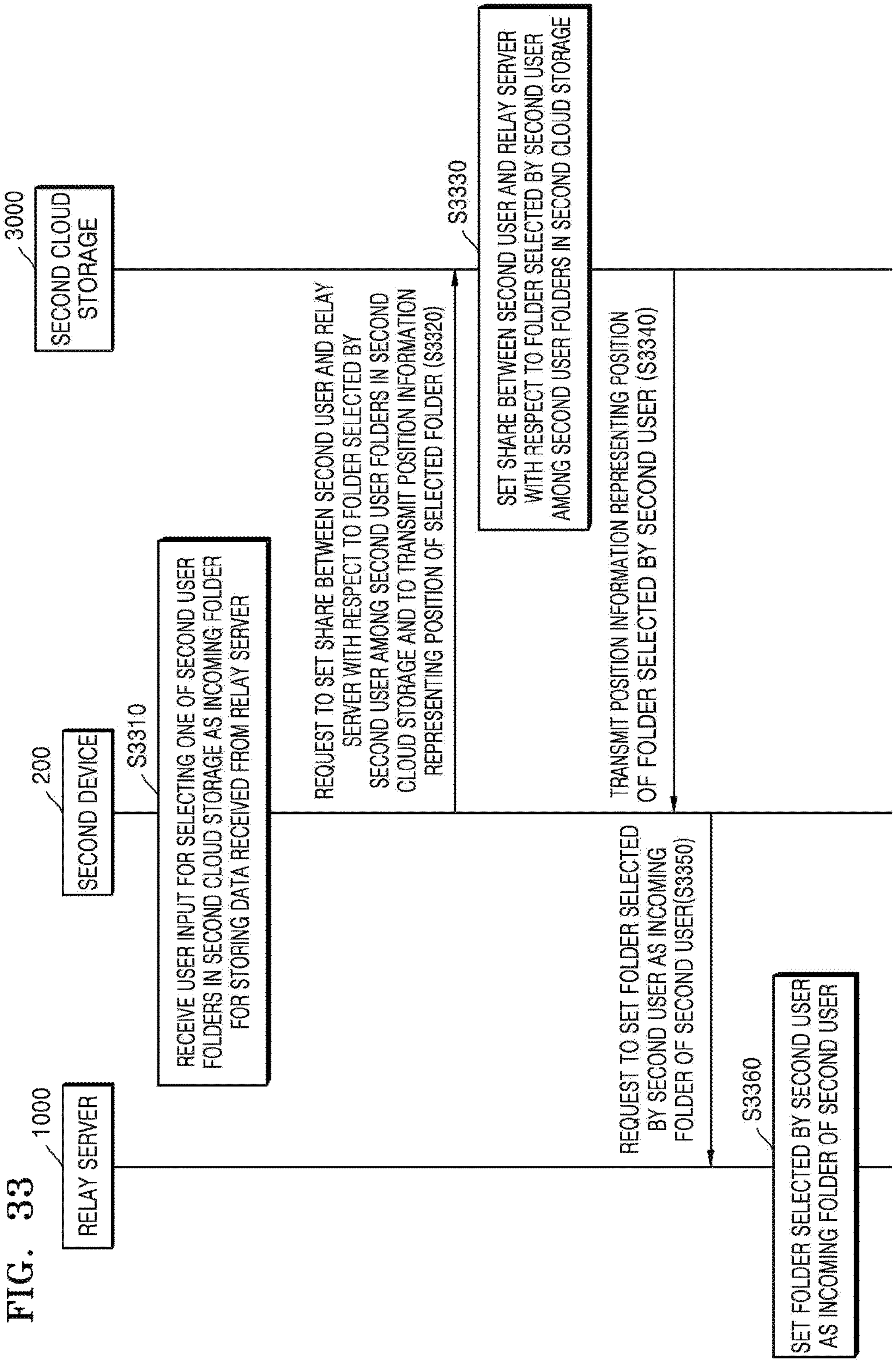
FIG. 33 is a flow diagram illustrating a method for the second device to set a folder of the second user in the second cloud storage as an incoming folder in the relay server, according to another exemplary embodiment.

FIG. 33 is a flow diagram illustrating a method for the second device 200 to set a folder of the second user in the second cloud storage 3000 as an incoming folder in the relay server 1000, according to another exemplary embodiment.

Referring to FIG. 33, in operation S3310, the second device 200 receives a user input for selecting one of the second user folders in the second cloud storage 3000 as the incoming folder for storing the data received from the relay server 1000.

In operation S3320, the second device 200 requests the second cloud storage 3000 to set the share between the second user and the relay server 1000 with respect to the folder selected among the second user folders in the second cloud storage 3000. Also, the second device 200 requests the second cloud storage 3000 to transmit the position information representing the position of the selected folder.

The share setting request between the second user and the relay server 1000 with respect to the second user data in the second cloud storage 3000 may include a second user ID registered in the second cloud storage 3000, an ID of the relay server 1000 registered in the second cloud storage 3000, and identification information of the selected folder.

In operation S3330, the second cloud storage 3000 sets the share between the second user and the relay server 1000 with respect to the folder selected by the second user among the second user folders in the second cloud storage 3000.

For example, corresponding to the identification information of the folder received from the second device 200, the second cloud storage 3000 may store the ID of the relay server 1000 registered in the second cloud storage 3000 as the sharer of the received folder. When the share between the second user and the relay server 1000 is set with respect to the folder selected by the second user, the relay server 1000 may acquire the right to store data in the selected folder.

In operation S3340, the second cloud storage 3000 transmits the position information representing the position of the folder selected by the second user to the second device 200.

The position information representing the position of the folder may include the URL of the folder for accessing the folder.

In operation S3350, the second device 200 requests the relay server 1000 to set the folder selected by the second user as the incoming folder of the second user.

The incoming folder setting request may include the position information representing the position of the folder received from the second cloud storage 3000 and the ID of the second user registered in the relay server 1000.

In operation S3360, the relay server 1000 sets the folder selected by the second user as the incoming folder of the second user.

For example, the relay server 1000 may store the position information representing the position of the folder corresponding to the ID of the second user registered in the relay server 1000.

Figure 34:
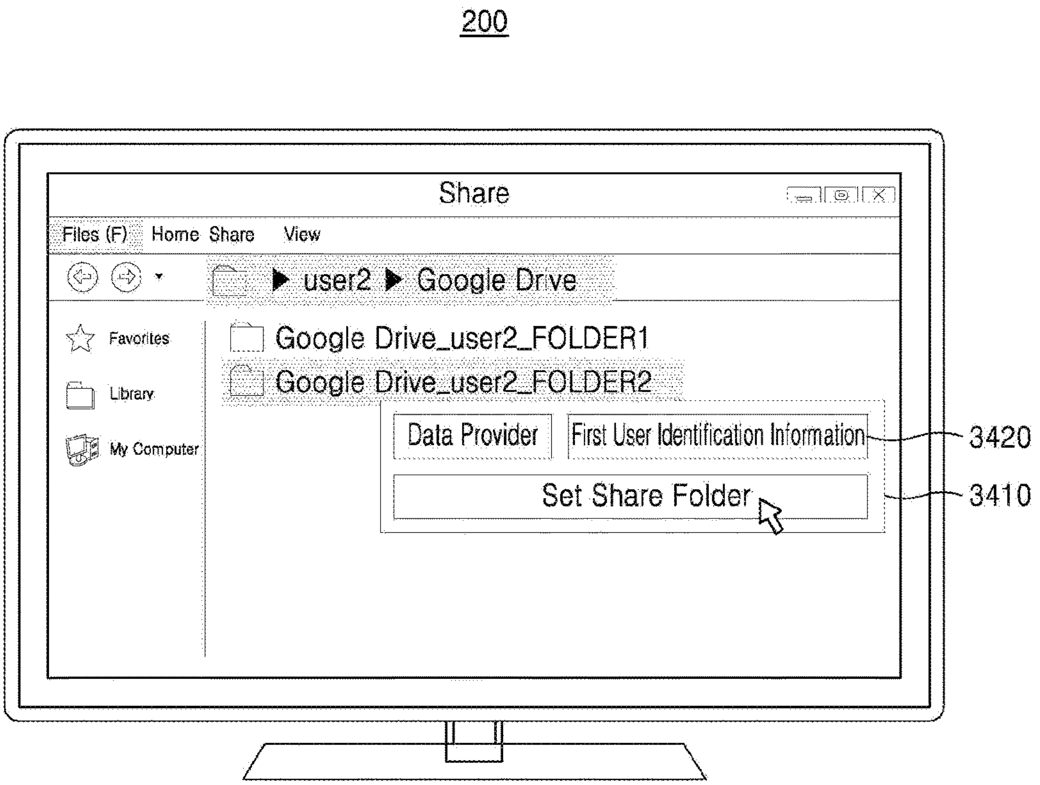
FIG. 34 is a diagram illustrating a method for the second device to receive an input for designating a provider from the second user, according to an exemplary embodiment.

FIG. 34 is a diagram illustrating a method for the second device 200 to receive an input for designating a provider from the second user, according to an exemplary embodiment.

The provider may refer to a user that may store data in the second user storage space without permission of the second user. For example, the provider may refer to a user that has the right to store the file or folder as the second user data in the second cloud storage 3000 without permission of the second user.

Referring to FIG. 34, the second device 200 may display a UI 3410 for receiving an input for designating the provider.

For example, when the second user clicks and holds the mouse right button while selecting the folder, the second device 200 may display the UI 3410 for designating the provider.

The UI 3410 for designating the provider may include a UI 3420 for inputting user identification information. The user identification information may include a user name, a user phone number, and a user e-mail address. Also, the UI 3420 for inputting the user identification information may be linked with the relay server 1000 or the user list stored in the device.

When receiving the second user input for inputting the provider, the second device 200 may request the relay server 1000 to set the user selected by the second user as the provider of the second user. The provider setting request may include the second user ID and the first user ID registered in the relay server 1000.

Also, the second device 200 may request the relay server 1000 to set the folder selected by the second user as the incoming folder and to set the user input by the second user as the provider of the incoming folder. In this case, the provider setting request may include the second user ID and the first user ID registered in the relay server 1000 and the position information representing the position of the selected folder.

When receiving the provider setting request, the relay server 1000 may set the first user ID registered in the relay server 1000 as the provider of the second user corresponding to the second user ID registered in the relay server 1000.

Figure 35:
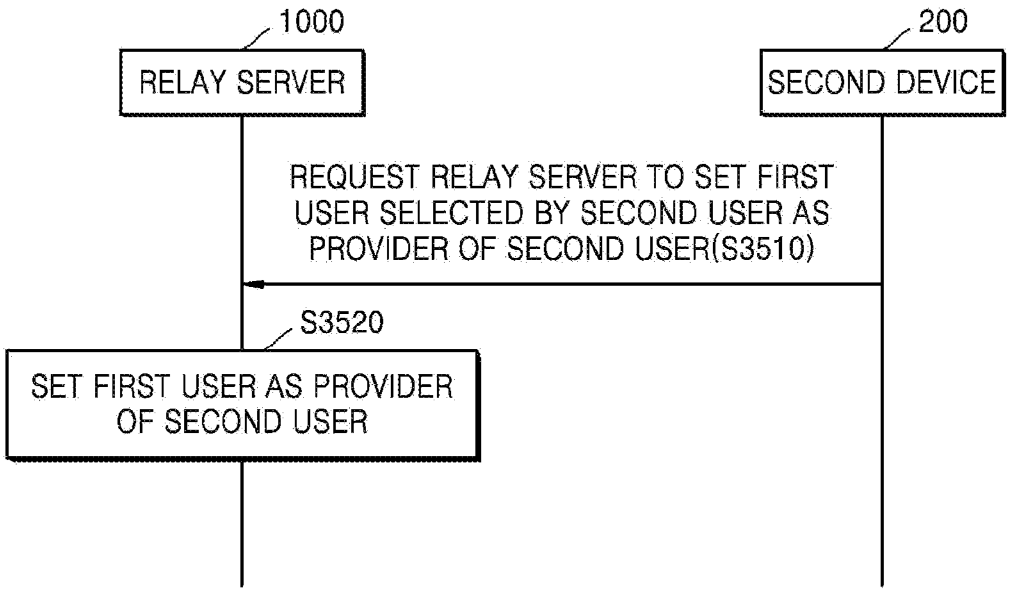
FIG. 35 is a flow diagram illustrating a method for the relay server to receive a provider setting request from the second device, according to an exemplary embodiment.

FIG. 35 is a flow diagram illustrating a method for the relay server 100 to receive a provider setting request from the second device 200, according to an exemplary embodiment.

Referring to FIG. 35, in operation S3510, the second device 200 requests the relay server 1000 to set the first user selected by the second user as the provider of the second user.

The provider setting request may include the second user ID and the first user ID registered in the relay server 1000.

In operation S3520, the relay server 1000 sets the first user as the provider of the second user.

For example, the relay server 1000 may store the first user ID registered in the relay server 1000 as the provider of the second user corresponding to the second user ID registered in the relay server 1000.

FIG. 36 is a diagram illustrating a DB 2150 about the second user stored in the relay server 1000 when the first user is set as a provider of the second user, according to an exemplary embodiment.

Referring to FIG. 36, the relay server 1000 may store a first user ID 3610 registered in the relay server 1000 as the provider of the second user corresponding to a second user ID 2160 registered in the relay server 1000.

Figure 37:
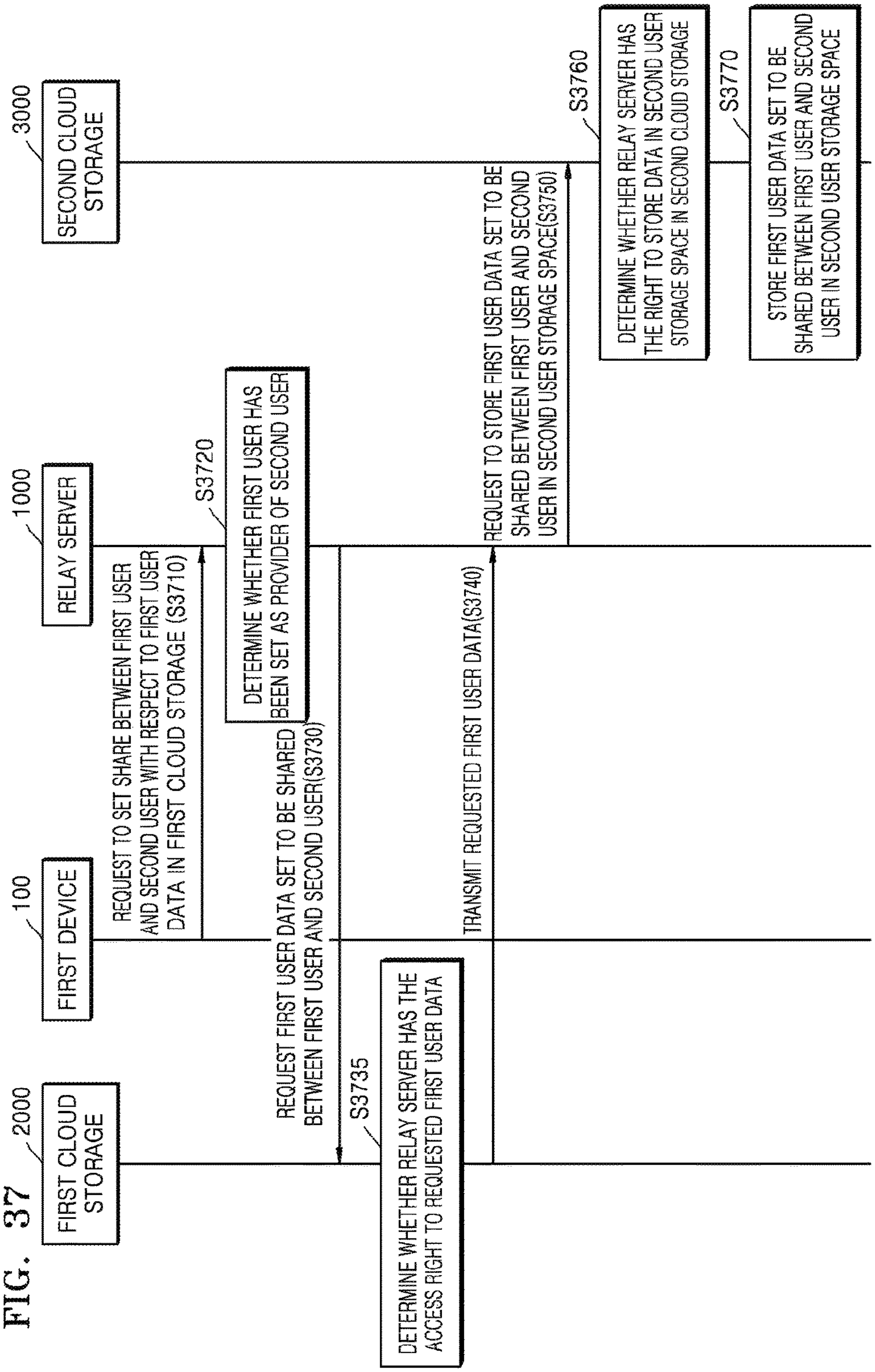
FIG. 37 is a flow diagram illustrating a method for the relay server to store the data of the first user, which has been set to be shared between the first user and the second user, in the second cloud storage when the first user is set as a provider of the second user in the relay server, according to an exemplary embodiment.

FIG. 37 is a flow diagram illustrating a method for the relay server 1000 to store the data of the first user, which has been set to be shared between the first user and the second user, in the second cloud storage 3000 when the first user is set as a provider of the second user in the relay server 1000, according to an exemplary embodiment.

Referring to FIG. 37, in operation S3710, the first device 100 requests the relay server 1000 to set the share between the first user and the second user with respect to the first user data in the first cloud storage 2000.

The share setting request between the first user and the second user with respect to at least one of the first user data stored in the first cloud storage 2000 may include the first user ID registered in the relay server 1000, the second user ID registered in the relay server 1000, and the identification information of the first user data to be shared. The identification information of the first user data may include position information representing the position of the first user data.

In operation S3720, the relay server 1000 determines whether the first user has been set as the provider of the second user.

For example, when the first user ID registered in the relay server 1000 is stored as the provider of the second user corresponding to the first user ID registered in the relay server 1000, the relay server 1000 may determine that the first user is set as the provider of the second user.

In operation S3730, when the first user has been set as the provider of the second user (in operation S3720), the relay server 1000 requests the first user data set to be shared between the first user and the second user from the first cloud storage 2000.

In operation S3735, the first cloud storage 2000 determines whether the relay server 1000 has the access right to the first user data requested by the relay server 1000.

In operation S3740, when the relay server 1000 has the access right to the requested first user data (in operation S3735), the first cloud storage 2000 transmits the first user data requested by the relay server 1000 to the relay server 1000.

In operation S3750, the relay server 1000 requests the second cloud storage 3000 to store the first user data set to be shared between the first user and the second user in the second user storage space in the second cloud storage 3000.

The relay server 1000 may request the second cloud storage 3000 to store the first user data received from the first cloud storage 2000 in the second user storage space in the second cloud storage 3000.

In operation S3760, the second cloud storage 3000 determines whether the relay server 1000 has the right to store data in the second user storage space in the second cloud storage 3000.

In operation S3770, when the relay server 1000 has the right to store data in the second user storage space in the second cloud storage 3000 (in operation S3760), the second cloud storage 3000 stores the first user data set to be shared between the first user and the second user in the second user storage space.

Thus, when the second user is set as the provider of the first user, the relay server 1000 may directly store the first user data in the second user storage space without the request of the second user through the second cloud storage 3000.

Figure 38:
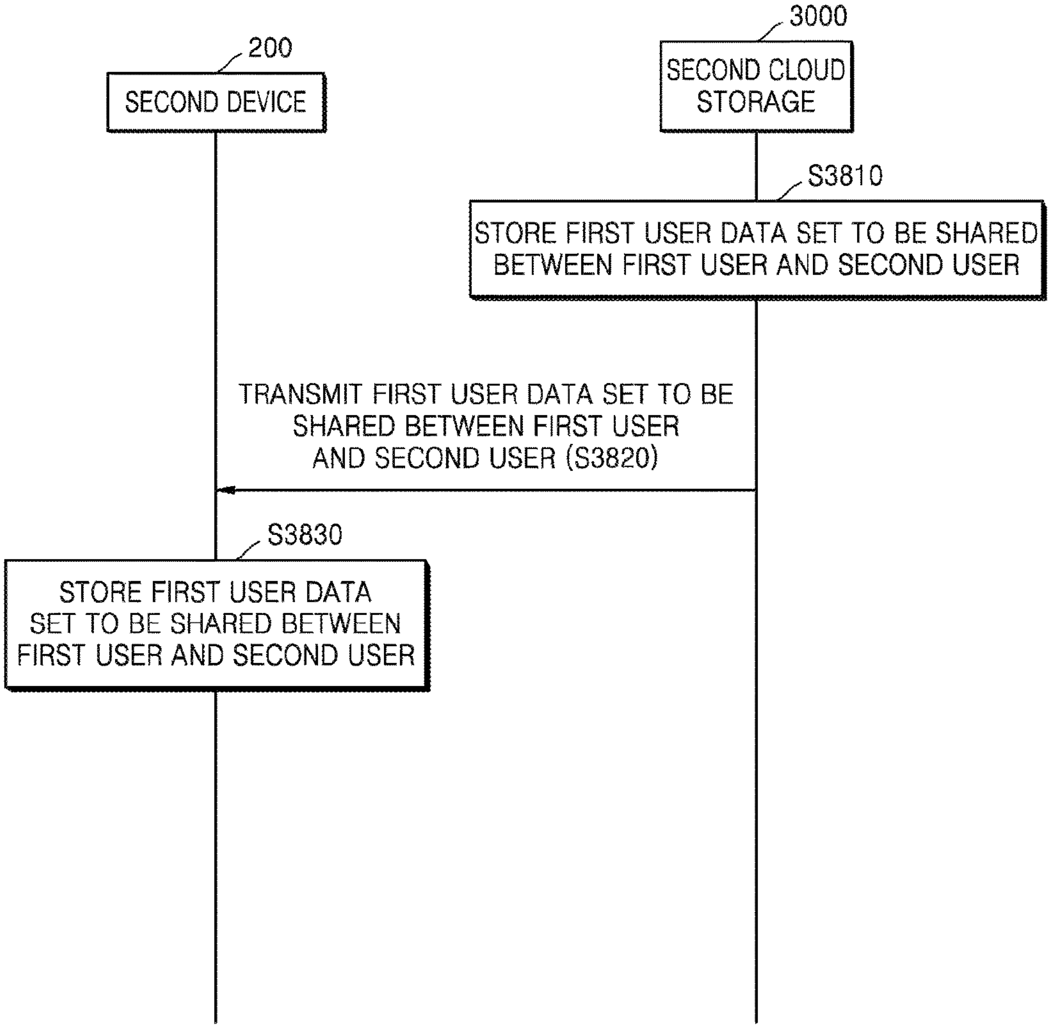
FIG. 38 is a flow diagram illustrating a method for the second cloud storage to transmit the data of the first user copied from the first cloud storage to the second device without the request of the second user when the data of the first user set to be shared between the first user and the second user is stored in the second cloud storage, according to an exemplary embodiment.

FIG. 38 is a flow diagram illustrating a method for the second cloud storage 3000 to transmit the data of the first user copied from the first cloud storage 2000 to the second device 200 without the request of the second user when the data of the first user set to be shared between the first user and the second user is stored in the second cloud storage 3000, according to an exemplary embodiment.

Referring to FIG. 38, in operation S3810, the second cloud storage 3000 stores the first user data set to be shared between the first user and the second user.

Without the request of the second user, the relay server 1000 may request the second cloud storage 3000 to store the first user data set to be shared between the first user and the second user as the second user data.

The second cloud storage 3000 may receive the first user data set to be shared between the first user and the second user from the relay server 1000 and store the received first user data as the second user data in the second cloud storage 3000.

In operation S3820, the second cloud storage 3000 transmits the first user data set to be shared between the first user and the second user to the second device 200.

For example, when the second cloud storage 3000 and the second device 200 synchronize data, because the first user data is stored in the second cloud storage 3000, the second cloud storage 3000 may transmit the first user data stored in the second cloud storage 3000 to the second device 200.

In operation S3830, the second device 200 stores the first user data set to be shared between the first user and the second user in the second device 200.

The second device 200 may store the first user data received from the second cloud storage 3000, which has been set to be shared between the first user and the second user, in the second device 200.

Figure 39:
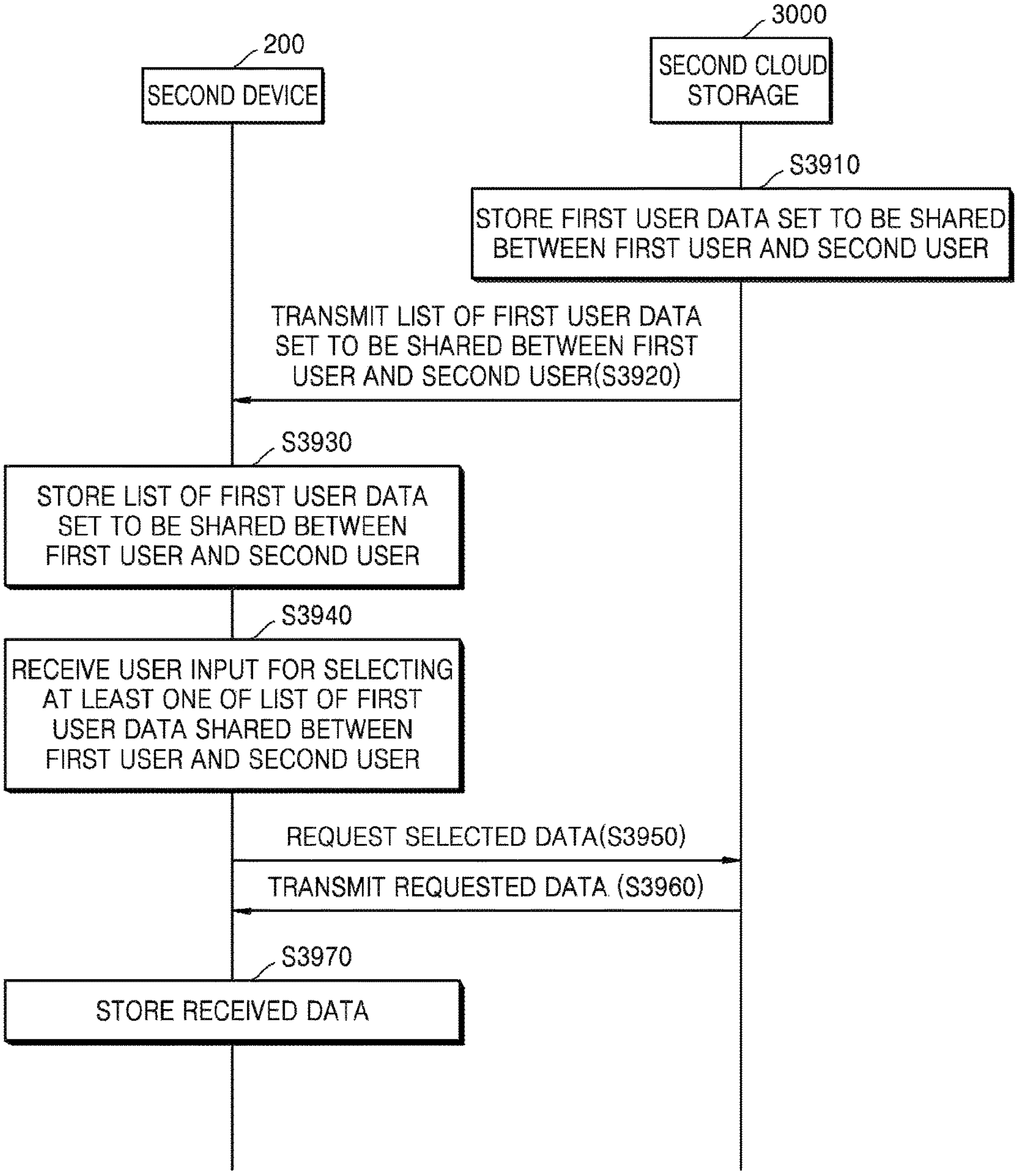
FIG. 39 is a flow diagram illustrating a method for the second device to receive the data of the first user stored in the second cloud storage without the request of the second user when the data of the first user set to be shared between the first user and the second user is stored in the second cloud storage, according to another exemplary embodiment.

FIG. 39 is a flow diagram illustrating a method for the second device 200 to receive the data of the first user stored in the second cloud storage 3000 without the request of the second user when the data of the first user set to be shared between the first user and the second user is stored in the second cloud storage 3000, according to another exemplary embodiment.

Referring to FIG. 39, in operation S3910, the second cloud storage 3000 stores the first user data set to be shared between the first user and the second user.

Without the request of the second user, the relay server 1000 may request the second cloud storage 3000 to store the first user data set to be shared between the first user and the second user as the second user data.

The second cloud storage 3000 may receive the first user data set to be shared between the first user and the second user from the relay server 1000 and store the received first user data as the second user data in the second cloud storage 3000.

In operation S3920, the second cloud storage 3000 transmits the list of the first user data set to be shared between the first user and the second user to the second device 200.

For example, when the second cloud storage 3000 and the second device 200 synchronize the list of data, because the first user data is stored in the second cloud storage 3000, the second cloud storage 3000 may transmit the list of the first user data stored in the second cloud storage 3000 to the second device 200. The list of data may include attribute information of the data.

In operation S3930, the second device 200 stores the list of the first user data set to be shared between the first user and the second user in the second device 200.

The second device 200 may store the list of the first user data received from the second cloud storage 3000 in the second device 200.

In operation S3940, the second device 200 receives a user input for selecting at least one of data of the list of the first user data shared between the first user and the second user.

The second device 200 may display the list of the first user data received from the second cloud storage 3000 on the screen. Also, the second device 200 may receive a user input for selecting at least one of the list of the data displayed on the screen.

In operation S3950, the second device 200 requests the data selected by the second user from the second cloud storage 3000.

In operation S3960, the second cloud storage 3000 transmits the data requested by the second device 200 to the second device 200.

In operation S3970, the second device 200 stores the data received from the second cloud storage 3000 in the second device 200.

FIG. 40 is a diagram illustrating a DB 4000 about the data of the first user stored in the relay server 100 when the data of the first user is stored in the storage space of the second user in the second cloud storage 3000 at the share request of the first user, according to an exemplary embodiment.

Referring to FIG. 40, the relay server 1000 may record the data receiver ID 1622, identification information 4010 of the cloud storage where the data is copied, and position information 4020 representing the position of the copied data, in the DB 4000 about the first user data, corresponding to the identification information of the data in the information 1620 about sharing. Remaining portions of the DB 4000 may correspond to the portions of the DB 1600 of FIG. 16.

Figure 41:
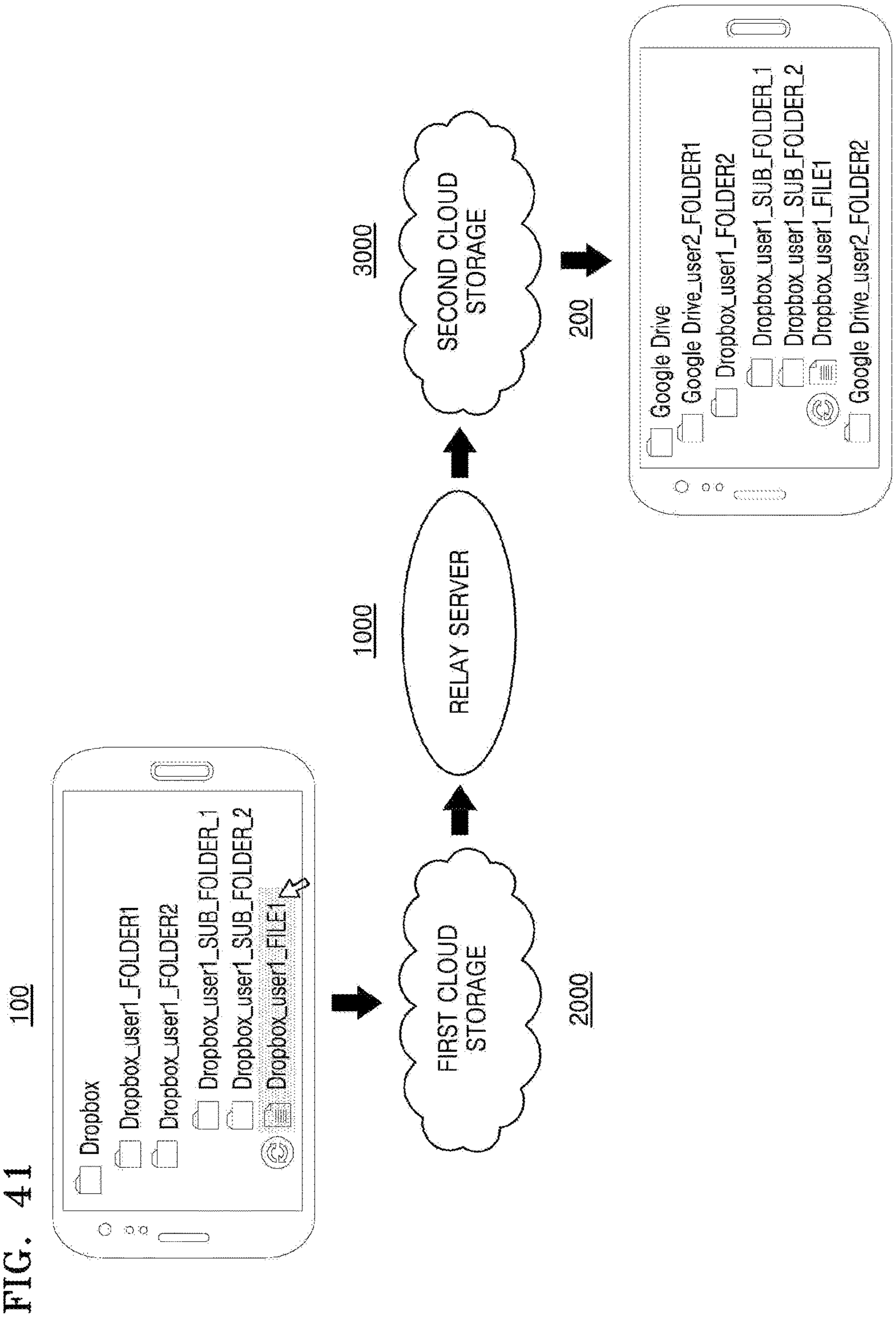
FIG. 41 is a diagram illustrating the synchronization between the first device and the second device with respect to the data shared between the first user and the second user, according to an exemplary embodiment.

FIG. 41 is a diagram illustrating the synchronization between the first device 100 and the second device 200 with respect to the data shared between the first user and the second user, according to an exemplary embodiment.

Referring to FIG. 41, the first device 100 and the second device 200 may synchronize the data shared between the first user and the second user.

For example, when the Dropbox_user1_FILE1 file stored in the first device 100 is modified, the first device 100 may synchronize the modified Dropbox_user1_FILE1 file with the first cloud storage 2000. When the first cloud storage 2000 receives the modified Dropbox_user1_FILE1 file from the first device 100 and store the same, the first cloud storage 2000 may notify the relay server 1000 that the Dropbox_user1_FILE1 file has been modified. Accordingly, the relay server 1000 may receive the modified Dropbox_user1_FILE1 file from the first cloud storage 2000. Also, the relay server 1000 may acquire the position information representing the position of the second user folder in the second cloud storage 3000 where the Dropbox_user1_FILE1 file is copied, and update the Dropbox_user1_FILE1 file prestored in the second cloud storage 3000 into the modified Dropbox_user1_FILE1 file. When the Dropbox_user1_FILE1 file is updated in the second user folder in the second cloud storage 3000, the second cloud storage 3000 may transmit the updated Dropbox_user1_FILE1 file to the second device 200. The second device 200 may receive the updated Dropbox_user1_FILE1 file from the second cloud storage 3000 and modify the Dropbox_user1_FILE1 file prestored in the second device 200 into the updated Dropbox_user1_FILE1 file. Accordingly, the first user data stored in the first cloud storage 2000 and shared between the first user and the second user may be synchronized between the first device 100 and the second device 200.

Also, when the second user data in the second device 200 is modified, the second user data stored in the second cloud storage 3000 and shared between the first user and the second user may be synchronized between the first device 100 and the second device 200.

Figure 42A:
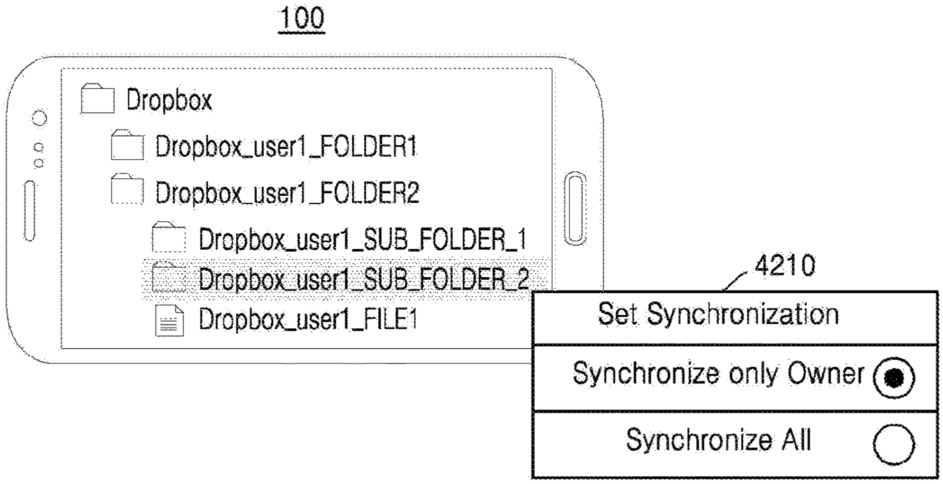
FIG. 42A is a diagram illustrating a UI for synchronization setting provided by the first device, according to an exemplary embodiment.

FIG. 42A is a diagram illustrating a UI for synchronization setting provided by the first device 100, according to an exemplary embodiment.

Referring to FIG. 42A, the first device 100 may set a synchronization mode for each of the first user data shared between the first user and the second user.

The first device 100 may receive a user input for selecting at least one of the first user data stored in the first cloud storage 2000. When receiving the user input for selecting at least one of the first user data, the first device 100 may determine whether the selected data is shared with the second user and whether the first user is an owner of the selected data. Information about whether the selected data is shared with the second user and whether the first user is an owner of the selected data may be stored in the first device 100 corresponding to the data.

When the selected data is shared with the second user and when the first user is an owner of the selected data, the first device 100 may display a synchronization setting menu for the selected data. When receiving a user input for touching the synchronization setting menu, the first device 100 may display a UI 4210 for selecting a synchronization mode for the selected data.

The UI 4210 for selecting the synchronization mode may include a UI for selecting one of a method for synchronizing the selected data only by the owner and a method for synchronizing the selected data by both the owner and the sharer.

The method for synchronizing the selected data only by the owner may refer to a unidirectional synchronization mode in which the modified file is updated in the file of the sharers only when the owner has modified the shared data, and the modified file is not updated in the file of the owner or another sharer when the sharer has modified the shared data.

The method for synchronizing the selected data by both the owner and the sharer may refer to a bidirectional synchronization mode in which the modified file is updated in the file of the owner or another sharer not only when the owner has modified the shared data but also when the sharer has modified the shared data.

The first device 100 may receive a user input for selecting one of the method for synchronizing the selected data only by the owner and the method for synchronizing the selected data by both the owner and the sharer from the first user. Also, the first device 100 may store the synchronization mode set by the first user in the relay server 1000 corresponding to the selected data. Accordingly, when the first user data shared between the first user and the second user is modified, the relay server 1000 may synchronize the modified data with the second cloud storage 3000 based on the synchronization mode set for the modified data.

Figure 42B:
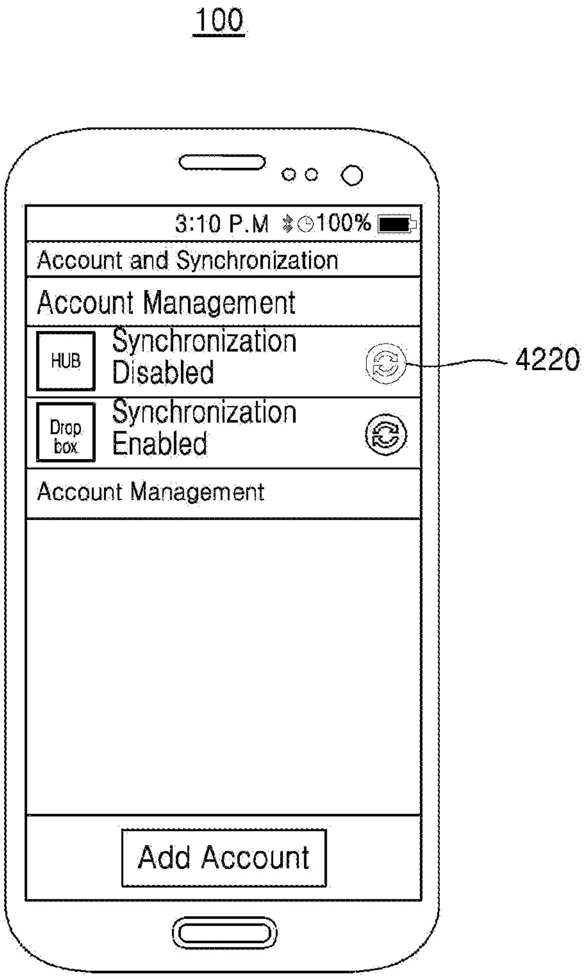
FIG. 42B is a diagram illustrating a UI for synchronization setting provided by the first device or the second device, according to another exemplary embodiment.

FIG. 42B is a diagram illustrating a UI for synchronization setting provided by the first device 100 or the second device 200, according to another exemplary embodiment.

Referring to FIG. 42B, the first device 100 may display a UI for enabling or disabling synchronization.

The first device 100 may display a UI 4220 for enabling or disabling the synchronization of the first user data between the relay server 1000 and the second cloud storage 3000.

When receiving a user input for disabling the synchronization of the first user data between the relay server 1000 and another cloud storage, the first device 100 may request the relay server 1000 to disable the synchronization of the first user data with another cloud storage. Accordingly, the relay server 1000 may not synchronize the first user data with another cloud storage.

FIG. 43 is a diagram illustrating DBs 4300 and 4305 about the data of the first user stored in the relay server 100 when information about a synchronization method is set, according to another exemplary embodiment.

Referring to FIG. 43, the relay server 1000 may receive synchronization direction information about the first user data from the first device 100. When receiving the synchronization direction information, the relay server 1000 may store synchronization direction information 4310 received from the first device 100 corresponding to the first user data in the DB 4300. Remaining portions of the DB 4300 may correspond to the portions of the DB 1600 of FIG. 16.

Also, the relay server 1000 may receive information about whether to synchronize the first user data between the relay server 1000 and another cloud storage from the first device 100. When receiving information 4320 about whether to perform synchronization, the relay server 1000 may store the information about whether to perform synchronization corresponding to the first user in the DB 4305. Remaining portions of the DB 4305 may correspond to the portions of the DB 1500 of FIG. 15.

Figure 44A:
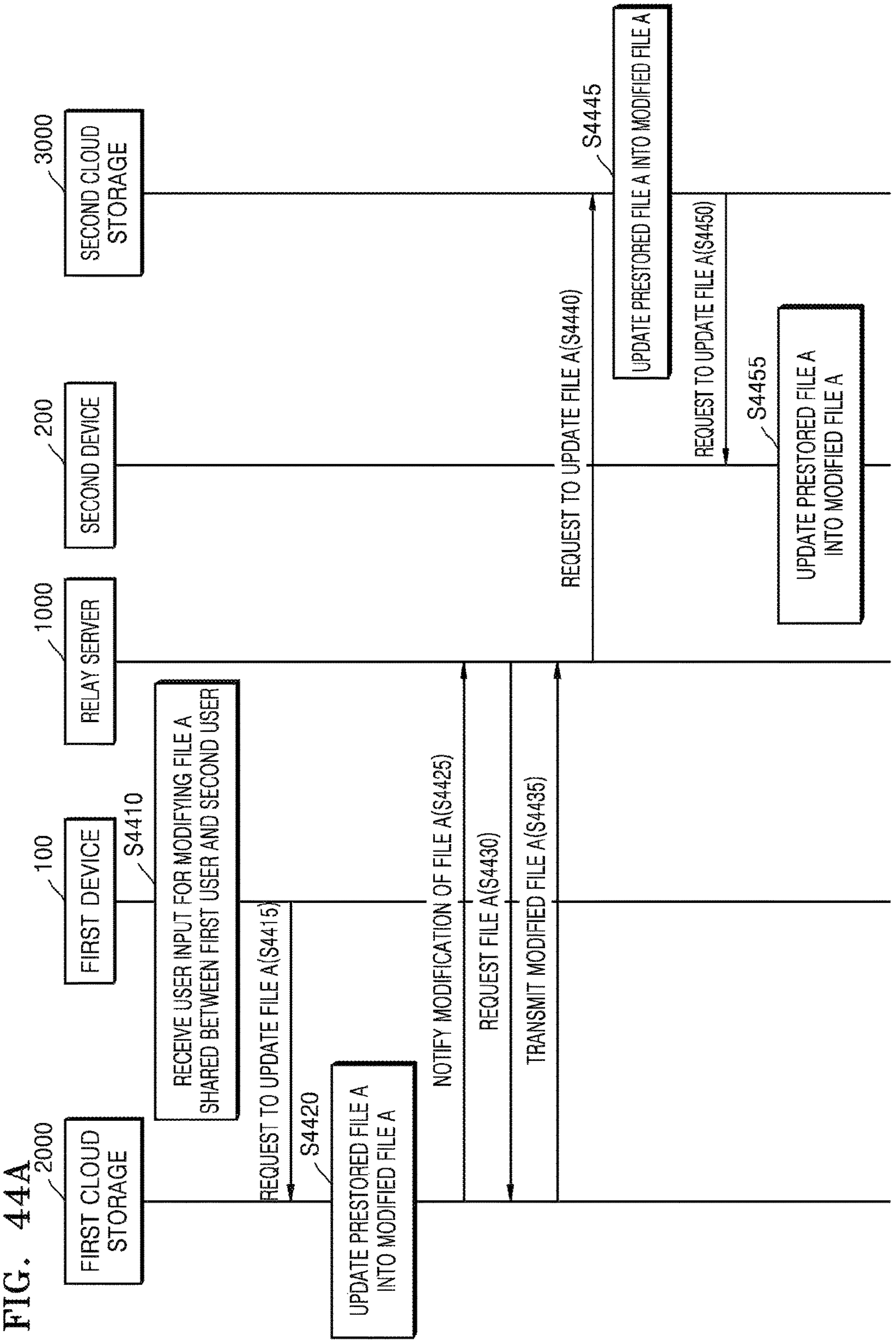
FIG. 44A is a flow diagram illustrating a method in which the data of the first user stored in the first cloud storage and a copy of the data of the first user stored in the second cloud storage are synchronized at the request of the first user, according to an exemplary embodiment.

FIG. 44A is a flow diagram illustrating a method in which the data of the first user stored in the first cloud storage 2000 and a copy of the data of the first user stored in the second cloud storage 3000 are synchronized at the request of the first user, according to an exemplary embodiment.

Referring to FIG. 44A, in operation S4410, the first device 100 receives a user input for modifying a file A shared between the first user and the second user.

The file A stored in the first cloud storage 2000 may be the original of the file that is copied from the first cloud storage 2000 into the second cloud storage 3000 by the relay server 1000 according to the share setting of the first user.

When the first device 100 and the first cloud storage 2000 synchronize data, the file A may be stored in the first device 100. Also, the first device 100 may receive a user input for modifying the file A stored in the first device 100.

In operation S4415, the first device 100 requests the first cloud storage 2000 to update the file A.

When the first device 100 and the first cloud storage 2000 synchronize data, because the file A is modified, the first device 100 may request the first cloud storage 2000 to update the file A prestored in the first cloud storage 2000 into the modified file A.

When requesting to update the file A, the first device 100 may transmit the identification information of the file A and the modified file A to the first cloud storage 2000.

In operation S4420, the first cloud storage 2000 updates the prestored file A into the modified file A.

The first cloud storage 2000 may acquire the storage position of the prestored file A based on the identification information of the file A received from the first device 100. Based on the acquired storage position, the first cloud storage 2000 may update the prestored file A into the file A received from the first device 100.

In operation S4425, the first cloud storage 2000 notifies the relay server 1000 of the modification of file A. The first cloud storage 2000 may transmit event information indicating that the file A of the first user has been modified to the relay server 1000.

The event information indicating that the file A has been modified may include identification information of the file A. The identification information of the file A may be position information representing the storage position of the file A.

In operation S4430, the relay server 1000 requests the file A from the first cloud storage 2000.

The request for the file A may include the identification information of the file A and the ID of the relay server 1000 registered in the first cloud storage 2000.

In operation S4435, the first cloud storage 2000 transmits the modified file A to the relay server 1000.

The first cloud storage 2000 may determine whether the relay server 1000 has the access right to the file A, based on the ID of the relay server 1000. When determining that the relay server 1000 has the access right to the file A, the first cloud storage 2000 may transmit the modified file A to the relay server 1000.

In operation S4440, the relay server 1000 requests the second cloud storage 3000 to update the file A.

When receiving the file A from the first cloud storage 2000, the relay server 1000 may detect the storage space of the users into which the file A is copied from the DB in the relay server 1000, based on the identification information of the file A. When the second user storage space in the second cloud storage 3000 is detected as the storage space of the users into which the file A is copied, the relay server 1000 may acquire position information representing the position of the second user storage place in the second cloud storage 3000.

Then, based on the position information representing the position of the second user storage place, the relay server 1000 may request the second cloud storage 3000 to update the file A of the second user. The request for the file A may include the identification information of the file A, the modified file A, and the ID of the relay server 1000 registered in the second cloud storage 3000.

By requesting the second cloud storage 3000 to update the file A, the relay server 1000 may update information about the file A shared between the first user and the second user.

For example, based on the identification information of the file A, the relay server 1000 may update the modification time of the file A recorded in the DB of the relay server 1000 and the identification information of the user that has modified the file A.

In operation S4445, the second cloud storage 3000 updates the prestored file A into the modified file A.

The second cloud storage 3000 may determine whether the relay server 1000 has the access right to the second user storage space, based on the ID of the relay server 1000. Also, the second cloud storage 3000 may acquire the storage position of the prestored file A based on the identification information of the file A.

When determining that the relay server 1000 has the access right to the second user storage space, the second cloud storage 3000 may update the prestored file A into the modified file A received from the relay server 1000.

In operation S4450, the second cloud storage 3000 requests the second device 200 to update the file A.

In operation S4455, the second device 200 updates the prestored file A into the modified file A received from the second cloud storage 3000.

Figure 44B:
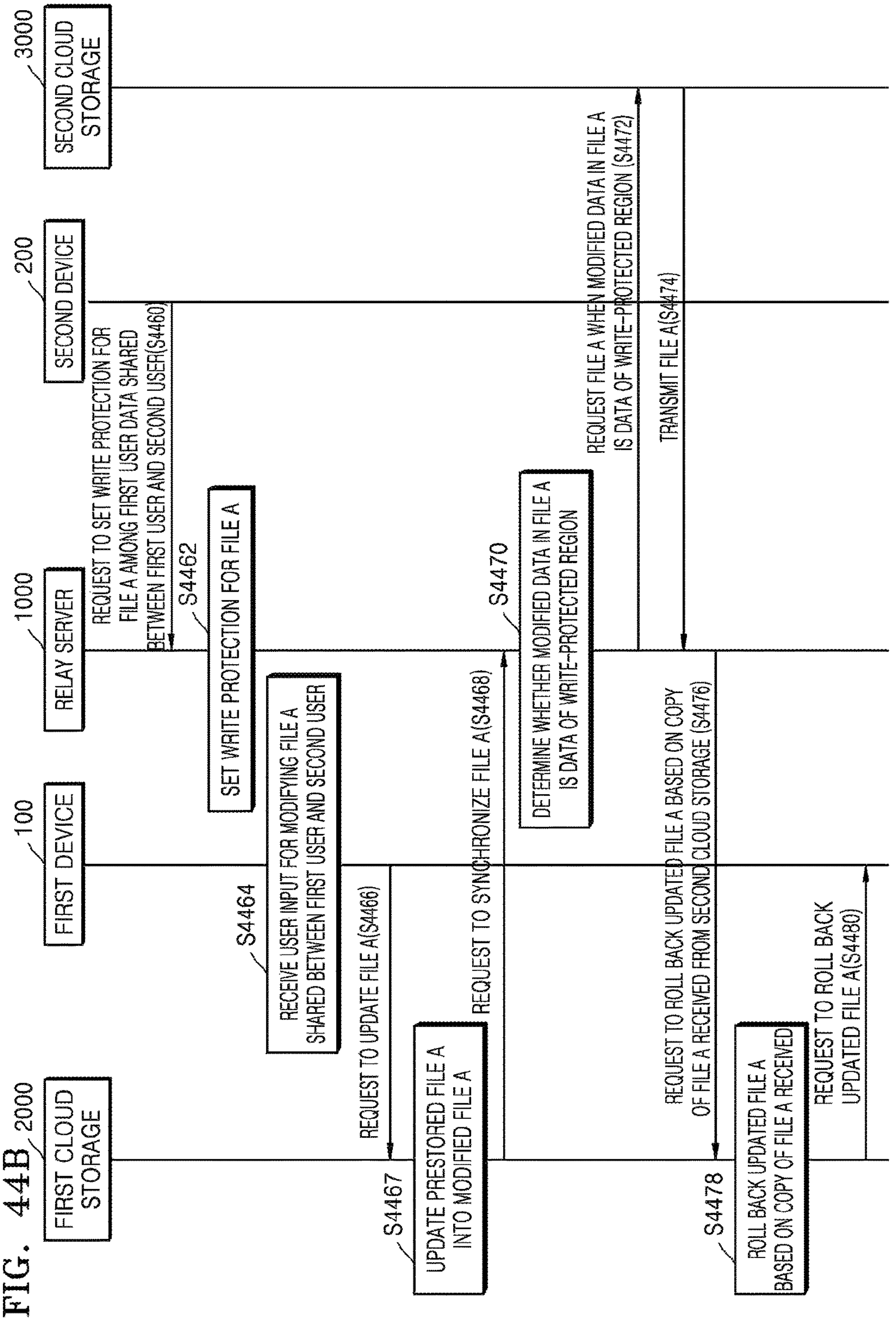
FIG. 44B is a flow diagram illustrating a method for the second device to set a write protection for the data shared between the first user and the second user, according to an exemplary embodiment.

FIG. 44B is a flow diagram illustrating a method for the relay server 1000 sets a write protection for the relevant data when the second user sets a write protection for the data shared between the first user and the second user, according to an exemplary embodiment.

Referring to FIG. 44B, in operation S4460, the second device 200 requests the relay server 1000 to set a write protection for the file A among the first user data shared between the first user and the second user.

When not the owner of the original file but the second user sets a write protection for the shared file, the second device 200 may request the relay server 1000 to set a write protection for the shared file.

The write protection mode may refer to a mode for preventing a write-protected user file from being modified due to the modification of a write-protected file by other users than the user that has set the write protection.

Also, the write protection mode may refer to a mode for preventing the file of the users sharing a write-protected file from being modified due to the modification of a write-protected file by other users than the user that has set the write protection.

The file A stored in the second cloud storage 3000 may be the file that is copied from the first cloud storage 2000 into the second cloud storage 3000 by the relay server 1000 according to the share setting of the first user. When the second device 200 and the second cloud storage 3000 synchronize data, the file A may be stored in the second device 200.

Also, the second device 200 may receive a second user input for setting a write protection for the file A stored in the second device 200. Setting a write protection for the file A may be setting a partial region to be write-protected among all data of the file A. For example, when the file A is a document, a write protection may be set for only some contents among the contents of the document. Also, when the file A is a moving image, a write protection may be set for a frame of a predetermined time domain among the fames of the moving image. When receiving a user input for setting a partial region to be write-protected among all data of the file A, the second device 200 may determine the position of the set partial region in the file A.

When receiving the second user input for setting a write protection for the file A, the second device 200 may request the relay server 1000 to set a write protection for the file A. The write protection setting request for the file A may include the identification information of the file A and the ID of the second user registered in the relay server 1000.

Also, the second device 200 may request the relay server 1000 to set a write protection for a partial region of the file A. In this case, the write protection setting request for the partial region of the file A may further include position information representing the position of the write-protected partial region in the file A in addition to the identification information of the file A and the ID of the second user registered in the relay server 1000.

In operation S4462, the relay server 1000 sets a write protection for the file A.

When receiving the write protection setting request for the file A from the second device 200, the relay server 1000 may set a write protection for the file A. For example, the relay server 1000 may store a write protection setting value corresponding to the identification information of the file A. Also, the relay server 1000 may store the position information representing the position of the write-protected partial region in the file A corresponding to the identification information of the file A. Also, the relay server 1000 may store the ID of the second user requesting the write protection as the user requesting the write protection corresponding to the identification information of the file A In operation S4464, the first device 100 receives a user input for modifying the file A shared between the first user and the second user.

For example, when the file A is a document file, the first device 100 may receive a user input for modifying the contents in the file A.

In operation S4466, the first device 100 requests the first cloud storage 2000 to update the file A.

The update request for the file A may include the identification information of the file A, the ID of the first user registered in the first cloud storage 2000, and the position information representing the position of the modified region in the file A.

In operation S4467, the first cloud storage 2000 updates the prestored file A into the modified file A.

In operation S4468, the first cloud storage 2000 requests the relay server 1000 to synchronize the file A.

After a write protection for the file A is set in the relay server 1000 corresponding to the second user, when the file A prestored in the first cloud storage 2000 is modified, the first cloud storage 2000 may request the relay server 1000 to synchronize the file A indicating that the file A has been modified. The synchronization request for the file A may include the identification information of the file A. Also, the synchronization request for the file A may include the position information representing the position of the modified data among the data of the file A.

In operation S4470, the relay server 1000 determines whether the modified data in the file A is the data of the write-protected region.

When receiving the synchronization request for the file A from the first cloud storage 2000, the relay server 1000 may determine whether a write protection is set for the file A. For example, the relay server 1000 may determine whether a write protection setting value is stored corresponding to the identification information of the file A. When the write protection setting value is stored corresponding to the identification information of the file A, the relay server 1000 may determine whether the modified data of the file A is the data of the write-protected region, based on the position information representing the position of the modified data among the data of the file A. For example, the relay server 1000 may determine whether the position of the modified data among the data of the file A is included in the position of the write-protected region.

When the modified data of the file A is the data of the write-protected region, the relay server 1000 may not synchronize the modified file A in the first cloud storage 2000 with the second cloud storage 3000.

When the modified data of the file A is not the data of the write-protected region, the relay server 1000 may synchronize the modified file A in the first cloud storage 2000 with the second cloud storage 3000.

In operation S4472, when the modified data in the file A is the data of the write-protected region, the relay server 1000 requests the file A from the second cloud storage 3000.

When the modified data of the file A is the data of the write-protected region, the relay server 1000 may request the file A identical to the original file from the second cloud storage 3000 to roll back the updated file A to the first cloud storage 2000.

In operation S4474, the second cloud storage 3000 transmits the file A to the relay server 1000.

In operation S4476, the relay server 1000 requests the first cloud storage 2000 to roll back the updated file A based on the copy of the file A received from the second cloud storage 3000.

In operation S4478, the first cloud storage 2000 rolls back the updated file A based on the copy of the received file A.

For example, the first cloud storage 2000 may delete the updated file A and store the copy of the received file A as the file A. Also, for example, based on the copy of the received file A, the first cloud storage 2000 may roll back only the write-protected region of the file A to the unmodified original copy.

In operation S4480, the first cloud storage 2000 requests the first device 100 to roll back the updated file A. When the updated file A stored in the first cloud storage 2000 is rolled back, the first cloud storage 2000 may synchronize the rolled-back file A with the file A stored in the first device 100.

For example, the first cloud storage 2000 may transmit an event indicating that the updated file A has been modified to the first device 100. When receiving the event, the first device 100 may receive the rolled-back file A from the first cloud storage 2000 and modify the updated file A into the rolled-back file A.

Figure 44C:
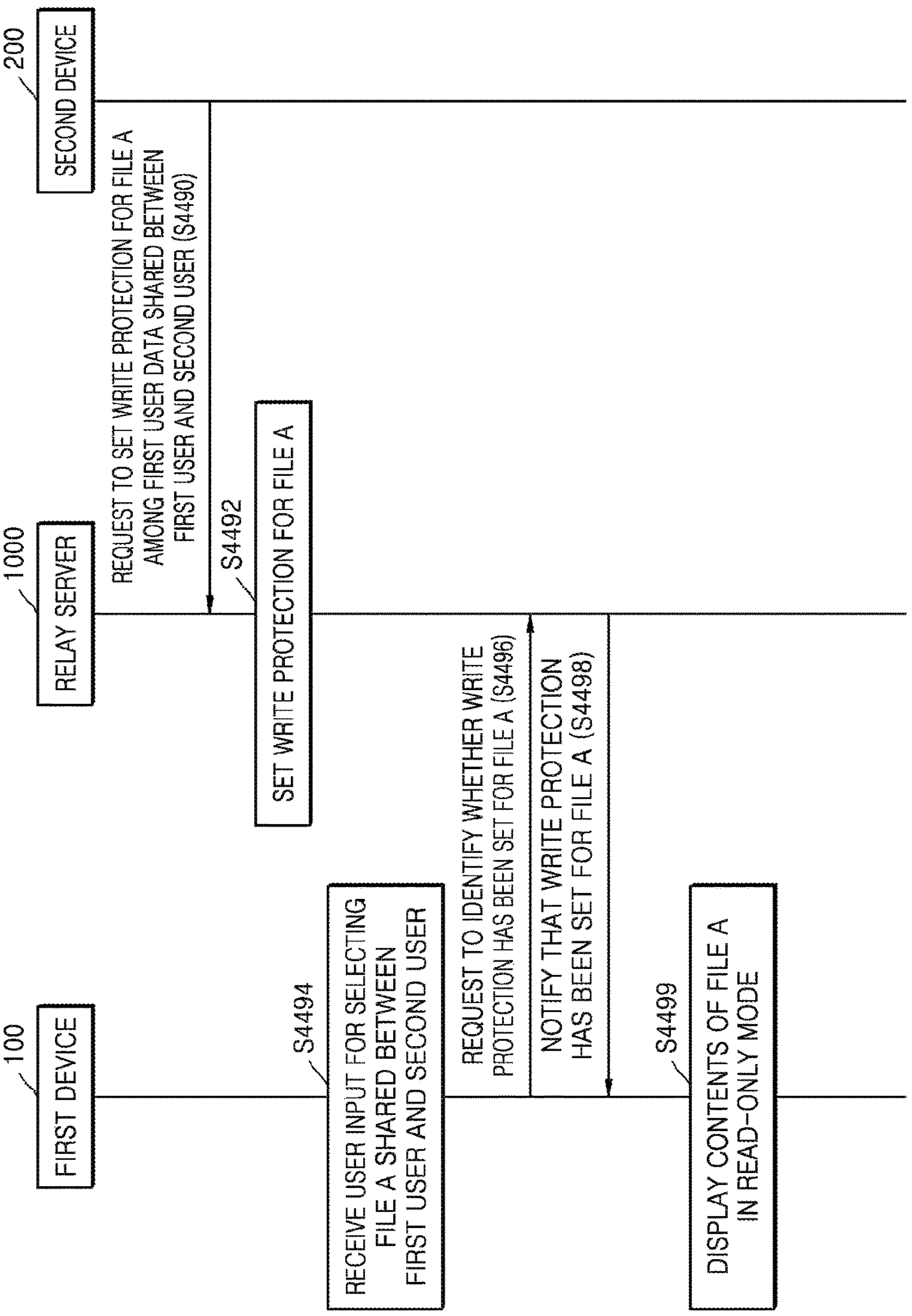
FIG. 44C is a flow diagram illustrating a method for the relay server sets a write protection for the relevant data when the second device sets a write protection for the data shared between the first user and the second user, according to another exemplary embodiment.

FIG. 44C is a flow diagram illustrating a method for the relay server 1000 sets a write protection for the relevant data when the second device 200 sets a write protection for the data shared between the first user and the second user, according to another exemplary embodiment.

Referring to FIG. 44C, in operation S4490, the second device 200 requests the relay server 1000 to set a write protection for the file A among the first user data shared between the first user and the second user. In operation S4492, the relay server 1000 sets a write protection for the file A. In operation S4494, the first device 100 receives a user input for selecting the file A shared between the first user and the second user to modify the file A. Operations S4490 to S4494 may correspond to operations S4460 to S4464 of FIG. 44B.

In operation S4496, the first device 100 requests the relay server 1000 to identify or determine whether a write protection has been set for the file A.

In operation S4498, the relay server 1000 notifies the first device 100 that the write protection has been set for the file A.

In this case, when a write protection is set for only a portion of the file A, the relay server 1000 may transmit information about the position of a write-protected region to the first device 100.

In operation S4499, the first device 100 displays the contents of the file A in a read-only mode.

For example, even when receiving a user input for modifying the displayed contents of the file A, the first device 100 may not modify the file A.

Also, according to an exemplary embodiment, when a write protection is set for the file A, the relay server 1000 may receive an event for notifying the first device 100 that a write protection is set for the file A. When receiving a user input for selecting the file A, the first device 100 may display the contents of the file A based on the information represented by the received event without requesting the relay server 1000 to determine whether a write protection is set for the file A.

Figure 45A:
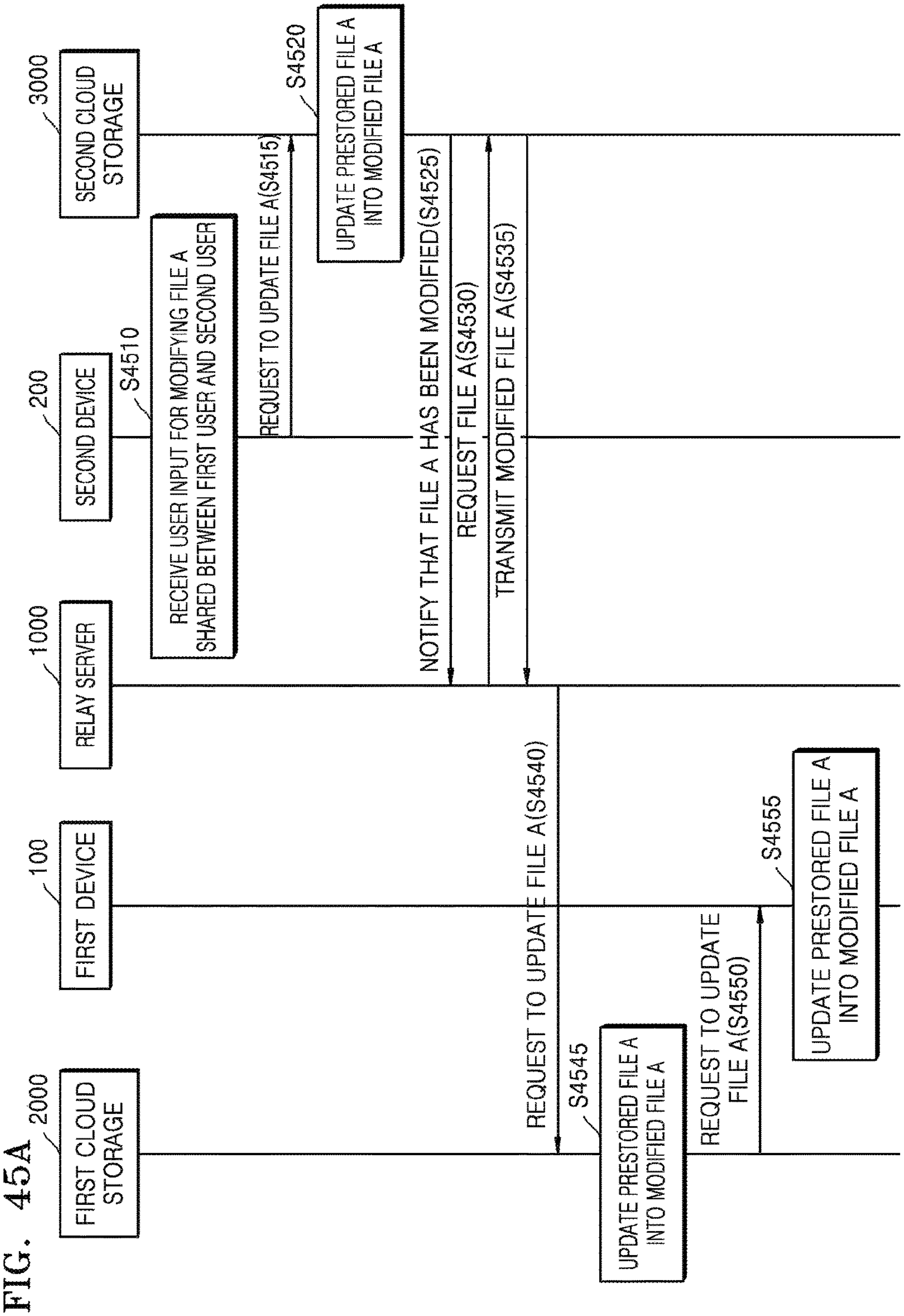
FIG. 45A is a flow diagram illustrating a method in which the data of the first user stored in the first cloud storage and a copy of the data of the first user stored in the second cloud storage are synchronized at the request of the second user, according to an exemplary embodiment.

FIG. 45A is a flow diagram illustrating a method in which the data of the first user stored in the first cloud storage 2000 and a copy of the data of the first user stored in the second cloud storage 3000 are synchronized at the request of the second user, according to an exemplary embodiment.

Referring to FIG. 45A, in operation S4510, the second device 200 receives a user input for modifying the file A shared between the first user and the second user.

The file A stored in the second cloud storage 3000 may be the copy of the file that is copied from the first cloud storage 2000 into the second cloud storage 3000 by the relay server 1000 according to the share setting of the first user.

When the second device 200 and the second cloud storage 3000 synchronize data, the file A may be stored in the second device 200. Also, the second device 200 may receive a user input for modifying the file A stored in the second device 200.

In operation S4515, the second device 200 requests the second cloud storage 3000 to update the file A.

When the second device 200 and the second cloud storage 3000 synchronize data, because the file A is modified, the second device 200 may request the second cloud storage 3000 to update the file A prestored in the second cloud storage 3000 into the modified file A.

When requesting to update the file A, the second device 200 may transmit the identification information of the file A and the modified file A to the second cloud storage 3000.

In operation S4520, the second cloud storage 3000 updates the prestored file A into the modified file A.

The second cloud storage 3000 may acquire the storage position of the prestored file A based on the identification information of the file A received from the second device 200. Based on the acquired storage position, the second cloud storage 3000 may update the prestored file A into the file A received from the second device 200.

In operation S4525, the second cloud storage 3000 notifies the relay server 1000 that the file A has been modified. The second cloud storage 3000 may transmit event information indicating that the file A of the second user has been modified to the relay server 1000.

The event information indicating that the file A has been modified may include identification information of the file A. The identification information of the file A may be position information representing the storage position of the file A.

In operation S4530, the second cloud storage 3000 requests the file A from the relay server 1000.

The request for the file A may include the identification information of the file A and the ID of the relay server 1000 registered in the second cloud storage 3000.

In operation S4535, the second cloud storage 3000 transmits the modified file A to the relay server 1000.

The second cloud storage 3000 may determine whether the relay server 1000 has the access right to the file A, based on the ID of the relay server 1000. When determining that the relay server 1000 has the access right to the file A, the second cloud storage 3000 may transmit the modified file A to the relay server 1000.

In operation S4540, the relay server 1000 requests the first cloud storage 2000 to update the file A.

When receiving the file A from the second cloud storage 3000, the relay server 1000 may detect the storage space of the users into which the file A is copied from the DB in the relay server 1000, based on the identification information of the file A. When the first user storage space in the first cloud storage 2000 is detected as the storage space of the users into which the file A is copied, the relay server 1000 may acquire position information representing the position of the first user storage place in the first cloud storage 2000.

Then, based on the position information representing the position of the first user storage place, the relay server 1000 may request the first cloud storage 2000 to update the file A of the first user into the modified file A. The request for the file A may include the identification information of the file A, the modified file A, and the ID of the relay server 1000 registered in the first cloud storage 2000.

By requesting the first cloud storage 2000 to update the file A, the relay server 1000 may update information about the file A shared between the first user and the second user.

For example, based on the identification information of the file A, the relay server 1000 may update the modification time of the file A recorded in the DB of the relay server 1000 and the identification information of the user that has modified the file A.

In operation S4545, the first cloud storage 2000 updates the prestored file A into the modified file A.

The first cloud storage 2000 may determine whether the relay server 1000 has the access right to the first user storage space, based on the ID of the relay server 1000. Also, the first cloud storage 2000 may acquire the storage position of the prestored file A based on the identification information of the file A.

When determining that the relay server 1000 has the access right to the first user storage space, the first cloud storage 2000 may update the prestored file A into the modified file A received from the relay server 1000.

In operation S4550, the first cloud storage 2000 requests the first device 100 to update the file A.

In operation S4555, the first device 100 updates the prestored file A into the modified file A received from the first cloud storage 2000.

Figure 45B:
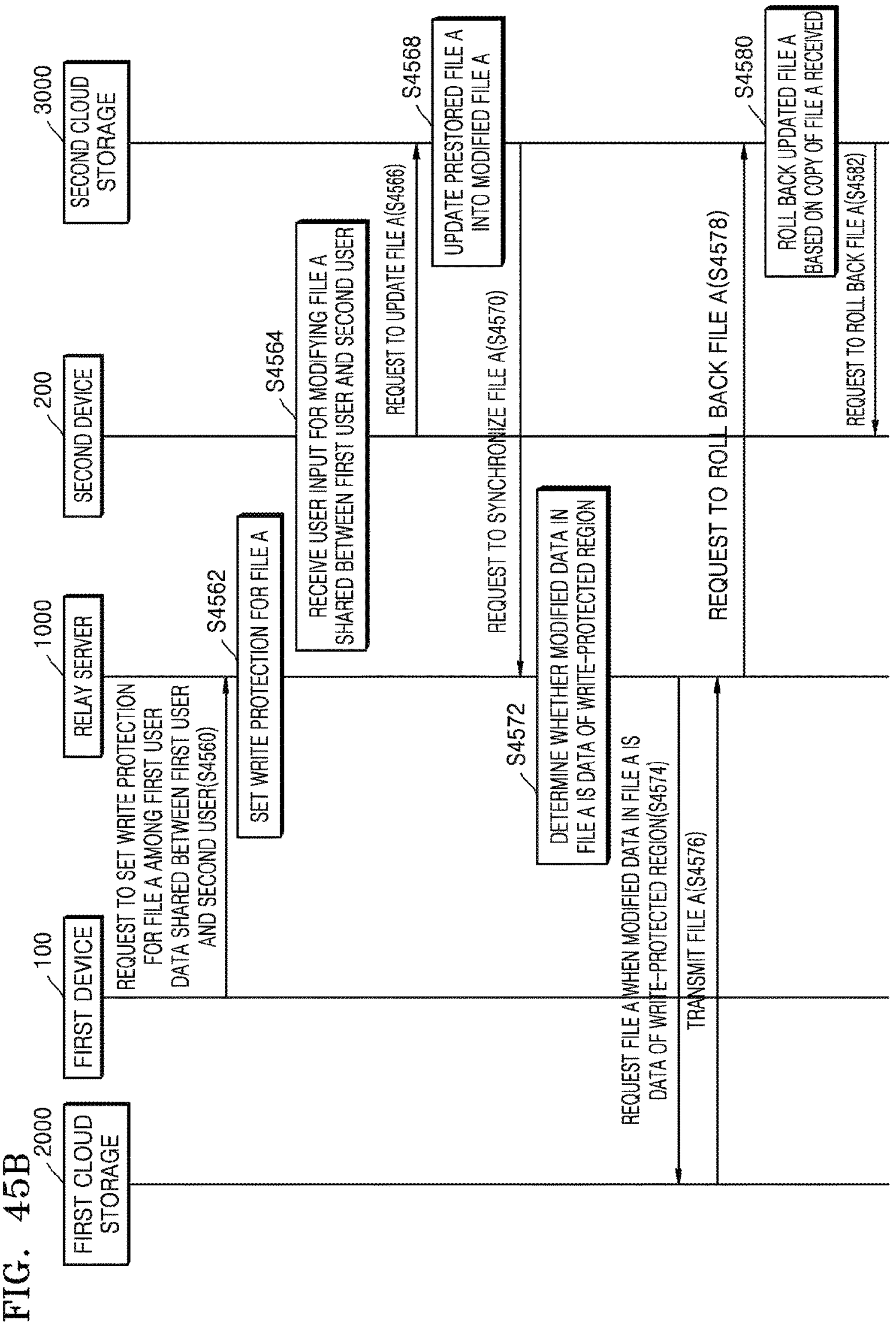
FIG. 45B is a flow diagram illustrating a method for the first device to set a write protection for the data shared between the first user and the second user, according to an exemplary embodiment.

FIG. 45B is a flow diagram illustrating a method for the relay server 1000 sets a write protection for the relevant data when the first user sets a write protection for the data shared between the first user and the second user, according to an exemplary embodiment.

Referring to FIG. 45B, in operation S4560, the first device 100 requests the relay server 1000 to set a write protection for the file A among the first user data shared between the first user and the second user.

When not the owner of the original file but the first user sets a write protection for the shared file, the first device 100 may request the relay server 1000 to set a write protection for the shared file.

The file A stored in the first cloud storage 2000 may be the original of the file that is copied from the first cloud storage 2000 into the second cloud storage 3000 by the relay server 1000 according to the share setting of the first user. When the first device 100 and the first cloud storage 2000 synchronize data, the file A may be stored in the first device 100.

In operation S4562, the relay server 1000 sets a write protection for the file A. In operation S4564, the second device 200 receives a user input for modifying the file A shared between the first user and the second user. In operation S4566, the second device 200 requests the second cloud storage 3000 to update the file A. In operation S4568, the first cloud storage 2000 updates the prestored file A into the modified file A. In operation S4570, the second cloud storage 3000 requests the relay server 1000 to synchronize the file A. In operation S4472, the relay server 1000 determines whether the modified data in the file A is the data of the write-protected region. In operation S4574, when the modified data in the file A is the data of the write-protected region, the relay server 1000 requests the file A from the first cloud storage 2000. In operation S4576, the first cloud storage 2000 transmits the file A to the relay server 1000. In operation S4578, the relay server 1000 requests the second cloud storage 3000 to roll back the updated file A based on the copy of the file A received from the first cloud storage 2000. In operation S4580, the second cloud storage 3000 rolls back the updated file A based on the copy of the received file A. In operation S4582, the second cloud storage 3000 requests the second device 200 to roll back the updated file A. Operations S4562 to S4582 may correspond to operations S4462 to S4480 of FIG. 44B.

Figure 46:
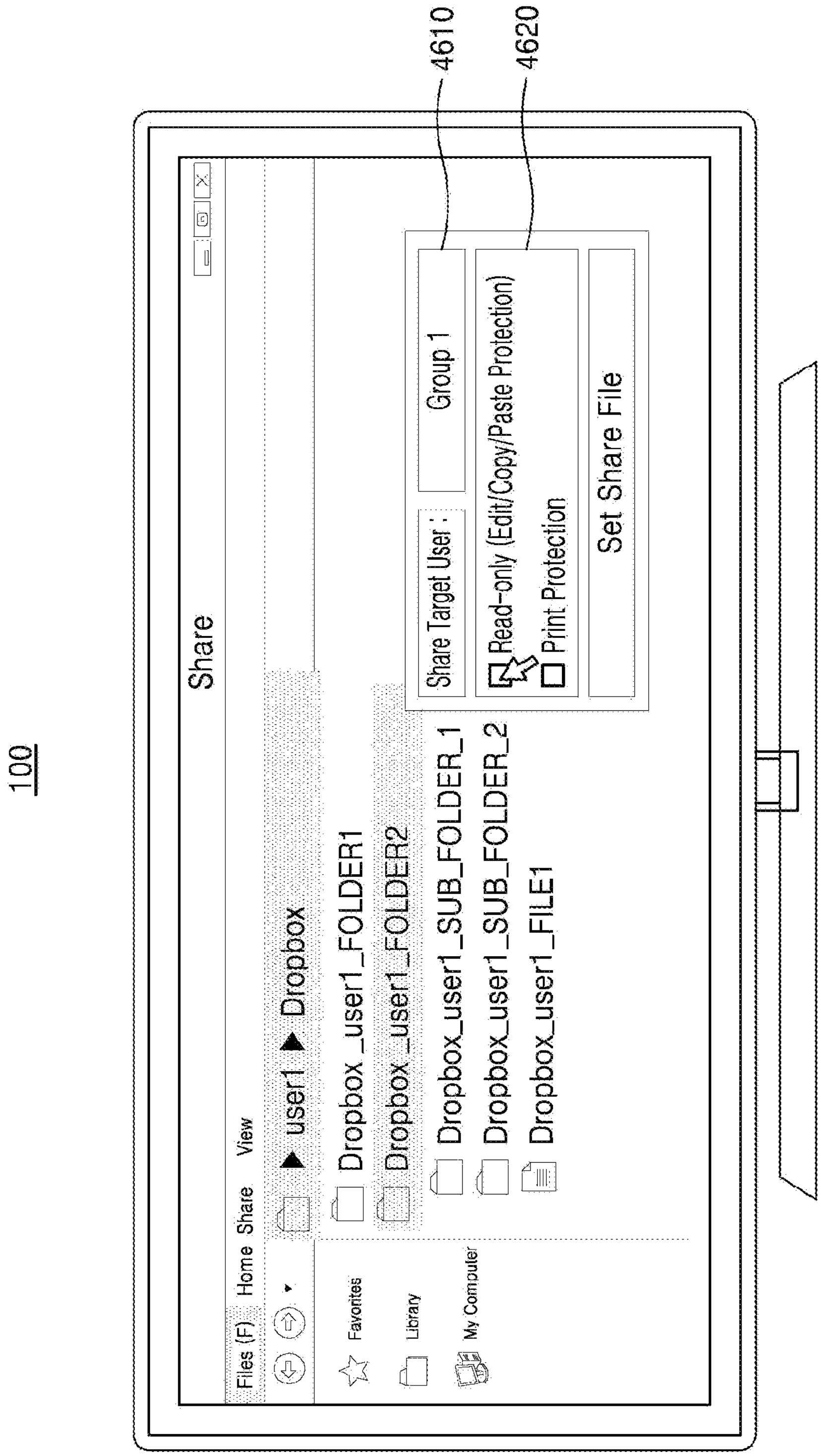
FIG. 46 is a diagram illustrating a UI for restricting a function about data to be shared, according to an exemplary embodiment.

FIG. 46 is a diagram illustrating a UI for restricting a function about data to be shared, according to an exemplary embodiment.

Referring to FIG. 46, the first device 100 may display a UI for restricting the use of data by a data receiver. The use restriction on the data may include the restrictions on the copy, print, and modification of the data.

The first device 100 may receive a user input for selecting share target data among the first user data stored in the first cloud storage 2000. When receiving the user input for selecting the share target data among the first user data, the first device 100 may display a UI 4610 for selecting the share target user and a UI 4620 for restricting the use of data by the data receiver.

When the data is a file or folder, the UI 4620 for restricting the use of data by the data receiver may include a UI for a read-only mode and a UI for a print protection mode. The read-only mode may refer to a mode for preventing the shared file from being edited, copied, and pasted by the file receiver. Also, the print protection mode may refer to a mode for preventing the shared file from being printed by the file receiver.

After setting a read-only mode or a print protection mode for the Dropbox_user1_FOLDER2 folder that is the first user data, when receiving a first user input for setting a share for a group 1, the first device 100 may request the relay server 1000 to restrict the edit, copy, and paste functions for the file in the Dropbox_user1_FOLDER2 folder. Also, the first device 100 may request the relay server 1000 to set the share of the file in the use-restricted Dropbox_user1_FOLDER2 folder with the group 1.

Figure 47:
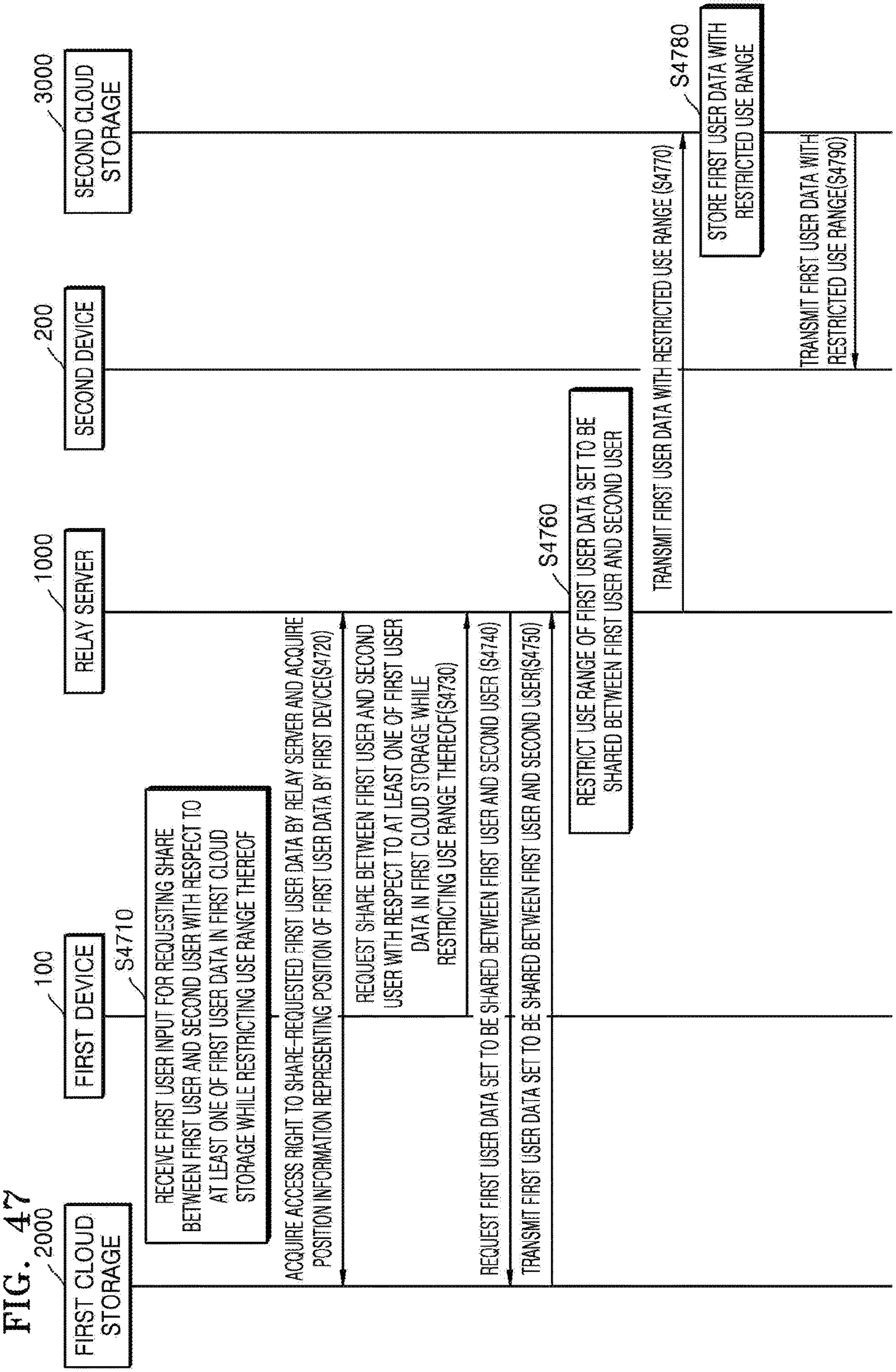
FIG. 47 is a flow diagram illustrating a method for the relay server to restrict the use of data set to be shared, according to an exemplary embodiment.

FIG. 47 is a flow diagram illustrating a method for the relay server 1000 to restrict the use of data set to be shared, according to an exemplary embodiment.

Referring to FIG. 47, in operation S4710, the first device 100 receives a first user input for requesting the share between the first user and the second user with respect to at least one of the first user data in the first cloud storage 2000 while restricting the use range thereof.

In operation S4720, the first device 100 requests the first cloud storage 2000 to grant the relay server 1000 the access right to the share-requested first user data. Also, the first device 100 requests position information representing the position of the first user data stored in the first cloud storage 2000 from the first cloud storage 2000.

The relay server 1000 may acquire the access right to the share-requested first user data. Also, the first device 100 may acquire the position information representing the position of the first user data.

In operation S4730, the first device 100 requests the relay server 1000 to share at least one of the first user data in the first cloud storage 2000 between the first user and the second user while restricting the use range thereof.

The first device 100 may transmit information about the URL of the first user data received from the first cloud storage 2000, the ID of the first user registered in the relay server 1000, the ID of the second user registered in the relay server 1000, and the use range set by the first user to the relay server 1000.

In operation S4740, the relay server 1000 requests the first user data set to be shared between the first user and the second user from the first cloud storage 2000.

In operation S4750, the first cloud storage 2000 transmits the first user data set to be shared between the first user and the second user to the relay server 1000.

In operation S4760, the relay server 1000 restricts the use range of the first user data set to be shared between the first user and the second user.

For example, when a read-only mode is requested to be set for the first user data set to be shared between the first user and the second user, the relay server 1000 may encrypt the file to prevent the second user from editing, copying, and pasting the first user data received from the first cloud storage 2000.

Also, the relay server 1000 may store information indicating that a read-only mode is set for the first user data set to be shared between the first user and the second user.

In operation S4770, the relay server 1000 transmits the first user data with the restricted use range to the second cloud storage 3000.

In operation S4780, the second cloud storage 3000 stores the first user data with the restricted use range.

In operation S4790, the second cloud storage 3000 transmits the first user data with the restricted use range to the second device 200.

Accordingly, the first user may share the use-restricted data with the second user. For example, when a read-only mode is set for the first user data, the second user may only view the first user data in the second device 200 but may not modify or copy the first user data.

Figure 48:
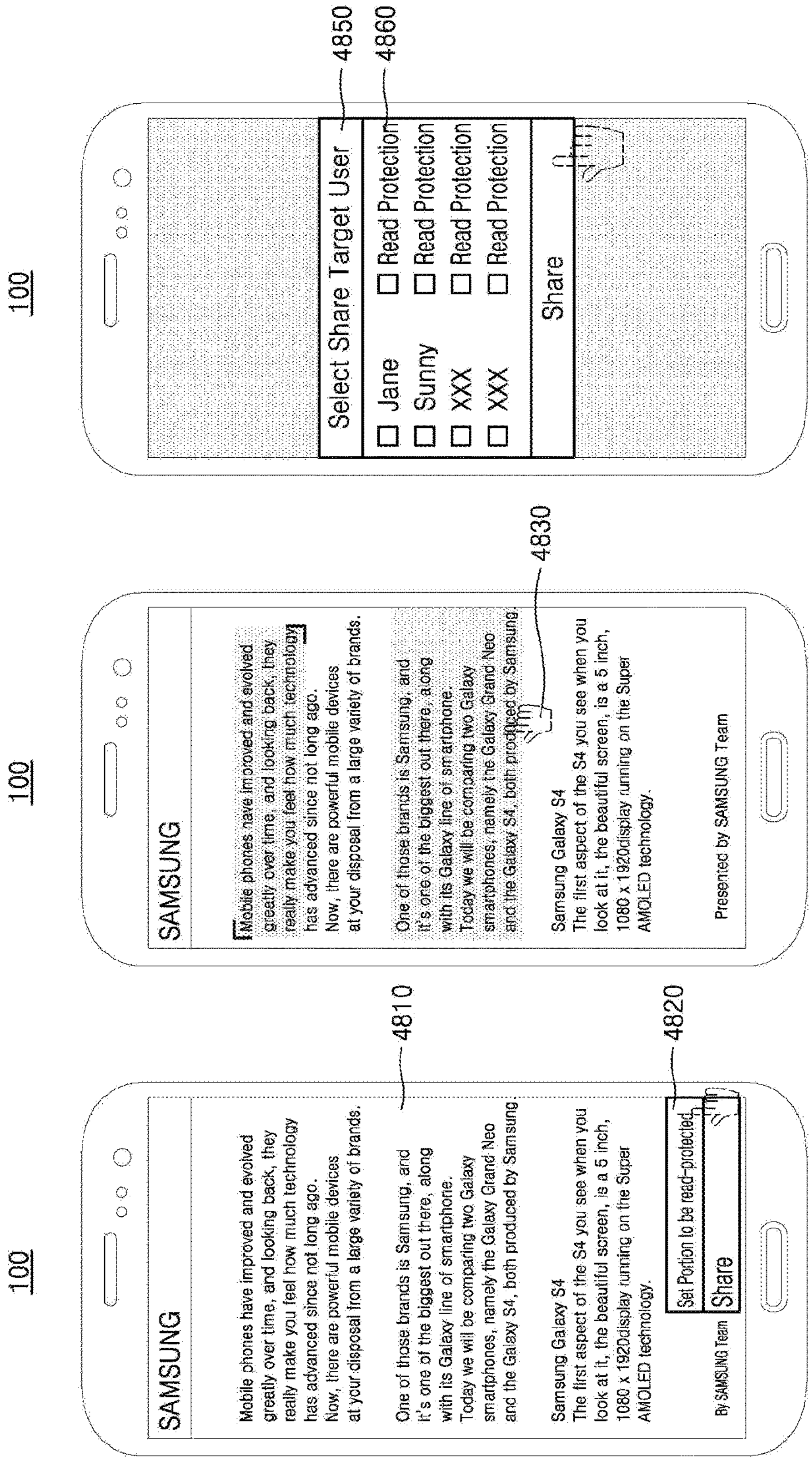
FIG. 48 is a diagram illustrating a UI for setting a read protection for a portion of the data to be shared, according to an exemplary embodiment.

FIG. 48 is a diagram illustrating a UI for setting a read protection for a portion of the data to be shared, according to an exemplary embodiment.

Referring to FIG. 48, the first device 100 may display contents 4810 of the first user file stored in the first cloud storage 2000.

When the contents 4810 of the first user file stored in the first cloud storage 2000 are displayed, the first device 100 may display a menu 4820 for setting a read protection for a portion of the displayed contents according to the first user input.

When receiving an input for selecting the menu 4820 for setting a read protection for a portion of the displayed contents, the first device 100 may display a UI 4830 for selecting a read protection target portion among the displayed contents.

The first device 100 may receive a first user input for selecting the read protection target portion. When receiving the first user input for selecting the read protection target portion, the first device 100 may display the portion selected by the first user discriminatively from the portion that is not selected by the first user.

Also, according to the first user input, the first device 100 may display a menu for displaying a UI for selecting the second user that will share the displayed contents.

When receiving a user input for selecting the menu for displaying the UI for selecting the second user that will share the displayed contents, the first device 100 may display a UI 4850 for selecting the second user that will share the displayed contents.

The UI 4850 for selecting the second user that will share the displayed contents may include an interface for selecting the second user and a UI 4860 for selecting whether to apply the read protection set for the contents to the second user.

When receiving a first user input for determining the second user for sharing and whether to apply a read protection to the second user for sharing, the first device 100 may request the relay server 1000 to share the displayed contents between the first user and the second user. In this case, the first device 100 may request the relay server 1000 to apply a read protection for the contents of the file to the read protection target user among the second users.

Figure 49:
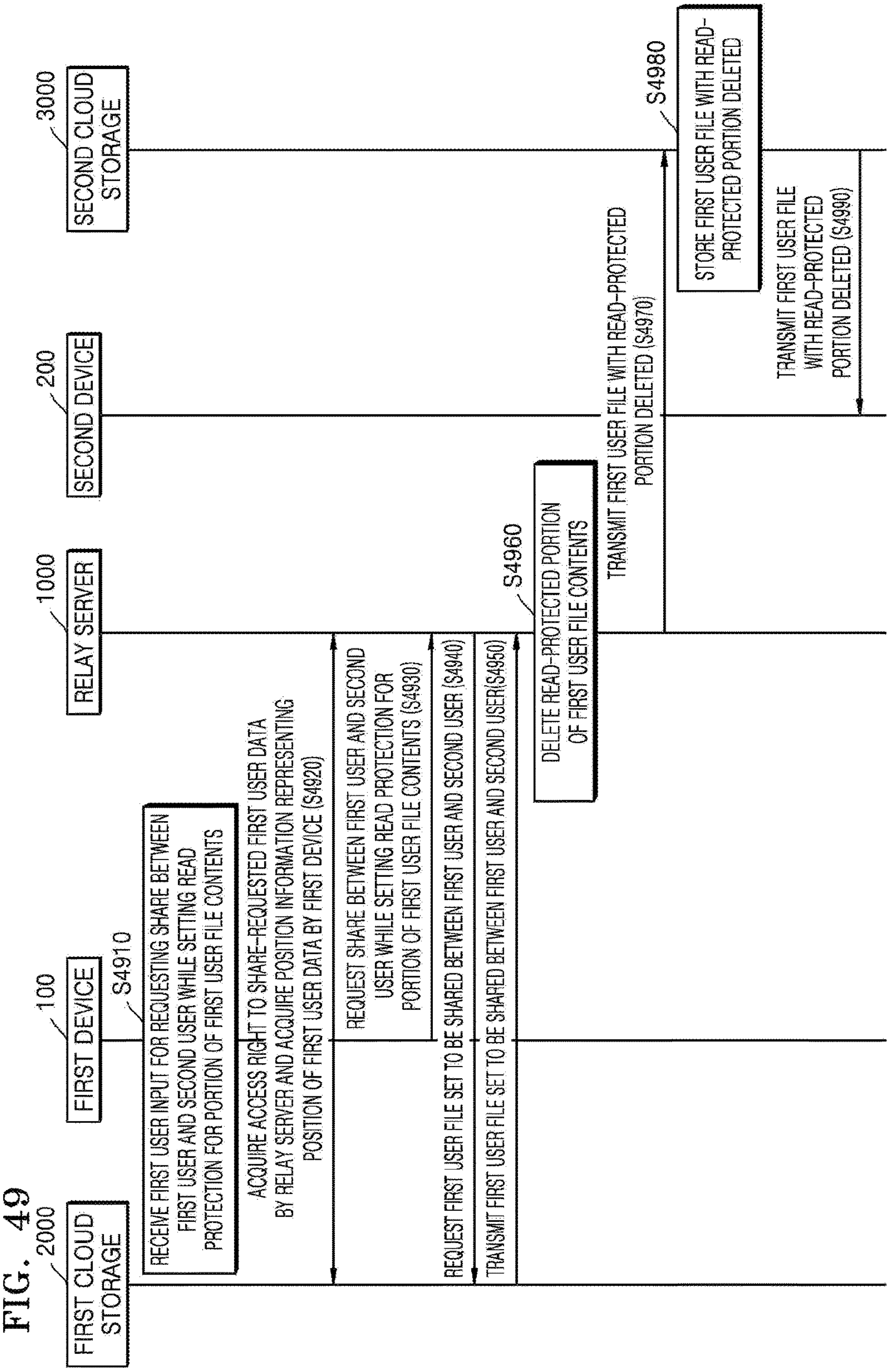
FIG. 49 is a flow diagram illustrating a method for sharing data while setting a read protection for a portion of the data to be shared, according to an exemplary embodiment.
Figure 50A:
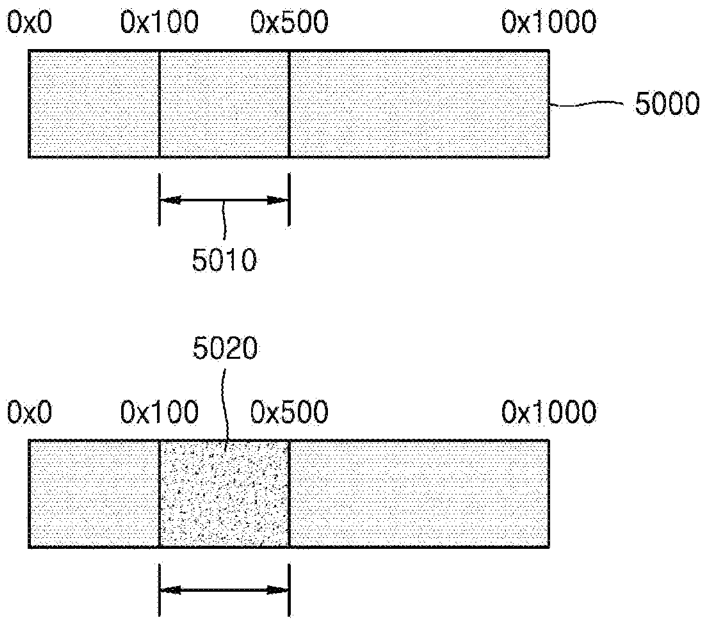
FIGS. 50A and 50B are diagrams illustrating a method for the relay server to delete a read-protected portion, according to an exemplary embodiment.
Figure 50B:
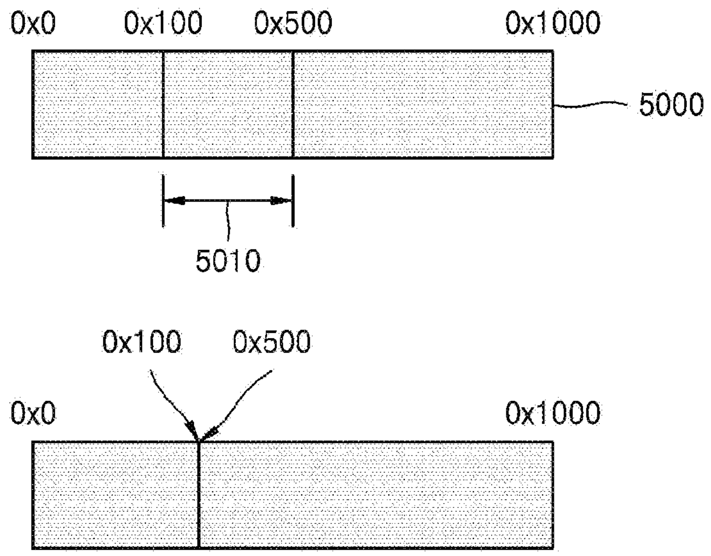

FIG. 49 is a flow diagram illustrating a method for sharing data while setting a read protection for a portion of the data to be shared, according to an exemplary embodiment. FIGS. 50A and 50B are diagrams illustrating a method for the relay server to delete a read-protected portion, according to an exemplary embodiment.

Referring to FIG. 49, in operation S4910, the first device 100 receives a first user input for requesting the share between the first user and the second user while setting a read protection for a portion of the contents of the first user file.

In operation S4920, the relay server 1000 acquires the access right to the share-requested first user data. Also, the first device 100 acquires the position information representing the position of the share-requested first user data.

In operation S4930, the first device 100 requests the relay server 1000 for the share of the read-protected file between the first user and the second user while setting the a read protection for a portion of the contents of the first user file.

The first device 100 may transmit information about the URL of the first user data received from the first cloud storage 2000, the ID of the first user registered in the relay server 1000, the ID of the second user registered in the relay server 1000, and the position of the read-protected portion among the contents of the file to the relay server 1000.

In operation S4940, the relay server 1000 requests the first user file set to be shared between the first user and the second user from the first cloud storage 2000.

In operation S4950, the first cloud storage 2000 transmits the first user file set to be shared between the first user and the second user to the relay server 1000.

In operation S4960, the relay server 1000 deletes the read-protected portion among the contents of the first user file set to be shared between the first user and the second user.

Based on the information about the position of the read-protected portion, the relay server 1000 may delete the read-protected portion among the first user file received from the first cloud storage 2000.

For example, as illustrated in FIG. 50A, the relay server 1000 may change a data value of a read-protected portion 5010 among contents 5000 of the file into a predetermined noise value 5020. Also, as illustrated in FIG. 50B, the relay server 1000 may delete the read-protected portion 5010 among the contents 5000 of the file and generate one file by connecting the other portions other than the deleted portion.

In operation S4970, the relay server 1000 transmits the first user file with the deleted read-protected portion to the second cloud storage 3000.

In operation S4980, the second cloud storage 3000 stores the first user file with the deleted read-protected portion.

In operation S4990, the second cloud storage 3000 transmits the first user file with the deleted read-protected portion to the second device 200.

Accordingly, the second user may view only the read-unprotected portion among the file A of the first user.

Figure 51:
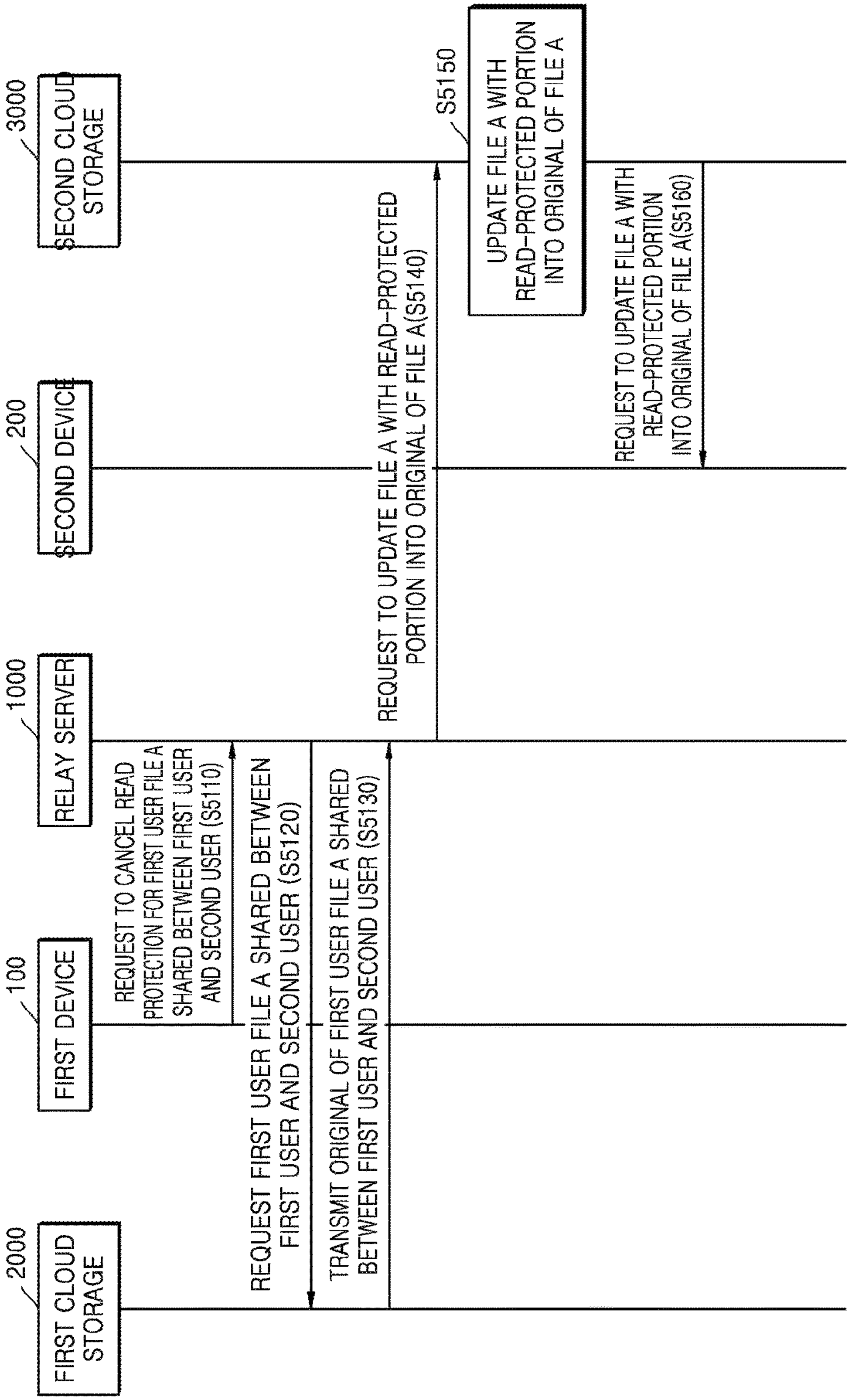
FIG. 51 is a flow diagram illustrating a method for canceling a read protection for the data of the first user that is partially read-protected and provided to the second user, according to an exemplary embodiment.

FIG. 51 is a flow diagram illustrating a method for canceling a read protection for the data of the first user that is partially read-protected and provided to the second user, according to an exemplary embodiment.

Referring to FIG. 51, in operation S5110, the first device 100 requests the relay server 1000 to cancel a read protection for the file A of the first user that is shared between the first user and the second user.

In operation S5120, the relay server 1000 requests the first user file A set to be shared between the first user and the second user from the first cloud storage 2000.

In operation S5130, the first cloud storage 2000 transmits the original of the first user file A set to be shared between the first user and the second user to the relay server 1000.

In operation s5140, the relay server 1000 requests the second cloud storage 3000 to update the file A with the partially read-protected portion and that is stored in the second cloud storage 3000, into the original of the file A received from the first cloud storage 2000.

In operation S5150, the second cloud storage 3000 updates the file A with the partially read-protected portion into the original of the file A received from the relay server 1000.

In operation s5160, the second cloud storage 3000 requests the second device 200 to update the file A with the partially read-protected portion into the original of the file A.

Because the second device 200 updates the partially read-protected file A prestored in the second device 200 into the original of the file A, the second user may view all of the contents of the file A.

Figure 52:
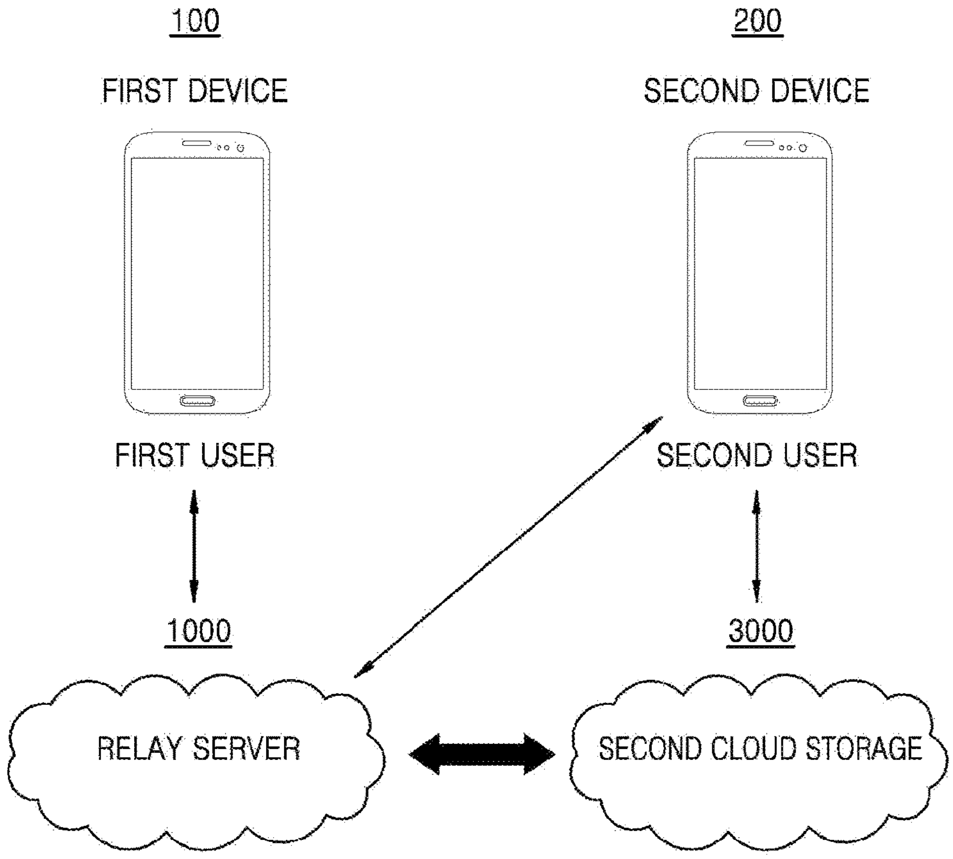
FIG. 52 is a diagram illustrating a method for sharing the data of the first user in the relay server or the data of the second user in the second cloud storage between the first user and the second user when the relay server provides a cloud storage function, according to an exemplary embodiment.

FIG. 52 is a diagram illustrating a method for sharing the data of the first user in the relay server 1000 or the data of the second user in the second cloud storage 3000 between the first user and the second user when the relay server 1000 provides a cloud storage function, according to an exemplary embodiment.

Referring to FIG. 52, the relay server 1000 may be a cloud storage that may provide a storage function to the users based on the accounts of the users.

The relay server 1000 may operate so that the first user data in the relay server 1000 may be shared between the first user and the second user. For example, when receiving a share request for sharing the first user data with the second user, the relay server 1000 may store the first user data in the relay server 1000 in the second user storage space in the second cloud storage 3000. Accordingly, the second user may acquire the first user data shared between the first user and the second user through the second cloud storage 3000.

Also, the relay server 1000 may operate so that the second user data in the second cloud storage 3000 may be shared between the first user and the second user. For example, the relay server 1000 may store the second user data in the second cloud storage 3000 in the first user storage space of the relay server 1000.

Also, the relay server 1000 may synchronize the first user data in the relay server 1000 with the copy of the first user data copied into the second user storage space in the second cloud storage 3000. For example, when the first user data in the relay server 1000 is modified, the relay server 1000 may update the copy of the first user data stored in the second cloud storage 3000 into the modified first user data.

Also, the relay server 1000 may set a write protection for the file shared between the first user and the second user with respect to the first user or the second user. Also, the relay server 1000 may set a read protection for the file shared between the first user and the second user with respect to the first user or the second user.

Figure 53:
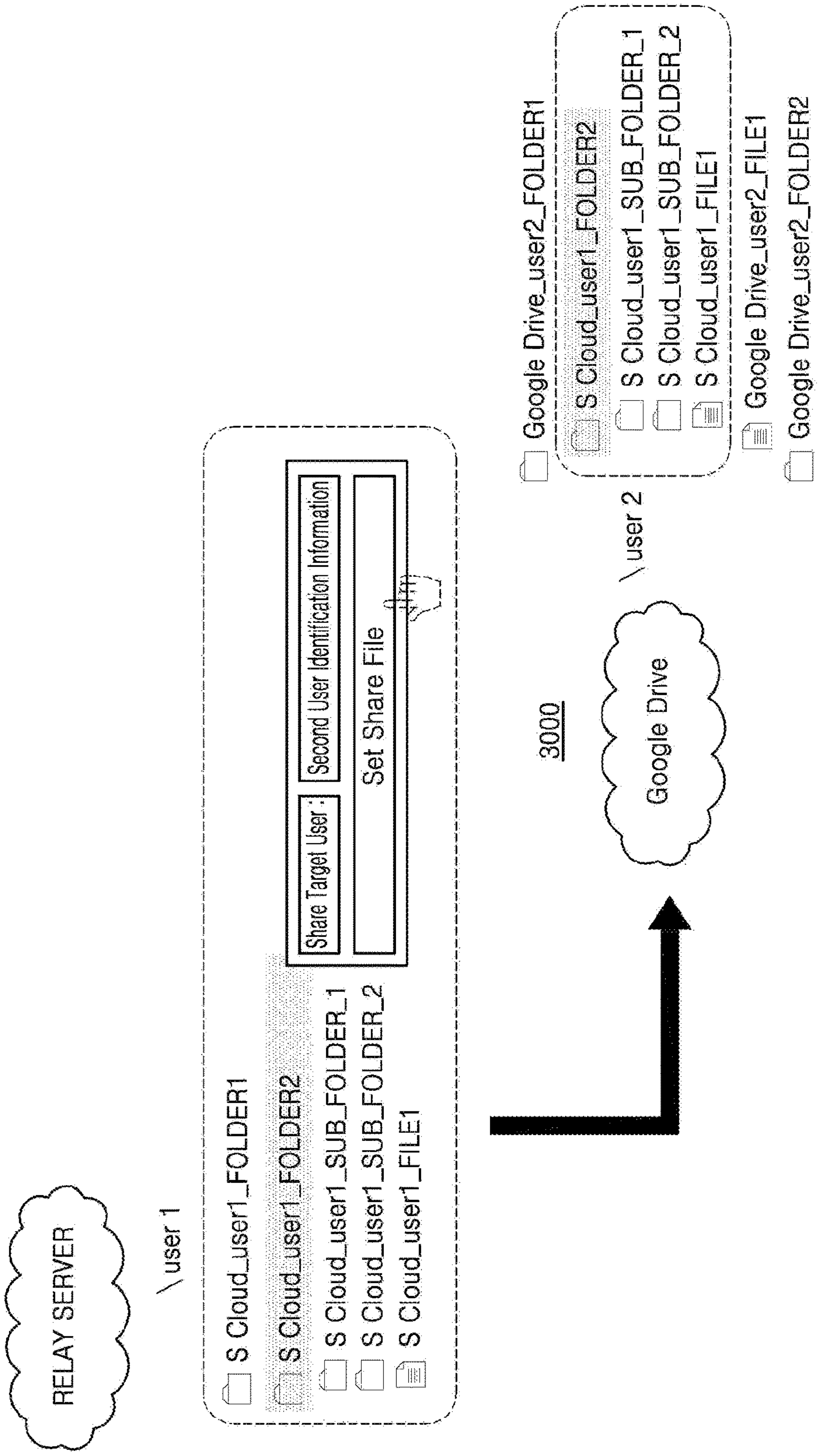
FIG. 53 is a diagram illustrating a method for the relay server to share the data of the first user between the first user and the second user when the relay server provides a cloud storage function, according to an exemplary embodiment.

FIG. 53 is a diagram illustrating a method for the relay server 1000 to share the data of the first user between the first user and the second user when the relay server 1000 provides a cloud storage function, according to an exemplary embodiment.

Referring to FIG. 53, the first user may set, in the relay server 1000, the share between the first user and the second user with respect to S Cloud_user1_FOLDER2 among the first user data in the relay server 1000. When the share between the first user and the second user is set with respect to S Cloud_user1_FOLDER2, the relay server 1000 may store the S Cloud_user1_FOLDER2 folder in the relay server 1000 as the second user data in the second cloud storage 3000.

When the S Cloud_user1_FOLDER2 folder of the first user in the relay server 1000 is copied as the second user data in the second cloud storage 3000, the S Cloud_user1_FOLDER2 folder of the second user may be mounted in the file system of the second user.

All data constituting the S Cloud_user1_FOLDER2 folder of the first user in the relay server 1000 may be copied into the second cloud storage 3000. Also, only the hierarchical structure of the S Cloud_user1_FOLDER2 folder of the first user and the attribute information of the file in the S Cloud_user1_FOLDER2 folder may be copied into the second cloud storage 3000.

A method for the relay server 1000 to store the first user data in the second user storage space of the second cloud storage 3000 when the share between the first user and the second user is set with respect to the first user data, will be described below in detail with reference to FIGS. 53 to 57.

Figure 54:
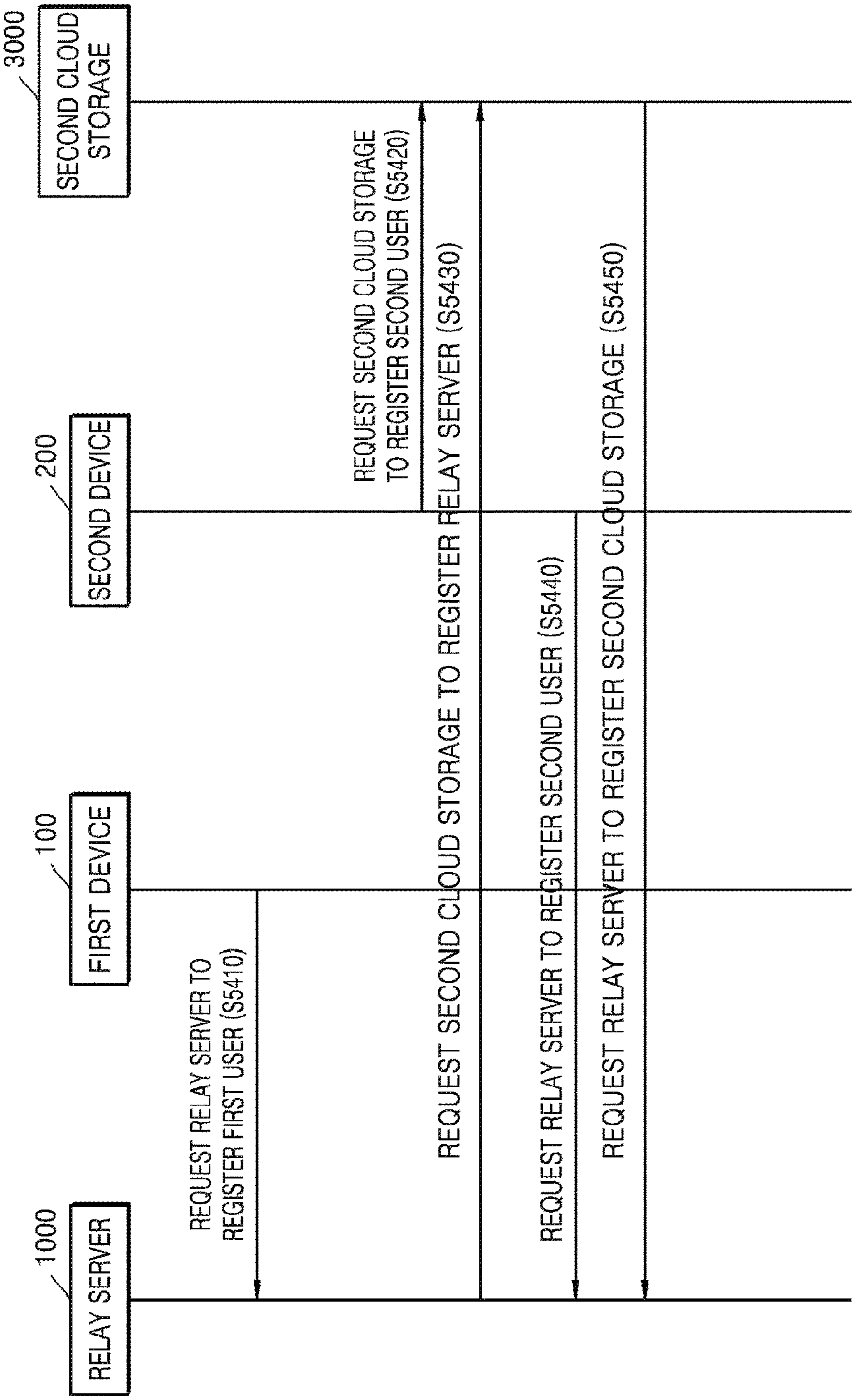
FIG. 54 is a flow diagram illustrating a method for the relay server and the second cloud storage to register the first user and the second user, according to an exemplary embodiment.

FIG. 54 is a flow diagram illustrating a method for the relay server 1000 and the second cloud storage 3000 to register the first user and the second user, according to an exemplary embodiment.

Referring to FIG. 54, in operation S5410, the relay server 1000 receives a request to register the first user from the first device 100. The first user registration request may include a first user account to be registered in the relay server 1000. The first user account may include the ID and password of the first user. When receiving the first user registration request, the relay server 1000 may grant the first user the right to use the resource of the relay server 1000. For example, the first user may store data in the relay server 1000 based on the first user account.

In operation S5420, the second cloud storage 3000 receives a request to register the second user from the second device 200. When receiving the second user registration request, the second cloud storage 3000 may grant the second user the right to use the resource of the second cloud storage 3000.

In operation S5430, the second cloud storage 3000 receives a request to register the relay server 1000 from the relay server 1000.

The relay server 1000 may be registered as a user in the second cloud storage 3000. Also, based on the permission of the user of the second cloud storage 3000, the relay server 1000 may be registered in the second cloud storage 3000 as a third party that may use the resource of the second cloud storage 3000. Also, when the relay server 1000 is pre-registered in the second cloud storage 3000, an operation of registering the relay server 1000 in the second cloud storage 3000 may be omitted.

In operation S5440, the second device 200 requests the relay server 1000 to register the second user. When receiving the second user registration request, the relay server 1000 may grant the second user the right to use the resource of the relay server 1000.

In operation S5450, the second cloud storage 3000 requests the relay server 1000 to register the second cloud storage 3000.

The second cloud storage 3000 may be registered as a user in the relay server 1000. Also, based on the permission of the user of the relay server 1000, the second cloud storage 3000 may be registered in the relay server 1000 as a third party that may use the resource of the relay server 1000. Also, when the second cloud storage 3000 is pre-registered in the relay server 1000, an operation of registering the second cloud storage 3000 in the relay server 1000 may be omitted.

Figure 55:
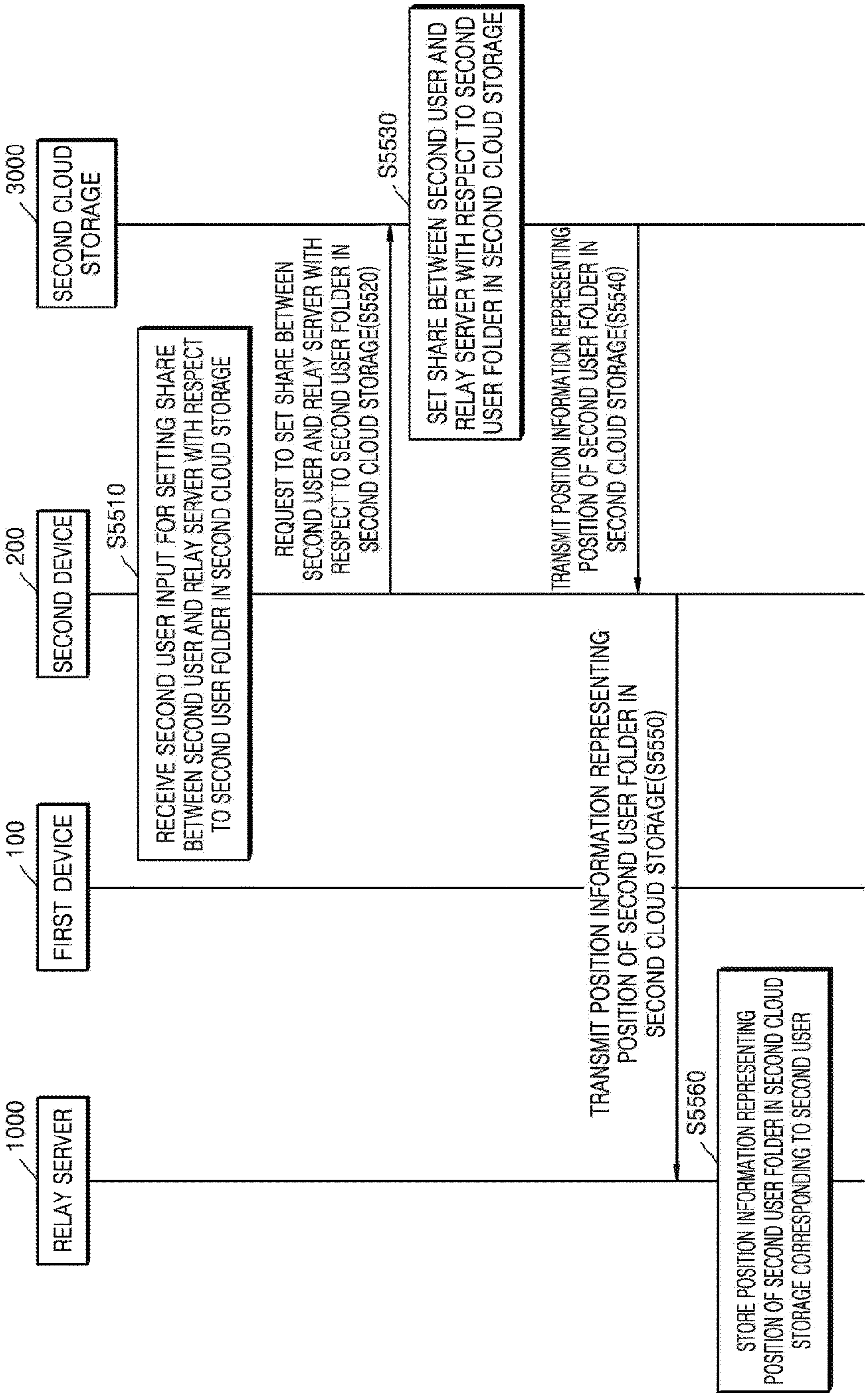
FIG. 55 is a flow diagram illustrating a method for the second device to register a folder of the second user in the second cloud storage as an incoming folder in the relay server, according to an exemplary embodiment.

FIG. 55 is a flow diagram illustrating a method for the second device 200 to register a folder of the second user in the second cloud storage 3000 as an incoming folder in the relay server 1000, according to an exemplary embodiment.

The incoming folder may refer to a folder for storing the data to be received from the relay server 1000.

Referring to FIG. 55, in operation S5510, the second device 200 receives a second user input for setting a share between the second user and the relay server 1000 with respect to a second user folder of the second user folders in the second cloud storage 3000 as an incoming folder.

In operation S5520, the second device 200 requests the second cloud storage 3000 to set the share between the second user and the relay server 1000 with respect to the second user folder selected by the second user in the second cloud storage 3000.

The share setting request may include the ID of the second user registered in the second cloud storage 3000, the ID of the relay server 1000 registered in the second cloud storage 3000, and the identification information of the folder selected by the second user.

Also, the second device 200 may request the position information representing the position of the folder selected by the second user from the second cloud storage 3000.

In operation S5530, the second cloud storage 3000 sets the share between the second user and the relay server 1000 with respect to the second user folder selected by the second user in the second cloud storage 3000.

For example, the second cloud storage 3000 may set the ID of the relay server 1000 registered in the second cloud storage 3000 as the ID of the sharer for the folder selected by the second user.

In operation 35540, the second cloud storage 3000 transmits the position information representing the position of the second user folder selected by the second user in the second cloud storage 3000 to the second device 200.

The position information representing the position of the folder may include the URL of the folder.

In operation S5550, the second device 200 transmits the position information representing the position of the second user folder selected by the second user in the second cloud storage 3000 to the relay server 1000. The second device 200 may request the relay server 1000 to set the folder selected by the second user as the incoming folder of the second user.

The incoming folder setting request may include the position information representing the position of the folder and the ID of the second user registered in the relay server 1000.

In operation S5560, the relay server 1000 stores the position information representing the position of the second user folder in the second cloud storage 3000 corresponding to the second user. The relay server 1000 may store the folder selected by the second user as the incoming folder of the second user in the relay server 1000.

For example, the relay server 1000 may store the position information representing the position of the folder selected by the second user as the position information of the incoming folder corresponding to the ID of the second user registered in the relay server 1000.

Figure 56:
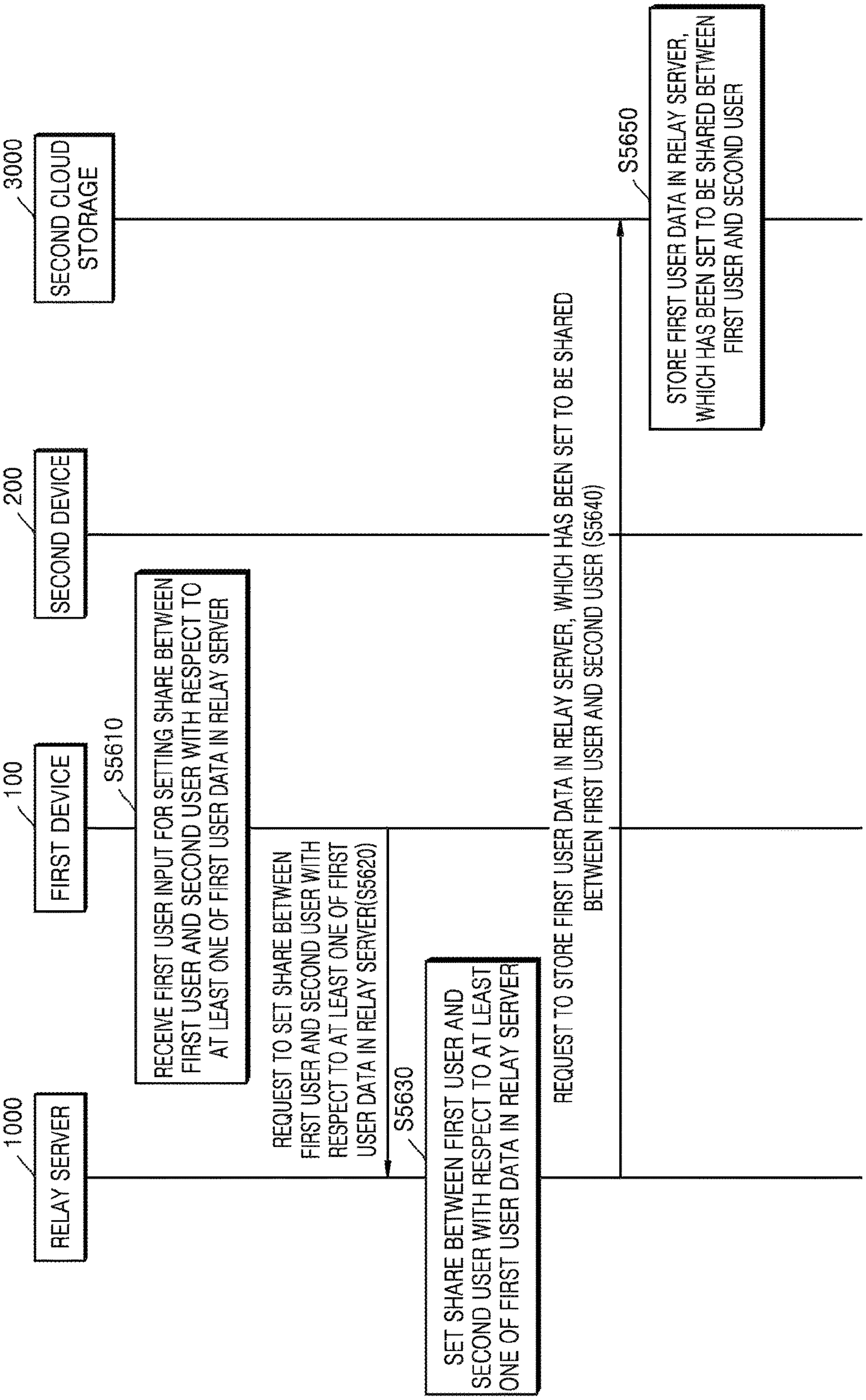
FIG. 56 is a flow diagram illustrating a method for the relay server to store the data of the first user in the relay server in the storage space of the second user when receiving a share request for sharing the data of the first user with the second user from the first device, according to an exemplary embodiment.

FIG. 56 is a flow diagram illustrating a method for the relay server 1000 to store the data of the first user in the relay server 1000 in the storage space of the second user when receiving a share request for sharing the data of the first user with the second user from the first device 100, according to an exemplary embodiment.

Referring to FIG. 56, in operation S5610, the first device 100 receives a first user input for setting the share between the first user and the second user with respect to at least one of the first user data in the relay server 1000.

In operation S5620, the first device 100 requests the relay server 1000 to set the share between the first user and the second user with respect to at least one of the first user data in the relay server 1000.

The first device 100 may request to share at least one of the first user data in the relay server 1000, which is selected by the first user, with the second user.

The share setting request between the first user and the second user with respect to the first user data may include the ID of the first user registered in the relay server 1000, the ID of the second user registered in the relay server 1000, and the identification information of the first user data in the relay server 1000, which is selected by the first user.

In operation S5630, the relay server 1000 sets the share between the first user and the second user with respect to at least one of the first user data in the relay server 1000.

Based on the identification information of the first user data received from the first device 100, the relay server 1000 may set the share between the first user and the second user with respect to at least one of the first user data in the relay server 1000, which is selected by the first user.

In operation S5640, the relay server 1000 requests the second cloud storage 3000 to store the first user data in the relay server 1000, which has been set to be shared between the first user and the second user, in the second user storage space in the second cloud storage 3000.

The relay server 1000 may store the position information representing the position of the second user storage space corresponding to the ID of the second user registered in the relay server 1000. For example, the relay server 1000 may store the second user folder in the second cloud storage 3000 as the incoming folder of the second user corresponding to the second user ID registered in the relay server 3000.

The relay server 1000 may request the second cloud storage 3000 to store the first user data in the second user storage space by using the position information representing the position of the second user storage space, the ID of the relay server 100 registered in the second cloud storage 3000, and the ID of the second user registered in the second cloud storage 3000.

In operation S5650, the second cloud storage 3000 stores the first user data in the relay server 1000, which has been set to be shared between the first user and the second user, in the second user storage space.

When receiving a storage request for storing the first user data in the second user storage space from the relay server 1000, the second cloud storage 3000 may determine whether the relay server 1000 has the right to store data in the second user storage space.

When the relay server 1000 has the right to store data in the second user storage space, the second cloud storage 3000 may store the first user data received from the relay server 1000 in the second user storage space.

Figure 57:
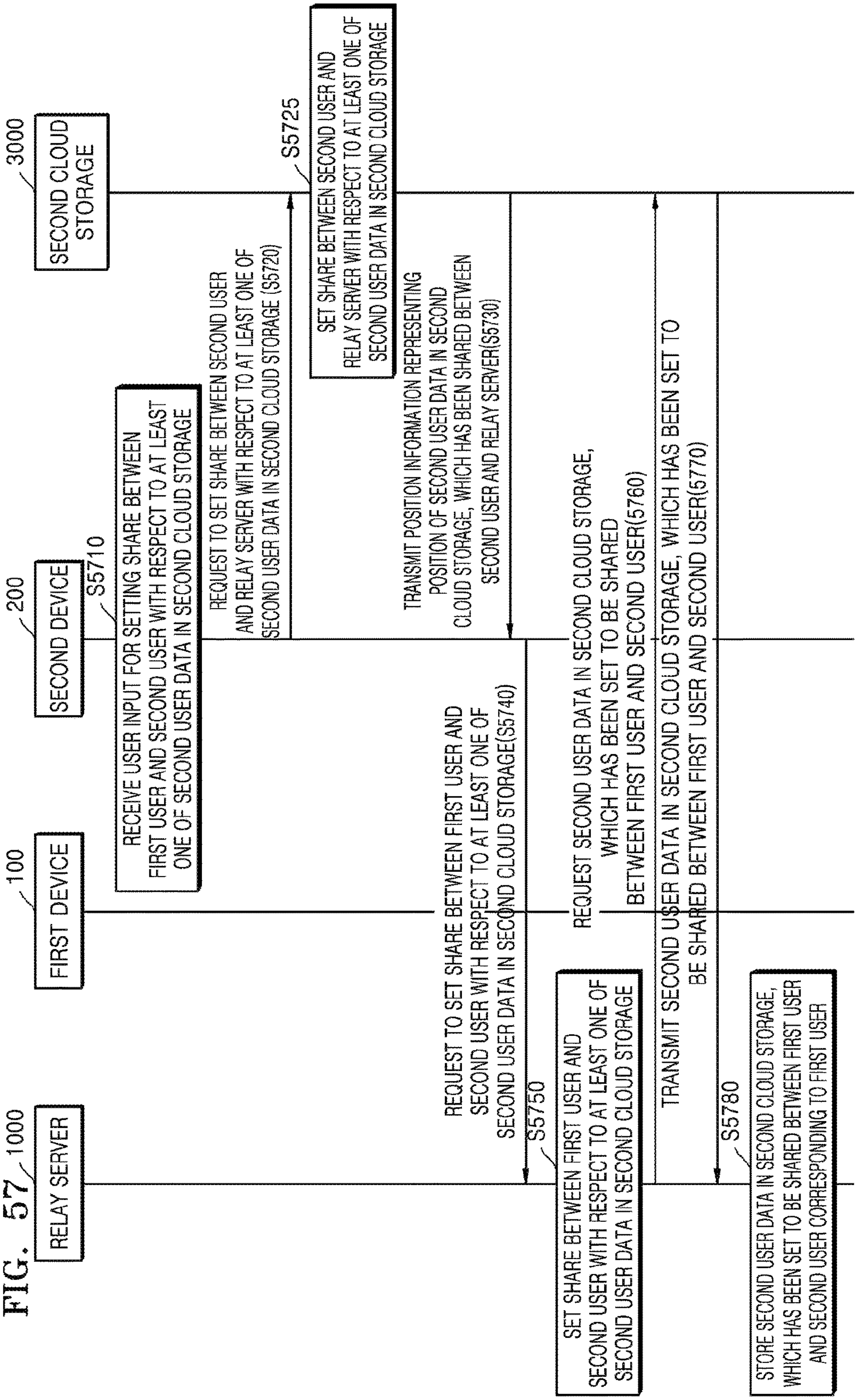
FIG. 57 is a flow diagram illustrating a method for the relay server to store the data of the second user in the second cloud storage in the relay server when receiving a share request for sharing the data of the second user in the second cloud storage between the first user and the second user from the second device, according to an exemplary embodiment.

FIG. 57 is a flow diagram illustrating a method for the relay server 1000 to store the data of the second user in the second cloud storage 3000 in the relay server 1000 when receiving a share request for sharing the data of the second user in the second cloud storage 3000 between the first user and the second user from the second device 200, according to an exemplary embodiment.

Referring to FIG. 57, in operation S5710, the second device 200 receives a user input for setting the share between the first user and the second user with respect to at least one of the second user data in the second cloud storage 3000.

In operation S5720, the second device 200 requests the second cloud storage 3000 to set the share between the second user and the relay server 1000 with respect to at least one of the second user data in the second cloud storage 3000.

The second device 200 may request the second cloud storage 3000 to share the second user data in the second cloud storage 3000, which is selected by the second user, with the relay server 1000.

The share setting request may include the ID of the second user registered in the second cloud storage 3000, the ID of the relay server 1000 registered in the second cloud storage 3000, and the identification information of the second user data in the second cloud storage 3000, which is selected by the second user.

Also, the second device 200 may request the position information representing the position of the second user data in the second cloud storage 3000, which is selected by the second user.

In operation S5725, the second cloud storage 3000 sets the share between the second user and the relay server 1000 with respect to at least one of the second user data in the second cloud storage 3000.

In operation S5730, the second cloud storage 3000 transmits the position information representing the position of the second user data in the second cloud storage 3000, which has been set to be shared between the second user and the relay server 1000, to the second device 200.

In operation S5740, the second device 200 requests the relay server 1000 to set the share between the first user and the second user with respect to at least one of the second user data in the second cloud storage 3000.

The second device 200 may request the relay server 1000 to share the second user data in the second cloud storage 3000, which is selected by the second user, between the first user and the second user.

The share request between the first user and the second user may include the ID of the first user registered in the relay server 1000, the ID of the second user registered in the relay server 1000, and the position information representing the position of the second user data.

In operation S5750, the relay server 1000 sets the share between the first user and the second user with respect to at least one of the second user data in the second cloud storage 3000.

In operation S5760, the relay server 1000 requests the second user data in the second cloud storage 3000, which has been set to be shared between the first user and the second user, from the second cloud storage 3000.

The request for the second user data may include the ID of the second user registered in the second cloud storage 3000, the ID of the relay server 1000 registered in the second cloud storage 3000, and the position information representing the position of the second user data.

In operation S5770, the second cloud storage 3000 transmits the second user data in the second cloud storage 3000, which has been set to be shared between the first user and the second user, to the relay server 1000.

The second cloud storage 3000 may determine whether the relay server 1000 has the access right to the second user data requested by the relay server 1000.

When the relay server 1000 has the access right to the second user data requested by the relay server 1000, the second cloud storage 3000 may transmit the second user data requested by the relay server 1000 to the relay server 1000.

In operation S5780, the relay server 1000 stores the second user data in the second cloud storage 3000, which has been set to be shared between the first user and the second user corresponding to the first user, in the first user storage space.

The relay server 1000 may store the second user data received from the second cloud storage 3000 in the first user storage space.

Figure 58:
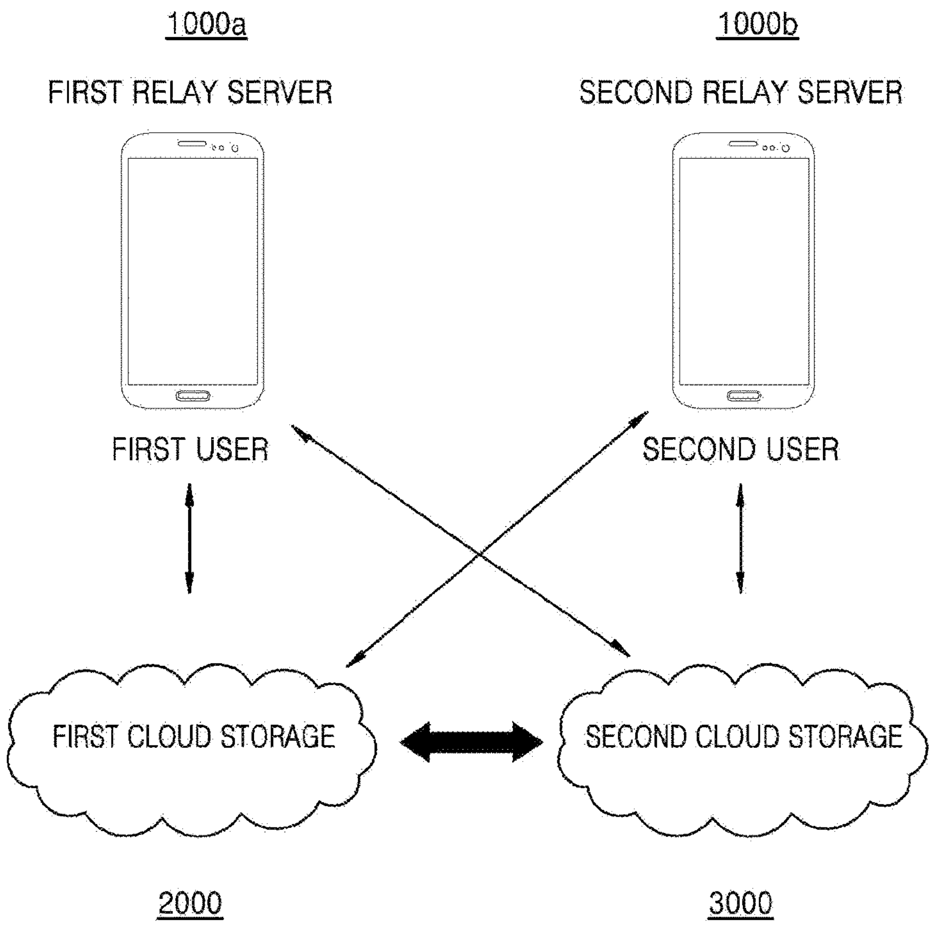
FIG. 58 is a diagram illustrating a method for a first relay server and a second relay server to share the data of the first user stored in the first cloud storage or the data of the second user in the second cloud storage between the first user and the second user, according to an exemplary embodiment.

FIG. 58 is a diagram illustrating a method for a first relay server 1000*a* and a second relay server 1000*b* to share the data of the first user stored in the first cloud storage 2000 or the data of the second user in the second cloud storage 3000 between the first user and the second user, according to an exemplary embodiment.

Referring to FIG. 58, the first relay server 1000*a* or the second relay server 1000*b* may share the first user data or the second user data between the first user and the second user by receiving the first user data from the first cloud storage 2000 and storing the received first user data in the second cloud storage 3000, or by receiving the second user data from the second cloud storage 3000 and storing the received second user data in the first cloud storage 3000.

The first cloud storage 2000 and the second cloud storage 3000 may be storages that are operated by different service providers. Also, the first cloud storage 2000 and the second cloud storage 3000 may referred to as public cloud storages according to some exemplary embodiments.

Figure 59:
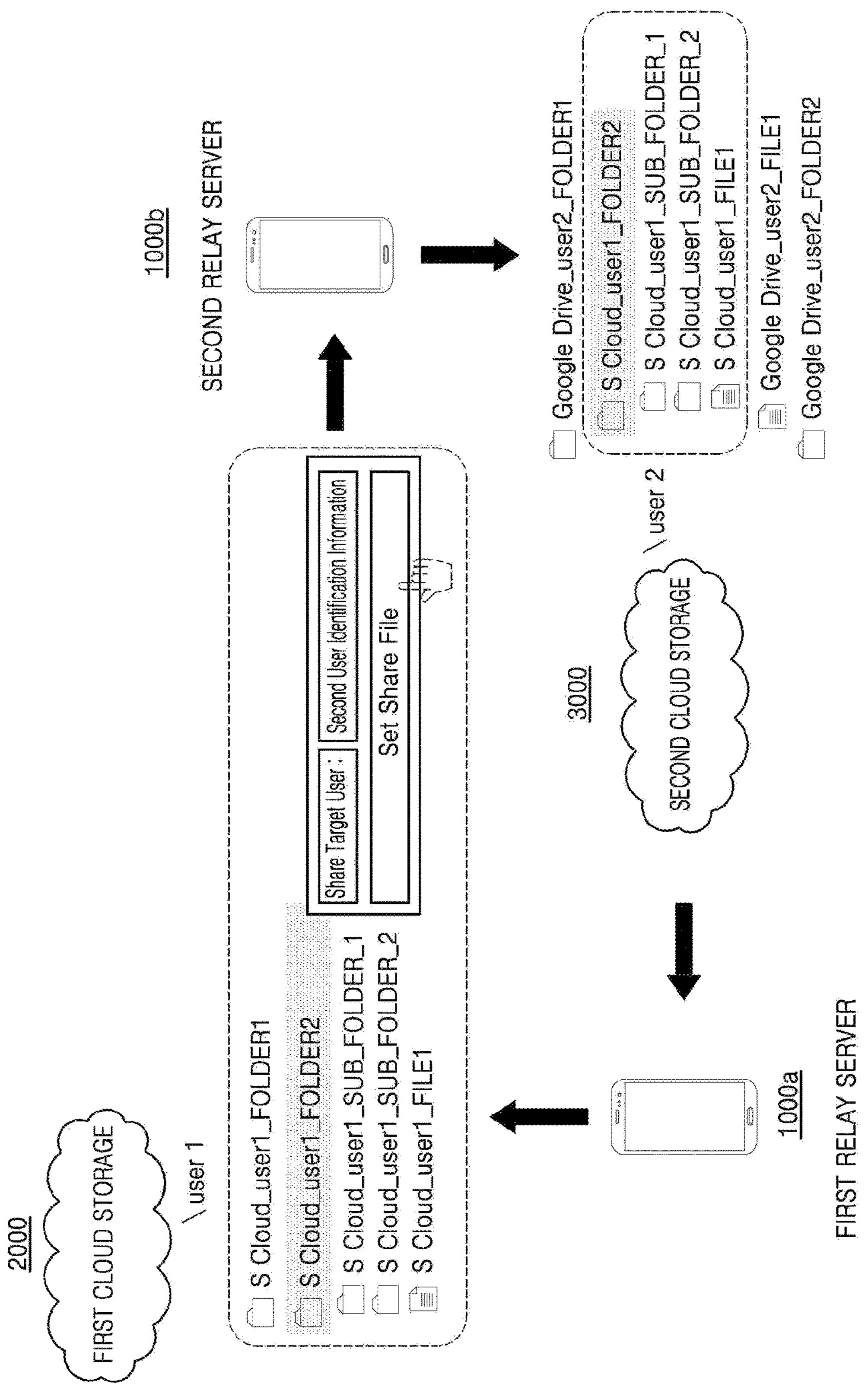
FIG. 59 is a diagram illustrating a method for the first relay server and the second relay server to share the data of the first user stored in the first cloud storage between the first user and the second user, according to an exemplary embodiment.

FIG. 59 is a diagram illustrating a method for the first relay server 1000*a* and the second relay server 1000*b* to share the data of the first user stored in the first cloud storage 2000 between the first user and the second user, according to an exemplary embodiment.

Referring to FIG. 59, by using the first relay server 1000*a*, in the first cloud storage 2000, the first user may set the share between the first user and the second user with respect to Dropbox_user1_FOLDER2 among the first user data stored in the first cloud storage 2000. When the share between the first user and the second user is set with respect to Dropbox_user1_FOLDER2, the first relay server 1000*a* may receive the position information representing the position of the Dropbox_user1_FOLDER2 folder from the first cloud storage 2000. Then, the first relay server 1000*a* may transmit the position information representing the position of the Dropbox_user1_FOLDER2 folder to the second relay server 1000*b*.

When receiving the position information representing the position of the Dropbox_user1_FOLDER2 folder, the second relay server 1000*b* may receive the Dropbox_user1_FOLDER2 folder from the first cloud storage 2000 based on the position information representing the position of the Dropbox_user1_FOLDER2 folder. Then, the second relay server 1000*b* may store the Dropbox_user1_FOLDER2 folder in the second cloud storage 3000.

A method for the first relay server 1000*a* and the second relay server 1000*b* to share the first user data between the first user and the second user by storing the first user data stored in the first cloud storage 2000 in the second user storage space in the second cloud storage 3000, will be described below in detail with reference to FIGS. 60 to 65.

Figure 60:
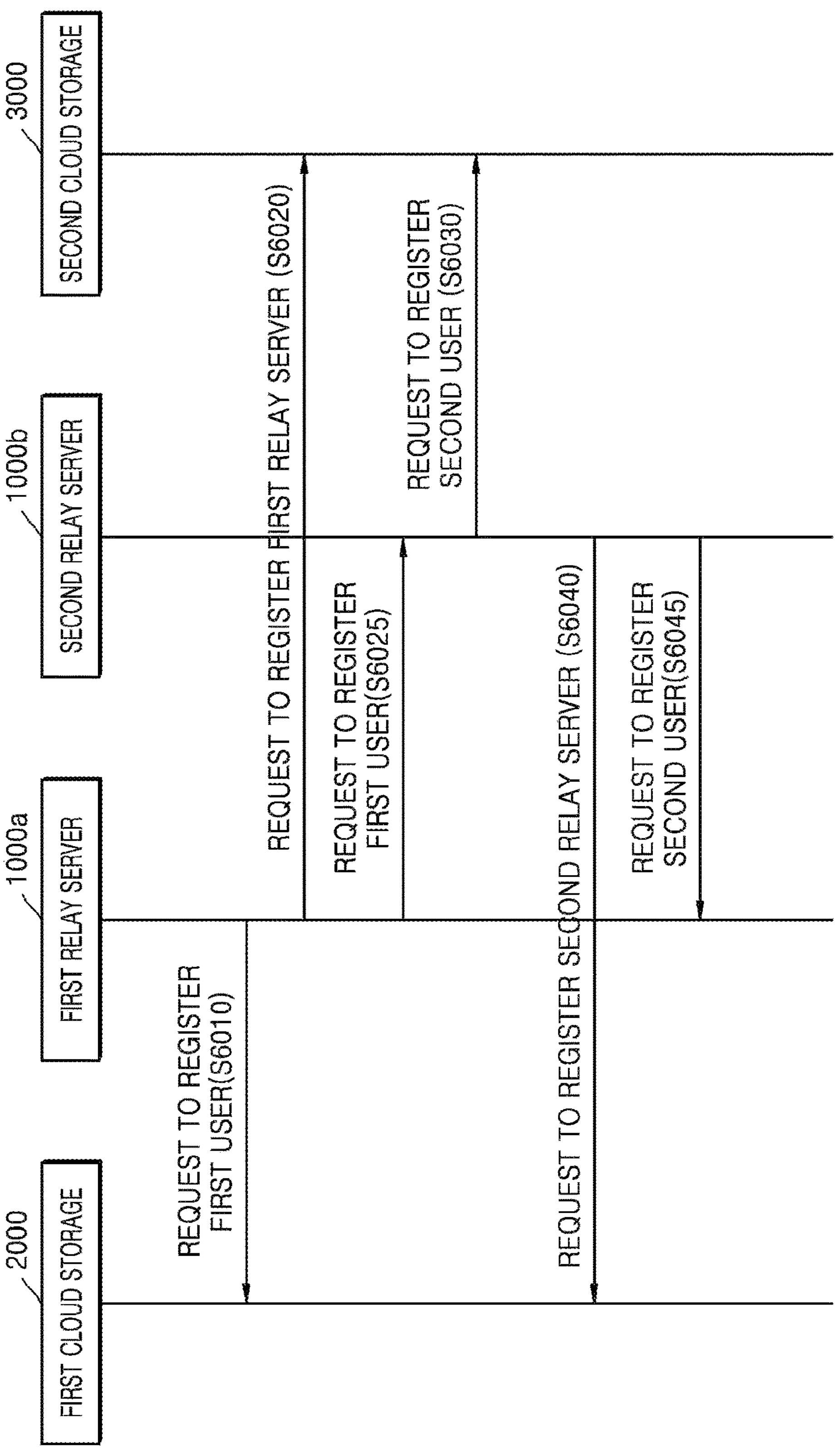
FIG. 60 is a flow diagram illustrating a method for the first cloud storage and the second cloud storage to register the first user and the second user, according to an exemplary embodiment.

FIG. 60 is a flow diagram illustrating a method for the first cloud storage 2000 and the second cloud storage 3000 to register the first user and the second user, according to an exemplary embodiment.

Referring to FIG. 60, in operation S6010, the first cloud storage 2000 receives a request to register the first user from the first relay server 1000*a*. The first user registration request may include a first user account to be registered in the first cloud storage 2000. The first user account may include the ID and password of the first user. When receiving the first user registration request, the first cloud storage 2000 may grant the first user the right to use the resource of the first cloud storage 2000.

In operation S6020, the second cloud storage 3000 receives a request to register the first user or the first relay server 1000*a* from the first relay server 1000*a*. When receiving the first user registration request, the second cloud storage 3000 may grant the first user the right to use the resource of the second cloud storage 3000.

In operation S6025, the first relay server 1000*a* requests the second relay server 1000*b* to register the first user.

For example, the second relay server 1000*b* may receive a request for inputting information about the first user from the first relay server 1000*a*.

In operation S6030, the second cloud storage 3000 receives a request to register the second user from the second relay server 1000*b*. When receiving the second user registration request, the second cloud storage 3000 may grant the second user the right to use the resource of the second cloud storage 3000.

In operation S6040, the first cloud storage 2000 receives a request to register the second user or the second relay server 1000*b* from the second relay server 1000*b*. When receiving the second user registration request, the first cloud storage 2000 may grant the second user the right to use the resource of the first cloud storage 2000.

In operation S6045, the second relay server 1000*b* requests the first relay server 1000*a* to register the second user.

Accordingly, the first user and the second user may be registered as the users of the first cloud storage 2000 and the second cloud storage 3000.

Figure 61:
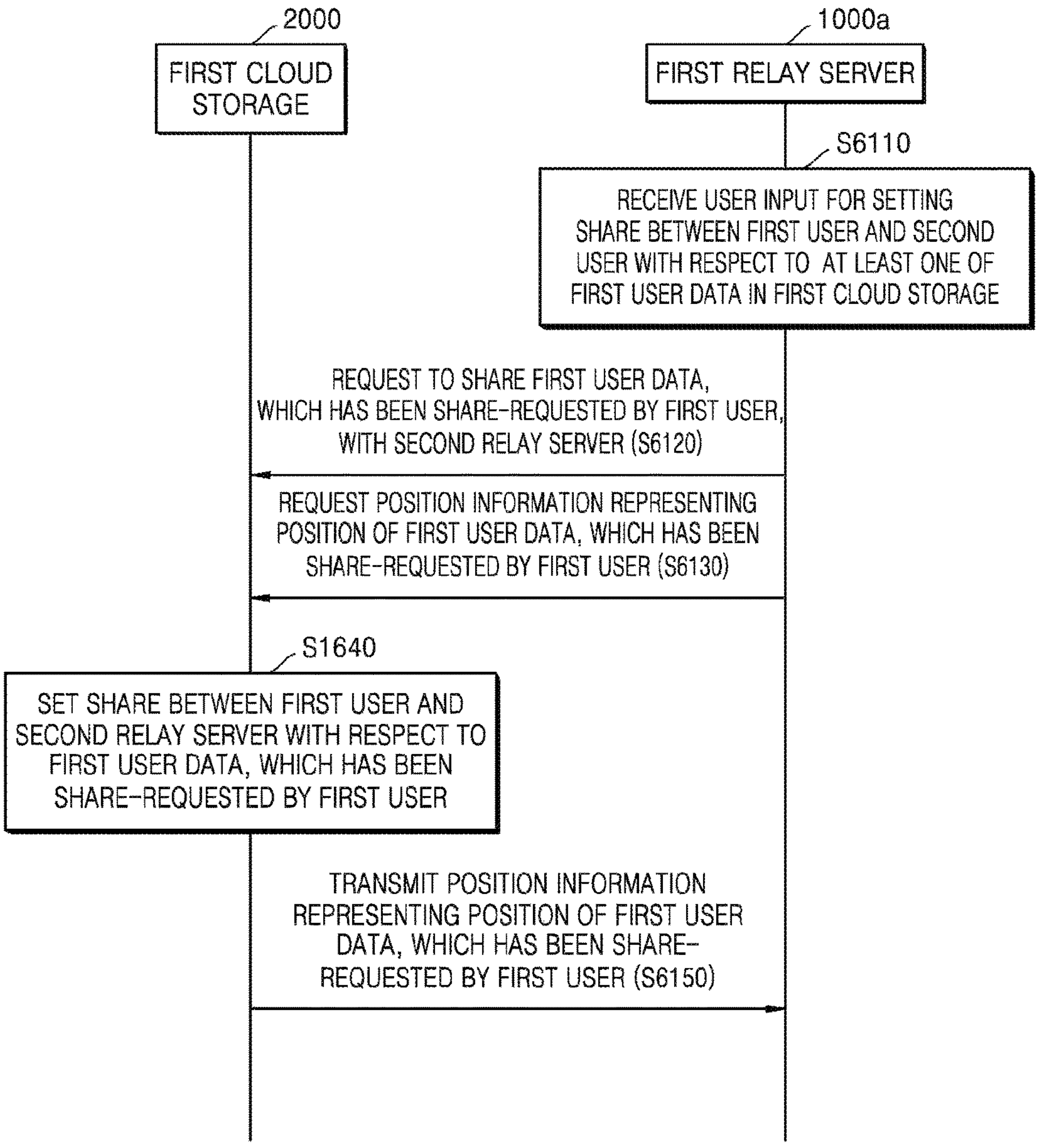
FIG. 61 is a flow diagram illustrating a method for the first relay server to set a share between the first user and the second user with respect to at least one of the data of the first user stored in the first cloud storage, according to an exemplary embodiment.

FIG. 61 is a flow diagram illustrating a method for the first relay server 1000*a* to set a share between the first user and the second user with respect to at least one of the data of the first user stored in the first cloud storage 2000, according to an exemplary embodiment.

Referring to FIG. 61, in operation S6110, the first relay server 1000*a* receives a user input for setting the share between the first user and the second user with respect to at least one of the first user data stored in the first cloud storage 2000.

The first relay server 1000*a* may receive a user input for selecting at least one of the first user data stored in the first cloud storage 2000. Also, the first relay server 1000*a* may receive a user input for setting the share between the first user and the second user with respect to the selected data.

In operation S6120, the first relay server 1000*a* requests the first cloud storage 2000 to share the first user data, which has been share-requested by the first user, with the second user or the second relay server 1000*b*.

In operation S6130, the first relay server 1000*a* requests the position information representing the position of the first user data, which has been share-requested by the first user, from the first cloud storage 2000.

Based on the ID of the first user registered in the first cloud storage 2000, the first relay server 1000*a* request the position information representing the position of the data selected by the first user.

In operation S6140, the first cloud storage 2000 sets the share between the first user and the second user with respect to the first user data, which has been share-requested by the first user.

In operation S6150, the first cloud storage 2000 transmits the position information representing the position of the first user data, which has been share-requested by the first user, to the first relay server 1000*a*.

Figure 62:
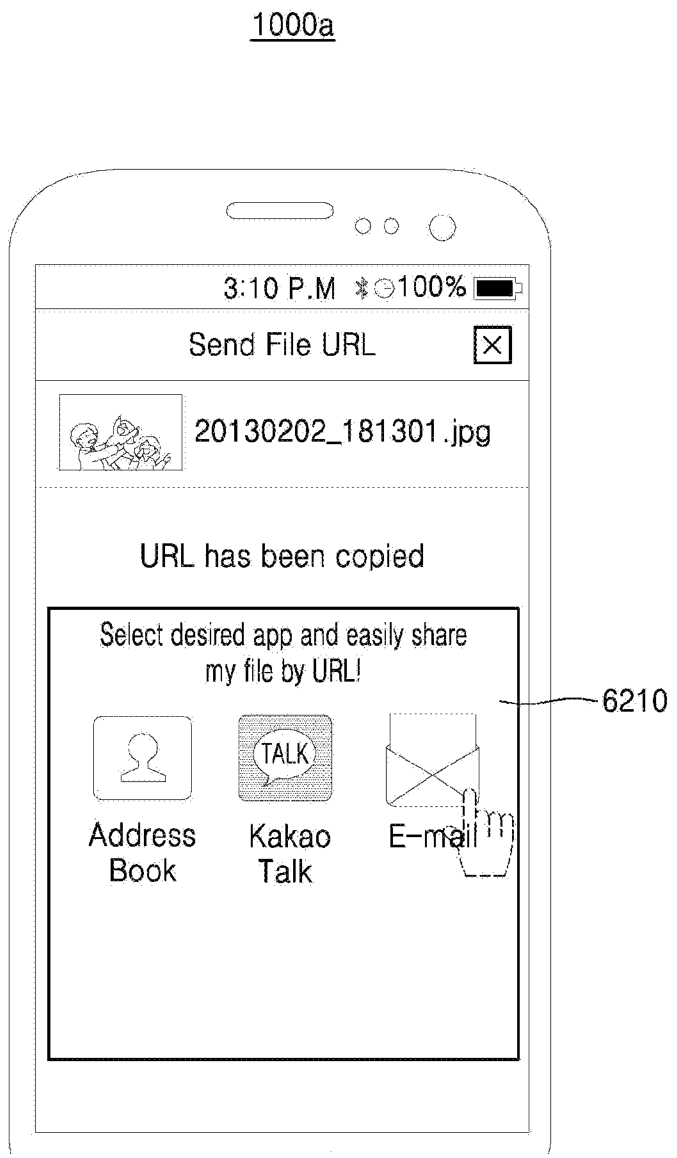
FIG. 62 is a diagram illustrating a UI for describing a method for the first user to transmit position information representing the position of a file set to be shared between the first user and the second user to the second user, according to an exemplary embodiment.

FIG. 62 is a diagram illustrating a UI for describing a method for the first user to transmit position information representing the position of a file set to be shared between the first user and the second user to the second user, according to an exemplary embodiment.

Referring to FIG. 62, when receiving the position information representing the position of the first user data stored in the first cloud storage 2000 from the first cloud storage 2000, the first relay server 1000*a* may display a UI 6210 for transmitting the position information representing the position of the first user data to the second relay server 1000*b*.

The UI 6210 for transmitting the position information representing the position of the first user data to the second relay server 1000*b* may include an icon for executing an application for transmitting texts between the users. The application for transmitting texts between the users may include an e-mail application, an SNS application, an SNS web application, and an address book application.

When receiving a user input for selecting one of the applications, the first relay server 1000*a* may execute the selected application. Accordingly, by using the executed application, the first user may transmit the position information representing the position of the file set to be shared between the first user and the second user to the second user.

Figure 63:
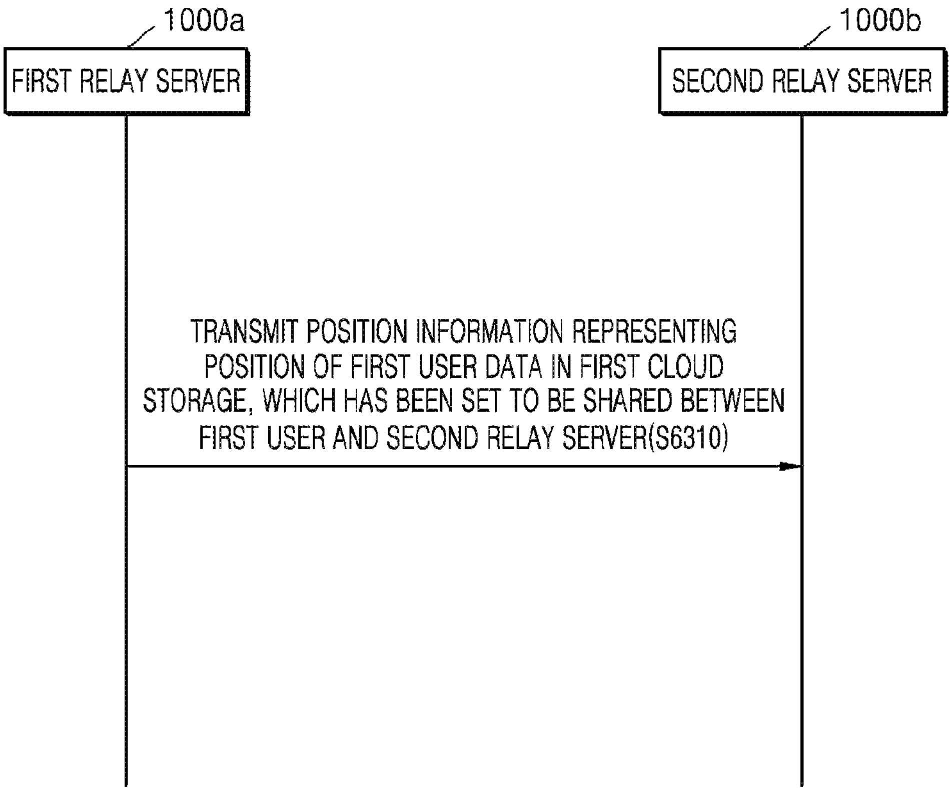
FIG. 63 is a flow diagram illustrating a method for the first relay server to transmit position information representing the position of a file set to be shared between the first user and the second user to the second relay server, according to an exemplary embodiment.

FIG. 63 is a flow diagram illustrating a method for the first relay server 1000*a* to transmit position information representing the position of a file set to be shared between the first user and the second user to the second relay server 1000*b*, according to an exemplary embodiment.

Referring to FIG. 63, in operation S6310, the first relay server 1000*a* transmits the position information representing the position of the first user data stored in the first cloud storage 2000, which has been set to be shared between the first user and the second user or the second relay server 1000*b*, to the second relay server 1000*b*.

The first user may directly transmit the position information representing the position of the first user data to the second relay server 1000*b* by using the application in the first relay server 1000*a*.

Also, when a separate server is provided to connect the first relay server 1000*a* and the second relay server 1000*b* corresponding to the first user and he second user, the first relay server 1000*a* may automatically transmit the position information representing the position of the first user data to the second relay server 1000*b*.

Figure 64:
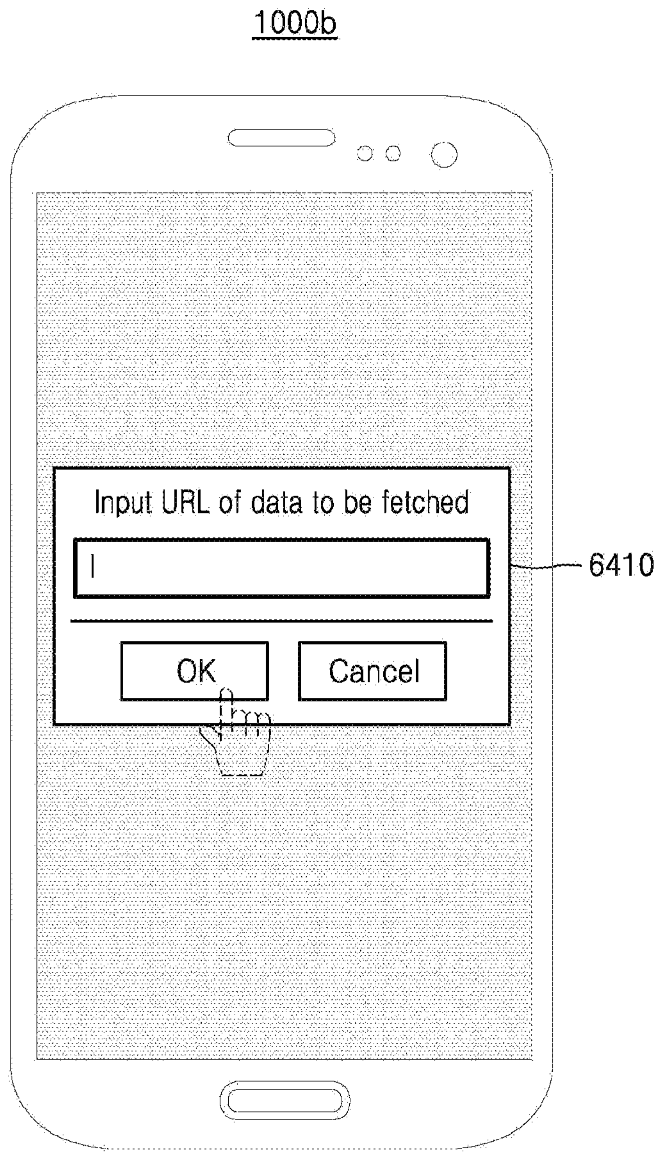
FIG. 64 is a diagram illustrating a UI for the second relay server to receive the data of the first user from the first cloud storage and store the received data of the first user in the second cloud storage, according to an exemplary embodiment.

FIG. 64 is a diagram illustrating a UI for the second relay server 1000*b* to receive the data of the first user from the first cloud storage 2000 and store the received data of the first user in the second cloud storage 3000, according to an exemplary embodiment.

Referring to FIG. 64, based on the second user input, the second relay server 1000*b* may execute an application for storing the first user data stored in the first cloud storage 2000 in the second user storage space in the second cloud storage 3000.

By executing the application, the second relay server 1000*b* may display a UI 6410 for receiving the position information representing the position of the first user data stored in the first cloud storage 2000 from the second user.

When receiving the position information representing the position of the first user data stored in the first cloud storage 2000 from the second user through the UI 6410, the second relay server 1000*b* may request the first user data stored in the first cloud storage 2000 from the first cloud storage 2000.

The first cloud storage 2000 may transmit the first user data requested by the second relay server 1000*b* to the second relay server 1000*b*. Then, the second relay server 1000*b* may store the first user data received from the first cloud storage 2000 in the second cloud storage 3000.

Figure 65:
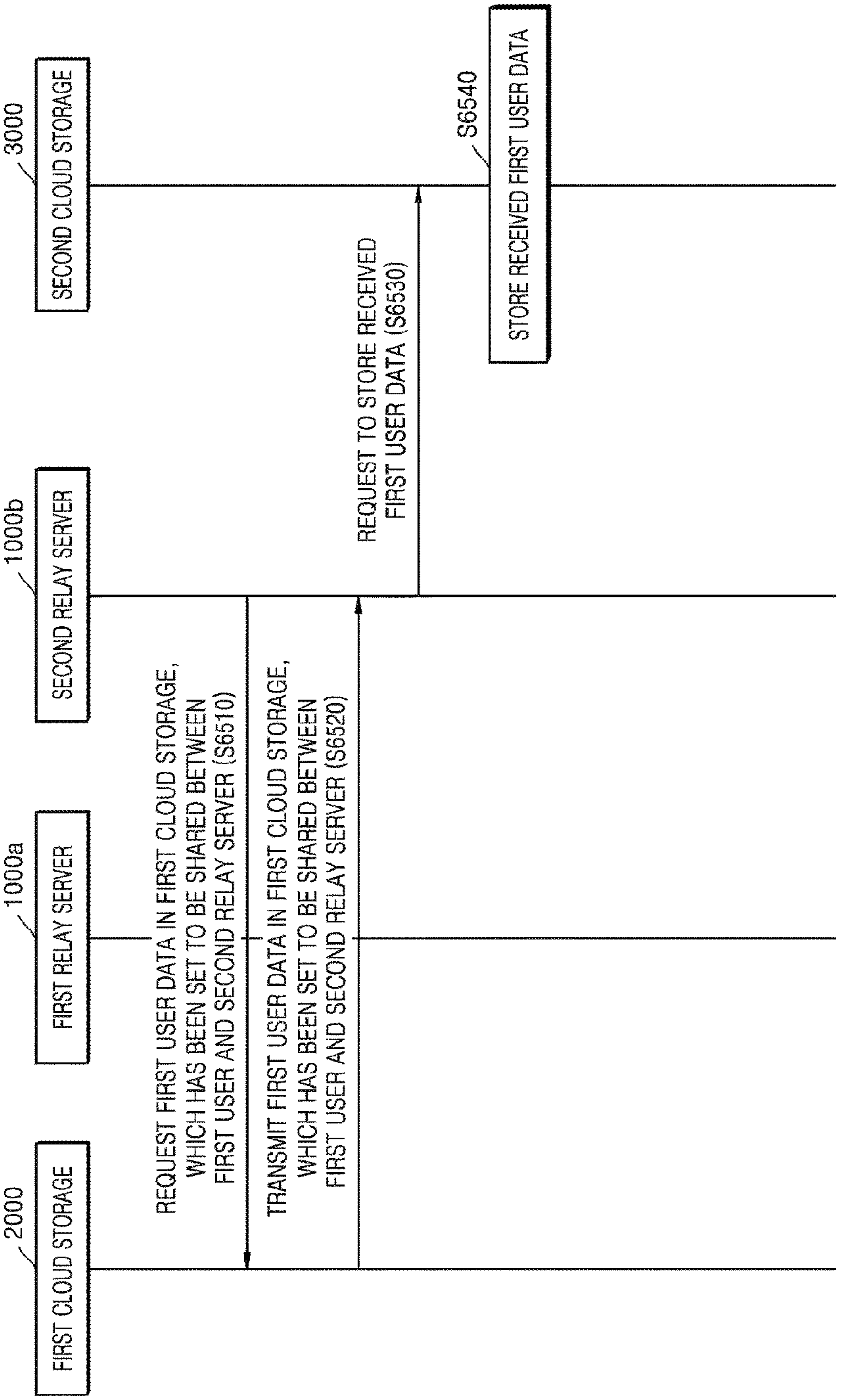
FIG. 65 is a flow diagram illustrating a method for the second relay server to receive the data of the first user from the first cloud storage and store the received data of the first user in the second cloud storage, according to an exemplary embodiment.

FIG. 65 is a flow diagram illustrating a method for the second relay server 1000*b* to receive the data of the first user from the first cloud storage 2000 and store the received data of the first user in the second cloud storage 3000, according to an exemplary embodiment.

Referring to FIG. 65, in operation S6510, the second relay server 1000*b* requests the first user data stored in the first cloud storage 2000, which has been set to be shared between the first user and the second user or the second relay server 1000*b*, from the first cloud storage 2000.

The request for the first user data stored in the first cloud storage 2000 may include the ID of the second user registered in the first cloud storage 2000 and the position information representing the position of the first user data stored in the first cloud storage 2000.

In operation S6520, the first cloud storage 2000 transmits the first user data stored in the first cloud storage 2000, which has been set to be shared between the first user and the second user or the second relay server 1000*b*, to the second relay server 1000*b*.

The first cloud storage 2000 may determine whether the second user has the access right to the first user data. When determining that the second user has the access right to the first user data, the first cloud storage 2000 may transmit the first user data to the second relay server 1000*b*.

In operation S6530, the second relay server 1000*b* requests the second cloud storage 3000 to store the received first user data stored in the first cloud storage 2000, which has been set to be shared between the first user and the second user, in the second user storage space in the second cloud storage 3000.

The second relay server 1000*b* may store the first user data received from the first cloud storage 2000 in the second relay server 1000*b*.

For example, the second relay server 1000*b* may store the received first user data in the folder in the second relay server 1000*b* that is synchronized with the second user folder in the second cloud storage 3000. When the received first user data is stored in the folder in the second relay server 1000*b* that is synchronized with the second user folder in the second cloud storage 3000, the received first user data may be upload to the second user folder in the second cloud storage 3000.

In operation S6540, the second cloud storage 3000 stores the received first user data stored in the first cloud storage 2000, which has been set to be shared between the first user and the second user.

The second cloud storage 3000 may store the data received from the second relay server 1000*b* in the second user storage space.

Figure 66:
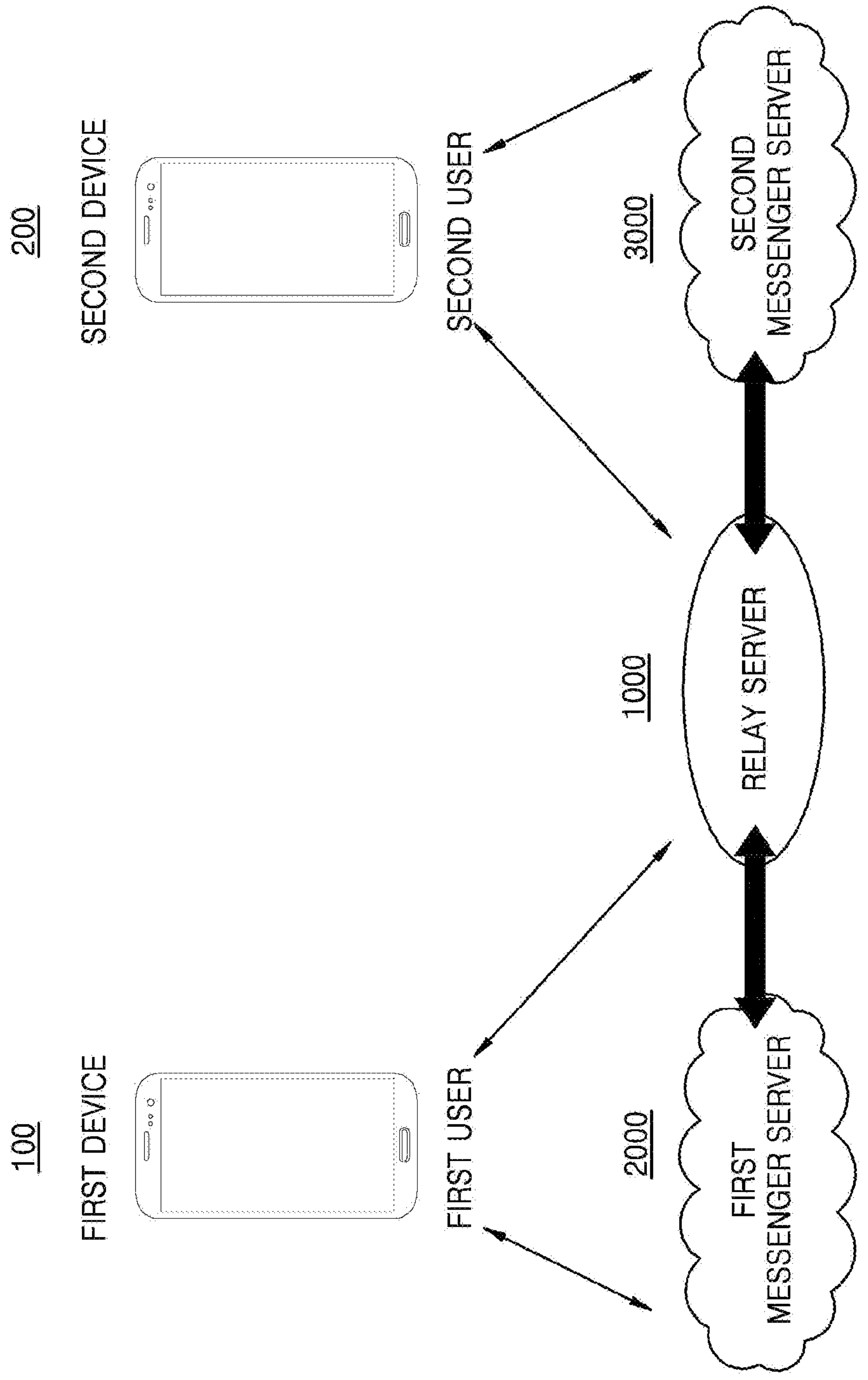
FIG. 66 is a diagram illustrating the relay server for relaying message transmission between users using different messenger services when cloud servers are messenger servers, according to an exemplary embodiment.

FIG. 66 is a diagram illustrating the relay server 1000 for relaying message transmission between users using different messenger services when cloud servers are messenger servers, according to an exemplary embodiment.

Referring to FIG. 66, the first messenger server 2000 and the second messenger server 3000 may be messenger servers that are operated by different service providers.

The messenger server 2000 or 3000 may transmit messages, which are communicated between the users registered in the messenger server 2000 or 3000, to the device 100 or 200 of the users. In this case, the messenger server 2000 or 3000 may transmit only the messages communicated between the users set as messenger friends in the messenger server 2000 or 3000.

Also, when receiving a request for adding another user as a friend of the user from the device 100 or 200, the messenger server 2000 or 3000 may determine whether the requesting device 100 or 200 has the right to add another user as a messenger friend of the user.

For example, the first messenger server 2000 may receive a request for adding a third user as a messenger friend of the first user from the relay server 1000. In this case, the first messenger server 2000 may receive right information for adding another user as a messenger friend of the first user, together with the messenger friend adding request, from the relay server 1000. When receiving the right information from the relay server 1000, the first messenger server 2000 may determine whether the relay server 1000 has the right to add the third user as a messenger friend of the first user, based on the received right information.

By connecting the messenger server 2000 or 3000 subscribed by the users, the relay server 1000 may relay message transmission between the users using different messenger services.

For example, the relay server 1000 may receive right information for adding another user as a messenger friend of the first user in the first messenger server 2000 from the first device 100. The relay server 1000 may register the relay server 1000 as a messenger friend of the first user in the first messenger server 2000 based on the right information received from the first device 100.

Also, the relay server 1000 may receive right information for adding another user as a messenger friend of the second user in the second messenger server 3000 from the second device 200. The relay server 1000 may register the relay server 1000 as a messenger friend of the second user in the second messenger server 3000 based on the right information received from the second device 200.

As a first messenger friend of the first user, the relay server 1000 may receive a message of the first user from the first messenger server 2000. As a second messenger friend of the second user, the relay server 1000 may request the second messenger server 3000 to transmit the message of the first user received from the first messenger server 2000 to the second user.

Also, as the second messenger friend of the second user, the relay server 1000 may receive a message of the second user from the second messenger server 3000. As the first messenger friend of the first user, the relay server 1000 may request the first messenger server 2000 to transmit the message of the second user received from the second messenger server 3000 to the first user.

Accordingly, the relay server 1000 may relay message transmission between the first user and the second user that use different messenger services.

Figure 67A:
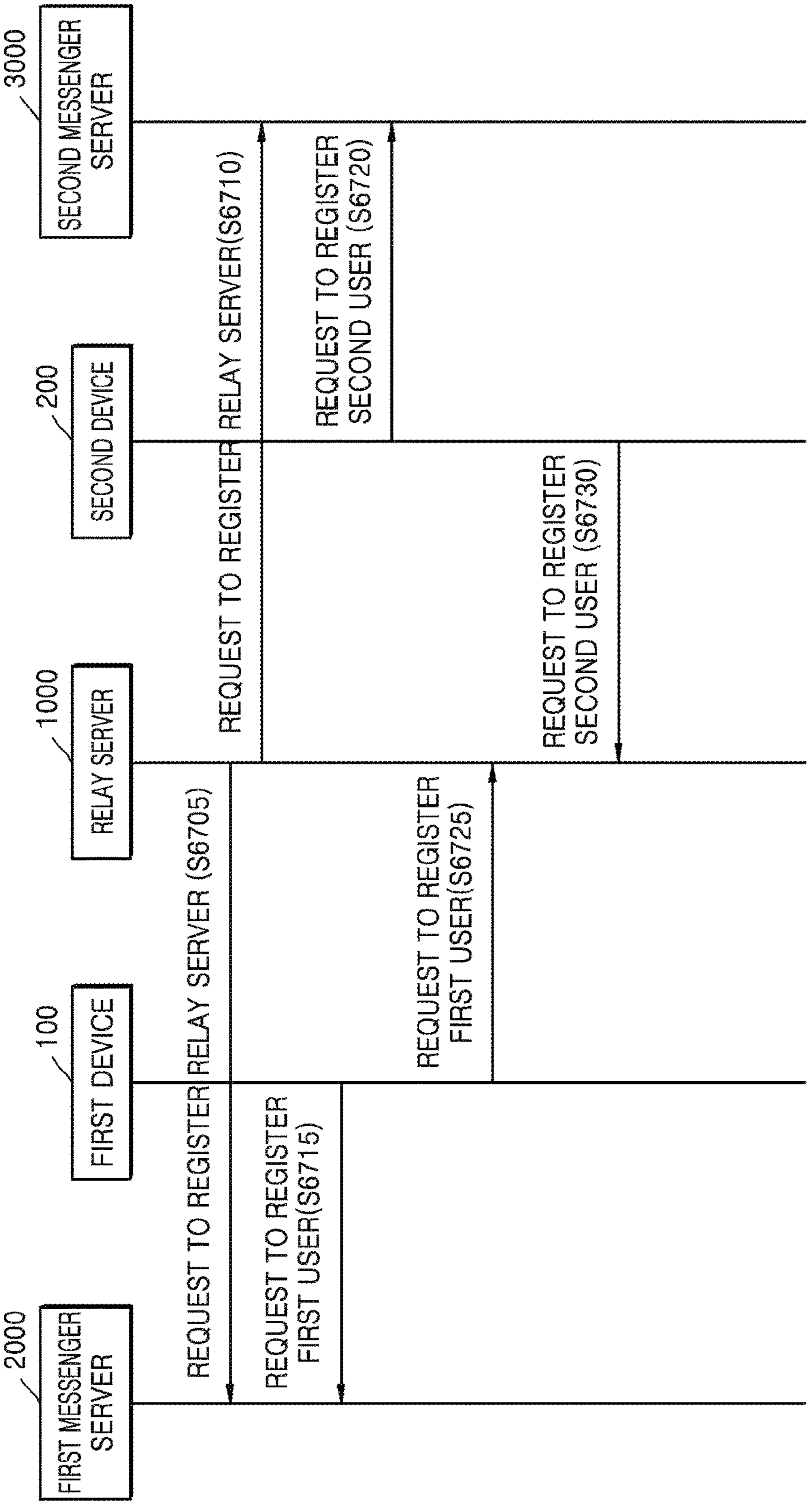
FIG. 67A is a flow diagram illustrating a method for the device and the relay server to register accounts in the messenger server and a method for the device to register an account in the relay server, according to an exemplary embodiment.

FIG. 67A is a flow diagram illustrating a method for the device 100 or 200 and the relay server 1000 to register accounts in the messenger server 2000 or 3000 and a method for the device 100 or 200 to register an account in the relay server 1000, according to an exemplary embodiment.

Referring to FIG. 67A, in operation S6705, the relay server 1000 requests the first messenger server 2000 to register the relay server 1000.

When receiving the registration request from the relay server 1000, the first messenger server 2000 may generate a first messenger account of the relay server 1000 and store information about the generated account. In this case, the first messenger account of the relay server 1000 may be an account as a third party, not an account as a user of the first messenger server 2000.

In operation S6710, the relay server 1000 requests the second messenger server 3000 to register the relay server 1000.

When receiving the registration request from the relay server 1000, the second messenger server 3000 may generate a second messenger account of the relay server 1000 and store information about the generated account. In this case, the second messenger account of the relay server 1000 may be an account as a third party, not an account as a user of the second messenger server 3000.

In operation S6715, the first device 100 transmits a request to register the first user to the first messenger server 2000.

For example, when receiving a first user input for executing an application distributed by the service provider of the first messenger server 2000, the first device 100 may request the first messenger server 2000 to register the first user.

In this case, the first device 100 may transmit the address information of the first device 100 and the account information of the first user, which will be registered in the first messenger server 2000, to the first messenger server 2000. The address information of the device may include, but is not limited to, the IP address of the device or the identification information of the device registered in a push server. Also, the account information may include at least one of the ID and the password.

The first messenger server 2000 may register the first user as a user subscribing a first messenger service in the first messenger server 2000. In this case, the first messenger server 2000 may store the address information of the first device 100 corresponding to the account information of the first user received from the first device 100.

In operation S6720, the second device 200 transmits a request to register the second user to the second messenger server 3000.

In this case, the second device 200 may transmit the address information of the second device 200 and the account information of the second user, which will be registered in the second messenger server 3000, to the second messenger server 3000.

The second messenger server 3000 may register the second user as a user subscribing a second messenger service in the second messenger server 3000. In this case, the second messenger server 3000 may store the address information of the second device 200 corresponding to the account information of the second user received from the second device 200.

In operation S6725, the first device 100 transmits a request to register the first user to the relay server 1000.

For example, when receiving a first user input for executing an application distributed by the service provider of the relay server 1000, the first device 100 may request the relay server 1000 to register the first user.

In this case, the first device 100 may transmit the account information of the first user, which will be registered in the relay server 1000, to the relay server 1000.

Also, the first device 100 may transmit information about the first messenger service subscribed by the first user to the relay server 1000. The information about the first messenger service may include the identification information of the first messenger service or the address information of the first messenger server 2000.

Also, the first device 100 may transmit unique information of the first user to the relay server 1000. The unique information of the first user may include, but is not limited to, the resident registration number and the contact address of the first user. The contact address of the first user may include, but is not limited to, the e-mail address and the phone number of the first user.

When receiving the account information of the first user, the information about the first messenger service, and the unique information of the first user from the first device 100, the relay server 1000 may register the first user as a user of the relay server 1000 in the relay server 1000. In this case, the relay server 1000 may store the information about the first messenger service and the unique information of the first user corresponding to the ID of the first user.

In operation S6730, the second device 200 transmits a request to register the second user to the relay server 1000.

Operation S6730 may be similar to operation S6725.

FIG. 67B is a diagram illustrating a DB 6700 storing information about the users subscribed in the relay server, according to an exemplary embodiment.

Referring to FIG. 67B, the relay server 1000 may store account information of each user.

Also, the relay server 1000 may store identification information 6720 of each messenger service subscribed by each user, a user ID 6730 registered in each messenger server, and unique information 6740 of each user, corresponding to a user ID 6710.

Also, according to an exemplary embodiment, the relay server 1000 may store contact addresses of persons related to each user, which are stored in the device 100 or 200 of each user.

Figure 68A:
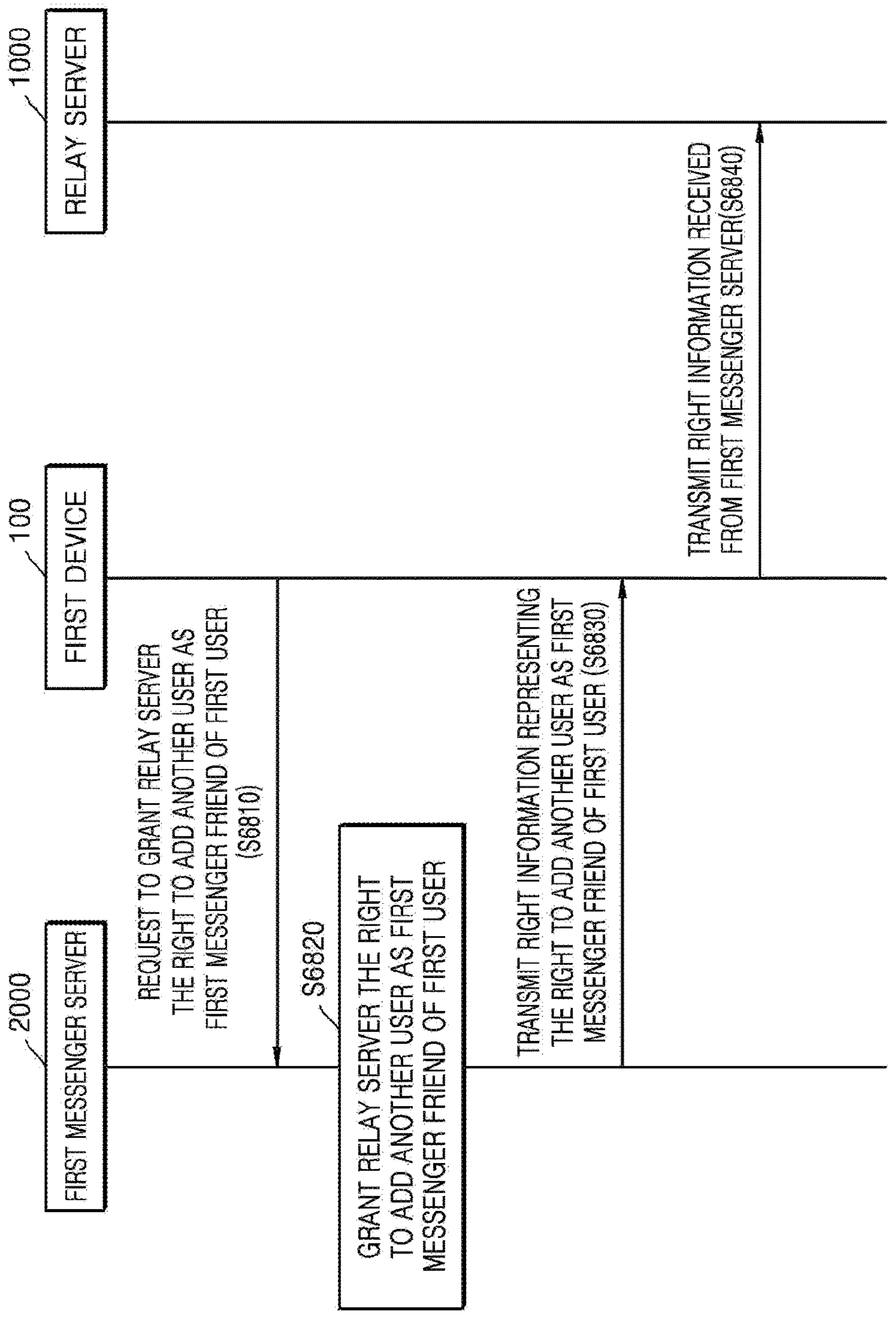
FIG. 68A is a flow diagram illustrating a method for the relay server to acquire the right of the first user about the first messenger server, according to an exemplary embodiment.

FIG. 68A is a flow diagram illustrating a method for the relay server 1000 to acquire the right of the first user about the first messenger server 2000, according to an exemplary embodiment.

Referring to FIG. 68A, in operation S6810, the first device 100 requests the first messenger server 2000 to grant the relay server 1000 the right to add another user as the first messenger friend of the first user.

Figure 68B:
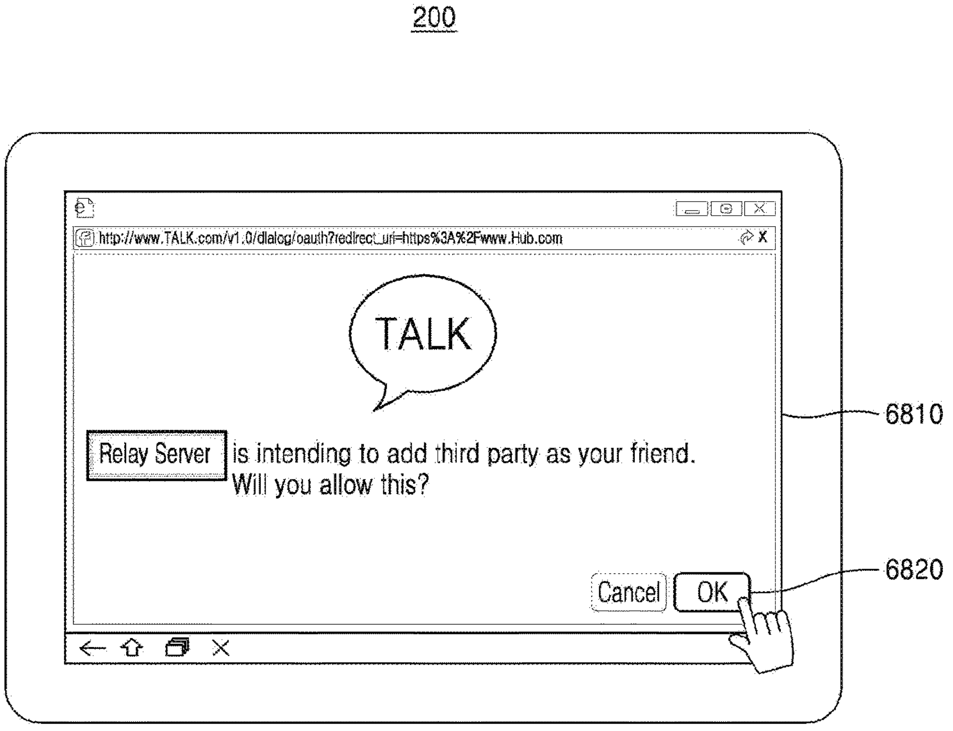
FIG. 68B is a diagram illustrating a UI for granting the relay server the right of the first user about the first messenger server, according to an exemplary embodiment.

For example, as illustrated in FIG. 68B, the first device 100 may provide a UI for selecting whether to grant the relay server 1000 the right to add another user as the first messenger friend of the first user.

When receiving a first user input for selecting to grant the relay server 1000 the right to add another user as the first messenger friend of the first user, the first device 100 may request the first messenger server 2000 to grant the relay server 1000 the right to add another user as the first messenger friend of the first user.

In this case, the first device 100 may transmit the first messenger account information of the first user and the first messenger ID of the relay server 1000 to the first messenger server 2000.

In operation S6820, the first messenger server 2000 grants the relay server 1000 the right to add another user as the first messenger friend of the first user.

The first messenger server 2000 may authenticate the first user based on the received first messenger account information of the first user. When the first user is authenticated, the first messenger server 2000 may generate the right information representing the right to add another user as the messenger friend of the first user. The first messenger server 2000 may store the generated right information corresponding to the first messenger ID of the first user and the first messenger ID of the relay server 1000.

In operation S6830, the first messenger server 2000 transmits the right information representing the right to add another user as the first messenger friend of the first user to the first device 100.

In operation S6840, the first device 100 transmits the right information received from the first messenger server 2000 to the relay server 1000.

In this case, the first device 100 may transmit the relay server ID of the first user together with the right information to the relay server 1000.

Also, in the same way, the relay server 1000 may acquire the right of the second user about the second messenger server 3000.

FIG. 68B is a diagram illustrating a UI for granting the relay server 1000 the right of the first user about the first messenger server 2000, according to an exemplary embodiment.

Referring to FIG. 68B, the first device 100 may provide a UI for allowing the relay server 1000 to acquire the right of the first user about the first messenger server 2000.

By executing an application distributed by the service provider operating the relay server 1000, the first device 100 may display a UI for selecting whether to grant the relay server 1000 the right to add another user as the first messenger friend of the first user.

For example, when receiving a user input for selecting to grant the relay server 1000 the right to add another user as the messenger friend of the first user, the first device 100 may request the first messenger server 2000 to grant the relay server 1000 the right to add another user as the first messenger friend of the first user.

In response to the right granting request, the first messenger server 2000 may request the first device 100 to authenticate the first user. When the authentication is completed, the first messenger server 2000 may transmit a web page 6810 for determining whether to grant the relay server 1000 the right to add another user as the messenger friend of the first user to the first device 100.

When receiving a user input for selecting an OK button 6820, the first device 100 may receive the right information representing the right to add another user as the first messenger friend of the first user from the first messenger server 2000 and transmit the received right information to the relay server 1000.

FIG. 68C is a diagram illustrating a DB 6800 that the relay sever 1000 stores when receiving right information from the device 200 or 300, according to an exemplary embodiment.

Referring to FIG. 68C, the relay server 1000 may store right information 6750 representing the right to add another user as the messenger friend of the user corresponding to the relay server ID of the user.

For example, the relay server 1000 may store the right information 6750 representing the right to add another user as the first messenger friend of the first user, which has been received from the first device 100, corresponding to the relay server ID of the user. Remaining portions of the DB 6800 may correspond to the portions of the DB 6700 of FIG. 67B.

Figure 69A:
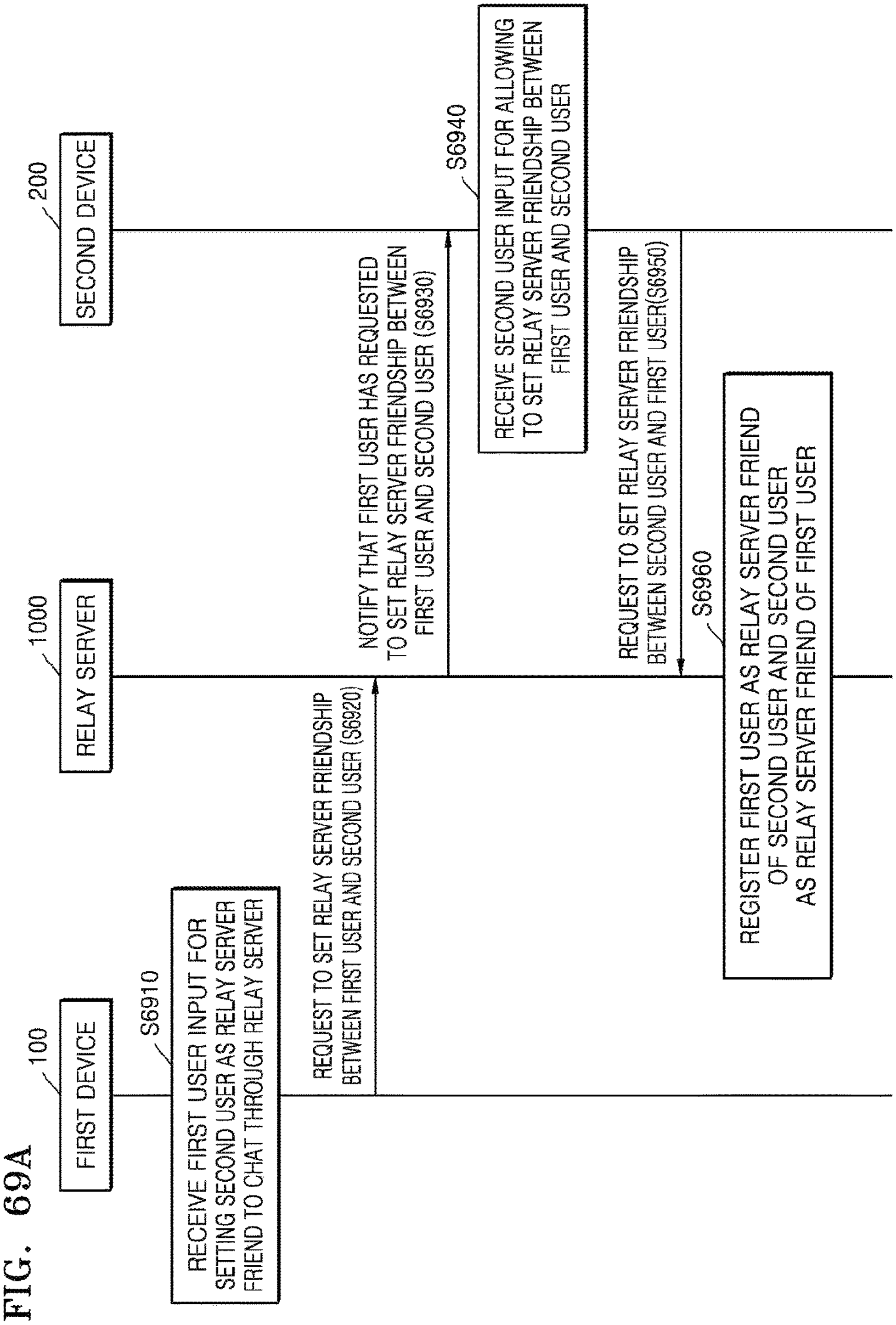
FIG. 69A is a diagram illustrating a method for the relay server to register the first user and the second user as relay server friends between each other, according to an exemplary embodiment.

FIG. 69A is a diagram illustrating a method for the relay server 1000 to register the first user and the second user as relay server friends between each other, according to an exemplary embodiment.

Referring to FIG. 69A, in operation S6910, the first device 100 receives a first user input for setting the second user as a relay server friend to chat through the relay server 1000.

Figure 69B:
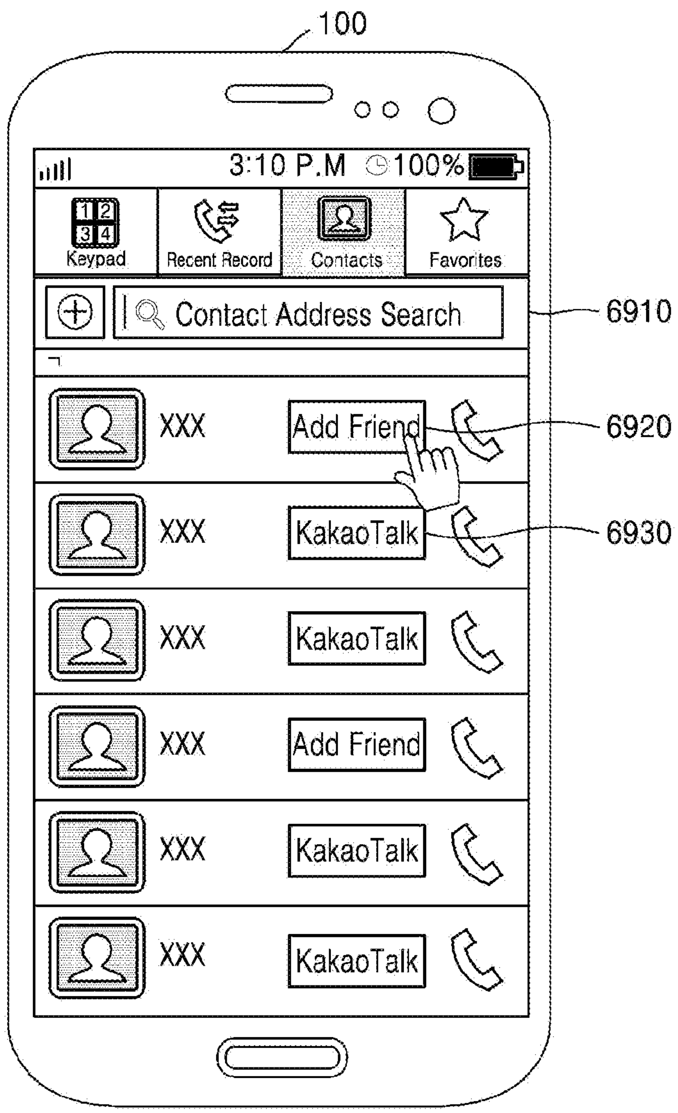
FIG. 69B is a diagram illustrating a method for the first device to receive a first user input for setting the second user as a relay server friend to chat with through the relay server, according to an exemplary embodiment.

For example, as illustrated in FIG. 69B, the first device 100 may provide a UI for setting the user whose contact address is stored in the first device 100 as the relay server friend to chat through the relay server 1000.

In operation S6920, the first device 100 requests the relay server 1000 to set the relay server friendship between the first user and the second user.

For example, when receiving a first user input for setting the second user as the relay server friend, the first device 100 may request the relay server 1000 to set the relay server friendship between the first user and the second user.

In this case, the first device 100 may transmit the relay server ID of the first user and the unique information of the second user stored in the first device 100 to the relay server 1000. Also, according to an exemplary embodiment, when the relay server ID of the second user is stored in the first device 100, the first device 100 may transmit the relay server ID of the second user together with the relay server ID of the first user to the relay server 1000.

In operation S6930, the relay server 1000 notifies the second device 200 that the first user has requested to set the relay server friendship between the first user and the second user.

For example, when receiving the request for setting the relay server friendship between the first user and the second user from the first device 100, the relay server 1000 may acquire the relay server ID of the second user based on the unique information of the second user received from the first device 100. For example, the relay server 1000 may determine the user having the same unique information as the unique information received from the first device 100 as the second user and acquire the ID of the second user.

Based on the address information of the second device 200 stored corresponding to the acquired ID of the second user, the relay server 1000 may notify the second device 200 that the request for setting the relay server friendship between the first user and the second user has been received from the first user.

In this case, the relay server 1000 may transmit the relay server ID of the first user, the name or the unique information of the first user, and the identification information of the second messenger service to the second device 200.

In operation S6940, the second device 200 receives a second user input for allowing to set the relay server friendship between the first user and the second user.

Figure 69C:
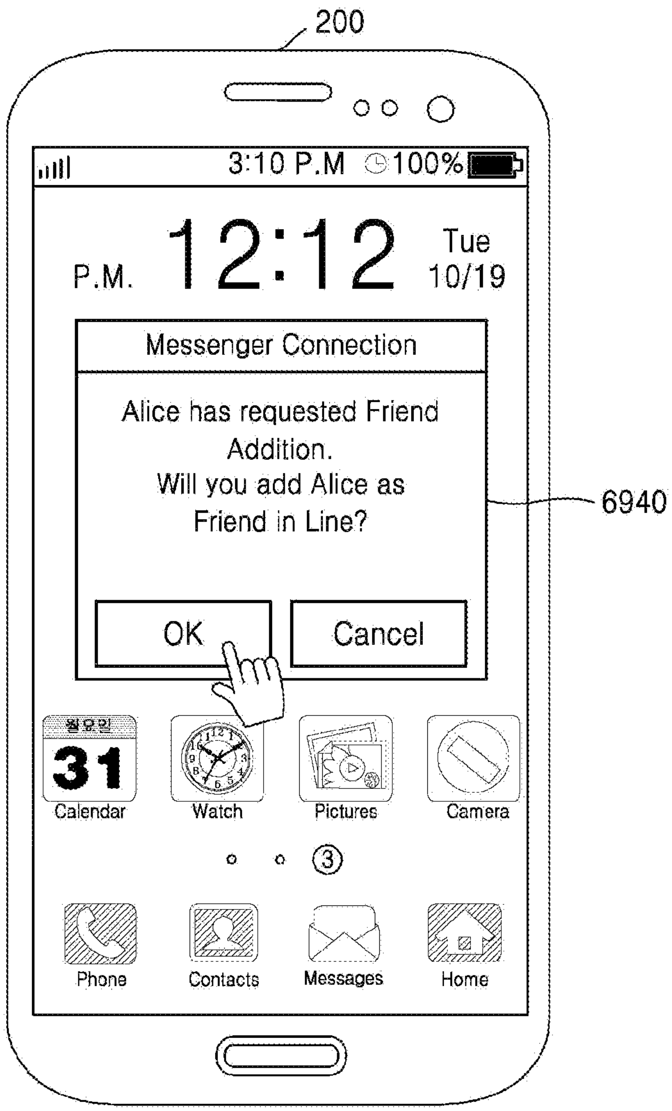
FIG. 69C is a diagram illustrating a method for the second device to receive a second user input for allowing to set a relay server friendship between the first user and the second user from the second user, according to an exemplary embodiment.

For example, as illustrated in FIG. 69C, when receiving the relay server friendship setting request of the first user from the relay server 1000, the second device 200 may display a notification popup indicating that the request for setting the relay server friendship between the first user and the second user has been received from the first user. By receiving a second user input for selecting an OK button in the notification popup, the second device 200 may receive a second user input for allowing to set the relay server friendship between the first user and the second user.

In operation S6950, the second device 200 requests the relay server 1000 to set the relay server friendship between the second user and the first user.

In this case, the second device 200 may transmit the relay server ID of the first user and the relay server ID of the second user to the relay server 1000.

In operation S6960, the relay server 1000 registers the first user as the relay server friend of the second user and the second user as the relay server friend of the first user.

The relay server 1000 may store the relay server ID of the second user as the relay server friend corresponding to the relay server ID of the first user. Also, the relay server 1000 may store the relay server ID of the first user as the relay server friend corresponding to the relay server ID of the second user.

FIG. 69B is a diagram illustrating a method for the first device 100 to receive a first user input for setting the second user as a relay server friend to chat with through the relay server 1000, according to an exemplary embodiment.

Referring to FIG. 69B, the first device 100 may provide a UI for setting the user whose contact address is stored in the first device 100 as the relay server friend to chat through the relay server 1000.

For example, when receiving a first user input for displaying the contact addresses stored in the first device 100, the first device 100 may display a page 6910 representing the identification information of the users whose contact addresses are stored therein. In this case, the first device 100 may display buttons 6920 and 6930 for chatting with each user, together with the identification information of the users whose contact addresses are stored therein. Also, the first device 100 may display information indicating whether the users are the first messenger friends of the first user on the buttons for chatting with the users.

For example, when the user is not registered as the first messenger friend of the first user in the first messenger server 2000, the first device 100 may display the button 6920 for registering the selected user as the relay server friend. For example, the user having identification information "Linda Kim" may not have been registered as the messenger friend of the first user in the first messenger server 2000. In this case, the first device 100 may display the button 6920 for registering "Linda Kim" as the relay server friend of the first user.

Also, when the user is registered as the messenger friend of the first user in the first messenger server 2000, the first device 100 may execute a first messenger application and display the button 6930 for chatting with the selected user.

The first device 100 may determine whether the users have been registered as the first messenger friends in the first messenger server 2000.

For example, the first device 100 may receive the contact addresses of the users registered as the messenger friends of the first user from the first messenger server 2000. The first device 100 may compare the contact address stored in the first device 100 with the contact address received from the first messenger server 2000 and determine that the users having the same contact address as the contact address received from the first messenger server 2000 has been registered as the messenger friends in the first messenger server 2000.

For example, when the messenger IDs of the messenger friends of the first user are stored in the first device 100, the first device 100 may receive the messenger IDs of the users registered as the messenger friends of the first user from the first messenger server 2000 and compare the received messenger IDs with the stored messenger IDs to determine that the users have been registered as the messenger friends in the first messenger server 2000.

When receiving a user input for selecting the button 6920 corresponding to "Linda Kim", the first device 100 may request the relay server 1000 to set the relay server friendship between the first user and the user corresponding to "Linda Kim".

FIG. 69C is a diagram illustrating a method for the second device 200 to receive a second user input for allowing to set a relay server friendship between the first user and the second user from the second user, according to an exemplary embodiment.

Referring to FIG. 69C, when receiving the relay server friendship setting request of the first user from the relay server 1000, the second device 200 may display a notification popup 6940 indicating that the request for setting the relay server friendship between the first user and the second user has been received.

Also, the second device 200 may display an OK button for receiving a user input for allowing to set the relay server friendship between the first user and the second user on the notification popup 6940.

When receiving a user input for selecting the OK button in the notification popup 6940, the second device 200 may request the relay server 1000 to set the relay server friendship between the second user and the first user.

FIG. 69D is a diagram illustrating a DB 6900 stored in the relay server 1000 when a relay server friendship is set between the users, according to an exemplary embodiment.

Referring to FIG. 69D, the relay server 1000 may store a relay server ID 6950 of the relay server friend of the user corresponding to the relay server ID 6710 of the user.

For example, the relay server 1000 may store the relay server ID of the second user as the relay server friend corresponding to the relay server ID of the first user.

Figure 70A:
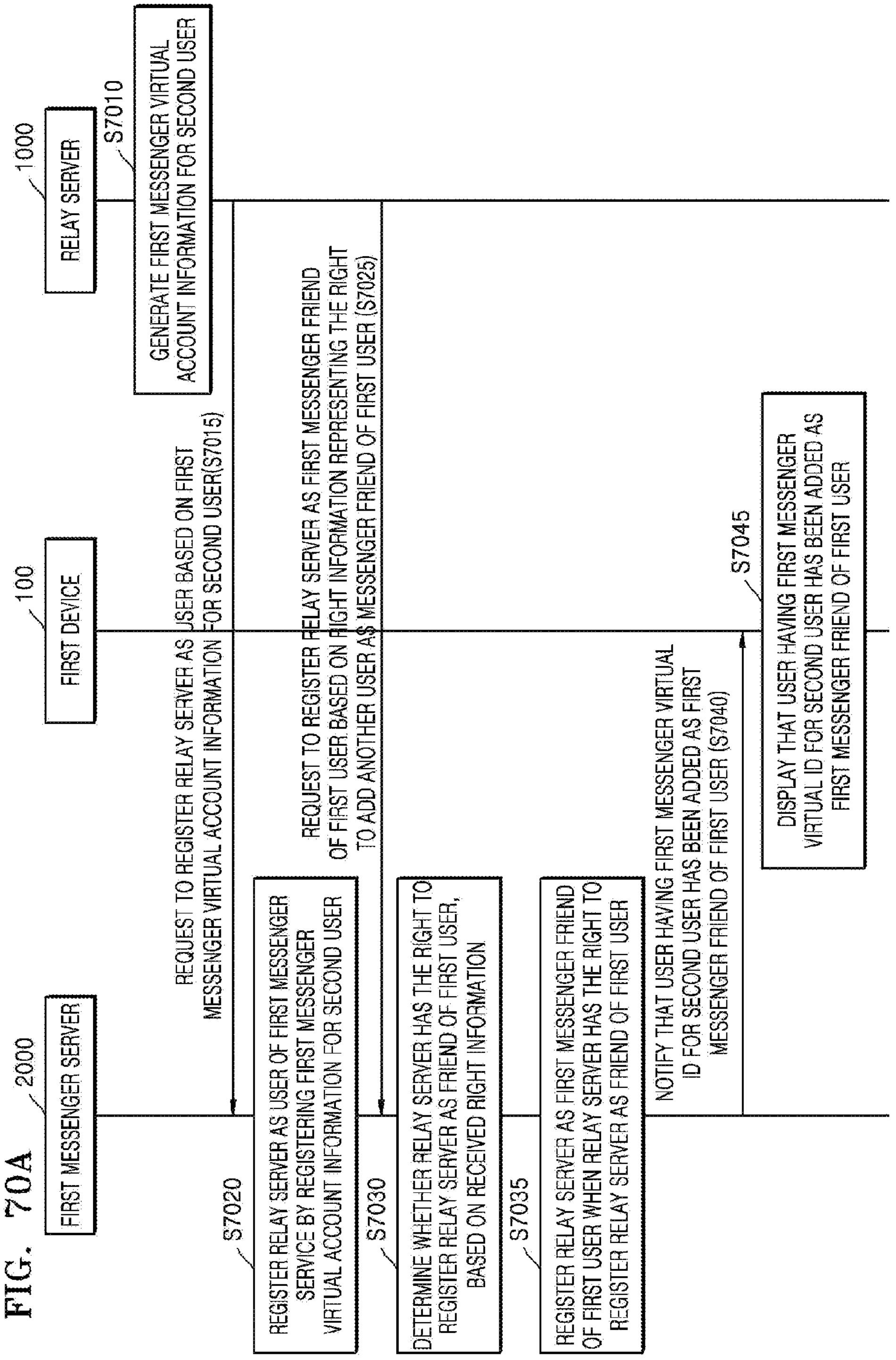
FIG. 70A is a flow diagram illustrating a method for the relay server to register the relay server as the second user in the first messenger server and register the relay server as the first messenger friend of the first user in the first messenger server based on the right information of the first user, according to an exemplary embodiment.

FIG. 70A is a flow diagram illustrating a method for the relay server 1000 to register the relay server 1000 as the second user in the first messenger server 2000 and register the relay server 1000 as the first messenger friend of the first user in the first messenger server 2000 based on the right information of the first user, according to an exemplary embodiment.

Referring to FIG. 70A, in operation S7010, the relay server 1000 generates first messenger virtual account information for the second user.

When the relay server friendship is set between the first user and the second user, the relay server 1000 may generate the first messenger virtual account information for the second user. The first messenger virtual account information for the second user may be referred to as first messenger virtual account information of the first user.

The first messenger virtual account information for the second user may include a first messenger virtual ID for the second user and a first messenger virtual password for the second user.

For example, the relay server 1000 may generate a coined word and determine the coined word as the first messenger virtual ID for the second user. Also, the relay server 1000 may determine the relay server ID of the second user or the name or unique information of the second user as the first messenger virtual ID for the second user.

Also, the relay server 1000 may generate the first messenger virtual password for the second user.

In operation S7015, the relay server 1000 requests the first messenger server 2000 to register the relay server 1000 as the user based on the first messenger virtual account information for the second user.

In this case, the relay server 1000 may transmit the first messenger virtual account information for the second user and the address information of the relay server 1000 to the first messenger server 2000. The address information of the relay server 1000 may include the IP address information of the relay server 1000 or the identification information of the relay server 1000 registered in the push server.

Also, according to an exemplary embodiment, when the first messenger server 2000 requests to register a nickname corresponding to the account, the relay server 1000 may transmit not only the first messenger virtual account information for the second user but also the nickname of the second user to the first messenger server 2000. The nickname of the second user may be information that the second user registers as the display information of the second user to be used in unsubscribed messenger services when the second user subscribes the relay server 1000.

In operation S7020, the first messenger server 2000 registers the relay server 1000 as the user of the first messenger service by registering the first messenger virtual account information for the second user.

The first messenger server 2000 may register the relay server 1000 as the user of the first messenger service by registering the first messenger virtual account information for the second user received from the relay server 1000. Also, the first messenger server 2000 may store the address information of the relay server 1000 corresponding to the first messenger virtual account information for the second user.

In operation S7025, the relay server 1000 requests the first messenger server 2000 to register the relay server 1000 as the first messenger friend of the first user based on the right information representing the right to add another user as the first messenger friend of the first user.

In this case, the relay server 1000 may transmit the first messenger ID of the first user, the right information, and the first messenger virtual account information of the second user to the first messenger server 2000.

In operation S7030, the first messenger server 2000 determines whether the relay server 1000 has the right to register the relay server 1000 as the messenger friend of the first user, based on the received right information.

For example, when the received right information is the right information that is distributed to the relay server 1000 by the first messenger server 2000 based on the first user input, the first messenger server 2000 may compare the right information distributed to the relay server 1000 with the right information stored in the first messenger server 2000 and determine that the relay server 1000 has the right to register the messenger friend of the first user.

Also, according to an exemplary embodiment, when the received right information is the password and the first messenger ID of the first user, the first messenger server 2000 may authenticate the relay server 1000 as the first user based on the received password and first messenger ID of the first user.

In operation S7035, the first messenger server 2000 registers the relay server 1000 as the first messenger friend of the first user when the relay server 1000 has the right to register the relay server 1000 as the friend of the first user.

The first messenger server 2000 may store the first messenger virtual ID information of the second user as the first messenger friend ID of the first user corresponding to the first messenger ID of the first user.

In operation S7040, the first messenger server 2000 notifies the first device 100 that the user having the first messenger virtual ID information for the second user has been added as the first messenger friend of the first user.

In this case, the first messenger server 2000 may transmit the first messenger virtual ID of the second user to the first device 100. Also, according to an exemplary embodiment, the first messenger server 2000 may transmit the name of the second user, the unique information of the second user, and the nickname of the second user to the first device 100.

In operation S7045, the first device 100 displays that the user having the first messenger virtual ID information for the second user has been added as the first messenger friend of the first user.

The first device 100 may display that the second user has been added as the first messenger friend of the first user, by displaying the first messenger virtual ID of the second user, the name of the second user, the unique information of the second user, or the nickname of the second user received from the first messenger server 2000.

Figure 70B:
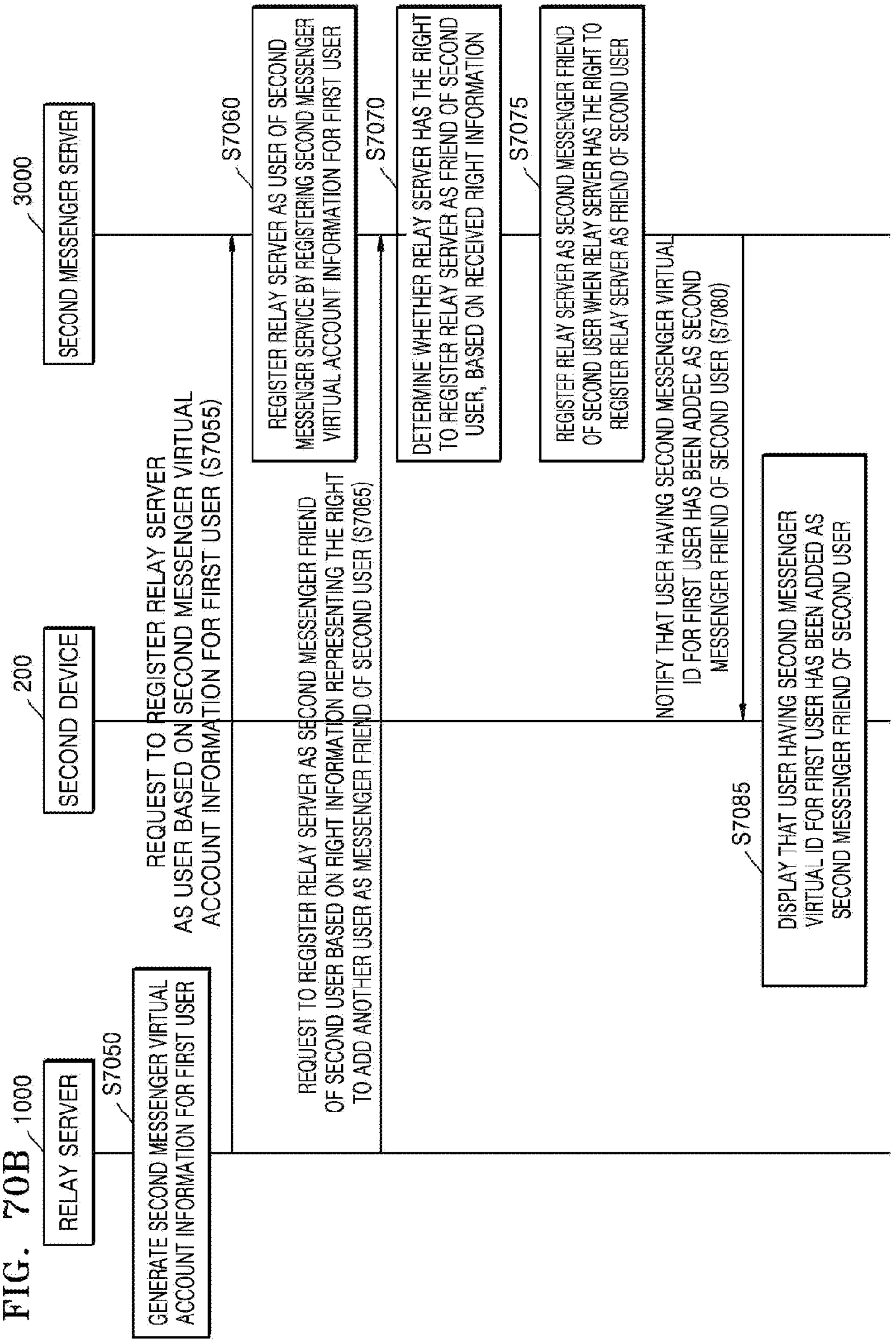
FIG. 70B is a flow diagram illustrating a method for the relay server to register the relay server as the first user in the second messenger server and register the relay server as the second messenger friend of the second user in the second messenger server based on the right information of the second user, according to an exemplary embodiment.

FIG. 70B is a flow diagram illustrating a method for the relay server 1000 to register the relay server 1000 as the first user in the second messenger server 3000 and register the relay server 1000 as the second messenger friend of the second user in the second messenger server 3000 based on the right information of the second user, according to an exemplary embodiment.

In operation S7050, the relay server 1000 generates second messenger virtual account information for the first user. In operation S7055, the relay server 1000 requests the second messenger server 3000 to register the relay server 1000 as the user based on the second messenger virtual account information for the first user. In operation S7060, the second messenger server 3000 registers the relay server 1000 as the user of the second messenger service by registering the second messenger virtual account information for the first user. In operation S7065, the relay server 1000 requests the second messenger server 3000 to register the relay server 1000 as the second messenger friend of the second user based on the right information representing the right to add another user as the messenger friend of the second user. In operation S7070, the second messenger server 3000 determines whether the relay server 1000 has the right to register the relay server 1000 as the messenger friend of the second user, based on the received right information. In operation S7075, the second messenger server 3000 registers the relay server 1000 as the second messenger friend of the second user when the relay server 1000 has the right to register the relay server 1000 as the friend of the second user. In operation S7080, the second messenger server 3000 notifies the second device 200 that the user having the second messenger virtual ID information for the first user has been added as the second messenger friend of the second user. In operation S7085, the first device 200 displays that the user having the second messenger virtual ID information for the first user has been added as the second messenger friend of the second user.

Operations S7050 to S7085 may correspond to operations S7010 to S7045.

FIG. 70C is a diagram illustrating a DB 7000 generated in the relay server 1000 when the relay server 1000 registers virtual account information for the users in the messenger servers, according to an exemplary embodiment.

Referring to FIG. 70C, the relay server 1000 may store virtual account information 7020 registered in the messenger server for the user corresponding to a relay server ID 7010 of the user.

For example, when the virtual account information for the first user is registered in the second messenger server 3000, the relay server 1000 may store the second messenger virtual account information for the first user corresponding to the relay server ID of the first user.

The virtual account information corresponding to one user may be different or identical according to messenger services. Also, the virtual ID may be unique information such as the e-mail address and the phone number of the user, or may be a coined word generated by the relay server.

Figure 70D:
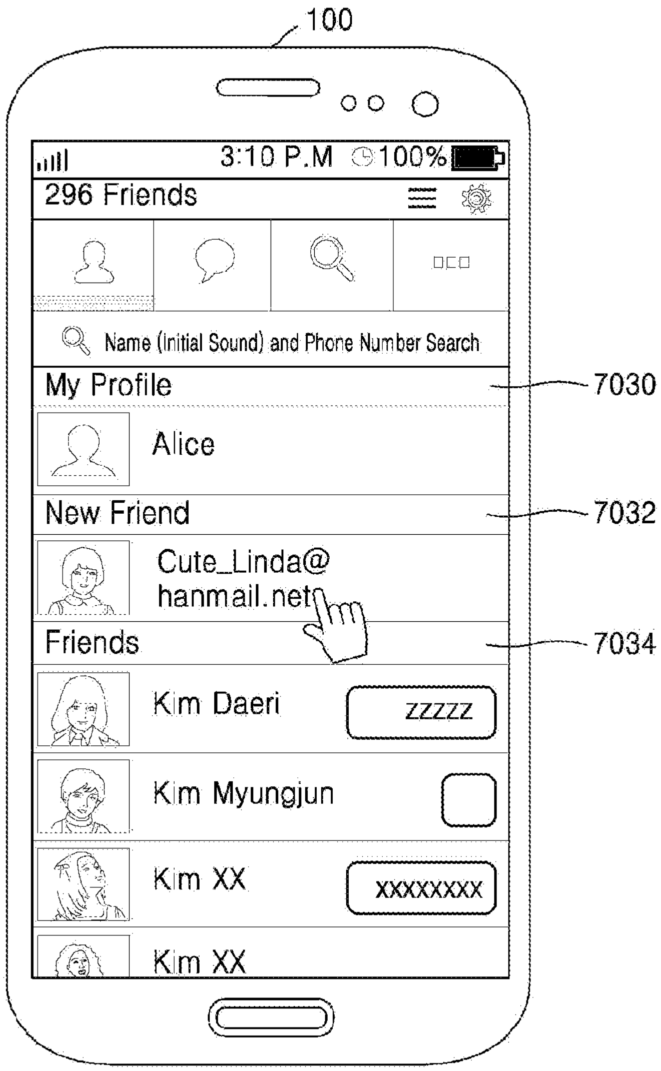
FIG. 70D is a diagram illustrating a method for the first device to display that the user having a first messenger virtual identifier (ID) of the second user has been added as the first messenger friend of the first user, according to an exemplary embodiment.

FIG. 70D is a diagram illustrating a method for the first device 100 to display that the user having a first messenger virtual ID of the second user has been added as the first messenger friend of the first user, according to an exemplary embodiment.

Referring to FIG. 70D, the first device 100 may display that the user having the first messenger virtual ID of the second user has been added as the first messenger friend of the first user.

For example, from the first messenger server 2000, the first device 100 may receive information indicating that the user having the first messenger virtual ID of the second user has been added as the first messenger friend of the first user. Also, according to an exemplary embodiment, the first device 100 may receive the nickname of the user having the first messenger virtual ID of the second user from the first messenger server 2000.

When receiving a user input for executing the first messenger application for providing the first messenger service, the first device 100 may display the addition of the second user by displaying the first messenger virtual ID of the second user received from the first messenger server 2000.

For example, when receiving the user input for executing the first messenger application for providing the first messenger service, the first device 100 may display an item 7030 representing the first messenger ID of the first user, an item 7032 representing the user that is newly as the first messenger friend of the first user, and an item 7034 representing the first messenger friend of the first user that is previously added.

When the first messenger virtual ID of the second user received from the first messenger server 2000 is "Cute_Linda@hanmail.net", the first device 100 may display the addition of the second user as the friend of the first user by displaying "Cute_Linda@hanmail.net" as the newly-added friend ID.

Figure 71A:
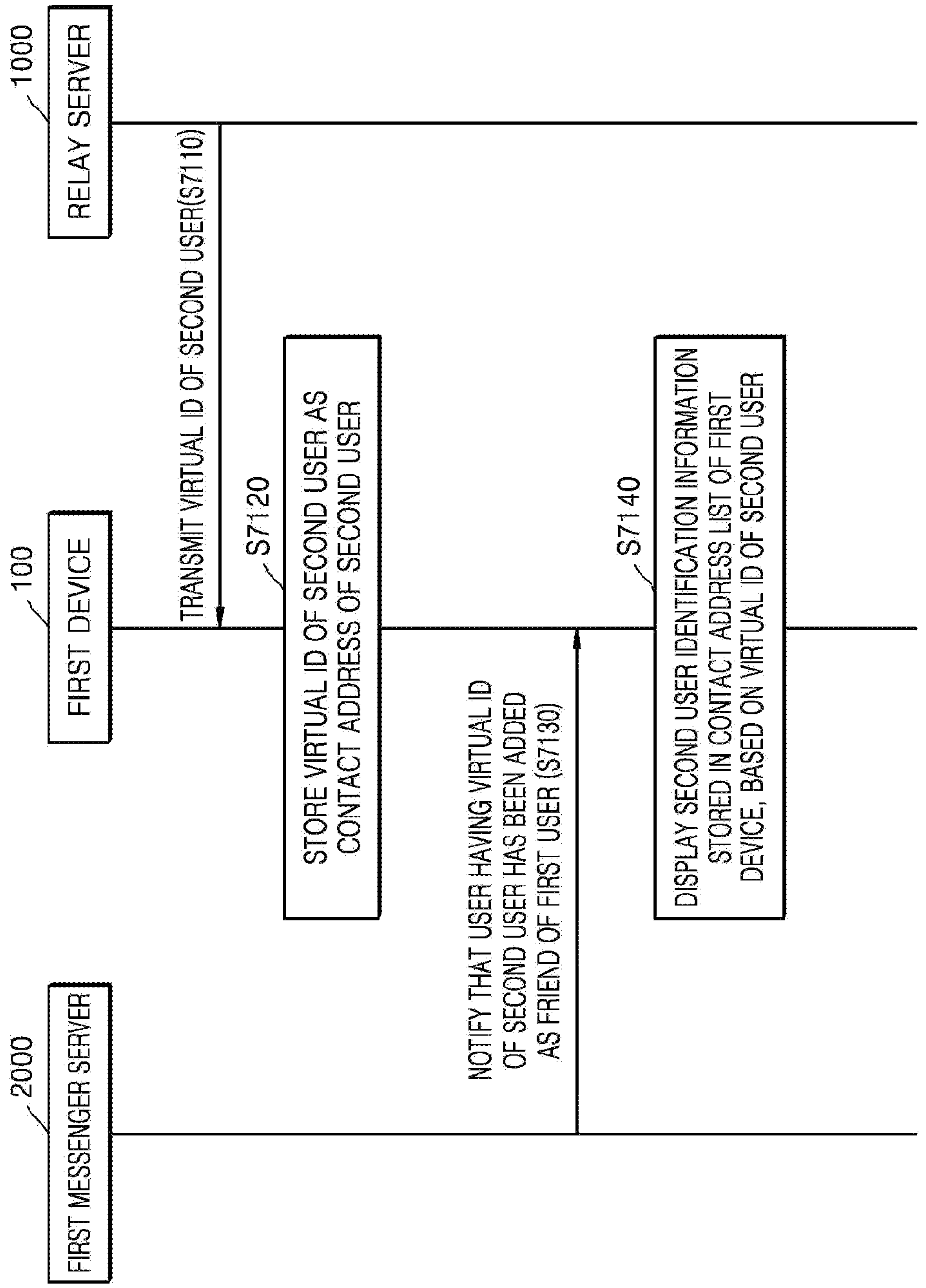
FIG. 71A is a flow diagram illustrating a method for the first device to display that the second user has been added by using a contact address list stored in the first device, according to an exemplary embodiment.

FIG. 71A is a flow diagram illustrating a method for the first device 100 to display that the second user has been added by using a contact address list stored in the first device 100, according to an exemplary embodiment.

Referring to FIG. 71A, in operation S7110, the relay server 1000 transmits the first messenger virtual ID of the second user to the first device 100.

When the first messenger virtual account information for the second user is registered in the first messenger server 2000, the relay server 1000 may transmit the first messenger virtual ID for the second user to the first device 100.

In operation S7120, the first device 100 stores the first messenger virtual ID of the second user as the contact address of the second user.

For example, the first device 100 may store the first messenger virtual ID for the second user as the phone number of the second user.

In operation S7130, the first messenger server 2000 notifies the first device 100 that the user having the first messenger virtual ID of the second user has been added as the messenger friend of the first user.

In this case, the first messenger server 2000 may transmit the first messenger virtual ID for the second user to the first device 100. Operation S7130 may correspond to operation S7040 of FIG. 70A.

In operation S7140, the first device 100 displays the identification information of the second user in the contact address list of the first device 100, based on the first messenger virtual ID for the second user.

For example, the first device 100 may compare the ID received from the first messenger server 2000 with the identification information of the users in the contact address list stored in the first device 100. In this case, when the ID received from the first messenger server 2000 is stored as the contact address, the first device 100 may display the identification information of the user having the ID received from the first messenger server 2000 as the stored contact address, as the user added as the messenger friend of the first user.

Figure 71B:
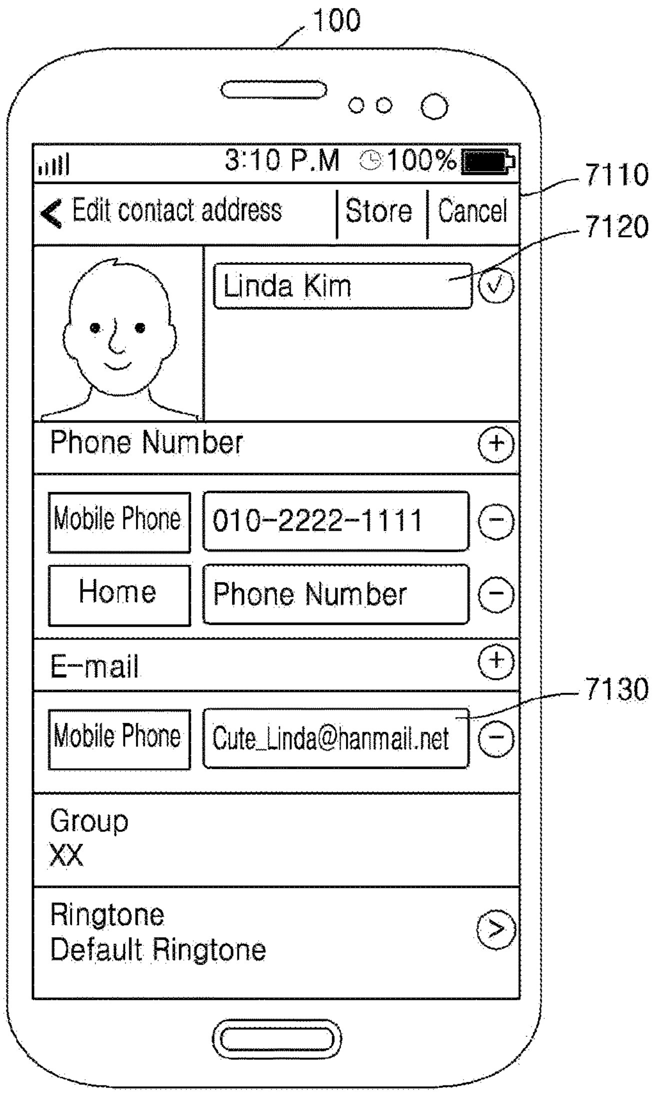
FIGS. 71B and 71C are diagrams illustrating a method for the first device to display that the second user has been added by using a contact address list stored in the first device, according to an exemplary embodiment.
Figure 71C:
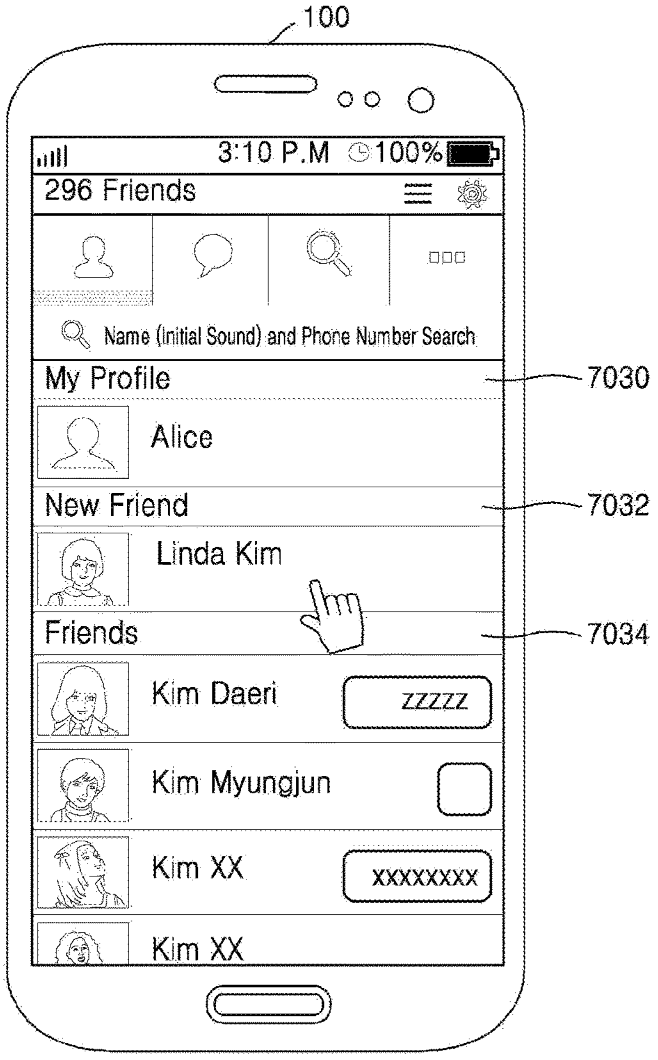

FIGS. 71B and 71C are diagrams illustrating a method for the first device 100 to display that the second user has been added by using a contact address list stored in the first device 100, according to an exemplary embodiment.

Referring to FIG. 71B, the first device 100 may store the first messenger virtual ID of the second user as the contact address of the second user.

The name of the second user may be stored as "Linda Kim" in the first device 100. Also, the second device 200 may store "Cute_Linda@hanmail.net", which is the first messenger virtual ID of the second user received from the relay server 1000, as the e-mail address of the second user.

When "Cute_Linda@hanmail.net" is received as the ID of the user added as the first messenger friend of the first user from the first messenger server 2000, the second device 200 may compare the received ID with the contact address list. Accordingly, the second device 200 may determine that the user added as the messenger friend of the first user is the user having identification information "Linda Kim".

When receiving a first user input for displaying the contact address of the second user, the first device 100 may display a page 7110 representing the contact address of the second user. Also, the first device 100 may display "Linda Kim" (7120) as the identification information of the second user and display "Cute_Linda@hanmail.net" (7130) as the e-mail address of the second user.

Referring to FIG. 71C, the first device 100 may display the identification information of the second user in the contact address list stored in the first device 100 as the user added as the first messenger friend of the first user.

When receiving a user input for executing the first messenger application for providing the first messenger service, the first device 100 may display a web page representing the identification information of the first messenger friends of the first user.

In this case, the first device 100 may display that the second user having the identification information "Linda Kim" has been added as the first messenger friend of the first user.

Accordingly, because the first device 100 displays the names of the users in the contact address list as the identification information of the first messenger friends of the first user, the user may easily discriminate between the users on the first messenger application.

Figure 72A:
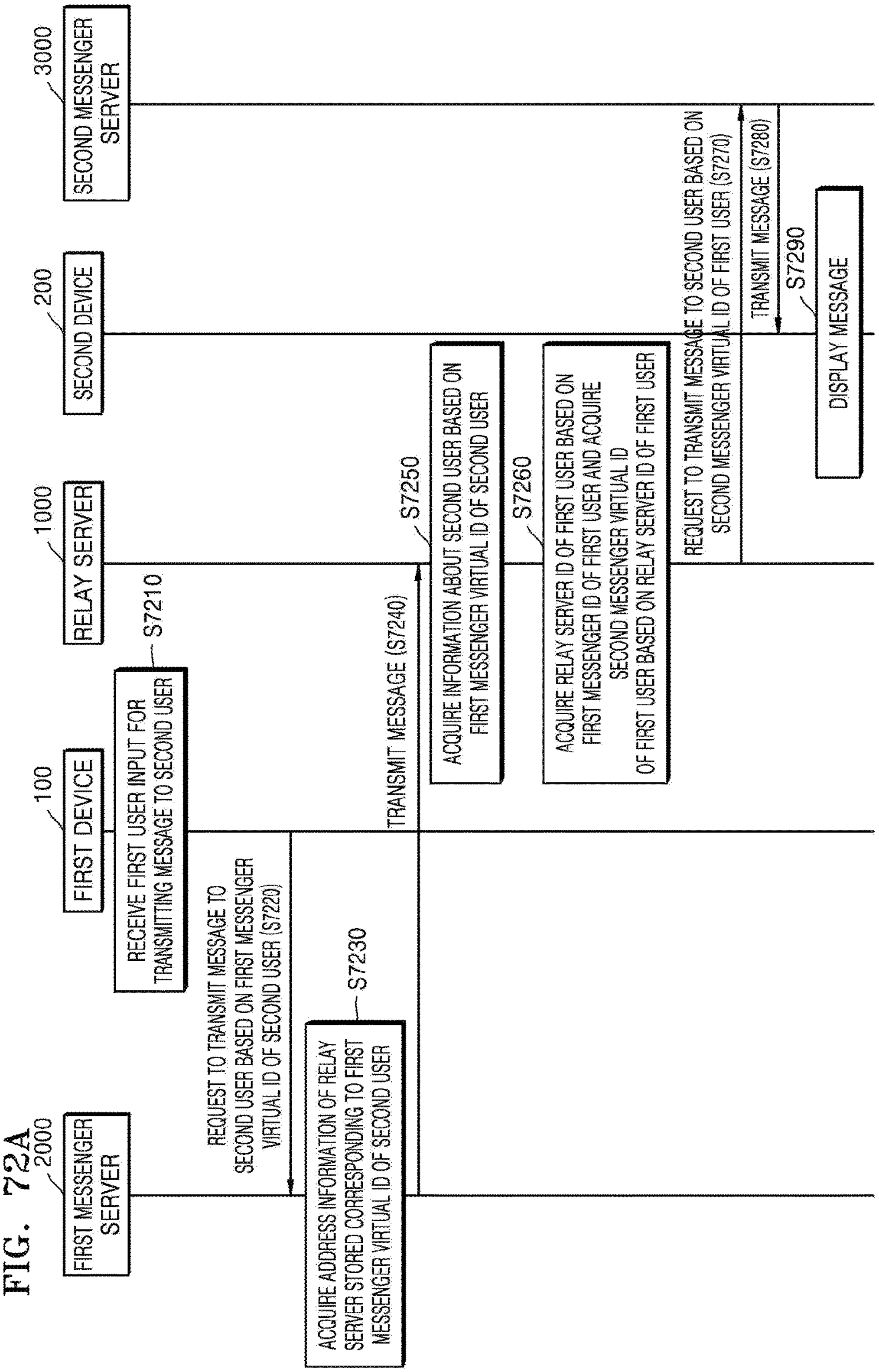
FIG. 72A is a flow diagram illustrating a method for the relay server to relay message transmission between the first user and the second user based on the virtual account information of the first user and the virtual account information of the second user, according to an exemplary embodiment.

FIG. 72A is a flow diagram illustrating a method for the relay server 1000 to relay message transmission between the first user and the second user based on the virtual account information of the first user and the virtual account information of the second user, according to an exemplary embodiment.

Referring to FIG. 72A, in operation S7210, the first device 100 receives a first user input for transmitting a message to the second user.

For example, the first device 100 may receive a first user input for executing the application distributed by the first messenger service provider and receive a first user input for transmitting a message to the second user by using the executed application.

In operation S7220, the first device 100 requests the first messenger server 2000 to transmit a message to the second user based on the first messenger virtual ID of the second user.

In this case, the first device 100 may transmit the first messenger ID of the first user, the first messenger virtual ID of the second user, and the message to the first messenger server 2000.

In operation S7230, the first messenger server 2000 acquires the address information of the relay server 1000 stored corresponding to the first messenger virtual ID of the second user.

When receiving the message transmission request from the first device 100, the first messenger server 2000 may acquire the address information of the relay server 1000 that is a receiver device, based on the first messenger virtual ID of the second user that is a receiver ID.

In operation S7240, the first messenger server 2000 transmits a message to the relay server 1000.

The first messenger server 2000 may transmit a message to the relay server 1000 by using the address information of the relay server 1000.

In this case, the first messenger server 2000 may transmit the first messenger ID of the first user as the transmitter ID and the first messenger virtual ID of the second user as the receiver ID to the relay server 1000.

In operation S7250, the relay server 1000 acquires information about the second user based on the first messenger virtual ID of the second user.

The relay server 1000 may acquire the relay server ID of the second user based on the first messenger virtual ID of the second user. Also, based on the acquired relay server ID of the second user, the relay server 1000 may acquire the identification information of the messenger service used by the second user, the address information of the messenger server used by the second user, and the second messenger ID of the second user.

In operation S7260, the relay server 1000 acquires the relay server ID of the first user based on the first messenger ID of the first user, and acquires the second messenger virtual ID of the first user based on the acquired relay server ID of the first user.

In operation S7270, the relay server 1000 requests the second messenger server 3000 to transmit a message to the second user based on the second messenger virtual ID of the first user.

In this case, the relay server 1000 may transmit the message, the second messenger virtual ID of the first user as the transmitter ID, and the second messenger ID of the second user as the receiver ID to the second messenger server 3000.

In operation S7280, the second messenger server 3000 transmits a message to the second device 200.

The second messenger server 3000 may acquire the address information of the second device 200 based on the second messenger ID of the second user and transmit the message to the second device 200 by using the acquired address information.

In this case, the second messenger server 3000 may transmit the second messenger virtual ID of the first user as the transmitter ID to the second device 200.

In operation S7290, the second device 200 displays the message.

For example, when receiving the message from the second messenger server 3000, the second device 200 may display a notification window indicating that the message has been received.

Also, because the application distributed by the second messenger service provider is executed, the second device 200 may display the received message.

In this case, the second device 200 may display the second messenger virtual ID of the first user or the name of the first user stored in the second device 200 as the transmitter.

Figure 72B:
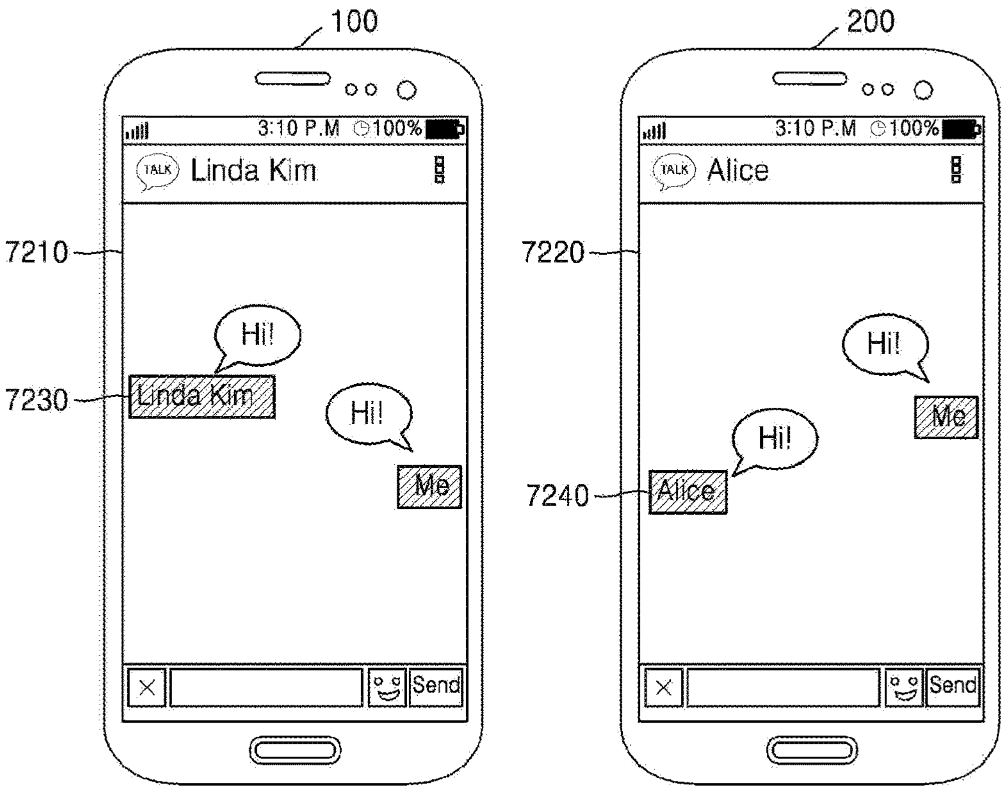
FIG. 72B is a diagram illustrating a method for the first device and the second device to display the messages communicated between the first user and the second user when the relay server relays the message transmission between the first user and the second user, according to an exemplary embodiment.

FIG. 72B is a diagram illustrating a method for the first device 100 and the second device 200 to display the messages communicated between the first user and the second user when the relay server 1000 relays the message transmission between the first user and the second user, according to an exemplary embodiment.

Referring to FIG. 72B, when the relay server 1000 relays the message transmission between the first user and the second user, the first device 100 and the second device 200 may display the messages communicated between the first user and the second user.

For example, when the first user "Alice" using a "KakaoTalk" messenger and the second user "Linda Kim" using a "Line" messenger chat with each other by using the relay server 1000, the first device 100 may execute a "KakaoTalk" application to display messages between "Alice" and "Linda Kim". Also, the second device 200 may use a "Line" application to display messages between "Alice" and "Linda Kim".

In this case, the first device 100 may display a page 7210 representing transmitted/received messages and display "Linda Kim" (7230), which is the identification information of the second user, as the identification information of the chat counterpart of the first user. Also, the second device 200 may display a page 7220 representing transmitted/received messages and display "Alice" (7240), which is the identification information of the first user, as the identification information of the chat counterpart of the second user.

Figure 73:
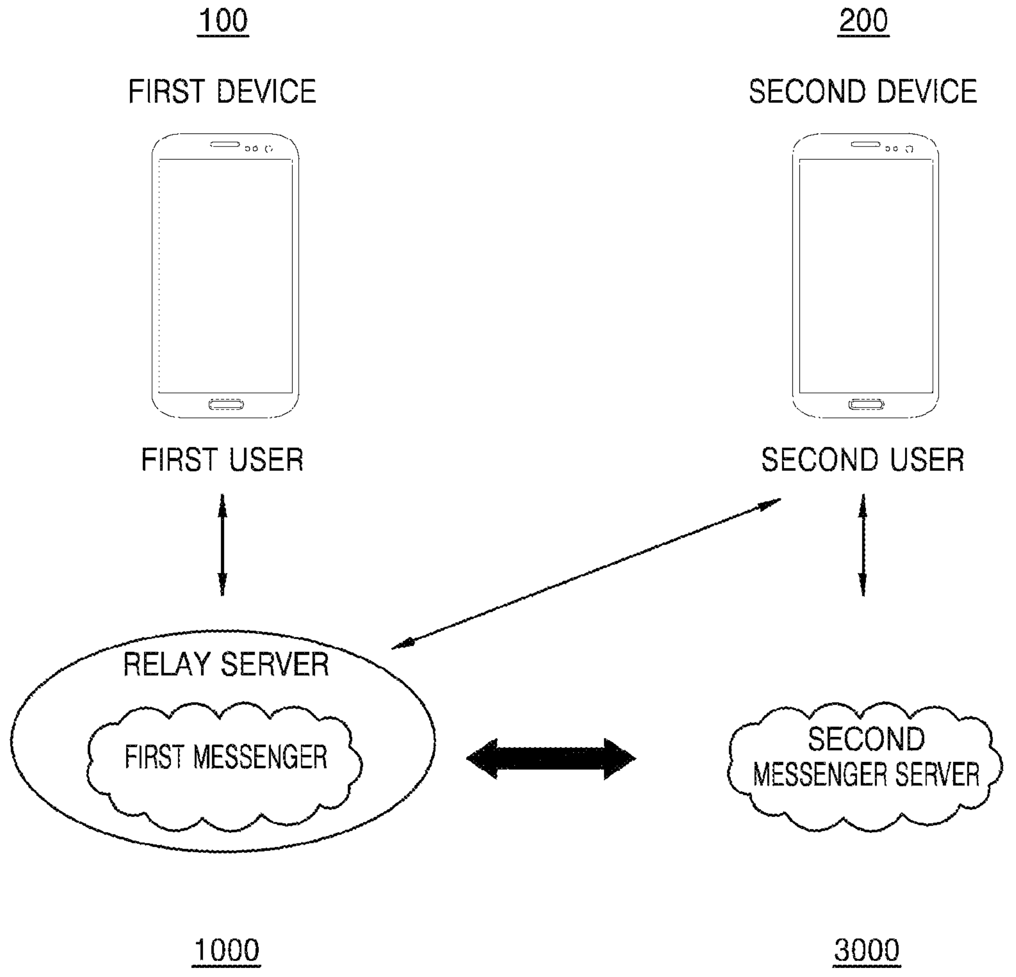
FIG. 73 is a diagram illustrating the relay server for relaying the message transmission between the user using a messenger function provided by the relay server and the user using another messenger service when the relay server performs a messenger function, according to an exemplary embodiment.

FIG. 73 is a diagram illustrating the relay server 1000 for relaying the message transmission between the user using a messenger function provided by the relay server 1000 and the user using another messenger service when the relay server 1000 performs a messenger function, according to an exemplary embodiment.

Referring to FIG. 73, the relay server 1000 and the second messenger server 3000 may be messenger servers that are operated by different service providers.

The relay server 1000 may perform the functions of the first messenger server 2000 illustrated in FIG. 66.

Also, the relay server 1000 may relay message transmission between the user using the messenger function provided by the relay server 1000 and the user using another messenger service.

For example, the relay server 1000 may receive right information for adding another user as the second messenger friend of the second user in the second messenger server 3000 from the second device 200. The relay server 1000 may add the relay server 1000 as the second messenger friend of the second user based on the right information received from the second device 200.

As the second messenger friend of the second user, the relay server 1000 may receive a message of the second user from the second messenger server 3000. The relay server 1000 may transmit the message of the second user received from the second messenger server 3000 to the first device 100.

Also, the relay server 1000 may receive a message of the first user from the first device 100. As the second messenger friend of the second user, the relay server 1000 may request the second messenger server 3000 to transmit the message of the first user received from the first messenger server 100 to the second user.

Accordingly, the relay server 1000 may relay message transmission between the user using the messenger function provided by the relay server 1000 and the user using another messenger service.

Figure 74:
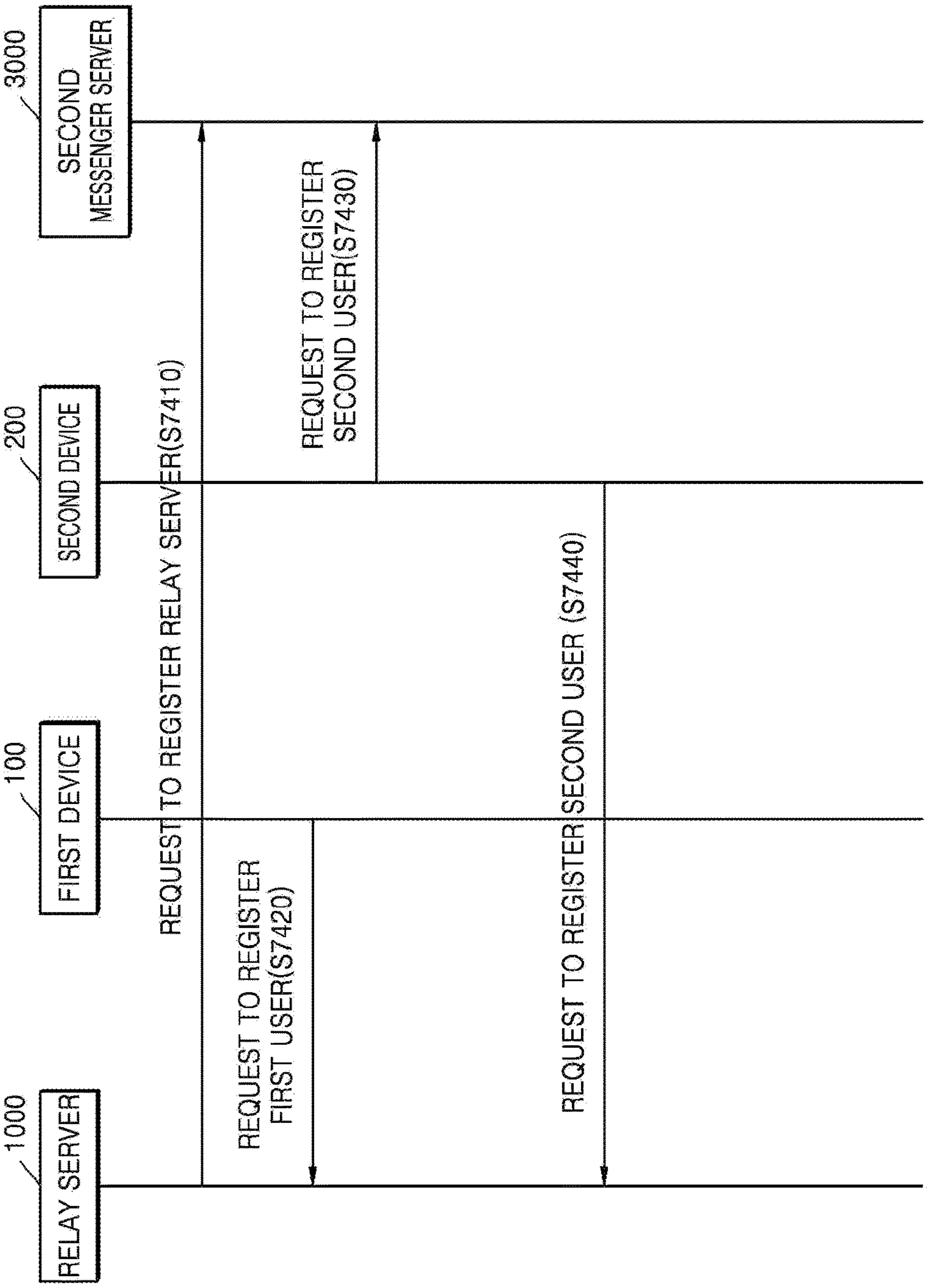
FIG. 74 is a flow diagram illustrating a method for the first device and the second device to register accounts in the relay server and a method for the second device to register an account in the second messenger server, according to an exemplary embodiment.

FIG. 74 is a flow diagram illustrating a method for the first device 100 and the second device 200 to register accounts in the relay server 1000 and a method for the second device 200 to register an account in the second messenger server 3000, according to an exemplary embodiment.

Referring to FIG. 74, in operation S7410, the relay server 1000 requests the second messenger server 3000 to register the relay server 1000.

When receiving the registration request from the relay server 1000, the second messenger server 3000 may generate a second messenger account of the relay server 1000 and store information about the generated account. In this case, the second messenger account of the relay server 1000 may be an account as a third party, not an account as a user of the second messenger server 3000.

In operation S7420, the first device 100 transmits request to register the first user to the relay server 1000.

For example, when receiving a first user input for installing an application distributed by the service provider of the relay server 1000, the first device 100 may request the relay server 1000 to register the first user.

In this case, the first device 100 may transmit the address information of the first device 100 and the relay server account information of the first user, which will be registered in the relay server 1000, to the relay server 1000. The address information of the device may include, but is not limited to, the IP address of the device or the identification information of the device registered in a push server. Also, the account information may include at least one of the ID and the password.

Also, the first device 100 may transmit unique information of the first user to the relay server 1000. The unique information of the first user may include, but is not limited to, the resident registration number and the contact address of the first user. The contact address of the first user may include, but is not limited to, the e-mail address and the phone number of the first user.

The relay server 1000 may store the address information of the first device 100 and the unique information of the first user corresponding to the relay server 1000 account information of the first user received from the first device.

In operation S7430, the second device 200 transmits a request to register the second user the second messenger server 3000.

In this case, the second device 200 may transmit the address information of the second device 200 and the second messenger account information of the second user, which will be registered in the second messenger server 3000, to the second messenger server 3000.

The second messenger server 3000 may store the address information of the second device 200 corresponding to the second messenger account information of the second user received from the second device 200.

In operation S7440, the second device 200 transmits a request to register the second to the relay server 1000.

For example, when receiving a second user input for installing an application distributed by the service provider of the relay server 1000, the second device 200 may request the relay server 1000 to register the second user.

In this case, the second device 200 may transmit the relay server 1000 account information of the second user, which will be registered in the relay server 1000, to the relay server 1000.

Also, the second device 200 may transmit information about the second messenger service subscribed by the second user to the relay server 1000. The information about the second messenger service may include the identification information of the second messenger service or the address information of the second messenger server 3000.

Also, the second device 200 may transmit unique information of the second user to the relay server 1000. The unique information of the second user may include, but is not limited to, the resident registration number and the contact address of the second user. The contact address of the second user may include, but is not limited to, the e-mail address and the phone number of the second user.

When receiving the relay server 1000 account information of the second user, the information about the second messenger service, and the unique information of the second user from the second device 200, the relay server 1000 may store the information about the second messenger service and the unique information of the second user corresponding to the relay server ID of the second user.

Figure 75:
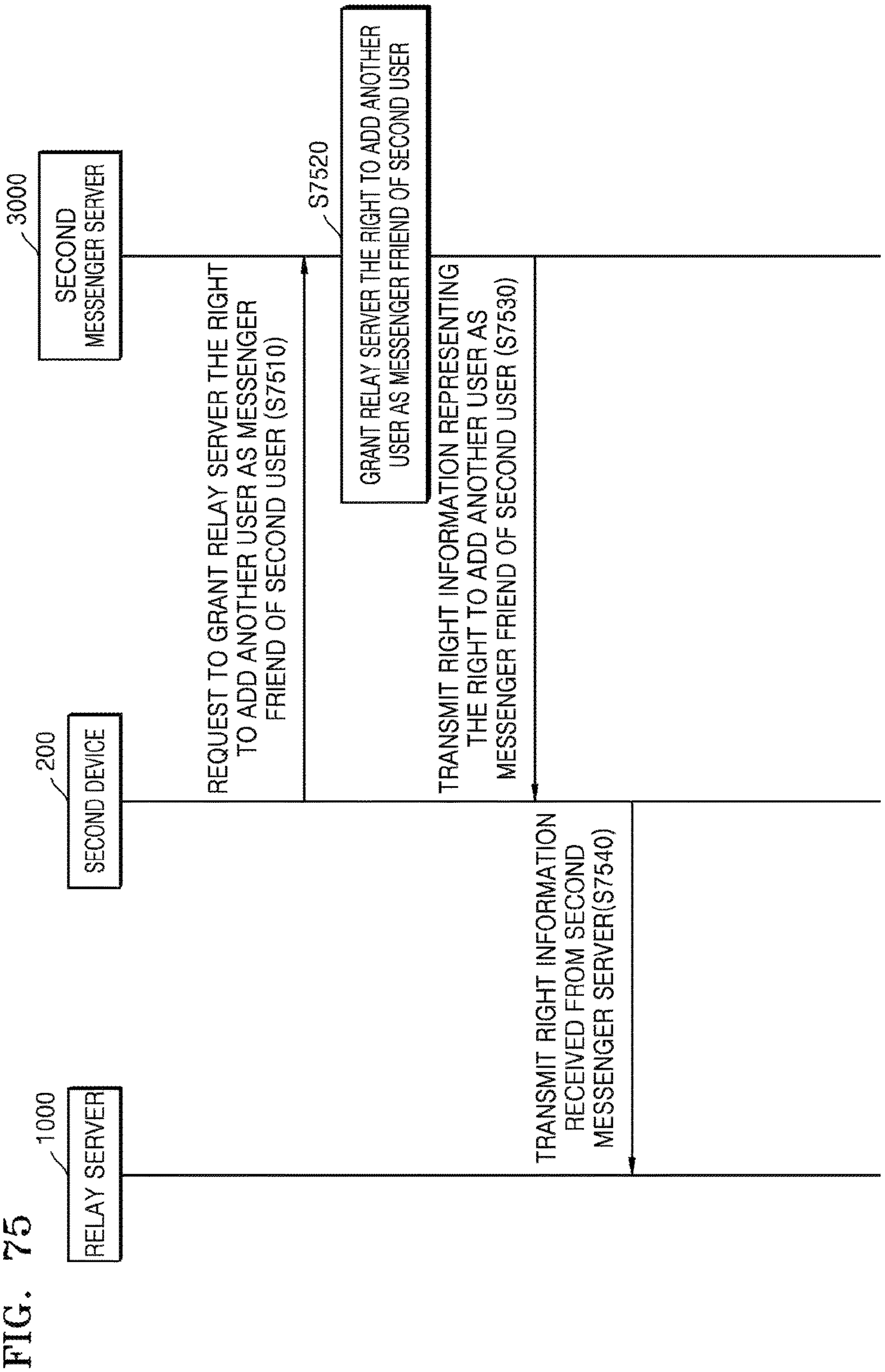
FIG. 75 is a flow diagram illustrating a method for the relay server to acquire the right of the second user about the second messenger server, according to an exemplary embodiment.

FIG. 75 is a flow diagram illustrating a method for the relay server 1000 to acquire the right of the second user about the second messenger server 3000, according to an exemplary embodiment.

Referring to FIG. 75, in operation S7510, the second device 200 requests the second messenger server 3000 to grant the relay server 1000 the right to add another user as the second messenger friend of the second user.

In this case, the second device 200 may transmit the second messenger account information of the second user and the second messenger identification information of the relay server 1000 to the second messenger server 3000.

In operation S7520, the second messenger server 3000 grants the relay server 1000 the right to add another user as the messenger friend of the second user.

The second messenger server 3000 may authenticate the second user based on the received account information of the second user. When the second user is authenticated, the second messenger server 3000 may generate the right information representing the right to add another user as the messenger friend of the second user. The second messenger server 3000 may store the generated right information corresponding to the second messenger ID of the second user and the second messenger identification information of the relay server 1000.

In operation S7530, the second messenger server 3000 transmits the right information representing the right to add another user as the messenger friend of the second user to the second device 200.

In operation S7540, the second device 200 transmits the right information received from the second messenger server 3000 to the relay server 1000.

In this case, the second device 200 may transmit the relay server ID of the second user together with the right information to the relay server 1000.

Accordingly, the relay server 1000 may acquire the right to add another user as the messenger friend of the second user in the second messenger server 3000.

Figure 76A:
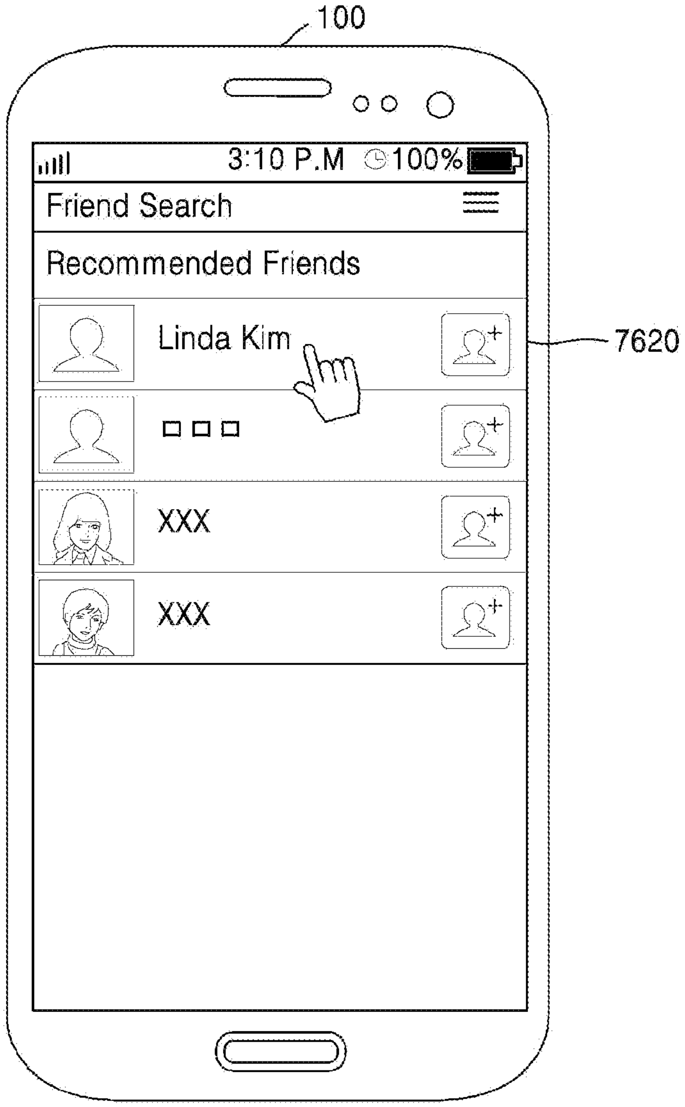
FIG. 76A is a diagram illustrating a method for the first device to receive a first user input for setting the second user as a first messenger friend to chat with through the relay server, according to an exemplary embodiment.

FIG. 76A is a diagram illustrating a method for the first device 100 to receive a first user input for setting the second user as a first messenger friend to chat with through the relay server 1000, according to an exemplary embodiment.

Referring to FIG. 76A, the first device 100 may provide a UI for receiving the list of users subscribing the relay server 1000 from the relay server 1000 and selecting the user selected among the received list of users as the first messenger friend.

For example, when receiving a first user input for executing the messenger application distributed by the relay server 1000, the first device 100 may receive the list of users, which are not set as the first messenger friend of the first user among the users subscribing the relay server 1000, from the relay server 1000. In this case, the relay server 1000 may transmit the list of users, which are related to the first user among the users that are not set as the first messenger friend of the first user, to the first device 100.

The users related to the first user may be, for example, the user that stores the contact address of the first user in the device or the user whose contact address is stored in the first device 100 by the first user, but are not limited thereto. To this end, the relay server 1000 may receive the contact address stored in the first device 100 from the first device 100 and receive the contact address stored in the second device 200 from the second device 200.

When receiving a first user input for selecting one of the list of users that are not set as the first messenger friend of the first user, the first device 100 may request the relay server 1000 to set the second user as the first messenger friend of the first user.

When receiving the list of users, which are related to the first user among the users that are not set as the first messenger friend of the first user, from the relay server 1000, the first device 100 may display a page 7620 representing the received users.

When receiving a user input for selecting the second user among the displayed users, the first device 100 may request the relay server 1000 to set the first messenger friendship between the first user and the second user.

When receiving the first messenger friendship setting request from the first device 100, the relay server 1000 may notify the second device 200 that the request for setting the first messenger friendship between the first user and the second user has been received from the first user.

As illustrated in FIG. 69C, the second device 200 may display a notification window indicating that the request for setting the first messenger friendship between the first user and the second user has been received, and request the relay server 1000 to set the first messenger friendship between the first user and the second user based on the second user's selection.

FIG. 76B is a diagram illustrating a DB 7600 stored in the relay server 1000, according to an exemplary embodiment.

Referring to FIG. 76B, the relay server 1000 may store information about each user.

The relay server 1000 may store identification information 7620 of each messenger service subscribed by each user, a messenger server ID 7630 of each user, and unique information 7640 of each user, corresponding to a relay server ID 7610 of each user.

Also, the relay server 1000 may store right information 7650 representing the right to add another user as the messenger friend of the user corresponding to the relay server ID 7610 of the user.

For example, the relay server 1000 may store the right information representing the right to add another user as the messenger friend of the second user, corresponding to the second user relay server ID.

Also, the relay server 1000 may store a relay server ID 7660 of the user set as the first messenger friend corresponding to the relay server ID 7610 of the user. For example, the relay server 1000 may set the second user as the first messenger friend corresponding to the relay server ID of the first user. The setting of the first messenger friendship between the users may be described with reference to FIGS. 69A to 69C.

Figure 77A:
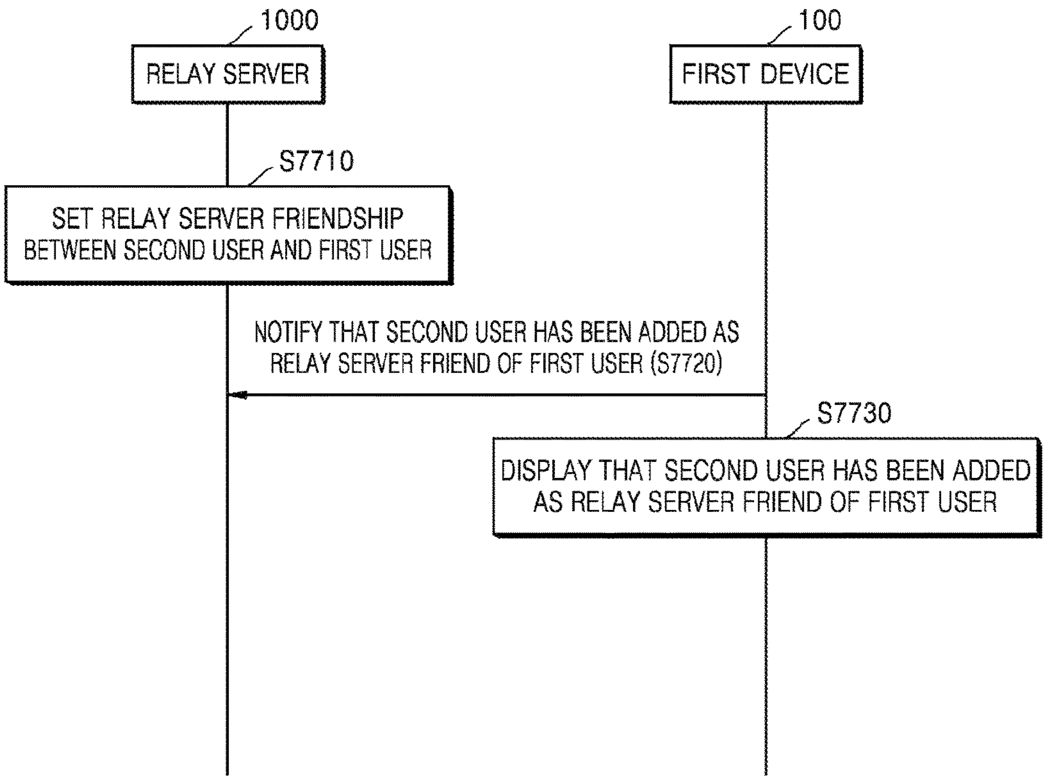
FIG. 77A is a flow diagram illustrating a method for the relay server to notify the first device that the second user has been registered as the first messenger friend of the first user when the second user is registered as the first messenger friend of the first user in the relay server, according to an exemplary embodiment.

FIG. 77A is a flow diagram illustrating a method for the relay server 1000 to notify the first device 100 that the second user has been registered as the first messenger friend of the first user when the second user is registered as the first messenger friend of the first user in the relay server 1000, according to an exemplary embodiment.

Referring to FIG. 77A, in operation S7710, the relay server 1000 sets the first messenger (or relay server) friendship between the first user and the second user.

When receiving the request for setting the first messenger friendship between the first user and the second user from the first device 100 and the second device 200, the relay server 1000 may set the first messenger friendship between the first user and the second user.

In operation S7720, the relay server 1000 notifies the first device 100 that the second user has been added as the first messenger friend of the first user.

In this case, the relay server 1000 may transmit the relay server ID of the first user and the relay server ID of the second user to the first device 100. According to an exemplary embodiment, the relay server 1000 may transmit the name or unique information of the second user to the first device 100.

In operation S7730, the first device 100 displays that the second user has been added as the first messenger friend of the first user.

When receiving a first user input for executing the messenger application distributed by the relay server 1000, the first device 100 may display that the second user has been added as the first messenger friend of the first user.

In this case, the first device 100 may display the relay server ID, name, or unique information of the second user as the display information of the second user. Also, as illustrated in FIG. 71C, the first device 100 may display the identification information of the second user in the contact address list stored in the first device 100 as the display information of the second user.

Also, as illustrated in FIG. 70B, the relay server 1000 may generate the second messenger virtual account information for the first user, register the relay server 1000 as the user of the second messenger service based on the generated second messenger virtual account information for the first user, and register the relay server 1000 as the second messenger friend of the second user based on the right information representing the right to add another user as the second messenger friend of the second user, so that the second device 200 may also display that the user having the second messenger virtual ID information for the first user has been added as the friend of the second user.

FIG. 77B is a diagram illustrating a DB 7700 in which the relay server 1000 stores the virtual account information of the users, according to an exemplary embodiment.

Referring to FIG. 77B, the relay server 1000 may store virtual account information 7720 for each messenger server corresponding to a relay server ID 7710 of the users.

Figure 78:
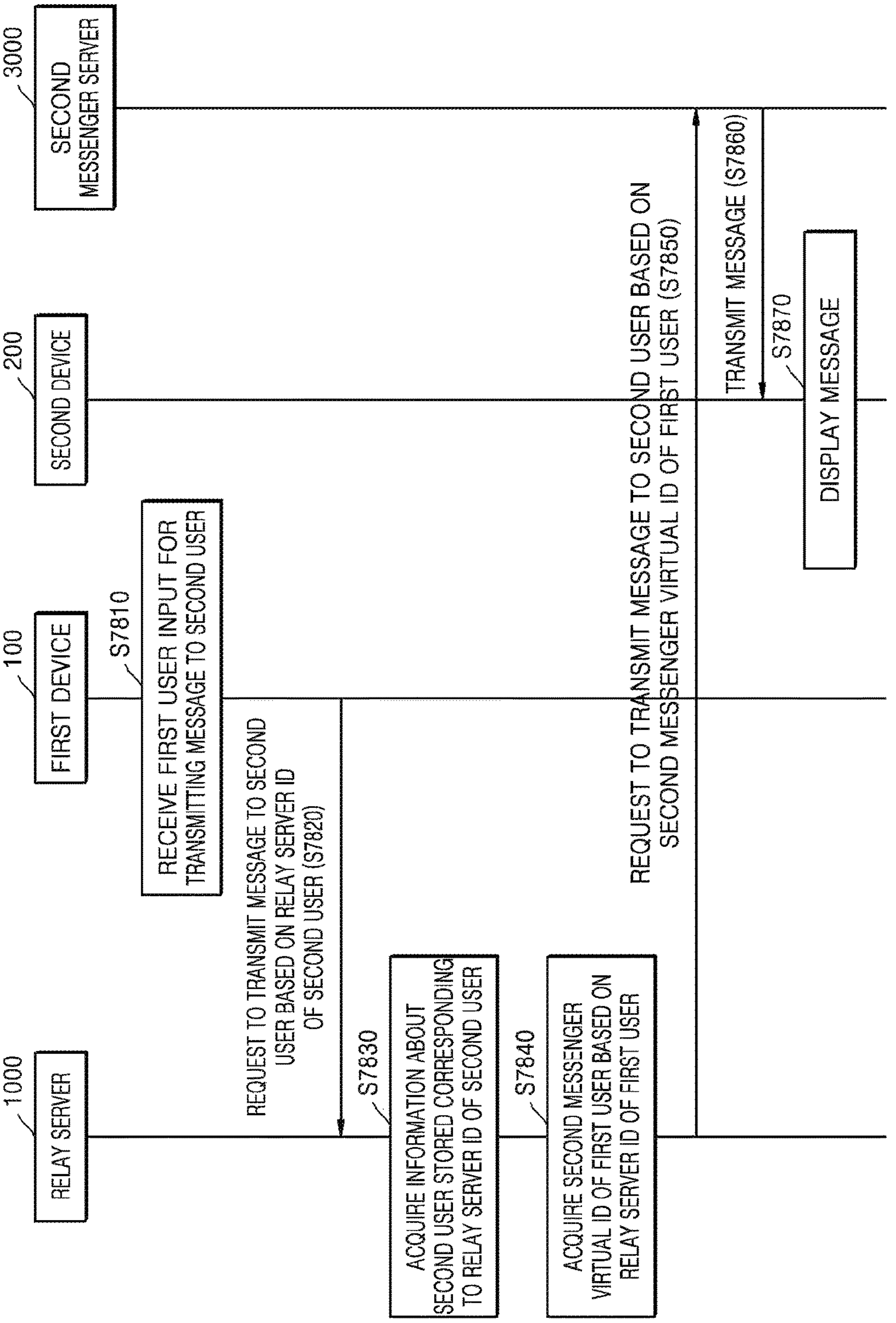
FIG. 78 is a flow diagram illustrating a method for the relay server to transmit a message of the first user received from the first device to the second user, according to an exemplary embodiment.

FIG. 78 is a flow diagram illustrating a method for the relay server 1000 to transmit a message of the first user received from the first device 100 to the second user, according to an exemplary embodiment.

Referring to FIG. 78, in operation S7810, the first device 100 receives a first user input for transmitting a message to the second user.

In operation S7820, the first device 100 requests the relay server 1000 to transmit a message to the second user based on the relay server ID of the second user.

In this case, the first device 100 may transmit the relay server ID of the first user, the relay server ID of the second user, and the message to the relay server 1000.

In operation S7830, the relay server 1000 acquires information about the second user stored corresponding to the relay server ID of the second user.

The information about the second user may include the identification information of a messenger server used by the second user, the address information of the messenger server, and the second messenger ID of the second user.

In operation S7840, the relay server 1000 acquires the second messenger virtual ID of the first user based on the relay server ID of the first user.

In operation S7850, the relay server 1000 requests the second messenger server 3000 to transmit a message to the second user based on the second messenger virtual ID of the first user.

In this case, the relay server 1000 may transmit the message, the second messenger virtual ID of the first user as the transmitter ID, and the second messenger ID of the second user as the receiver ID to the second messenger server 3000.

In operation S7860, the second messenger server 3000 transmits a message to the second device 200.

The second messenger server 3000 may acquire the address information of the second device 200 based on the second messenger ID of the second user and transmit the message to the second device 200 by using the acquired address information.

In this case, the second messenger server 3000 may transmit the second messenger virtual ID of the first user as the transmitter ID to the second device 200.

In operation S7870, the second device 200 displays the message.

In this case, the second device 200 may display the second messenger virtual ID of the first user or the name of the first user stored in the second device 200 as the transmitter.

Figure 79:
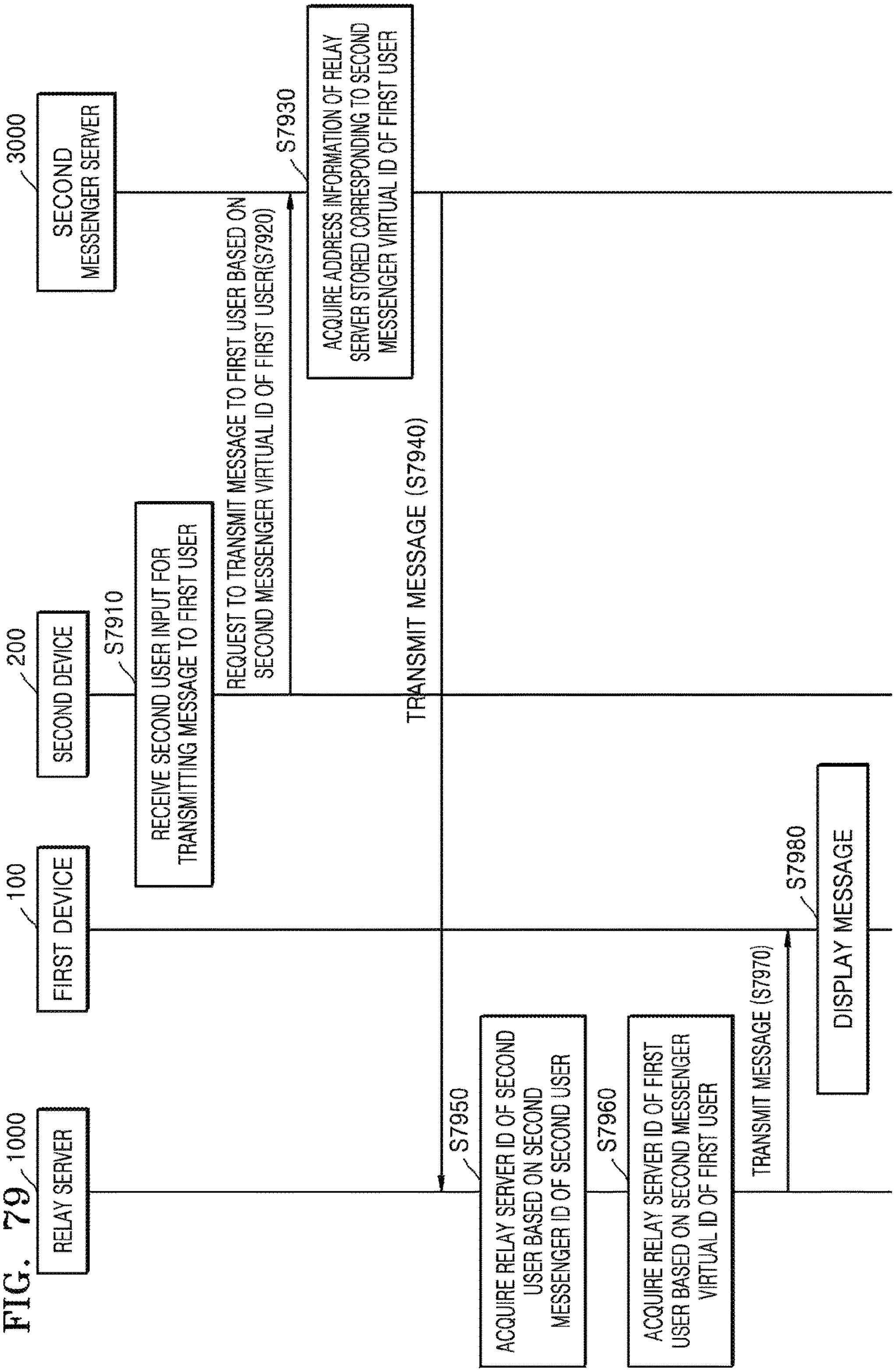
FIG. 79 is a flow diagram illustrating a method for the relay server to transmit a message of the second user received from the second device to the first user, according to an exemplary embodiment.

FIG. 79 is a flow diagram illustrating a method for the relay server 1000 to transmit a message of the second user received from the second device 200 to the first user, according to an exemplary embodiment.

Referring to FIG. 79, in operation S7910, the second device 200 receives a second user input for transmitting a message to the first user.

In operation S7920, the second device 200 requests the second messenger server 3000 to transmit a message to the first user based on the second messenger virtual ID of the first user.

In this case, the second device 200 may transmit the second messenger ID of the second user, the second messenger virtual ID of the first user, and the message to the second messenger server 3000.

In operation S7930, the second messenger server 3000 acquires the address information of the relay server 1000 stored corresponding to the second messenger virtual ID of the first user.

When receiving the message transmission request from the first device 100, the first messenger server 2000 may acquire the address information of the relay server 1000 that is a receiver device, based on the first messenger virtual ID of the second user that is a receiver ID.

In operation S7940, the second messenger server 3000 transmits a message to the relay server 1000.

The second messenger server 3000 may transmit a message to the relay server 1000 by using the address information of the relay server 1000.

In this case, the second messenger server 3000 may transmit the second messenger ID of the second user as the transmitter ID and the second messenger virtual ID of the first user as the receiver ID to the relay server 1000.

In operation S7950, the relay server 1000 acquires the relay server ID of the second user based on the second messenger ID of the second user.

In operation S7960, the relay server 1000 acquires the relay server ID of the first user based on the second messenger virtual ID of the first user.

In operation S7970, the relay server 1000 transmits a message to the first device 100.

The relay server 1000 may acquire the address information of the first device 100 stored corresponding to the relay server ID of the first user. The relay server 1000 may transmit the message received from the first messenger server 2000 to the first device 100 by using the acquired address information of the first device 100.

In operation S7980, the first device 100 displays the message.

In this case, the first device 100 may display the relay server ID of the second user or the name of the second user stored in the first device 100 as the display information of the transmitter.

Figure 80:
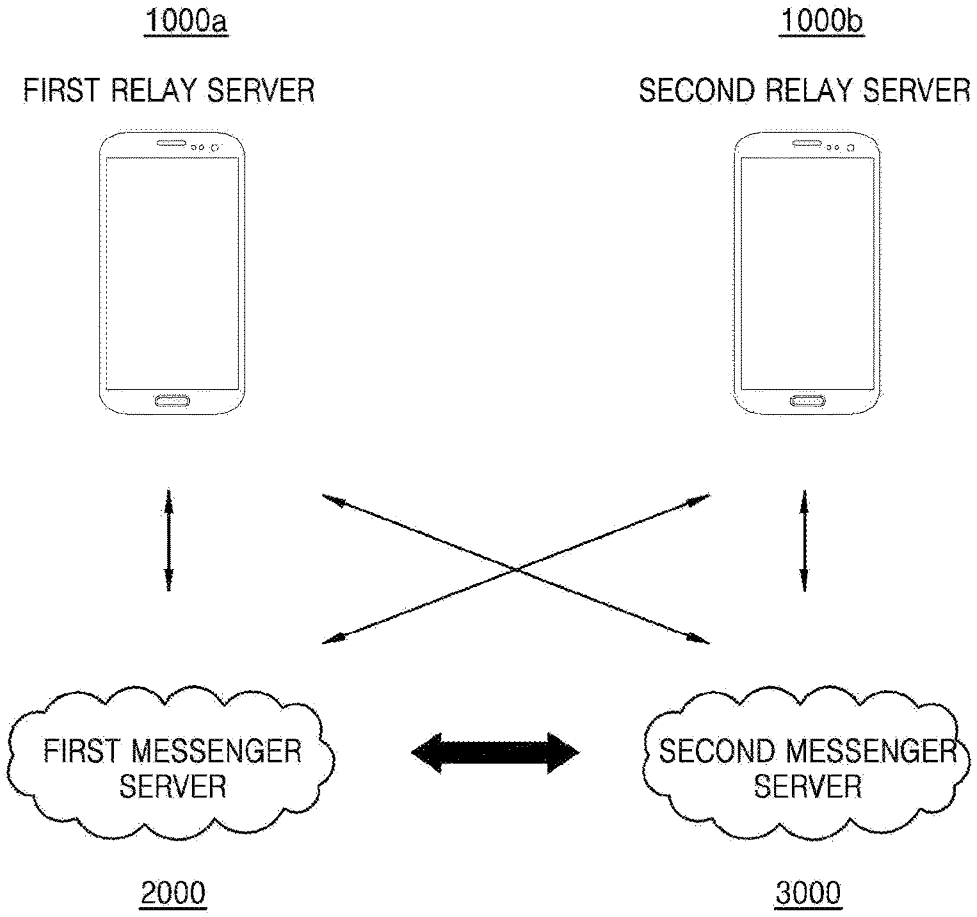
FIG. 80 is a diagram illustrating the relay server for relaying the message transmission between the users using different messenger services when the relay server performs a function of the device, according to an exemplary embodiment.

FIG. 80 is a diagram illustrating the relay server 1000 for relaying the message transmission between the users using different messenger services when the relay server 1000 perform a function of the device 100 or 200, according to an exemplary embodiment.

Referring to FIG. 80, the first relay server 1000*a* may be the device of the first user. Also, the second relay server 1000*b* may be the device of the second user.

The first messenger application distributed by the first messenger service provider may be installed in the first relay server 1000*a*. Also, the second messenger application distributed by the second messenger service provider may be installed in the second relay server 1000*b*.

The first relay server 1000*a* and the second relay server 1000*b* may relay message transmission between the first user and the second user that use different messenger services.

For example, the first relay server 1000*a* may receive right information for adding another user as the messenger friend of the first user in the first messenger server 2000 from the first messenger server 2000. Also, the first relay server 1000*a* may add the first relay server 1000*a* as the first messenger friend of the first user in the first messenger server 2000 based on the received right information.

Also, the second relay server 1000*b* may receive right information for adding another user as the messenger friend of the second user in the second messenger server 3000 from the second messenger server 3000. Also, the second relay server 1000*b* may add the second relay server 1000*b* as the messenger friend of the second user in the second messenger server 3000 based on the received right information.

As the friend of the first user, the first relay server 1000*a* may receive the message transmitted to the second user by the first user from the first messenger server 2000. Also, the first relay server 1000*a* may request the second messenger server 3000 to transmit the received message to the second user. When receiving the message transmission request from the first relay server 1000*a*, the second messenger server 3000 may transmit the received message to the second relay server 1000*b*.

Accordingly, the first relay server 1000*a* and the second relay server 1000*b* may relay message transmission between the first user and the second user that use different messenger services.

Figure 81:
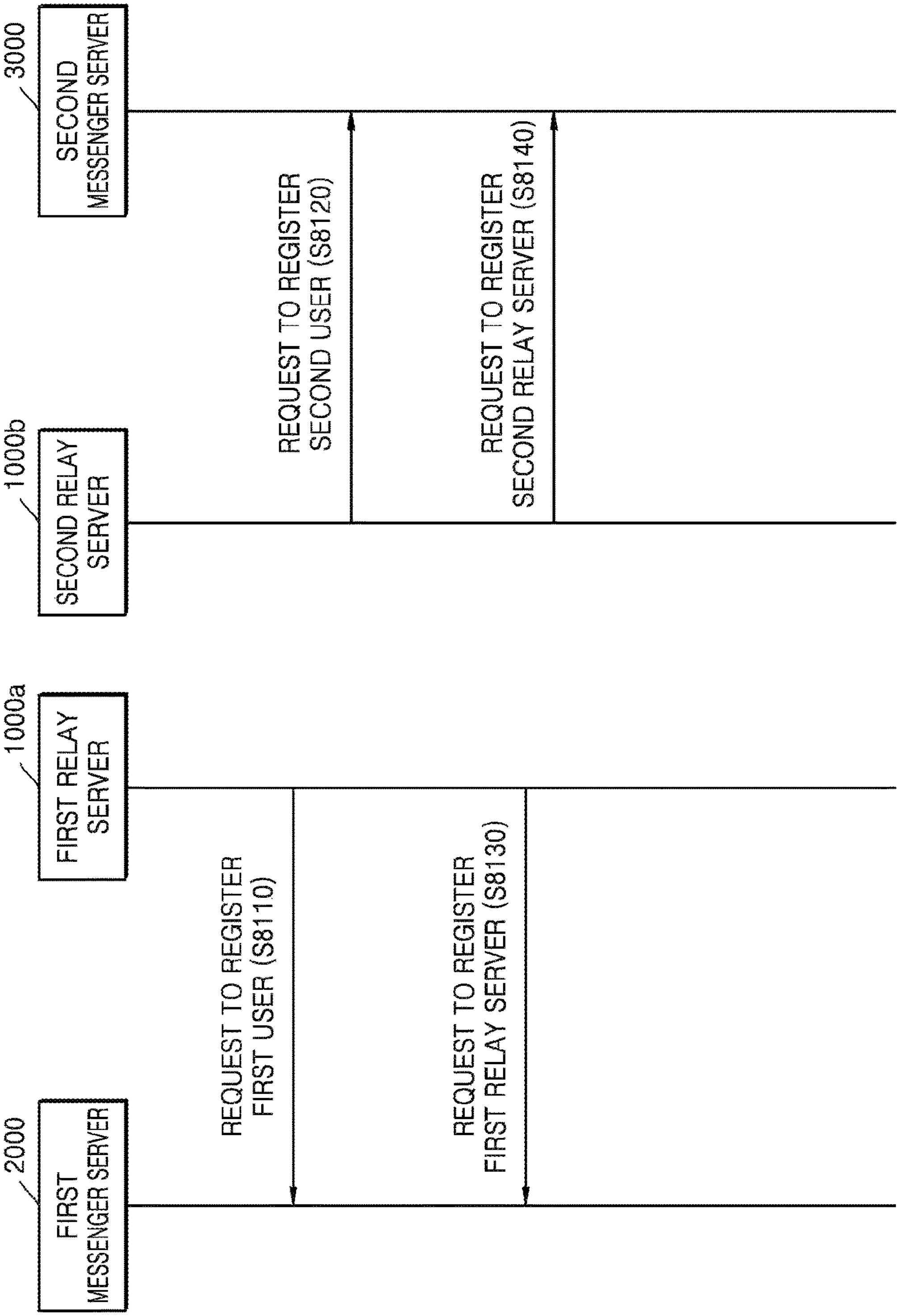
FIG. 81 is a flow diagram illustrating a method for the first relay server to register in the first messenger server and for the second relay server to register in the second messenger server, according to an exemplary embodiment.

FIG. 81 is a flow diagram illustrating a method for the first relay server 1000*a* to register in the first messenger server 2000 and for the second relay server 1000*b* to register in the second messenger server 3000, according to an exemplary embodiment.

Referring to FIG. 81, in operation S8110, the first relay server 1000*a* requests the first messenger server 2000 to register the first user.

For example, when receiving a first user input for installing the application distributed by the service provider of the first messenger server 2000, the first relay server 1000*a* may request the first messenger server 2000 to register the first user.

In this case, the first relay server 1000*a* may transmit the address information of the first relay server 1000*a* and the account information of the first user, which will be registered in the first messenger server 2000, to the first messenger server 2000. The address information of the device may include, but is not limited to, the IP address of the device or the identification information of the device registered in a push server. Also, the account information may include at least one of the ID and the password.

The first messenger server 2000 may store the address information of the first relay server 1000*a* corresponding to the account information of the first user received from the first relay server 1000*a*.

In operation S8120, the second relay server 1000*b* requests the second messenger server 3000 to register the second user.

In this case, the second relay server 1000*b* may transmit the address information of the second device 200 and the account information of the second user, which will be registered in the second messenger server 3000, to the second messenger server 3000.

The second messenger server 3000 may store the address information of the second relay server 1000*b* corresponding to the account information of the second user received from the second relay server 1000*b*.

In operation S8130, the first relay server 1000*a* requests the first messenger server 2000 to register the first relay server 1000*a*.

When receiving the registration request from the first relay server 1000*a*, the first messenger server 2000 may generate the account of the first relay server 1000*a* in the first messenger server 2000 and store information about the generated account. In this case, the account of the first relay server 1000*a* in the first messenger server 2000 may be an account as a third party, not an account as the user of the first messenger server 2000.

Also, the first relay server 1000*a* may transmit the address information of the first relay server 1000*a* to the first messenger server 2000. The first messenger server 2000 may store the address information of the first relay server 1000*a* corresponding to the account information of the first relay server 1000*a*.

In operation S8140, the second relay server 1000*b* requests the second messenger server 3000 to register the second relay server 1000*b*.

When receiving the registration request from the second relay server 1000*b*, the second messenger server 3000 may generate the account of the second relay server 1000*b* in the second messenger server 3000 and store information about the generated account. In this case, the account of the second relay server 1000*b* in the second messenger server 3000 may be an account as a third party, not an account as the user of the second messenger server 3000.

Also, the second relay server 1000*b* may transmit the address information of the second relay server 1000*b* to the second messenger server 3000. The second messenger server 3000 may store the address information of the second relay server 1000*b* corresponding to the account information of the second relay server 1000*b*.

Figure 82A:
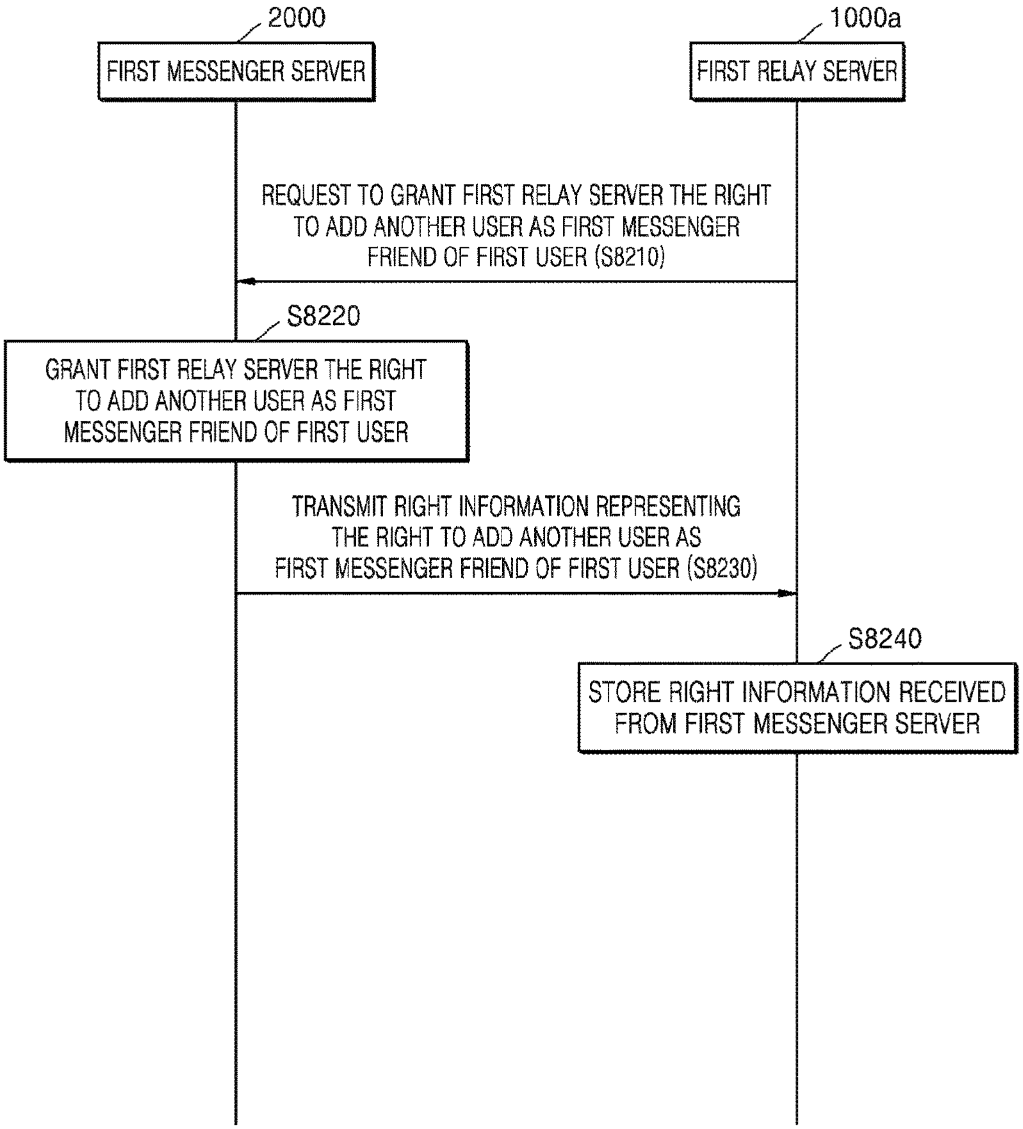
FIG. 82A is a flow diagram illustrating a method for the first relay server to acquire the right to add another user as the first messenger friend of the first user from the first messenger server, according to an exemplary embodiment.

FIG. 82A is a flow diagram illustrating a method for the first relay server 1000*a* to acquire the right to add another user as the first messenger friend of the first user from the first messenger server 2000, according to an exemplary embodiment.

Referring to FIG. 82A, in operation S8210, the first relay server 1000*a* requests the first messenger server 2000 to grant the first relay server 1000*a* the right to add another user as the first messenger friend of the first user.

For example, as illustrated in FIG. 69B, the first relay server 1000*a* may provide a UI for selecting whether to grant the first relay server 1000*a* the right to add another user as the first messenger friend of the first user.

When receiving a first user input for selecting to grant the first relay server 1000*a* the right to add another user as the first messenger friend of the first user, the first relay server 1000*a* may request the first messenger server 2000 to grant the first relay server 1000*a* the right to add another user as the first messenger friend of the first user.

In this case, the first relay server 1000*a* may transmit the first messenger account information of the first user and the first messenger account information of the first relay server 1000*a* to the first messenger server 2000.

In operation S8220, the first messenger server 2000 grants the first relay server 1000*a* the right to add another user as the first messenger friend of the first user.

The first messenger server 2000 may authenticate the first user based on the received first messenger account information of the first user. When the first user is authenticated, the first messenger server 2000 may generate the right information representing the right to add another user as the first messenger friend of the first user. The first messenger server 2000 may store the generated right information corresponding to the first messenger ID of the first user and the first messenger ID of the first relay server 1000*a*.

In operation S8230, the first messenger server 2000 transmits the right information representing the right to add another user as the first messenger friend of the first user to the first relay server 1000*a*.

In operation S8240, the first relay server 1000*a* stores the right information received from the first messenger server 2000.

Figure 82B:
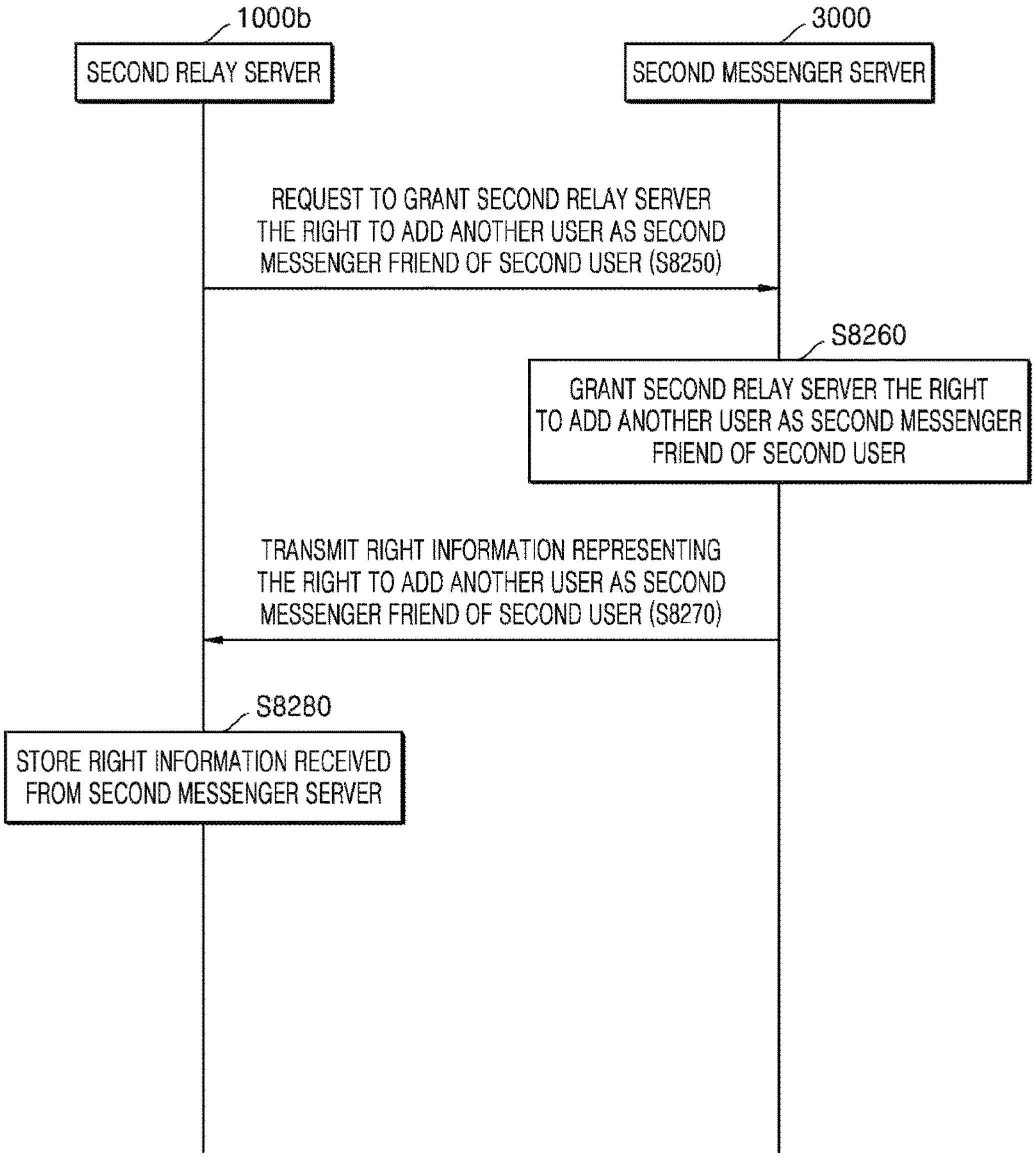
FIG. 82B is a flow diagram illustrating a method for the second relay server to acquire the right to add another user as the second messenger friend of the second user from the second messenger server, according to an exemplary embodiment.

FIG. 82B is a flow diagram illustrating a method for the second relay server 1000*b* to acquire the right to add another user as the second messenger friend of the second user from the second messenger server 3000, according to an exemplary embodiment.

In operation S8250, the second relay server 1000*b* requests the second messenger server 3000 to grant the second relay server 1000*b* the right to add another user as the second messenger friend of the second user. In operation S8260, the second messenger server 3000 grants the second relay server 1000*b* the right to add another user as the second messenger friend of the second user. In operation S8270, the second messenger server 3000 transmits the right information representing the right to add another user as the second messenger friend of the second user to the second relay server 1000*b*. In operation S8280, the second relay server 1000*b* stores the right information received from the second messenger server 3000.

Operations S8250 to S8280 may correspond to operations S8210 to S8240 of FIG. 82A.

Figure 83A:
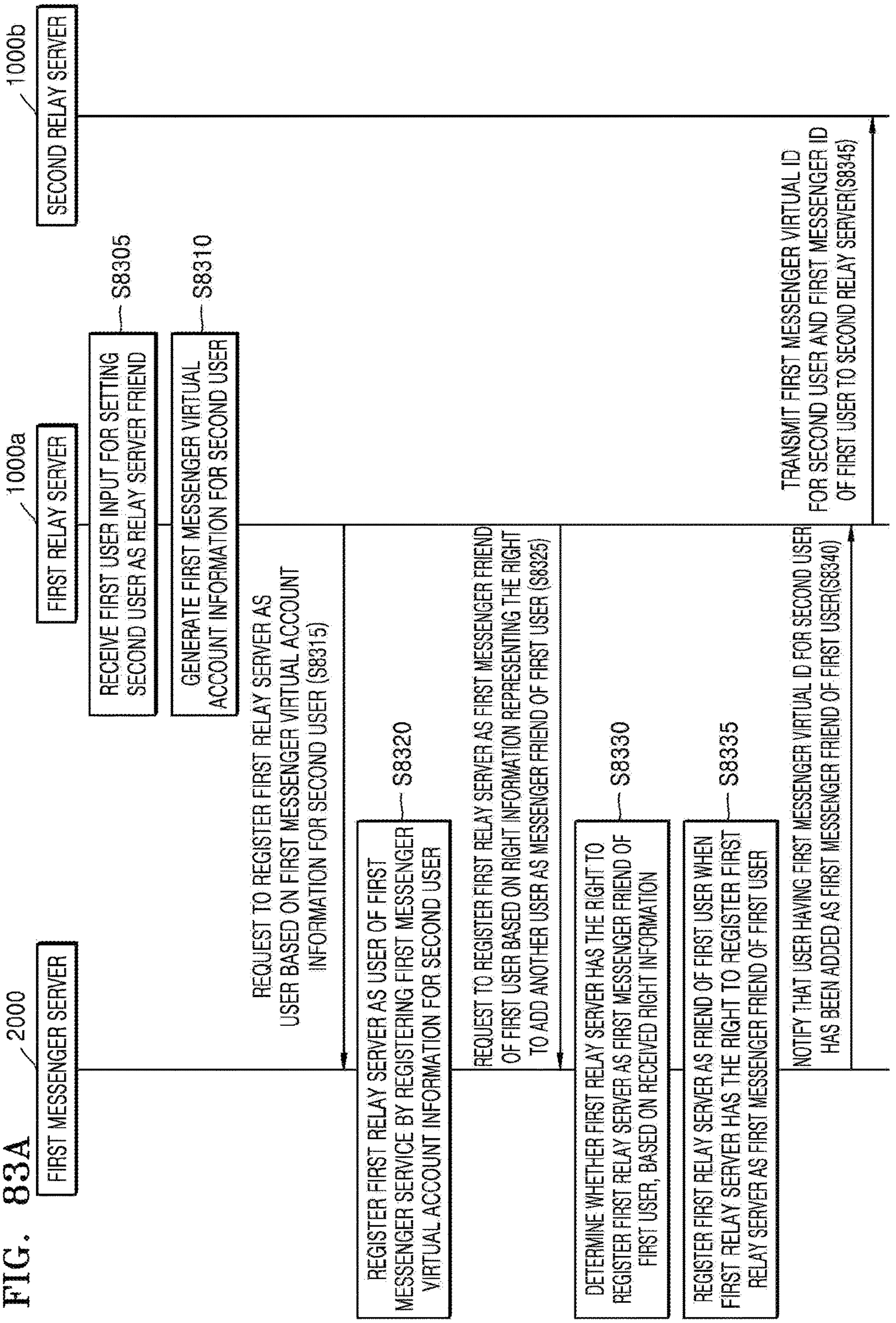
FIG. 83A is a flow diagram illustrating a method for the first relay server to register the first relay server in the first messenger server and register the first relay server as the first messenger friend of the first user in the first messenger server based on the right information of the first user, according to an exemplary embodiment.

FIG. 83A is a flow diagram illustrating a method for the first relay server 1000*a* to register the first relay server 1000*a* in the first messenger server 2000 and register the first relay server 1000*a* as the first messenger friend of the first user in the first messenger server 2000 based on the right information of the first user, according to an exemplary embodiment.

Referring to FIG. 83A, in operation S8305, the first relay server 1000*a* receives a first user input for setting the second user as the relay server friend.

Figure 84A:
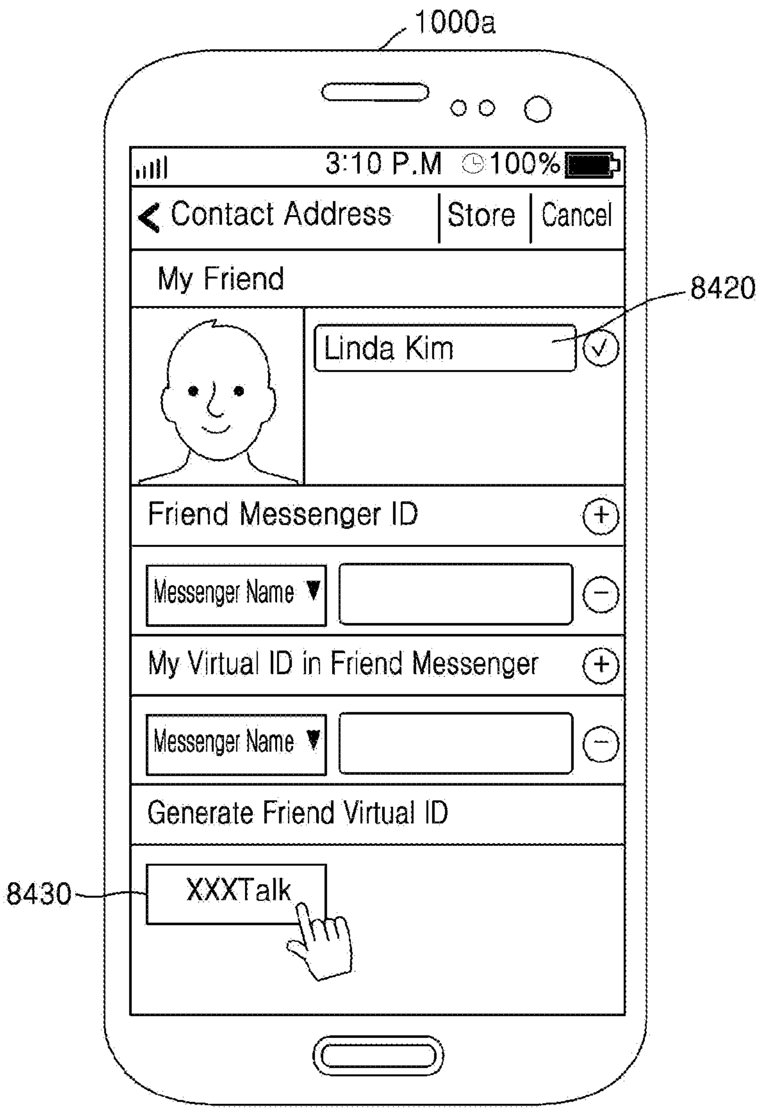
FIGS. 84A to 84C are diagrams illustrating a method for the first relay server to transmit the first messenger virtual ID of the second user to the second relay server, according to an exemplary embodiment.

For example, as illustrated in FIG. 84A, the first relay server 1000*a* may provide a UI for selecting the user among the contact address list and setting the selected user as the first relay server friend of the first user. The first relay server friend of the first user may refer to the user that does not use the first messenger but may communicate messages with the first user by using the first relay server 1000*a*.

In operation S8310, the first relay server 1000*a* generates first messenger virtual account information for the second user.

When the second user is selected as the first relay server friend, the first relay server 1000*a* may generate the first messenger virtual account information for the second user.

The first messenger virtual account information for the second user may include a first messenger virtual ID for the second user and a first messenger virtual password for the second user.

For example, the first relay server 1000*a* may generate a coined word and determine the coined word as the first messenger virtual ID for the second user. Also, the first relay server 1000*a* may determine the first relay server (1000*a*) ID of the second user or the name or unique information of the second user as the first messenger virtual ID for the second user.

Also, the first relay server 1000*a* may generate the first messenger virtual password for the second user.

In operation S8315, the first relay server 1000*a* requests the first messenger server 2000 to register the first relay server 1000*a* as the user based on the first messenger virtual account information for the second user.

In this case, the first relay server 1000*a* may transmit the first messenger virtual account information for the second user and the address information of the first relay server 1000*a* to the first messenger server 2000. The address information of the first relay server 1000*a* may include the IP address information of the first relay server 1000*a* or the identification information of the first relay server 1000*a* registered in the push server.

In operation S8320, the first messenger server 2000 registers the first relay server 1000*a* as the user of the first messenger service by registering the first messenger virtual account information for the second user.

The first messenger server 2000 may register the first relay server 1000*a* as the user of the first messenger service by registering the first messenger virtual account information for the second user received from the first relay server 1000*a*. Also, the first messenger server 2000 may store the address information of the first relay server 1000*a* corresponding to the first messenger virtual account information for the second user.

In operation S8325, the first relay server 1000*a* requests the first messenger server 2000 to register the first relay server 1000*a* as the first messenger friend of the first user based on the right information representing the right to add another user as the messenger friend of the first user.

In this case, the first relay server 1000*a* may transmit the first messenger ID of the first user, the right information, and the first messenger virtual account information of the second user to the first messenger server 2000.

In operation S8330, the first messenger server 2000 determines whether the first relay server 1000*a* has the right to register the first relay server 1000*a* as the first messenger friend of the first user, based on the received right information.

For example, when the received right information is the password and the first messenger ID of the first user, the first messenger server 2000 may authenticate the first relay server 1000*a* as the first user based on the received password and first messenger ID of the first user.

Also, according to an exemplary embodiment, when the received right information is the right information that is distributed to the first relay server 1000*a* by the first messenger server 2000 based on the first user input, the first messenger server 2000 may compare the right information distributed to the first relay server 1000*a* with the right information stored in the first messenger server 2000 and determine that the first relay server 1000*a* has the right to register the messenger friend of the first user.

In operation S8335, the first messenger server 2000 registers the first relay server 1000*a* as the first messenger friend of the first user when the first relay server 1000*a* has the right to register the first relay server 1000*a* as the friend of the first user.

The first messenger server 2000 may store the first messenger virtual ID information for the second user as the messenger friend of the first user corresponding to the first user ID.

In operation S8340, the first messenger server 2000 notifies the first relay server 1000*a* that the user having the first messenger virtual ID information for the second user has been added as the first messenger friend of the first user.

In this case, the first messenger server 2000 may transmit the first messenger virtual ID for the second user to the first relay server 1000*a*.

In operation S8345, the first relay server 1000*a* transmits the first messenger virtual ID for the second user and the first messenger ID of the first user to the second relay server 1000*b*.

In this case, the first relay server 1000*a* may transmit the first messenger ID of the first user together with the first messenger virtual ID for the second user to the second relay server 1000*b*.

Figure 84B:
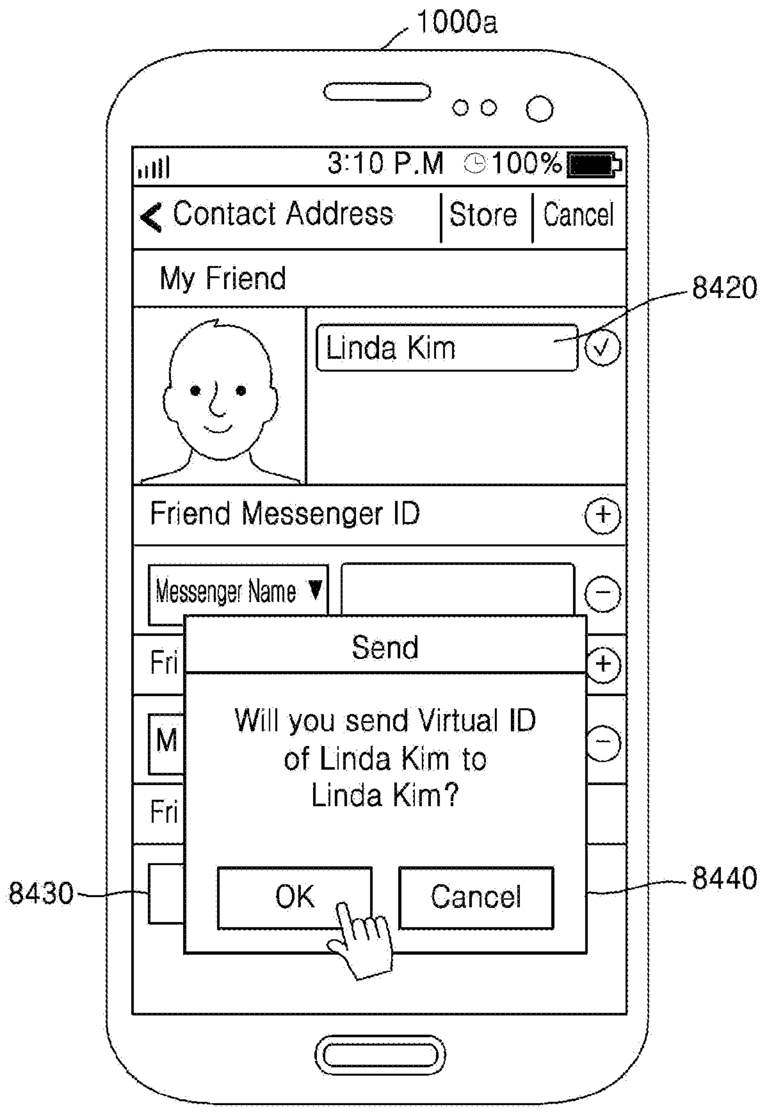

For example, as illustrated in FIG. 84B, when receiving the first messenger virtual ID for the second user from the first messenger server 2000, the first relay server 1000*a* may provide a UI for transmitting the first messenger virtual ID of the second user and the first messenger ID of the first user to the second user by using a text message.

Figure 84C:
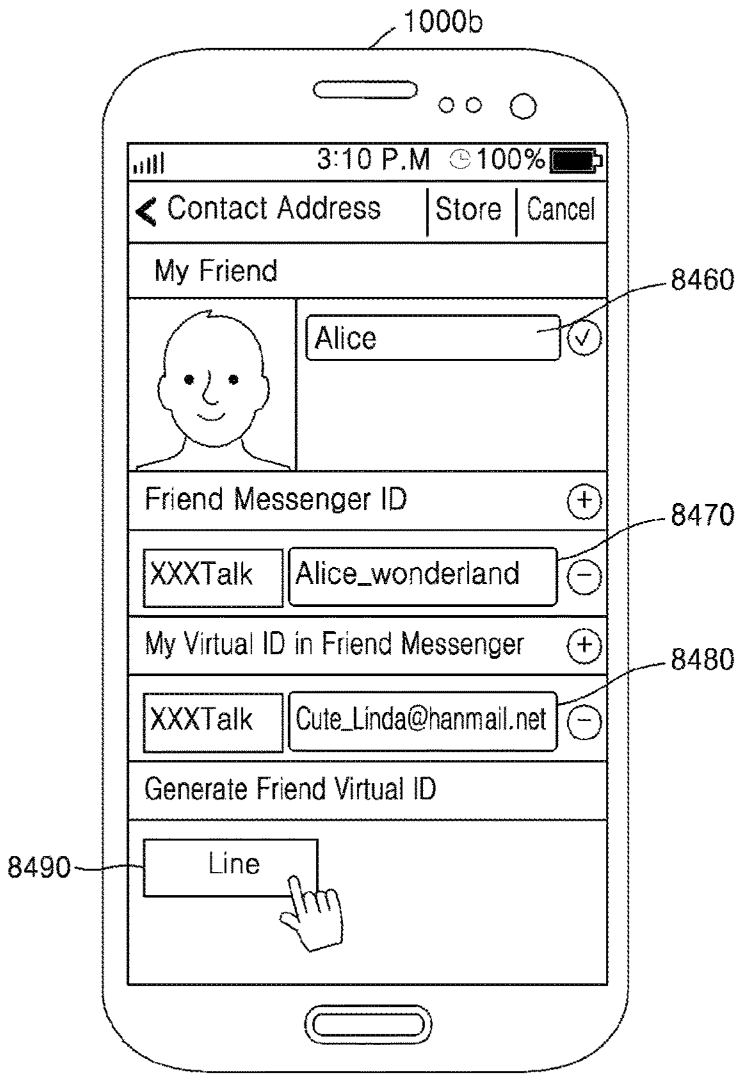

As illustrated in FIG. 84C, when receiving a text message from the first relay server 1000*a*, the second relay server 1000*b* may receive a second user input for setting the first messenger virtual ID of the second user and the first messenger ID of the first user, which are included in the text message, in the second relay server 1000*b*.

Also, according to an exemplary embodiment, the first relay server 1000*a* may request a separate server, which are subscribed by the first user and the second user, to transmit the first messenger virtual ID of the second user and the first messenger ID of the first user to the second user. When receiving the first messenger virtual ID of the second user and the first messenger ID of the first user from the separate server, the second relay server 1000*b* may store the received first messenger virtual ID of the second user and the received first messenger ID of the first user.

Figure 83B:
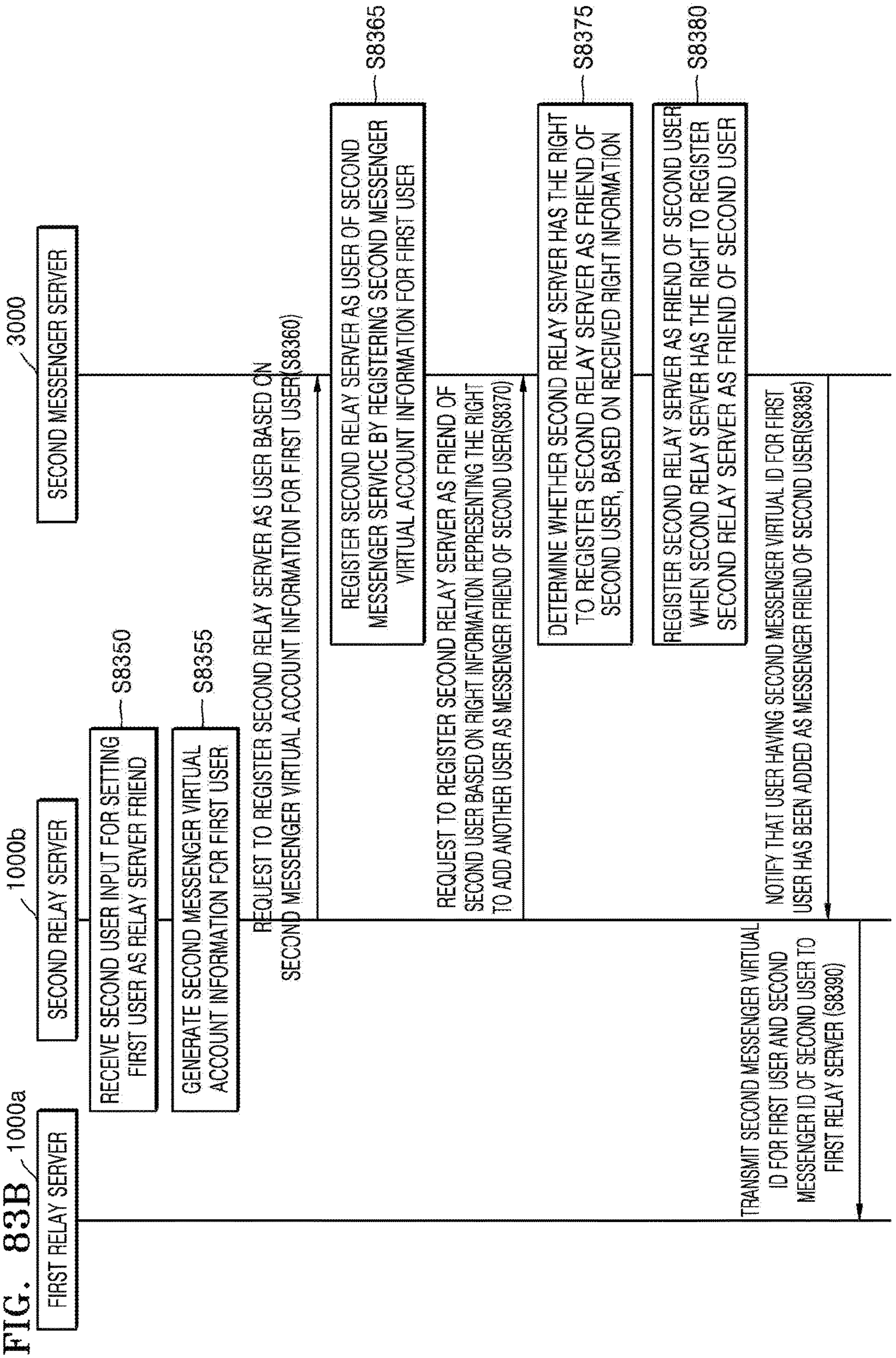
FIG. 83B is a flow diagram illustrating a method for the second relay server to register the second relay server in the second messenger server and register the second relay server as the second messenger friend of the second user in the second messenger server based on the right information of the second user, according to an exemplary embodiment.

FIG. 83B is a flow diagram illustrating a method for the second relay server 1000*b* to register the second relay server 1000*b* in the second messenger server 3000 and register the second relay server 1000*b* as the second messenger friend of the second user in the second messenger server 3000 based on the right information of the second user, according to an exemplary embodiment.

Referring to FIG. 83B, in operation S8350, the second relay server 1000*b* receives a second user input for setting the first user as the relay server friend. In operation S8355, the second relay server 1000*b* generates second messenger virtual account information for the first user. In operation S8360, the second relay server 1000*b* requests the second messenger server 3000 to register the second relay server 1000*b* as the user based on the second messenger virtual account information for the first user. In operation S8365, the second messenger server 3000 registers the second relay server 1000*b* as the user of the second messenger service by registering the second messenger virtual account information for the first user. In operation S8370, the second relay server 1000*b* requests the second messenger server 3000 to register the second relay server 1000*b* as the messenger friend of the second user based on the right information representing the right to add another user as the messenger friend of the second user.

In operation S8375, the second messenger server 3000 determines whether the second relay server 1000*b* has the right to register the second relay server 1000*b* as the messenger friend of the second user, based on the received right information. In operation S8380, the second messenger server 3000 registers the second relay server 1000*b* as the messenger friend of the second user when the second relay server 1000*b* has the right to register the second relay server 1000*b* as the friend of the second user. In operation S8385, the second messenger server 3000 notifies the second relay server 1000*b* that the user having the second messenger virtual ID information for the first user has been added as the messenger friend of the second user. In operation S8390, the second relay server 1000*b* transmits the second messenger virtual ID for the first user and the second messenger ID of the second user to the first relay server 1000*a*.

Operations S8350 to S8380 may correspond to operations S8305 to S8345 of FIG. 83A.

FIGS. 84A to 84C are diagrams illustrating a method for the first relay server 1000*a* to transmit the first messenger virtual ID of the second user to the second relay server 1000*b*, according to an exemplary embodiment.

Referring to FIG. 84A, the first relay server 1000*a* may transmit the first messenger virtual ID for the second user and the first messenger ID of the first user to the second relay server 1000*b*.

For example, when receiving a first user input for selecting the contact address of the second user stored in the first device 100, the first device 100 may provide a UI for generating the first messenger virtual ID of the second user.

For example, when receiving an "Alice" input for selecting the contact address of "Linda Kim" stored in the "Alice" device 1000*a* that is the first relay server 1000*a*, the "Alice" device 1000*a* may display a button 8430 for generating identification information 8420 of "Linda Kim" and a virtual ID of "Linda Kim" for "KakaoTalk" that is a messenger service subscribed by "Alice".

When receiving the "Alice" input for selecting the button 8430, the "Alice" device 1000*a* may request the "KakaoTalk" server 2000 to generate the virtual account of "Linda Kim" and register the generated virtual account. Also, the "Alice" device 1000*a* may store the generated account information as the virtual account of "Linda Kim".

Referring to FIG. 84B, the first relay server 1000*a* may transmit the first messenger virtual ID for the second user and the first messenger ID of the first user to the second relay server 1000*b*.

For example, when receiving the virtual account from the "KakaoTalk" server, the "Alice" device 1000*a* may display a pop-up window 8440 for transmitting the KakaoTalk virtual ID of "Linda Kim" to "Linda Kim".

The pop-up window 8440 may be a window for transmitting the KakaoTalk virtual ID of "Linda Kim" to "Linda Kim" in the form of a text message, or may be a window for requesting the separate server of "Alice" and "Linda Kim" to transmit the KakaoTalk virtual ID of "Linda Kim" to "Linda Kim".

When receiving the "Alice" input for selecting an OK button in the message window, the "Alice" device 1000*a* may transmit the KakaoTalk virtual ID of "Linda Kim" in the form of a text or to a separate server. In this case, the "Alice" device 1000*a* may transmit the KakaoTalk ID of "Alice" together.

Referring to FIG. 84C, the second relay server 1000*b* may receive the first messenger virtual ID for the second user and the first messenger ID of the first user from the first relay server 1000*a*.

The "Linda Kim" device 1000*b* that is the second relay server 1000*b* may receive the KakaoTalk virtual ID of "Linda Kim" and the KakaoTalk ID of "Alice" in the form of a text message or from a separate server.

When receiving the KakaoTalk virtual ID of "Linda Kim" and the KakaoTalk ID of "Alice" in the form of a text message, the "Linda Kim" device 1000*b* may receive an input of "Linda Kim" for inputting the KakaoTalk virtual ID of "Linda Kim" and the KakaoTalk ID of "Alice" and store the received information corresponding to the identification information of "Alice". When receiving the KakaoTalk virtual ID of "Linda Kim" and the KakaoTalk ID of "Alice" from a separate server, the "Linda Kim" device 1000*b* may store the KakaoTalk virtual ID of "Linda Kim" and the KakaoTalk ID of "Alice" corresponding to the identification information of "Alice".

Accordingly, when receiving an input of "Linda Kim" for selecting the contact address of "Alice", the "Linda Kim" device 1000*b* may display the KakaoTalk virtual ID (8480) of "Linda Kim" and the KakaoTalk ID (8470) of "Alice" stored corresponding to the identification information (8460) of "Alice".

Also, the "Linda Kim" device 1000*b* may display a button 8490 for generating the virtual ID of "Alice" for "Line" that is a messenger service subscribed by "Linda Kim".

FIG. 85A is a diagram illustrating a DB stored in the first relay server 1000*a*, according to an exemplary embodiment.

Referring to FIG. 85A, the first relay server 1000*a* may store first user information 8510 and second user information 8520.

For example, the first relay server 1000*a* may store first messenger account information 8514 of the first user received from the first user or the first messenger server 2000 corresponding to messenger identification information 8512. Also, the first relay server 1000*a* may store right information 8516 representing the right to add another user as the messenger friend of the first user, which has been received from the first messenger server 2000, corresponding to the messenger identification information 8512.

Also, the first relay server 1000*a* may store the information 8520 about the users that are stored as the first relay server friend. For example, the first relay server 1000*a* may store first messenger virtual account information 8522 and 8523 of the second user, messenger identification information 8524 of the second user, a second messenger ID 8525 of the second user, and a contact address 8526 of the second user, corresponding to identification information 8521 of the second user.

FIG. 85B is a diagram illustrating a DB stored in the second relay server 1000*b*, according to an exemplary embodiment.

Referring to FIG. 85B, the second relay server 1000*b* may store second user information 8530 and first user information 8540.

The second user information 8530 and the first user information 8540 stored by the second relay server 1000*b* may be described with reference to FIG. 85A.

Figure 86:
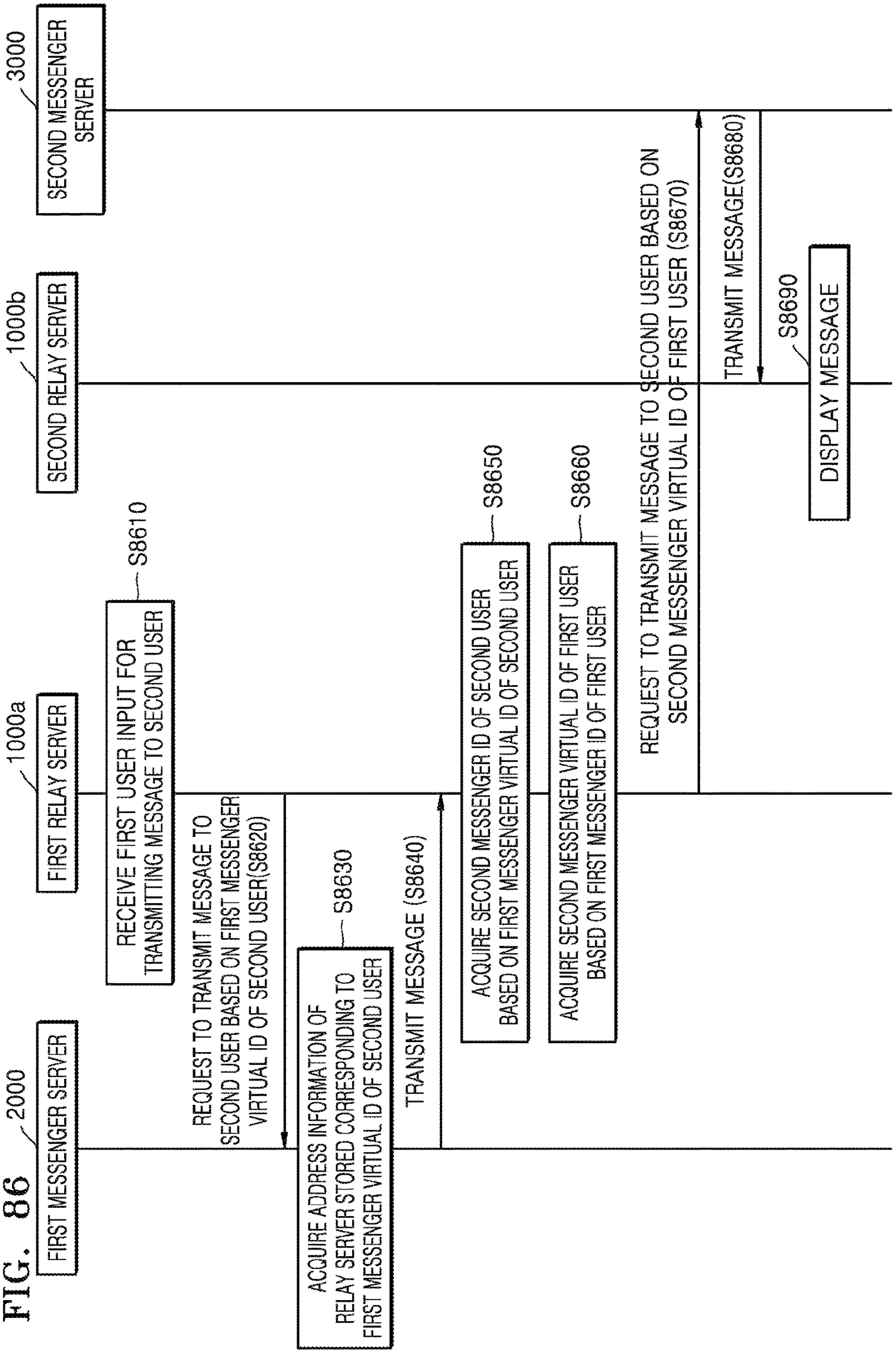
FIG. 86 is a flow diagram illustrating a method for the first relay server and the second relay server to relay a message transmitted from the first user to the second user, according to an exemplary embodiment.

FIG. 86 is a flow diagram illustrating a method for the first relay server 1000*a* and the second relay server 1000*b* to relay a message transmitted from the first user to the second user, according to an exemplary embodiment.

Referring to FIG. 86, in operation S8610, the first relay server 1000*a* receives a first user input for transmitting a message to the second user.

For example, the first relay server 1000*a* may receive a first user input for executing the application distributed by the first messenger service provider and transmitting a message to the second user by using the executed application.

In operation S8620, the first relay server 1000*a* requests to transmit a message to the second user based on the first messenger virtual ID of the second user.

When receiving the first user input for transmitting a message to the second user, the first relay server 1000*a* may request the first messenger server 2000 to transmit a message to the second user based on the first messenger virtual ID of the second user.

In this case, the first relay server 1000*a* may transmit the first messenger ID of the first user as the transmitter ID and the first messenger virtual ID of the second user as the receiver ID to the first messenger server 2000.

In operation S8630, the first messenger server 2000 acquires the address information of the relay server 1000 stored corresponding to the first messenger virtual ID of the second user.

The first messenger server 2000 may acquire the address information of the relay server 1000 stored corresponding to the first messenger virtual ID of the second user that is the receiver ID.

In operation S8640, the first messenger server 2000 transmits a message to the first relay server 1000*a*.

The first messenger server 2000 may transmit the message received from the first relay server to the relay server 1000 that is the receiver device.

The first relay server 1000*a* may transmit the first messenger ID of the first user as the transmitter ID and the first messenger virtual ID of the second user as the receiver ID to the first messenger server 2000.

In operation S8650, the first relay server 1000*a* acquires the second messenger ID of the second user based on the first messenger virtual ID of the second user.

The first relay server 1000*a* may acquire the second messenger ID of the second user stored corresponding to the first messenger virtual ID of the second user received from the first messenger server 2000.

Also, the first relay server 1000*a* may acquire the address information of the second messenger server 3000 and the identification information of the second messenger service stored corresponding to the first messenger virtual ID of the second user.

In operation S8660, the first relay server 1000*a* acquires the second messenger virtual ID of the first user based on the first messenger ID of the first user.

The first relay server 1000*a* may acquire the second messenger virtual ID of the first user stored corresponding to the first messenger virtual ID of the first user received from the first messenger server 2000.

In operation S8670, the first relay server 1000*a* requests the second messenger server 3000 to transmit a message to the second user based on the second messenger virtual ID of the first user.

The first relay server 1000*a* may transmit the message, the second messenger virtual ID of the first user as the transmitter ID and the ID of the second user as the receiver ID to the second messenger server 3000 by using the address information of the second messenger server 3000.

In operation S8680, the second messenger server 3000 transmits a message to the second relay server 1000*b*.

The second messenger server 3000 may acquire the address information of the second relay server 1000*b* stored corresponding to the second messenger ID of the second user. Also, the second messenger server 3000 may transmit the second messenger virtual ID of the first user as the transmitter ID and the second messenger ID of the second user as the receiver ID to the second relay server 1000*b* by using the address information of the second relay server 1000*b*.

In operation S8690, the second relay server 1000*b* displays the message.

When receiving the message from the second messenger server 3000, the second relay server 1000*b* may display the received message.

For example, the second relay server 1000*b* may display a notification window indicting that the message has been received from the second user. Also, for example, when receiving a second user input for executing the application provided by the second messenger service provider, the second relay server 1000*b* may display an image indicating that the message has been received from the second user.

Figure 87:
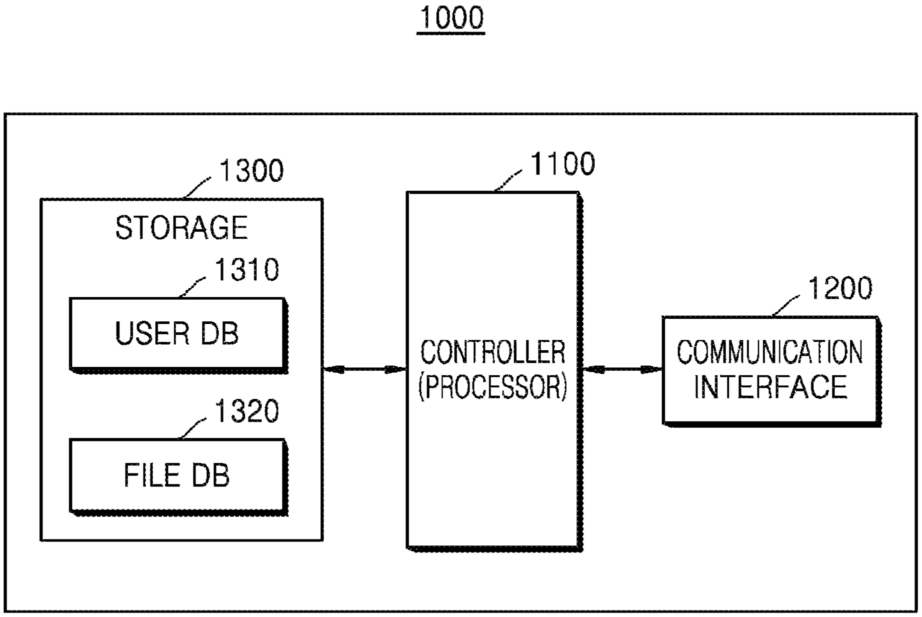
FIG. 87 is a block diagram of the relay server according to an exemplary embodiment.

FIG. 87 is a block diagram of the relay server 1000 according to an exemplary embodiment.

As illustrated in FIG. 87, the relay server 1000 according to an exemplary embodiment includes a controller 1100, a communication interface 1200, and a storage 1300. However, not all of the illustrated components are indispensable components. The relay server 1000 may include components more than the illustrated components, or may include components less than the illustrated components.

The communication interface 1200 may communicate with various types of external devices according to various types of communication methods. For example, the communication interface 1200 may communicate data with the devices 100 and 200 or the cloud storages 2000 and 3000.

Also, the communication interface 1200 may include communication ports. Through the communication ports, the communication interface 1200 may receive user inputs from the devices 100 and 200 and communicate files or information about files with the devices 100 and 200 or the cloud servers 2000 and 3000. Also, the communication interface 1200 may communicate messages and information about the messages with the devices 100 and 200 or the messenger servers 2000 and 3000.

The communication ports may include, but are not limited to, 100BASE-TX ports, 1000BASE-T ports, 10GBASE-T ports, WiFi antennas, Bluetooth antennas, and cellular antennas.

Also, the communication interface 1200 may include a network processor. The network processor may identify packets received through the communication ports and transmit the identified packets to the controller 1100. Also, the communication interface 1200 may transmit generated packets to the network through the communication ports. Also, the communication interface 1200 may communicate data according to various protocols. For example, the communication interface 1200 may communicate data according to TCP/IP, UDP, FTP, or SMTP, but are not limited thereto.

Also, according to an exemplary embodiment, the communication interface 1200 may include WiFi chips, Bluetooth chips, or wireless communication chips.

The storage 1300 may store data or information.

Also, the storage 1300 may include at least one of an internal memory and an external memory.

The internal memory may include at least one of volatile memories (e.g., dynamic RAMs (DRAMs), static RAMs (SRAMs), and synchronous dynamic RAMs (SDRAMs)), nonvolatile memories (e.g., one-time programmable ROMs (OTPROMs), programmable ROMs (PROMs), erasable and programmable ROMs (EPROMs), electrically erasable and programmable ROMs (EEPROMs), mask ROMs, and flash ROMs), hard disk drives (HDDs), and solid state drives (SSDs). The external memory may include, for example, at least one of CF (Compact Flash), SD (Secure Digital), Micro-SD (Micro Secure Digital), Mini-SD (Mini Secure Digital), xD (extreme Digital), and Memory Stick.

Also, the storage 1300 may include a user DB 1310 and a file DB 1320.

The user DB 1310 may include a computer-readable and writable storage medium. The user DB 1310 may store information about each user registered in the relay server 1000. For example, the user DB 1310 may store relay server account information, device identification information, file list information, and cloud server information of each user.

Also, the file DB 1320 may include a computer-readable and writable storage medium. The file DB 1320 may store information about files to be relayed. The files may include, but are not limited to, image files, audio files, video files, spreadsheets, presentation files, and HTML files.

Also, the file DB 1320 may store attribute information of each file. The attribute information of each file may include, but is not limited to, information about a file name, a file type, an original file storage position, an original file size, a copied data size among a total file size, a file generation time, a file modification time, a file access time, a file access right, a file access range, and a thumbnail image.

The controller 1100 may control overall operations of the relay server 1000.

When the cloud server is a cloud storage, the storage 1300 may store access right information about the first cloud storage 2000 subscribed by the first user and access right information about the second cloud storage 3000 subscribed by the second user.

When the communication interface 1200 requests first user data, which is stored in the first cloud storage 2000, from the first cloud storage 2000 by using the storage access right information about the first cloud storage 2000, the controller 1100 may control the communication interface 1200 to transmit the first user data, which is received from the first cloud storage 2000 in response to the request, to the second cloud storage 3000 by using the stored access right information about the second cloud storage 3000.

Also, when the communication interface 1200 receives a synchronization request indicating that the first user data has been modified from the first cloud storage 2000, the controller 1100 may update a copy of first user data stored in the second cloud storage 3000 into the modified first user data in response to the synchronization request.

When the synchronization request includes position information representing the position of modified data in the file, the controller 1100 may determine whether the modified data is data of a write-protected region based on the position information in response to the synchronization request and update the copy of the first user data stored in the second cloud storage 3000 into the modified first user data when the modified data is not data of a write-protected region.

When the communication interface 1200 receives a synchronization request indicating that a copy of first user data stored in the second cloud storage 3000 has been modified from the second cloud storage 3000, the controller 1100 may update the first user data stored in the first cloud storage 2000 into the modified copy of the first user data in response to the synchronization request.

When the synchronization request includes position information representing the position of modified data in a copy of a file of the first user, the controller 1100 may determine whether the modified data is data of a write-protected region based on the position information in response to the synchronization request and update the first user data stored in the first cloud storage 2000 into the modified copy of the first user data when the modified data is not data of a write-protected region.

Also, when the communication interface 1200 receives a read protection request about a portion of a file among the first user data from the first device 1000 of the first user, the controller 1100 may acquire the file from the first cloud storage 2000 in response to the read protection request, delete a read-protected portion from the acquired file, and store a file with the portion deleted in the second cloud storage 3000.

Also, when the cloud server is a messenger server, the storage 1300 may store right information of the first user about the first messenger server 2000 and right information of the second user about the second messenger server 3000.

When the communication interface 1200 receives a message of the first user from the first messenger server 2000 by using the stored right information of the first user, the controller 1100 may control the communication interface 1200 to transmit the message of the first user, which is received from the first messenger server 2000, to the second messenger server 3000 by using the stored right information of the second user.

Also, when the communication interface 1200 receives a registration request for registering the second user as a first messenger friend of the first user from a device of the first user, the controller may generate a first messenger virtual ID of the second user in response to the registration request, register the generated first messenger virtual ID of the second user in the first messenger server 2000, and register the first messenger virtual ID of the second user as a messenger friend ID of the first user in the first messenger server 2000 based on the right information of the first user about the first messenger server 2000.

Also, the communication interface 1200 may transmit the first messenger virtual ID of the second user as an ID of the second user in the first messenger to the device of the first user in response to the registration request.

Also, when the communication interface 1200 receives a registration request for registering the first user as a second messenger friend of the second user from a device of the second user, the controller may generate a second messenger virtual ID of the first user in response to the registration request, register the generated second messenger virtual ID of the first user in the second messenger server 3000, and register the second messenger virtual ID of the first user as a messenger friend ID of the second user in the second messenger server 3000 based on the right information of the second user about the second messenger server 3000.

Also, the communication interface 1200 may transmit the second messenger virtual ID of the first user as an ID of the first user in the second messenger to the device of the second user in response to the registration request.

Also, the communication interface 1200 may register a first messenger virtual ID of the second user in the first messenger server 2000 by using the stored right information of the first user and receive the message of the first user about the second user from the first messenger server 2000 by using the registered first messenger virtual ID of the second user.

In this case, the controller 1100 may register a second messenger virtual ID of the first user in the second messenger server 3000 by using the stored right information of the second user and control the communication interface 1200 to transmit the message of the first user, which is received from the first messenger server 2000, to the second messenger server 3000 by using the registered second messenger virtual ID of the first user.

Also, the communication interface 1200 may receive a message transmission request for transmitting a message representing the first messenger virtual ID of the second user as a receiver ID to the second user, from a device of the first user and request the second messenger server 3000 to transmit the message representing the second messenger virtual ID of the first user as a transmitter ID to the second user in response to the message transmission request.

For example, the controller 1100 may acquire the position information representing the position of the first user stored in the first cloud storage 2000 and the position information representing the position of the second user storage space in the second cloud storage 3000.

Also, the controller 1100 may receive a share request of the first user for sharing the first user data with the second user from the device of the first user through the communication interface 1200. The share request may be a request for storing the first user data in the second user storage space.

Also, through the communication interface 1200, based on the right of the relay server 1000 for receiving the first user data from the first cloud storage 2000, the controller 1100 may receive the first user data stored in the first cloud storage 2000 from the first cloud storage 2000.

Also, through the communication interface 1200, based on the right of the relay server 1000 for storing data in the second user storage space in the second cloud storage 3000, the controller 1100 may store the received first user data in the second user storage space.

In this case, in the second cloud storage 3000, the controller 1100 may store only the file attribute information among the data constituting the first user file.

Also, when receiving a request for the first user data stored in the first cloud storage 2000 from the second cloud storage 3000, the controller 1100 may store the received first user data in the second user storage space.

Also, the controller 1100 may receive a synchronization request indicating that the first user data stored in the first cloud storage 2000 has been modified from the first cloud storage 2000.

Also, in response to the synchronization request, the controller 1100 may update the copy of the first user data stored in the second cloud storage 3000 into the modified first user data. The copy of the first user data may refer to the data obtained when the first user data in the first cloud storage 2000 is copied into the second user storage space in response to the share request.

Also, in response to the synchronization request, from the first device 100, the controller 1100 may determine whether the modified data is write-protected data and update the copy of the first user data stored in the second cloud storage 3000 into the modified first user data when the modified data is not write-protected data. In this case, the write protection may represent that the copy of the first user data stored in the second user storage space is set not to be modified by the relay server 1000.

Also, the controller 1100 may receive a read protection request for a portion of the file among the first user data from the first device 100.

Also, in response to the read protection request, the controller 1100 may receive the read-protected file from the first cloud storage 2000, delete a read-protected portion among the received file, and store the file with the read-protected portion deleted in the second user storage space.

Figure 88:
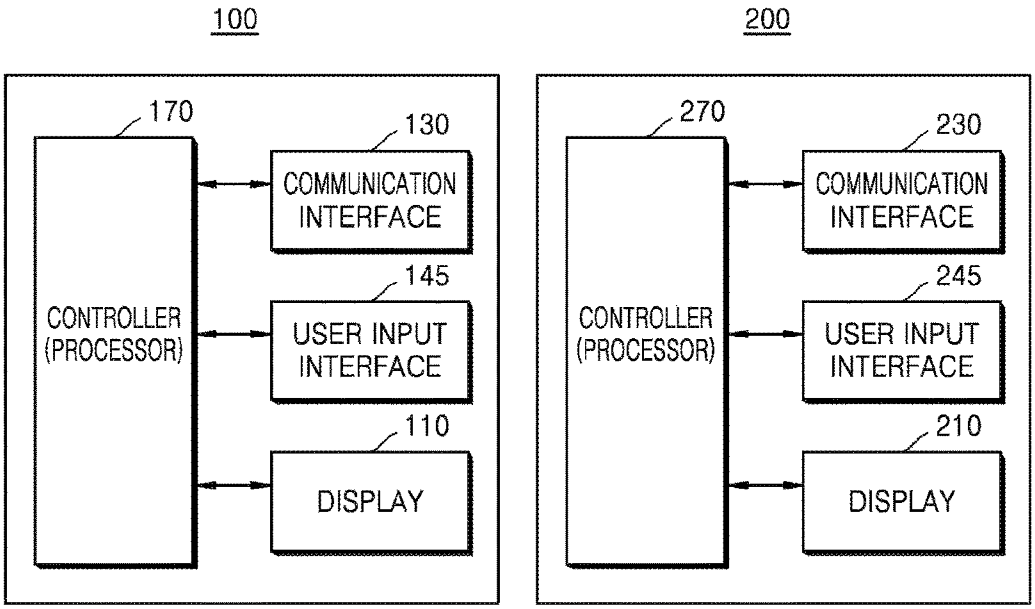
FIG. 88 is a block diagram of the first device according to an exemplary embodiment.

FIG. 88 is a block diagram of the first device 100 according to an exemplary embodiment. The configuration of the second device 200 may include the configuration of the first device 100.

As illustrated in FIG. 88, the first device 100 according to an exemplary embodiment includes a controller 170, a communication interface 130, a user input interface 145, and a display 110. The second device 200 according to an exemplary embodiment includes a controller 270, a communication interface 230, a user input interface 245, and a display 210 performing similar functions to those of the first device 100, and thus, description thereof will be omitted. However, not all of the illustrated components are indispensable components. The first device 100 and the second device 200 may include components more than the illustrated components, or may include components less than the illustrated components.

The communication interface 130 may communicate data with external devices. For example, the communication interface 130 may communicate data with the second device 200, the cloud servers 2000 and 3000, or the relay server 1000.

The user input interface 145 may receive a user input for sharing data from the first user. Also, the user input interface 145 may receive a user input for transmitting a message from the first user.

The display 110 may display data or an image for sharing data. Also, the display 110 may display data or an image for transmitting a message.

The controller 170 may control overall operations of the first device 100.

For example, the controller 170 may request the first cloud storage 2000 to assign the relay server 1000 the right to acquire the first user data from the first cloud storage 2000. For example, the controller 170 may request the second cloud storage 3000 to set a share between the second user and the relay server 1000 with respect to the second user folder stored in the second cloud storage 3000.

Also, the controller 170 may transmit a share request for sharing the first user data between the first user and the second user to the relay server 1000 based on the first user input. In this case, the share request may refer to the request for the relay server to receive the first user data from the first cloud storage 2000 based on the right to acquire the first user data from the first cloud storage 2000 and store the received first user data in the storage space for the second user data in the second cloud storage 3000.

Also, when the first device 100 operates as the second device 200, the controller 170 may request the second cloud storage 3000 to assign the relay server 1000 the right to store data in the second user storage space for the second user data.

Also, the controller 170 may receive the second user data stored in the second user storage space from the second cloud storage 3000.

Also, the display 110 may display the list of second user data received from the second cloud storage 3000. In this case, at least one of the second user data may include data obtained when the relay server 1000 receives a first user file from the first cloud storage 2000 according to the sharing of the first user with the second user with respect to the first user data stored in the first cloud storage 2000 and stores the received first user file in the second user storage space based on the right to store data in the second user storage space.

Figure 89:
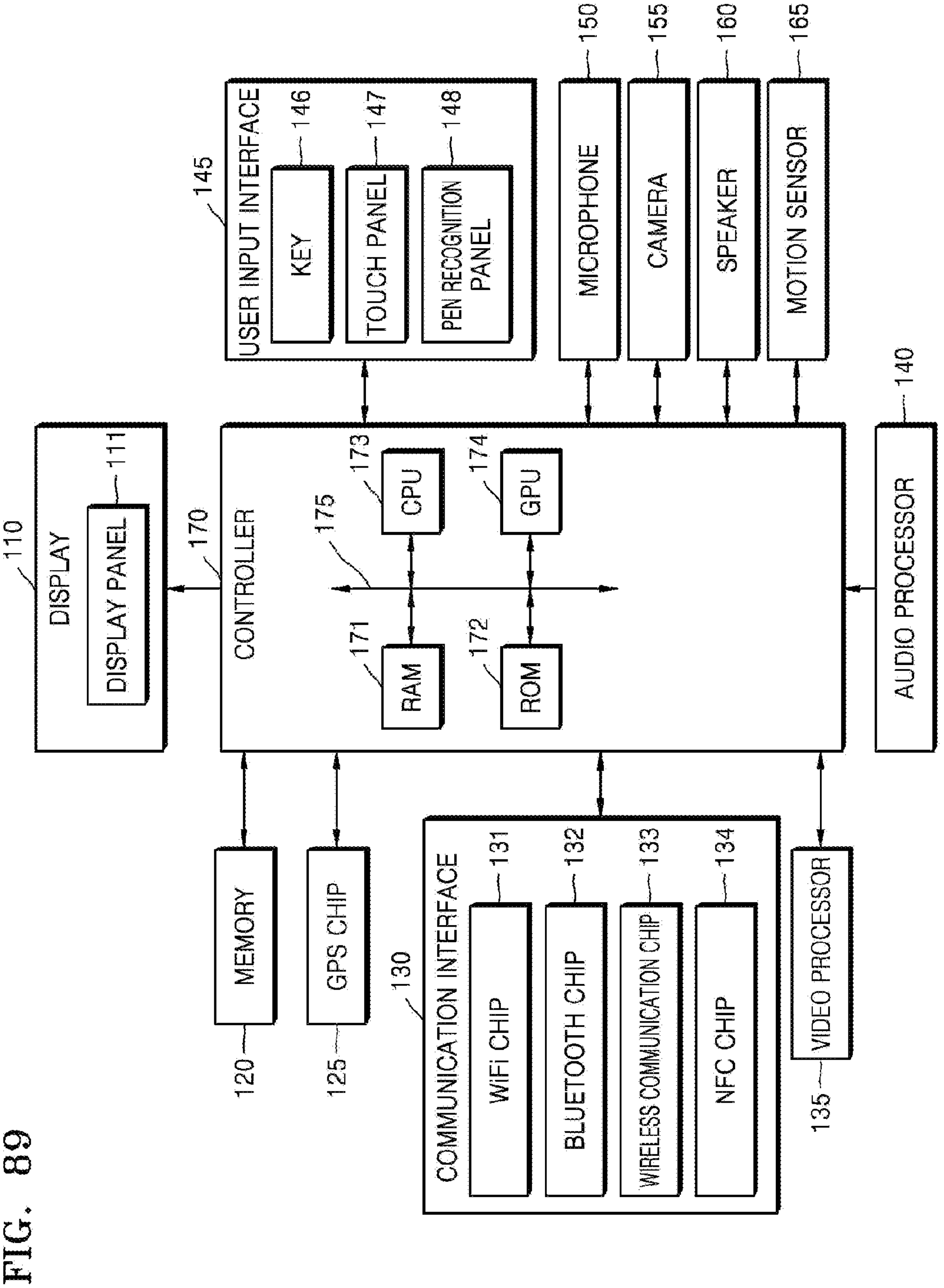
FIG. 89 is a block diagram of the first device according to another exemplary embodiment.

FIG. 89 is a block diagram of the first device 100 according to another exemplary embodiment. The configuration of the second device 200 may include the configuration of the first device 100.

As illustrated in FIG. 89, the configuration of the first device 100 may be applied, for example, to various types of devices such as portable phones, tablet PCs, PDAs, MP3 players, kiosks, electronic picture frames, navigation devices, digital TVs, and wearable devices such as head-mounted displays (HMDs) or wrist watches.

Referring to FIG. 89, the first device 100 includes a display 110, a controller 170, a memory 120, a global positioning system (GPS) chip 125, a communication interface 130, a video processor 135, an audio processor 140, a user input interface 145, a microphone 150, a camera 155, a speaker 160, and a motion sensor 165.

The display 110 includes a display panel 111 and a controller for controlling the display panel 111. The display panel 111 may include various types of displays such as liquid crystal displays (LCDs), organic light-emitting diode (OLED) displays, active-matrix organic light-emitting diode (AM-OLED) displays, and plasma display panels (PDPs). The display panel 111 may be implemented to be flexible, transparent, or wearable. The display 110 may be provided as a touchscreen in combination with a touch panel 147 of the user input interface 145. For example, the touchscreen may include an integrated module in which the display panel 111 and the touch panel 147 are combined into a laminated structure.

The memory 120 may include at least one of an internal memory and an external memory.

The internal memory may include, for example, at least one of volatile memories (e.g., DRAMs, SRAMs, and SDRAMs), nonvolatile memories (e.g., OTPROMs, PROMs, EPROMs, EEPROMs, mask ROMs, and flash ROMs), HDDs, and SSDs. According to an exemplary embodiment, the controller 170 may load data or commands received from at least one of the nonvolatile memories or other components into the volatile memories and process the same. Also, the controller 170 may store data received or generated from other components in the nonvolatile memories.

The external memory may include, for example, at least one of CF (Compact Flash), SD (Secure Digital), Micro-SD (Micro Secure Digital), Mini-SD (Mini Secure Digital), xD (extreme Digital), and Memory Stick.

The controller 170 may control the display 110 to display some of the contents stored in the memory 120. In other words, the controller 170 may display some of the contents stored in the memory 120 on the display 110. Also, when a user gesture is made in a region of the display 110, the controller 170 may perform a control operation corresponding to the user gesture.

The controller 170 may include at least one of a RAM 171, a ROM 172, a central processing unit (CPU) 173, a graphic processing unit (GPU) 174, and a bus 175. For example, the controller 170 may include only the CPU 173 or, only the CPU 173 and the GPU 174.

The RAM 171, the ROM 172, the CPU 173, and the GPU 174 may be connected to each other through the bus 175.

The CPU 173 may access the memory 120 and perform booting by using an operating system (OS) stored in the memory 120. Then, the CPU 173 may perform various operations by using various programs, contents, and data stored in the memory 120.

The ROM 172 may store an instruction set for system booting. For example, when the first device 100 is turned on in response to a turn-on command, the CPU 173 may copy the OS stored in the memory 120 into the RAM 171 according to the instruction stored in the ROM 172 and execute the OS to boot the system.

Also, the memory 120 may store at least one program for performing various embodiments of the present disclosure. The controller 170 may control the first device 100 to operate according to the various embodiments of the present disclosure by executing the at least one program stored in the memory 120. For example, the CPU 173 may copy the at least one programs stored in the memory 120 into the RAM 171 and execute the programs copied into the RAM 171, to perform various operations. When the booting of the first device 100 is completed, the GPU 174 may display a UI screen in a region of the display 110. In detail, the GPU 174 may generate a screen where an electronic document including various objects such as contents, icons, and menus are displayed. The GPU 174 may calculate display attribute values of the respective objects, such as coordinate values, shapes, sizes, and colors, according to the screen layout. Then, the GPU 174 may generate screens of various layouts including objects based on the calculated display attribute values. The screens generated by the GPU 174 may be provided to the display 110 and displayed in the respective regions of the display 110.

The GPS chip 125 may receive GPS signals from GPS satellites to calculate the current position of the first device 100. When using a navigation program, or when using the current position of the user, the controller 170 may calculate the current position of the user by using the GPS chip 125.

The communication interface 130 may communicate with various types of external devices according to various types of communication methods. The communication interface 130 may include at least one of a WiFi chip 131, a Bluetooth chip 132, a wireless communication chip 133, and a near field communication (NFC) chip 134. The controller 170 may communicate with various external devices by using the communication interface 130.

The WiFi chip 131 and the Bluetooth chip 132 may perform communication by the WiFi method and the Bluetooth method respectively. In the case of using the WiFi chip 131 or Bluetooth chip 132, various types of connection information such as SSIDs and session keys may be first transmitted/received to connect communication and then transmit/receive various types of information. The wireless communication chip 133 may refer to a chip that may perform communication according to various communication standards such as IEEE, ZigBee, 3G (3rd Generation), 3GPP (3rd Generation Partnership Project), and LTE (Long Term Evolution). The NFC chip 134 may refer to a chip that may operate by the NFC method using a 13.56 MHz frequency band among various RFID frequency bands such as 135 kHz, 13.56 MHz, 433 MHz, 860 to 960 MHz, and 2.45 GHz.

The video processor 135 may process video data included in the contents stored in the memory 120 or the contents received through the communication interface 130. The video processor 135 may perform various image processes such as decoding, scaling, noise filtering, frame rate conversion, and resolution conversion on the video data.

The audio processor 140 may process audio data included in the contents stored in the memory 120 or the contents received through the communication interface 130. The audio processor 140 may perform various processes such as decoding, amplification, and noise filtering on the audio data.

When a multimedia content player program is executed, the controller 170 may drive the video processor 135 and the audio processor 140 to play the corresponding content. The speaker 160 may output the audio data generated by the audio processor 140.

The user input interface 145 may receive various instructions from the user. The user input interface 145 may include at least one of a key 146, a touch panel 147, and a pen recognition panel 148.

The key 146 may include various types of keys such as mechanical buttons and wheels formed in various regions such as front portions, side portions, and rear portions of the body of the first device 100.

The touch panel 147 may sense a touch input of the user and output a touch event value corresponding to the sensed touch signal. When the touch panel 147 is combined with the display panel 111 to constitute the touchscreen, the touchscreen may be implemented as various types of touch sensors such as a capacitive type, a resistive type, and a piezoelectric type. When a portion of the body of the user touches the touchscreen surface, the capacitive-type touchscreen calculates the touch coordinates by sensing a microcurrent induced by the human body of the user by using the dielectric substance formed to coat the touchscreen surface. The resistive-type touchscreen includes two electrode plates installed in the touchscreen and calculates the touch coordinates by sensing a current flow caused by the contact between the upper and lower plates at the touch point contact when the user touches the screen. The touch event generated on the touchscreen may be mainly generated by the user's finger and may also be generated by the object of a conductive material that may apply an electrostatic capacity change.

The pen recognition panel 148 may sense the pen proximity input or pen touch input according to the operation of a user's touch pen (e.g., a stylus pen or a digitizer pen) and output the sensed pen proximity event or pen touch event. The pen recognition panel 148 may be implemented, for example, by the EMR method and may sense a touch or proximity input according to a change in the strength of an electromagnetic field caused by the pen proximity or touch. In detail, the pen recognition panel 148 may include an electromagnetic induction coil sensor that has a grid structure and an electronic signal processing unit that sequentially provides an alternating signal having a predetermined frequency to each loop coil of the electromagnetic induction coil sensor. When a pen including a resonant circuit is present near the loop coil of the pen recognition panel 148, a magnetic field transmitted from the loop coil generates a current based on a mutual electromagnetic induction in the resonant circuit included in the pen. Based on the generated current, an induction magnetic field may be generated from the coil constituting the resonant circuit in the pen, and the pen recognition panel 148 may sense the pen proximity position or touch position by detecting the induction magnetic field in the loop coil that is in a signal reception state. The pen recognition panel 148 may be provided under the display panel 111 to have a predetermined area, for example, an area that may cover the display region of the display panel 111.

The microphone 150 may receive a user voice or other sounds and convert the same into audio data. The controller 170 may use the user voice input through the microphone 150 in a call operation, or convert the same into audio data and store the audio data in the memory 120.

The camera 155 may capture still images or moving images according to the user's control. The camera 155 may be provided in plurality such as a front camera and a rear camera.

When the camera 155 and the microphone 150 are provided, the controller 170 may perform a control operation according to the user voice input through the microphone 150 or the user motion recognized by the camera 155. For example, the first device 100 may operate in a motion control mode or a voice control mode. When the first device 100 operates in a motion control mode, the controller 170 may enable the camera 155 to capture an image of the user, track a user's motion change, and perform a control operation corresponding to the user's motion change. When the first device 100 operates in a voice control mode, the controller 170 may analyze the user voice input through the microphone 150 and perform a control operation corresponding to the analyzed user voice (i.e., a voice recognition mode).

The motion sensor 165 may sense the body motion of the first device 100. The first device 100 may be rotated or inclined in various directions. In this case, the motion sensor 165 may sense motion features such as a rotation direction and angle and an inclination by using at least one of various sensors such as a magnetic sensor, a gyro sensor, and an acceleration sensor.

In addition, in FIG. 89, according to other exemplary embodiments, the first device 100 may further include: a USB port to which a USB connector may be connected; various external input ports for connection with various external terminals such as headset, mouse, and LAN; a digital multimedia broadcasting (DMB) chip for receiving and processing DMB signals; and various other sensors.

The names of the above components of the first device 100 may vary according to embodiments. Also, the first device 100 according to exemplary embodiments may include at least one of the above components, may omit some of the above components therefrom, or may further include other components in addition to the above components.

In addition, the exemplary embodiments may also be implemented through computer-readable code and/or instructions on a medium, e.g., a non-transitory computer-readable medium, to control at least one processing element to implement any above-described embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A relay server comprising:

a storage configured to store instructions, first access right information of a first cloud storage service to which a first user is subscribed, and second access right information of a second cloud storage service to which a second user is subscribed, wherein the first cloud storage service is physically remote from the second cloud storage service, and the relay server is physically remote from either one or both of the first cloud storage service and the second cloud storage service;

a communication interface configured to:

communicate, over a network, with the first cloud storage service, the second cloud storage service, a device of the first user and a device of the second user, wherein the device of the first user and the device of the second user are physically remote from the relay server, the first cloud storage service and the second cloud storage service;

request, from the first cloud storage service, first data that is stored in the first cloud storage service, based on the first access right information; and receive the requested first data from the first cloud storage service; and a hardware processor configured to execute the instructions to implement a controller configured to control the communication interface to store the received first data in the second cloud storage service, based on the second access right information, wherein the communication interface is further configured to:

receive, from the device of the first user, a read protection request for a portion of a file among the first data; and receive, from the device of the second user, a folder setting request to set a folder in the second cloud storage service, wherein the folder is for storing incoming data that is received by the second cloud storage service from the relay server, and the controller is further configured to:

set the folder in the second cloud storage service in response to the communication interface receiving the folder setting request;

acquire the file from the first cloud storage service in response to the communication interface receiving the read protection request;

apply read-protection to the portion of the acquired file; and store the read-protected portion of the acquired file in the set folder in the second cloud storage service.

2. The relay server of claim 1, wherein the first access right information includes an account of the relay server that is registered in the first cloud storage, and an access right representing a right of the relay server to receive the first data from the first cloud storage service is set in the first cloud storage service to correspond to the account.

3. The relay server of claim 2, wherein the access right is set by the first cloud storage service in response to the first cloud storage service receiving, from the device of the first user, a request for sharing the first data with the relay server.

4. The relay server of claim 1, wherein the second access right information of the second cloud storage service includes an account of the relay server that is registered in the second cloud storage service, and an access right representing a right of the relay server to store data in a storage space of the second cloud storage service is set in the second cloud storage service to correspond to the account.

5. The relay server of claim 4, wherein the access right is set by the second cloud storage service in response to the second cloud storage service receiving, from the device of the second user, a request for sharing the storage space of the second cloud storage service with the relay server.

6. The relay server of claim 1, wherein the communication interface is further configured to receive, from the first cloud storage service, a synchronization request indicating that the first data is modified, and the controller is further configured to update a copy of the first data that is stored in the second cloud storage service into the modified first data in response to the communication interface receiving the synchronization request.

7. The relay server of claim 6, wherein the synchronization request includes position information representing a position of modified data in the file, the controller is further configured to:

determine whether the modified data is of a write-protected region, based on the position information, in response to the communication interface receiving the synchronization request; and update the copy of the first data that is stored in the second cloud storage service into the modified first data in response to the controller determining that the modified data is not of the write-protected region, and the write-protected region is in the copy of the first data that is set not to be modified by the relay server.

8. The relay server of claim 1, wherein the communication interface is further configured to receive, from the second cloud storage service, a synchronization request indicating that a copy of the first data that is stored in the second cloud storage service is modified, and the controller is further configured to update the first data that is stored in the first cloud storage service into the modified copy of the first data in response to the communication interface receiving the synchronization request.

9. The relay server of claim 8, wherein the synchronization request includes position information representing a position of modified data in a copy of the file, the controller is further configured to:

determine whether the modified data is of a write-protected region, based on the position information, in response to the communication interface receiving the synchronization request; and update the first data that is stored in the first cloud storage service into the modified copy of the first data in response to the controller determining that the modified data is not of the write-protected region, and the write-protected region is in the first data that is set not to be modified by the relay server.

10. A data relay method in a method of sharing, by a relay server, data between devices, the data relay method comprising:

storing, by a storage, instructions, first access right information of a first cloud storage service to which a first user is subscribed, and second access right information of a second cloud storage service to which a second user is subscribed, wherein the first cloud storage service is physically remote from the second cloud storage service, and the relay server is physically remote from either one or both of the first cloud storage service and the second cloud storage service;

communicating, over a network, with the first cloud storage service, the second cloud storage service, a device of the first user and a device of the second user, wherein the device of the first user and the device of the second user are physically remote from the relay server, the first cloud storage service and the second cloud storage service;

requesting, by a communication interface, from the first cloud storage service, first data that is stored in the first cloud storage service, based on the first access right information; and receiving, by the communication interface, the requested first data from the first cloud storage service;

storing, by a hardware processor executing the instructions, the received first data in the second cloud storage service, based on the second access right information;

receiving, by the communication interface, from the device of the first user, a read protection request for a portion of a file among the first data;

receiving, by the communication interface, from the device of the second user, a folder setting request to set a folder in the second cloud storage service, wherein the folder is for storing incoming data that is received by the second cloud storage service from the relay server;

setting the folder in the second cloud storage service in response to the receiving the folder setting request;

acquiring, by the processor, the file from the first cloud storage service in response to the receiving the read protection request;

applying, by the processor, read-protection to the portion of the acquired file; and storing, by the processor, the read-protected portion of the acquired file in the set folder in the second cloud storage service.

11. The data relay method of claim 10, wherein the first access right information includes an account of the relay server that is registered in the first cloud storage service, and an access right representing a right of the relay server to receive the first data from the first cloud storage service is set in the first cloud storage service to correspond to the account.

12. The data relay method of claim 11, wherein the access right is set by the first cloud storage service in response to the first cloud storage service receiving, from the device of the first user, a request for sharing the first data with the relay server.

13. The data relay method of claim 10, wherein the second access right information of the second cloud storage service includes an account of the relay server that is registered in the second cloud storage service, and an access right representing a right of the relay server to store data in a storage space of the second cloud storage service is set in the second cloud storage service to correspond to the account.

14. The data relay method of claim 13, wherein the access right is set by the second cloud storage service in response to the second cloud storage service receiving, from the device of the second user, a request for sharing the storage space of the second cloud storage service with the relay server.

15. The data relay method of claim 10, further comprising:

receiving, from the first cloud storage service, a synchronization request indicating that the first data is modified; and updating a copy of the first data that is stored in the second cloud storage service into the modified first data in response to the receiving the synchronization request.

16. The data relay method of claim 15, wherein the synchronization request includes position information representing a position of modified data in the file, the updating comprises:

determining whether the modified data is of a write-protected region, based on the position information, in response to the receiving the synchronization request; and updating the copy of the first data that is stored in the second cloud storage service into the modified first data in response to the determining that the modified data is not of the write-protected region, and the write-protected region is in the copy of the first data that is set not to be modified by the relay server.

17. The data relay method of claim 10, further comprising:

receiving, from the second cloud storage service, a synchronization request indicating that a copy of the first data that is stored in the second cloud storage service is modified; and updating the first data that is stored in the first cloud storage service into the modified copy of the first data in response to the receiving the synchronization request.

18. The data relay method of claim 17, wherein the synchronization request includes position information representing a position of modified data in a copy of the file, the updating comprises:

determining whether the modified data is of a write-protected region, based on the position information, in response to the receiving the synchronization request; and updating the first data that is stored in the first cloud storage service into the modified copy of the first data in response to the determining that the modified data is not of the write-protected region, and the write-protected region is in the first data that is set not to be modified by the relay server.

19. A relay server comprising:

a storage configured to store instructions, first right information of a first user for a first messenger server, and second right information of a second user for a second messenger server;

a communication interface configured to receive a message of the first user from the first messenger server based on the first right information; and a hardware processor configured to execute the instructions to implement a controller configured to control the communication interface to transmit the message of the first user to the second messenger server based on the second right information, wherein the communication interface is further configured to:

receive, from a device of the first user, a read protection request for a portion of a file that is stored in a first cloud storage service; and receive, from a device of the second user, a folder setting request to set a folder in a second cloud storage service, wherein the folder is for storing incoming data that is received by the second cloud storage service from the relay server, the controller is further configured to:

set the folder in the second cloud storage service in response to the communication interface receiving the folder setting request;

acquire the file from the first cloud storage service in response to the communication interface receiving the read protection request;

apply read-protection to the portion of the acquired file; and store the read-protected portion of the acquired file in the set folder in the second cloud storage service, the first cloud storage service is physically remote from the second cloud storage service, the relay server is physically remote from either one or both of the first cloud storage service and the second cloud storage service, the device of the first user and the device of the second user are physically remote from the relay server, the first cloud storage service and the second cloud storage service, and the communication interface is further configured to communicate, over a network, with the device of the first user, the device of the second user, the first cloud storage service and the second cloud storage service.

20. The relay server of claim 19, wherein the first right information is of a right to register, in the first messenger server, a third user that is subscribed in the first messenger server as a messenger friend of the first user, and the second right information is of a right to register, in the second messenger server, a fourth user that is subscribed in the second messenger server as a messenger friend of the second user.

21. The relay server of claim 19, wherein the communication interface is further configured to receive, from the device of the first user, a registration request for registering the second user as a messenger friend of the first user, the controller is further configured to:

generate a messenger virtual identifier (ID) of the second user in response to the communication interface receiving the registration request;

register the messenger virtual ID of the second user in the first messenger server; and register, in the first messenger server, the messenger virtual ID of the second user as a messenger friend ID of the first user based on the first right information, and the communication interface is further configured to transmit, to the device of the first user, the messenger virtual ID of the second user as an ID of the second user in the first messenger server in response to the communication interface receiving the registration request.

22. The relay server of claim 19, wherein the communication interface is further configured to receive, from the device of the second user, a registration request for registering the first user as a messenger friend of the second user, the controller is further configured to:

generate a messenger virtual identifier (ID) of the first user in response to the communication interface receiving the registration request;

register the messenger virtual ID of the first user in the second messenger server; and register, in the second messenger server, the messenger virtual ID of the first user as a messenger friend ID of the second user based on the second right information, and the communication interface is further configured to transmit, to the device of the second user, the messenger virtual ID of the first user as an ID of the first user in the second messenger server in response to the communication interface receiving the registration request.

23. The relay server of claim 19, wherein the communication interface is further configured to:

register a first messenger virtual ID of the second user in the first messenger server based on the first right information; and receive, from the first messenger server, the message of the first user about the second user based on the registered first messenger virtual ID of the second user, and the controller is further configured to:

register a second messenger virtual ID of the first user in the second messenger server based on the second right information; and control the communication interface to transmit the message of the first user to the second messenger server based on the registered second messenger virtual ID of the first user.

24. The relay server of claim 23, wherein the communication interface is further configured to:

receive, from the device of the first user, a message transmission request for transmitting, to the device of the second user, a message representing the first messenger virtual ID of the second user as a receiver ID; and request the second messenger server to transmit, to the device of the second user, a message representing the second messenger virtual ID of the first user as a transmitter ID in response to the communication interface receiving the message transmission request.

25. A relay server comprising:

a memory storing instructions;

a hardware processor configured to execute the instructions to implement a controller configured to register an identifier (ID) of the relay server in a first cloud storage service and a second cloud storage service, wherein the first cloud storage service is physically remote from the second cloud storage service, and the relay server is physically remote from either one or both of the first cloud storage service and the second cloud storage service; and a communication interface configured to:

communicate, over a network, with the first cloud storage service, the second cloud storage service, a first device that is registered in the first cloud storage service and a second device that is registered in the second cloud storage service, wherein the first device and the second device are physically remote from the relay server, the first cloud storage service and the second cloud storage service;

receive, from the first device, a request to share first data with the second device;

request the first data from the first cloud storage service based on the ID of the relay server in response to the communication interface receiving the request; and receive the requested first data from the first cloud storage service, wherein the controller is further configured to store the received first data in the second cloud storage service, based on the ID of the relay server, the communication interface is further configured to:

receive, from the first device, a read protection request for a portion of a file among the first data; and receive, from the second device, a folder setting request to set a folder in the second cloud storage service, wherein the folder is for storing incoming data that is received by the second cloud storage service from the relay server, and the controller is further configured to:

acquire the file from the first cloud storage service in response to the communication interface receiving the read protection request;

apply read-protection to the portion of the acquired file; and store the read-protected portion of the acquired file in the set folder in the second cloud storage service.

26. The relay server of claim 25, wherein the relay server is granted a right to access the first data in the first cloud storage service by the first device, the right to access the first data being set to correspond to the ID of the relay server, and the relay server is granted a right to store data in the second cloud storage service by the second device, the right to store data being set to correspond to the ID of the relay server.

27. The relay server of claim 25, wherein the communication interface is further configured to request the first data from the first cloud storage service based on the ID of the relay server and a storage location of the first data in the first cloud storage service in response to the communication interface receiving the request.

28. The relay server of claim 25, wherein the communication interface is further configured to store the received first data in the second cloud storage service, based on the ID of the relay server and an ID of the second device.

* * * * *